(12) United States Patent
Tsukuba

(10) Patent No.: US 11,070,841 B2
(45) Date of Patent: Jul. 20, 2021

(54) IMAGE PROCESSING APPARATUS AND METHOD FOR CODING SKIP INFORMATION

(71) Applicant: SONY CORPORATION, Tokyo (JP)

(72) Inventor: Takeshi Tsukuba, Chiba (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/704,480

(22) Filed: Dec. 5, 2019

(65) Prior Publication Data

US 2020/0112746 A1 Apr. 9, 2020

Related U.S. Application Data

(62) Division of application No. 16/087,475, filed as application No. PCT/JP2017/011715 on Mar. 23, 2017, now Pat. No. 10,595,046.

(30) Foreign Application Priority Data

May 13, 2016 (JP) .............................. JP2016-097170
Jun. 8, 2016 (JP) .............................. JP2016-114765

(51) Int. Cl.
*H04N 19/61* (2014.01)
*H04N 19/176* (2014.01)
(Continued)

(52) U.S. Cl.
CPC ............. *H04N 19/61* (2014.11); *H04N 19/12* (2014.11); *H04N 19/124* (2014.11);
(Continued)

(58) Field of Classification Search
CPC ........ H04N 19/61; H04N 19/70; H04N 19/12; H04N 19/157; H04N 19/124; H04N 19/517; H04N 19/176
See application file for complete search history.

(56) References Cited

U.S. PATENT DOCUMENTS

2008/0310512 A1 12/2008 Ye et al.
2010/0086029 A1 4/2010 Chen et al.
(Continued)

FOREIGN PATENT DOCUMENTS

KR 10-2013-0116754 A 10/2013
RU 2012108618 A 11/2013
(Continued)

OTHER PUBLICATIONS

Zhao et al., TU-level non-separable secondary transform, JVET-B0059, Joint Video Exploration Team (JVET) of ITU-T SG 16 WP 3 and ISO/IEC JTC 1/SC 29/WG 11, pp. 1-5, Feb. 20-26, 2016, 2$^{nd}$ Meeting: San Diego, USA.
(Continued)

*Primary Examiner* — Marnie A Matt
(74) *Attorney, Agent, or Firm* — Paratus Law Group, PLLC

(57) ABSTRACT

There is provided an image processing apparatus and method that make it possible to suppress degradation of the encoding efficiency. In the case where primary transform that is a transform process for a prediction residual that is a difference between an image and a prediction image of the image is to be skipped, also secondary transform, which is a transform process for a primary transform coefficient obtained by the primary transform of the prediction residual, is skipped. The present disclosure can be applied, for example, to an image processing apparatus, an image encoding apparatus, an image decoding apparatus and so forth.

11 Claims, 78 Drawing Sheets

(51) Int. Cl.
*H04N 19/70* (2014.01)
*H04N 19/12* (2014.01)
*H04N 19/157* (2014.01)
*H04N 19/124* (2014.01)
*H04N 19/517* (2014.01)

(52) U.S. Cl.
CPC ......... *H04N 19/157* (2014.11); *H04N 19/176* (2014.11); *H04N 19/517* (2014.11); *H04N 19/70* (2014.11)

(56) References Cited

U.S. PATENT DOCUMENTS

| | | | |
|---|---|---|---|
| 2011/0032999 | A1 | 2/2011 | Chen et al. |
| 2012/0127003 | A1* | 5/2012 | Shibahara ............ H04N 19/124 341/87 |
| 2013/0003856 | A1* | 1/2013 | Saxena ................ H04N 19/12 375/240.18 |
| 2013/0215969 | A1 | 8/2013 | Fang et al. |
| 2014/0056362 | A1* | 2/2014 | Mrak .................... H04N 19/60 375/240.18 |
| 2017/0094313 | A1 | 3/2017 | Zhao et al. |
| 2019/0149822 | A1 | 5/2019 | Kim et al. |

FOREIGN PATENT DOCUMENTS

| | | |
|---|---|---|
| WO | WO 2017/058614 A1 | 4/2017 |
| WO | WO 2017/191782 A1 | 11/2017 |

OTHER PUBLICATIONS

Chen et al., Algorithm Description of Joint Exploration Test Model 2, JVET-B1001_v3, Joint Video Exploration Team (JVET) of ITU-T SG 16 WP 3 and ISO/IEC JTC 1/SC 29/WG 11, Feb. 20-26, 2016, pp. 1-32, $2^{nd}$ Meeting: San Diego, USA.

Tsukuba et al., EE2.7-related: On secondary transform when primary transform is skipped, JVET-O0045_r1, Joint Video Exploration Team (JVET) of ITU-T SG 16 WP 3 and ISO/IEC JTC 1/SC 29/WG 11, May 26-Jun. 1, 2016, pp. 1-7, $3^{rd}$ Meeting: Geneva, CH.

Jan. 29, 2019, European Search Report issued for related EP Application No. 17795837.8.

Zhao et al., TU-level non-separable secondary transform, Joint Video Exploration Team (JVET) of ITU-T SG 16 WP 3 and ISO/IEC JTC 1/SC 29/WG 11, Feb. 20-26, 2016, pp. 1-5, 2nd Meeting: San Diego, USA.

Xin Zhao et al., NSST: Non-Separable Secondary Transforms for Next Generation Video Coding, 2016 Picture Coding Symposium (PCS), Dec. 4-7, 2016, pp. 1-5, IEEE, Nuremberg, Germany.

* cited by examiner

FIG. 7

| scanIndex | scanType |
|---|---|
| 0 | Up-right diagonal scan |
| 1 | horizontal fast scan |
| 2 | vertical fast scan |

A

| 1→ | 2→ | 3→ | ↗4 |
|---|---|---|---|
| 5→ | 6→ | 7→ | ↗8 |
| 9→ | 10→ | 11→ | ↗12 |
| 13→ | 14→ | 15→ | 16 |

B horizontal fast scan

| 1 | 5 | 9 | 13 |
|---|---|---|---|
| 2 | 6 | 10 | 14 |
| 3 | 7 | 11 | 15 |
| 4 | 8 | 12 | 16 |

C vertical fast scan

| 1 | 3 | 6 | 10 |
|---|---|---|---|
| 2 | 5 | 9 | 13 |
| 4 | 8 | 12 | 15 |
| 7 | 11 | 14 | 16 |

D up-right diagonal scan

FIG. 15

| | Descriptor |
|---|---|
| residual_coding(x0, y0, log2TrafoSize, cIdx) { | |
|   if(transquant_bypass_enabled_flag) | |
|     transquant_bypass_flag[x0][y0][cIdx] | ae(v) |
|   if(ts_enabled_flag && !transquant_bypass_flag && (log2TrafoSize <= log2MaxTSSize) && st_idx==0) | |
|     ts_flag[x0][y0][cIdx] | ae(v) |
|   ... OMIT SYNTAX DESCRIPTION RELATING TO coeff ... | |
| } | |

FIG. 20

| | Descriptor |
|---|---|
| residual_coding(x0, y0, log2TrafoSize, cIdx) { | |
|   if(transquant_bypass_enabled_flag) | |
|     transquant_bypass_flag[x0][y0][cIdx] | ae(v) |
|   if(ts_enabled_flag && !transquant_bypass_flag && <br>    (log2TrafoSize <= log2MaxTSSize)) | |
|     ts_flag[x0][y0][cIdx] | ae(v) |
|   ... OMIT SYNTAX DESCRIPTION RELATING TO coeff ... | |
|   if(st_enabled_flag && <br>    (transquant_bypass_flag == 0 || ts_flag == 0) && <br>    numSig>=TH) | |
|     st_flag | ae(v) |
|   ... | |
| } | |

FIG. 27

| | Descriptor |
|---|---|
| residual_coding(x0, y0, log2TrafoSize, cIdx) { | |
|   if(transquant_bypass_enabled_flag) | |
|     transquant_bypass_flag[x0][cIdx] | ae(v) |
|   if(ts_enabled_flag && !transquant_bypass_flag && (log2TrafoSize <= log2MaxTSSize)) | |
|     ts_flag[x0][y0][cIdx] | ae(v) |
|   ... OMIT SYNTAX DESCRIPTION RELATING TO coeff ... | |
|   if(st_enabled_flag && (transquant_bypass_flag == 0 \|\| ts_flag == 0) && numSigInSBK>=TH) | |
|     st_flag | ae(v) |
|   ... | |
| } | |

FIG. 32

```
codePTIdx(pt_idx) {
  if(TBSize <= PT_INTRA_MAX_CU) {
    symbol1 = pt_idx >>1
    symbol2 = pt_idx & 1
    encode symbol1
    encode symbol2
  }
}
```
} Binarization is fixed length coding

A

Derivation of ctxInc on pt_idx

| binIdx | 0 | 1 |
|---|---|---|
| pt_idx = (pt_hor_flag<<1) +pt_ver_flag | intra ? 0:2 | intra?1:3 |

```
parsePTIdx(){
  pt_idx = 0
  if(TBSize <= PT_INTRA_MAX_CU) {
    symbol1 = decode bin
    symbol2 = decode bin
    pt_idx = (symbol1<<1) + symbol2
  }
  return pt_idx
}
```
⎱ Binarization is fixed length coding

B

Derivation of ctxInc on pt_idx

| binIdx | 0 | 1 |
|---|---|---|
| pt_idx = (pt_hor_flag<<1) +pt_ver_flag | intra ? 0:2 | intra?1:3 |

FIG. 34

| | Descriptor |
|---|---|
| residual_coding(x0,y0,log2TrafoSize,cIdx) { | |
|   if(transquant_bypass_enabled_flag) | |
|     transquant_bypass_flag[x0][y0][cIdx] | ae(v) |
|   if(ts_enabled_flag && !transquant_bypass_flag && (log2TrafoSize <= log2MaxTSSize)) | |
|     ts_flag[x0][y0][cIdx] | ae(v) |
|   ... OMIT SYNTAX DESCRIPTION RELATING TO coeff ... | |
|   if(pt_enabled_flag && (transquant_bypass_flag == 0 || ts_flag == 0) && numSig>=TH) | |
|     pt_idx | ae(v) |
|   ... | |
| } | |

FIG. 38

Derivation of ctxIncon pt_idx

| WORKING EXAMPLE | binIdx | | |
|---|---|---|---|
| | 0 | 1 | 2 |
| M0 (all bypass) | bypass | bypass | bypass |
| M1 (1 context coded bin+2 EP bins) | (intra?0:1) | bypass | bypass |
| M2 (2 context coded bins+1 EP bin) | (intra?0:1) | (intra?2:3) | bypass |
| M3 (1 context coded bin+2 EP bins) | 0 | bypass | bypass |
| M4 (2 context coded bins+1 EP bin) | 0 | 1 | bypass |

FIG. 39

```
//Example of Truncated Unary binarization
CodePTIdx(pt_idx) {
    maxPTIdx = 3;
    //optional (MODIFICATION 1)
    if(!intra)pt_idx = maxPTIdxVal - pt_idx maxBinIdx = min(pt_idx,maxPTIdx)
    for(binIdx=0;i< maxBinIdx;binIdx++) {
        symbol = 1
        encode symbol
    }
    if(pt_idx < maxPTIdx) {
        symbol = 0
        encode symbol
    }
}
```

A

Truncated unary binarization

| pt_idx | Bin string | | | |
|---|---|---|---|---|
| 0 | 0 | | | |
| 1 | 1 | 0 | | |
| 2 | 1 | 1 | 0 | |
| 3 | 1 | 1 | 1 | |

B

Truncated unary binarization
(INVERSE PATTERN OF SYMBOL)

| pt_idx | Bin string | | | |
|---|---|---|---|---|
| 0 | 1 | | | |
| 1 | 0 | 1 | | |
| 2 | 0 | 0 | 1 | |
| 3 | 0 | 0 | 0 | |

```
//Example of Truncated Unary binarization
ParsePTIdx() {
    pt_idx = 0
    symbol = 0
    maxPTIdx = 3
    do{
        symbol = decode bin
        if(symbol) {
            pt_idx ++
            if(pt_idx==maxPTIdx) break;
        }
    }while(symbol == 1)
    //optional (MODIFICATION 1)
    if(!intra)pt_idx = maxPTIdx - pt_idx
    return pt_idx
}
```

A

Truncated unary binarization

| pt_idx | Bin string | | | |
|---|---|---|---|---|
| 0 | 0 | | | |
| 1 | 1 | 0 | | |
| 2 | 1 | 1 | 0 | |
| 3 | 1 | 1 | 1 | |

B

Truncated unary binarization
(INVERSE PATTERN OF SYMBOL)

| pt_idx | Bin string | | | |
|---|---|---|---|---|
| 0 | 1 | | | |
| 1 | 0 | 1 | | |
| 2 | 0 | 0 | 1 | |
| 3 | 0 | 0 | 0 | |

| | Descriptor |
|---|---|
| residual_coding(x0,y0,log2TrafoSize,cIdx) { | |
|   if(transquant_bypass_enabled_flag) | |
|     transquant_bypass_flag[x0][y0][cIdx] | ae(v) |
|   if(ts_enabled_flag && !transquant_bypass_flag && (max(TBXSize, TBYSize) <= MaxTSSize)) | |
|     ts_flag[x0][y0][cIdx] | ae(v) |
|   ... OMIT SYNTAX DESCRIPTION RELATING TO coeff ... | |
|   if(st_enabled_flag && (transquant_bypass_flag == 0 \|\|ts_flag == 0) && numSig>=TH) | |
|     st_flag | ae(v) |
|   ... | |
| } | |

FIG. 52

JEM-4.0

| case | transquant_bypass_flag (CU) | apt_flag (CU) | ts_flag (TB) | pt_idx (TB) | st_idx (TB) | 1st Tr. | 2nd Tr. | SUBJECT |
|---|---|---|---|---|---|---|---|---|
| 0 | 0 | 0 | 0 | Not signal | 0 | DCT | – | |
| 1 | 0 | 0 | 0 | Not signal | >0 | DCT | NSST | |
| 2 | 0 | 0 | 1 | Not signal | Not signal | – | – | |
| 3 | 0 | 1 | 0 | >=0 | 0 | DTT | – | ts_flag IS REDUNDANT |
| 4 | 0 | 1 | 0 | >=0 | >0 | DTT | NSST | ts_flag IS REDUNDANT |
| 5 | 0 | 1 | 1 | Not signal | Not signal | – | – | apt_flag IS REDUNDANT |
| 6 | 1 | 0 | Not signal | Not signal | Not signal | – | – | apt_flag IS REDUNDANT |
| 7 | 1 | 1 | Not signal | Not signal | Not signal | – | – | apt_flag IS REDUNDANT |

DTT:Discrete Trigonometric Transform(GENERIC NAME OF DCT/DST)

FIG. 53

IN CASE syntax ORDER IS NOT CHANGED

| case | TQ Bypass Flag (CU) | apt_flag (TB) | ts_flag (TB) | pt_idx (TB) | st_idx (TB) | 1st Tr. | 2nd Tr. | |
|---|---|---|---|---|---|---|---|---|
| 0 | 0 | 0 | 0 | – | 0 | DCT | – | |
| 1 | 0 | 0 | 0 | – | >0 | DCT | NSST | |
| 2 | 0 | 0 | 1 | – | – | – | – | |
| 3 | 0 | 1 | – | >=0 | 0 | DTT | – | |
| 4 | 0 | 1 | – | >=0 | >0 | DTT | NSST | |
| 5 | 1 | – | – | – | – | – | – | |

DTT: Discrete Trigonometric Transform (GENERIC NAME OF DCT/DST)

F I G. 5 4

```
Transform Unit syntax
transform_unit(x0, y0, log2TbWidth, log2TbHeight) {
    ...
    for (compID=0; compID<numValidChannel; compID++) {
        cbf[x0][y0][compID]
        if(cbf[x0][y0][compID]) {
            if (apt_enabled_flag && compID==COMPONENT_Y
                && width <= MaxPTSize
                && height <= MaxPTSize
                && !transquant_bypass_flag[x0][y0]) {
                apt_flag[x0][y0]
            }
            if (compID==COMPONENT_Y) {
                residual_coding( x0, y0, log2TbWidth, log2TbHeight, COMPONENT_Y)
                // syntaxes related to residuals of luma TB
            }
            else { // compID!=COMPONENT_Y
                residual_coding( x0, y0, log2TbWidthC, log2TbHeightC, compID)
                // syntaxes related to residuals of chroma TBs
            }
        }
        //if(cbf[x0][y0][compID])
    } // end of loop for (compID=0; compID<numValidChannel; compID++)
    // syntaxes related to secondary transform
    numSigL  = ts_flag[x0][y0][COMPONENT_Y]  ? 0 : countNonZeroCoeffs (COMPONENT_Y)
    numSigC  = ts_flag[x0][y0][COMPONENT_Cb] ? 0 : countNonZeroCoeffs (COMPONENT_Cb)
    numSigC += ts_flag[x0][y0][COMPONENT_Cr] ? 0 : countNonZeroCoeffs (COMPONENT_Cr)
    if (st_enabled_flag && CuPredMode[x0][y0]==MODE_INTRA && !transquant_bypass_flag[x0][y0]) {
        if (numSigL >= stNumSigLTH)
            st_idx[x0][y0]
        if (numSigC >= stNumSigCTH)
            chroma_st_idx[x0][y0]
    }
    ...
}
```

| | Descriptor |
|---|---|
| | |
| | ae(v) |
| | |
| | |
| | ae(v) |
| | |
| | |
| | |
| | |
| | |
| | |
| | |
| | |
| | |
| | |
| | |
| | |
| | |
| | ae(v) |
| | ae(v) |
| | |

*countNonZeroCoeffs (compID) IS A FUNCTION THAT RETURNS THE NUMBER OF NON-ZERO COEFFICIENTS (SIGNIFICANT COEFFICIENTS) EXISTING IN THE TRANSFORM BLOCK OF THE COLOR SIGNAL INDICATED BY compID

F I G. 5 5

```
Residual Coding syntax
residual_coding(x0,y0,log2TbWidth,log2TbHeight,compID) {
    if(ts_enabled_flag && !transquant_bypass_flag[x0][y0] &&
       ((log2TbWidth + log2TbHeight) <= log2MaxTSSize ) && !apt_flag[x0][y0])
        ts_flag[x0][y0][compID]
    ...
    // syntaxes related to last_pos_(x,y),
        coded_sbk_flag,sig_flag,gr1_flag,
        gr2_flag/coeff_abs_level_remaining/coeff_sign_flag,etc…
    ...
    // syntaxes related to adaptive primary transform
    numSig = countNonZeroCoeffs (compID)
    if( compID == COMPUNENT_Y && apt_flag[x0][y0] &&
       !transquant_bypass_flag[x0][y0] && !ts_flag[x0][y0][compID] &&
       log2TbWidth <= log2MaxPTSize && log2TbHeight <= log2MaxPTSize &&
       ((CuPredMode[x0][y0]==MODE_INTRA && numSig >= ptNumSigTH) ||
        CuPredMode[x0][y0]==MODE_INTER) ]
       {
           pt_idx[x0][y0][compID]
       }
    ...
}
```

| Descriptor |
|---|
| ae(v) |
| ae(v) |

*countNonZeroCoeffs (compID) IS A FUNCTION THAT RETURNS THE NUMBER OF NON-ZERO COEFFICIENTS (SIGNIFICANT COEFFICIENTS) EXISTING IN THE TRANSFORM BLOCK OF THE COLOR SIGNAL INDICATED BY compID

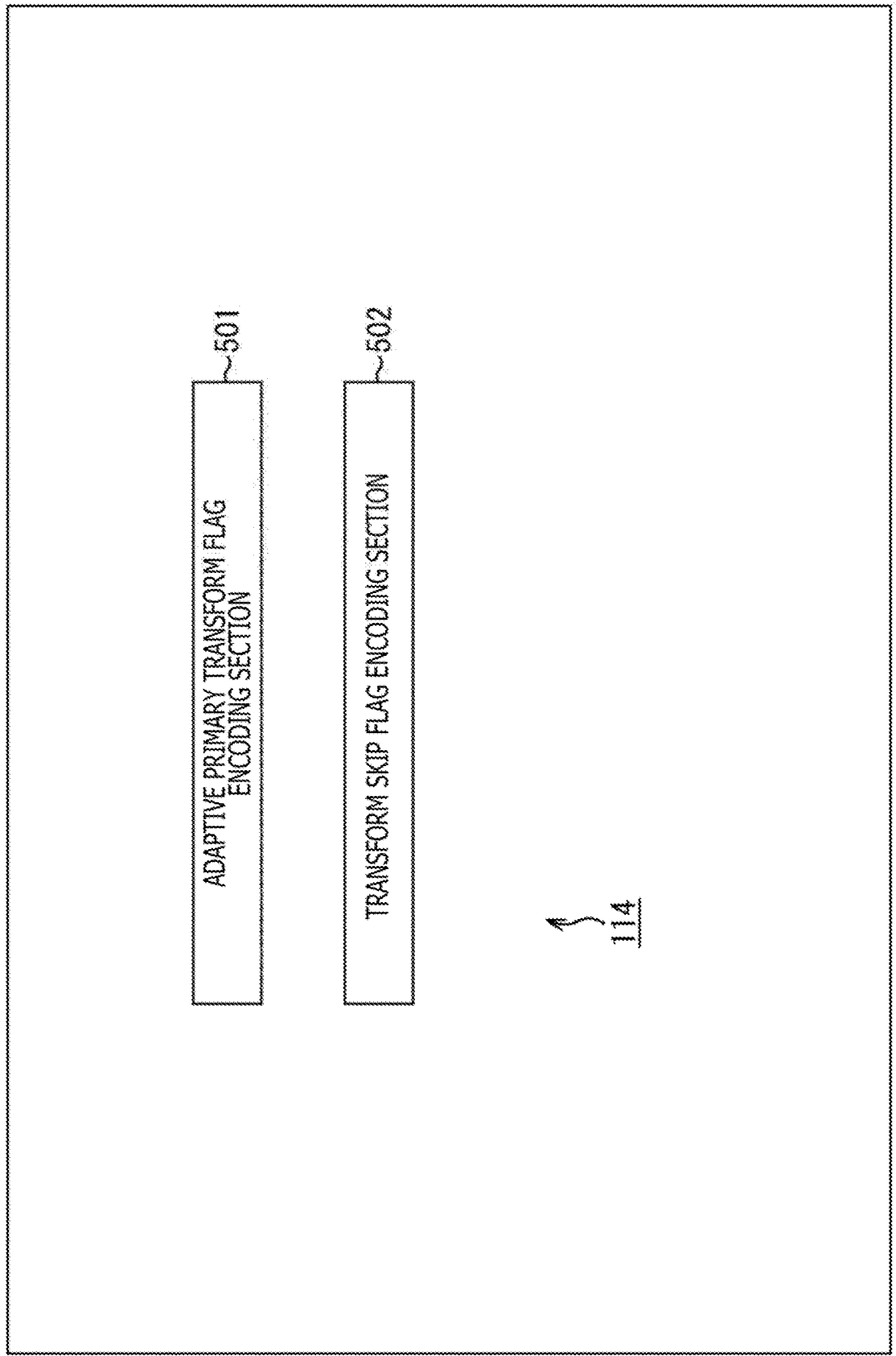

FIG. 58

```
Transform Unit syntax
transform_unit(x0, y0, log2TbWidth, log2TbHeight)                                          Descriptor
  ...
  for(compID=0; compID<numValidChannel; compID++) {
    cbf[x0][y0][compID]                                                                    ae(v)
    if(cbf[x0][y0][compID]) {
      if(apt_enabled_flag
        && width <= MaxPTSize
        && height <= MaxPTSize
        && !transquant_bypass_flag[x0][y0] ) {
          apt_flag[x0][y0][compID]                                                         ae(v)
        }
        if(compID==COMPONENT_Y) {
          residual_coding( x0, y0, log2TbWidth, log2TbHeight, COMPONENT_Y)
          // syntaxes related to residuals of luma TB
        }
        else { // compID==COMPONENT_Y
          residual_coding( x0, y0, log2TbWidthC, log2TbHeightC, compID)
          // syntaxes related to residuals of chroma TBs
        }
      } //if( cbf[x0][y0])
    } // end of loop for (compID=0; compID<numValidChannel; compID++)
    // syntaxes related to secondary transform
    numSigL = ts_flag[x0][y0][COMPONENT_Y] ? 0 : countNonZeroCoeffs(COMPONENT_Y)
    numSigC = ts_flag[x0][y0][COMPONENT_Cb] ? 0 : countNonZeroCoeffs(COMPONENT_Cb)
    numSigC += ts_flag[x0][y0][COMPONENT_Cr] ? 0 : countNonZeroCoeffs(COMPONENT_Cr)
    if (st_enabled_flag && CuPredMode[x0][y0]==MODE_INTRA && !transquant_bypass_flag[x0][y0]) {
      if (numSigL >= stNumSigLTH)
        st_idx[x0][y0]                                                                     ae(v)
      if (numSigC >= stNumSigCTH)
        chroma_st_idx[x0][y0]                                                              ae(v)
    }
  ...
}
```

FIG. 59

```
Residual Coding syntax
residual_coding(x0, y0, log2TbWidth, log2TbHeight, compID) {                                    Descriptor
    ...
    if(ts_enabled_flag && !transquant_bypass_flag[x0][y0] &&
       ((log2TbWidth + log2TbHeight) <= log2MaxTSSize) && !apt_flag[x0][y0][compID]){
        ts_flag [x0][y0][compID]                                                                ae(v)
    ...
    // syntaxes related to last_pos_(x, y),
       coded_sbk_flag, sig_flag,
       gr1_flag, coeff_abs_level_remaining, coeff_sign_flag, etc...
    ...
    // syntaxes related to adaptive primary transform
    numSig = countNonZeroCoeffs (compID)
    if(compID == COMPONENT_Y && apt_flag[x0][y0] &&
       !transquant_bypass_flag[x0][y0] && !ts_flag[x0][y0][compID] &&
       log2TbWidth <= log2MaxPTSize && log2TbHeight <= log2MaxPTSize &&
       ((CuPredMode[x0][y0]==MODE_INTRA && numSig >= ptNumSigTH) ||
         CuPredMode[x0][y0]==MODE_INTER)){
         pt_idx[x0][y0][compID]                                                                 ae(v)
    }
    ...
}
```

*countNonZeroCoeffs (compID) IS A FUNCTION THAT RETURNS THE NUMBER OF NON-ZERO COEFFICIENTS (SIGNIFICANT COEFFICIENTS) EXISTING IN THE TRANSFORM BLOCK OF THE COLOR SIGNAL INDICATED BY compID

FIG. 60

Residual Coding syntax

| | Descriptor |
|---|---|
| residual_coding( x0, y0, log2TbWidth, log2TbHeight, compID ) { | |
| if( ts_enabled_flag && !transquant_bypass_flag[x0][y0] && <br> ( (log2TbWidth + log2TbHeight ) <= log2MaxTSSize ) && !(apt_flag[x0][y0] && compID==COMPONENT_Y ) | |
|   ts_flag[x0][y0][compID] | ae(v) |
| ... | |
| // syntaxes related to last_pos_(x, y), <br>   coded_sbk_flag, sig_flag, gr1_flag, <br>   gr2_flag/coeff_abs_level_remaining/coeff_sign_flag, etc... | |
| ... | |
| // syntaxes related to adaptive primary transform <br> numSig = countNonZeroCoeffs (compID) | |
| if( compID == COMPONENT_Y && apt_flag[x0][y0] && !ts_flag[x0][y0][compID] && <br>   !transquant_bypass_flag[x0][y0] && log2TbWidth <= log2MaxPTSize && <br>   log2TbHeight <= log2MaxPTSize && <br>   ((CuPredMode[x0][y0]==MODE_INTRA && numSig >= ptNumSigTH ) \|\| <br>   CuPredMode[x0][y0]==MODE_INTER ) ) | |
|   pt_idx[x0][y0][compID] | ae(v) |
| ... | |
| } | |

*countNonZeroCoeffs(compID) IS A FUNCTION THAT RETURNS THE NUMBER OF NON-ZERO COEFFICIENTS (SIGNIFICANT COEFFICIENTS) EXISTING IN THE TRANSFORM BLOCK OF THE COLOR SIGNAL INDICATED BY compID

FIG. 63

JVET-E0037

| case | transquant_bypass_flag (CU) | ts_flag (TB) | apt_flag (TB) | pt_idx (TB) | st_idx (TB) | 1st Tr. | 2nd Tr. | SUBJECT |
|---|---|---|---|---|---|---|---|---|
| 0 | 0 | 0 | 0 | Not signal | 0 | DCT | - | |
| 1 | 0 | 0 | 0 | Not signal | >0 | DCT | NSST | |
| 2 | 0 | 0 | 1 | >=0 | 0 | DTT | - | |
| 3 | 0 | 0 | 1 | >=0 | >0 | DTT | NSST | |
| 4 | 0 | 1 | Not signal | Not signal | Not signal | - | - | |
| 6 | 1 | Not signal | 0 | Not signal | Not signal | - | - | apt_flag IS REDUNDANT |
| 7 | 1 | Not signal | 1 | Not signal | Not signal | - | - | apt_flag IS REDUNDANT |

DTT:Discrete Trigonometric Transform (GENERIC NAME OF DCT/DST)

F I G. 6 4

| case | TQ Bypass Flag (CU) | ts_flag (TB) | apt_flag (TB) | pt_idx (TB) | st_idx (TB) | 1st Tr. | 2nd Tr. | COMMENT |
|---|---|---|---|---|---|---|---|---|
| 0 | 0 | 0 | 0 | - | 0 | DCT | - | |
| 1 | 0 | 0 | 0 | - | >0 | DCT | NSST | |
| 2 | 0 | 0 | 1 | >=0 | 0 | DTT | - | |
| 3 | 0 | 0 | 1 | >=0 | >0 | DTT | NSST | |
| 4 | 0 | 1 | - | - | - | - | - | |
| 6 | 1 | - | - | - | - | - | - | |

DTT: Discrete Trigonometric Transform (GENERIC NAME OF DCT/DST)

FIG. 65

| Transform Unit syntax | Descriptor |
|---|---|
| transform_unit(x0, y0, log2TbWidth, log2TbHeight) { | |
| ... | |
|   for(compID=0; compID<numValidChannel; compID++) { | |
|     cbf[x0][y0][compID] | ae(v) |
|     if(cbf[x0][y0][compID]) { | |
|       if(compID==COMPONENT_Y) | |
|         residual_coding(x0, y0, log2TbWidth, log2TbHeight, COMPONENT_Y) | |
|         // syntaxes related to residuals of luma TB | |
|       } | |
|       else { // compID!=COMPONENT_Y | |
|         residual_coding(x0, y0, log2TbWidthC, log2TbHeightC, compID) | |
|         // syntaxes related to residuals of chroma TBs | |
|       } | |
|     } //if(cbf[x0][y0][compID]) | |
|   } // end of loop for(compID=0; compID<numValidChannel; compID++) | |
|   ... | |
|   // syntaxes related to secondary transform | |
|   numSigL = ts_flag[x0][y0][COMPONENT_Y] ? 0 : countNonZeroCoeffs(COMPONENT_Y) | |
|   numSigC = ts_flag[x0][y0][COMPONENT_Cb] ? 0 : countNonZeroCoeffs(COMPONENT_Cb) | |
|   numSigC += ts_flag[x0][y0][COMPONENT_Cr] ? 0 : countNonZeroCoeffs(COMPONENT_Cr) | |
|   if (st_enabled_flag && CuPredMode[x0][y0]==MODE_INTRA && !transquant_bypass_flag[x0][y0]) { | |
|     if(numSigL >= stNumSigLTH) | |
|       st_idx[x0][y0] | ae(v) |
|     if(numSigC >= stNumSigCTH) | |
|       chroma_st_idx[x0][y0] | ae(v) |
|   } | |
|   ... | |
| } | |

*countNonZeroCoeffs(compID) IS A FUNCTION THAT RETURNS THE NUMBER OF NON-ZERO COEFFICIENTS (SIGNIFICANT COEFFICIENTS) EXISTING IN THE TRANSFORM BLOCK OF THE COLOR SIGNAL INDICATED BY compID

FIG. 66

```
Residual Coding syntax
residual_coding(x0, y0, log2TbWidth, log2TbHeight, compID) {                        Descriptor
  ...
  if(ts_enabled_flag && !transquant_bypass_flag[x0][y0] &&
     ((log2TbWidth + log2TbHeight) <= log2MaxTSSize ))
    ts_flag[x0][y0][compID]                                                         ae(v)
  if(apt_enabled_flag && compID==COMPONENT_Y && !ts_flag[x0][y0][compID]
     && !transquant_bypass_flag[x0][y0] )
    apt_flag[x0][y0]                                                                ae(v)
  ...
  // syntaxes related to last_pos_(x, y),
                          coded_sbk_flag, sig_flag, gr1_flag,
                          gr2_flag/coeff_abs_level_remaining/coeff_sign_flag, etc...
  ...
  // syntaxes related to adaptive primary transform
  numSig = countNonZeroCoeffs(compID)
  if(compID == COMPONENT_Y && apt_flag[x0][y0] &&
     !transquant_bypass_flag[x0][y0] && !ts_flag[x0][y0][compID] &&
     log2MaxPTSize <= log2TbWidth && log2TbHeight <= log2MaxPTSize && numSig >= ptNumSigTH ||
     ((CuPredMode[x0][y0]==MODE_INTRA && numSig >= ptNumSigTH) ||
       CuPredMode[x0][y0]==MODE_INTER))
  {
    pt_idx[x0][y0][compID]                                                          ae(v)
  }
  ...
}
```

*countNonZeroCoeffs(compID) IS A FUNCTION THAT RETURNS THE NUMBER OF NON-ZERO COEFFICIENTS (SIGNIFICANT COEFFICIENTS) EXISTING IN THE TRANSFORM BLOCK OF THE COLOR SIGNAL INDICATED BY compID

FIG.68

```
Residual Coding syntax
residual_coding(x0, y0, log2TbWidth, log2TbHeight, compID) {                                                    Descriptor
...
if(ts_enabled_flag && ! transquant_bypass_flag[x0][y0] &&
   ((log2TbWidth + log2TbHeight) <= log2MaxTSSize ))
   ts_flag[x0][y0][compID]                                                                                      ae(v)
if(apt_enabled_flag && !ts_flag[x0][y0][compID]
   && !transquant_bypass_flag[x0][y0] )
   apt_flag[x0][y0][compID]                                                                                     ae(v)
...
// syntaxes related to last_pos_{x,y},
   coded_sbk_flag, sig_flag, gr1_flag,
   gr2_flag, coeff_abs_level_remaining, coeff_sign_flag, etc...
...
// syntaxes related to adaptive primary transform
numSig = countNonZeroCoeffs(compID)
if(compID == COMPONENT_Y && apt_flag[x0][y0][compID] &&
   !transquant_bypass_flag[x0][y0] && !ts_flag[x0][y0][compID] &&
   log2TbWidth <= log2MaxPTSize && log2TbHeight <= log2MaxPTSize &&
   ((CuPredMode[x0][y0]==MODE_INTRA && numSig >= ptNumSigTH) ||
   CuPredMode[x0][y0]==MODE_INTER))
   pt_idx[x0][y0][compID]                                                                                       ae(v)
...
}
```

*countNonZeroCoeffs(compID) IS A FUNCTION THAT RETURNS THE NUMBER OF NON-ZERO COEFFICIENTS (SIGNIFICANT COEFFICIENTS) EXISTING IN THE TRANSFORM BLOCK OF THE COLOR SIGNAL INDICATED BY compID

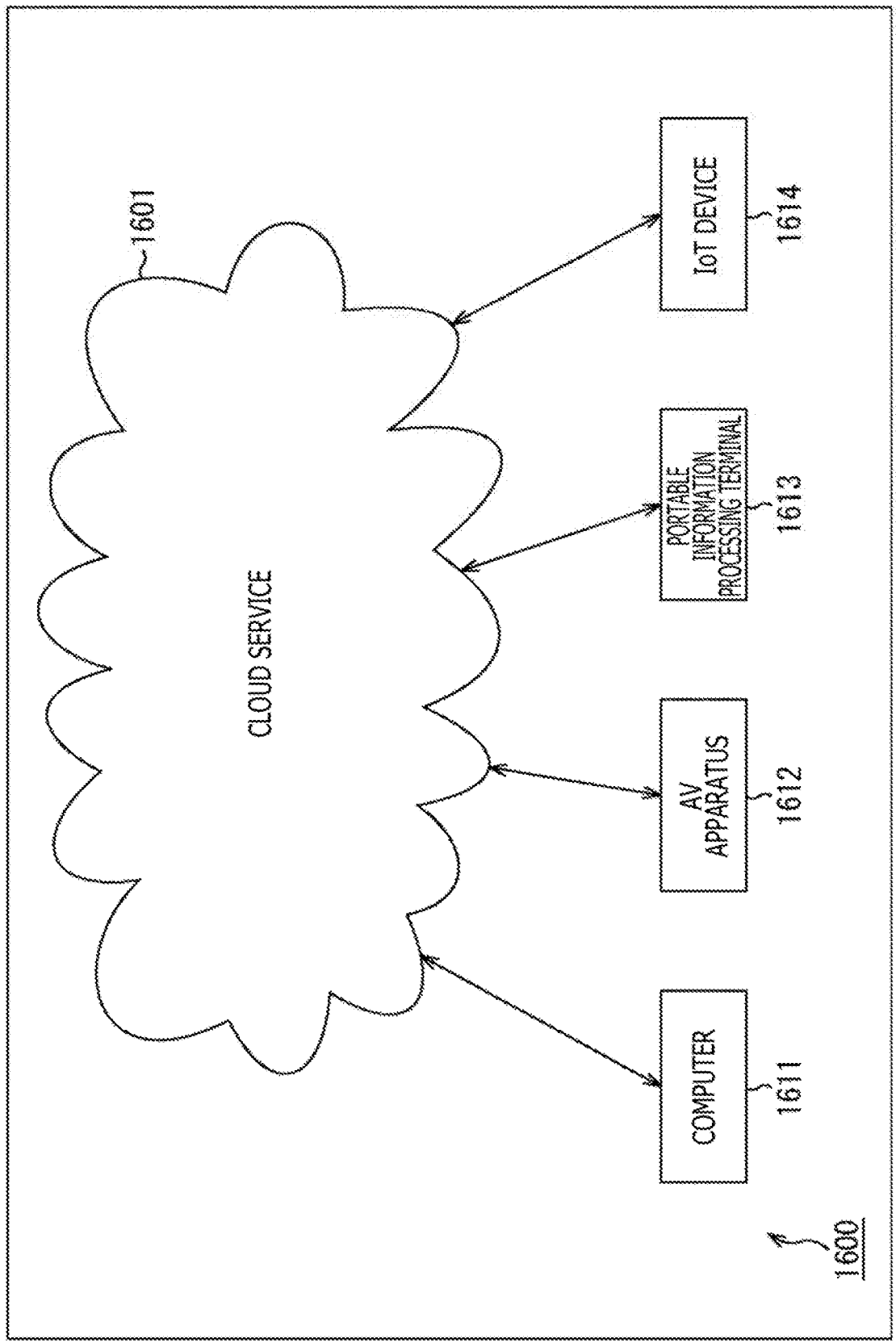

IMAGE PROCESSING APPARATUS AND METHOD FOR CODING SKIP INFORMATION

CROSS REFERENCE TO PRIOR APPLICATION

This application is a divisional of U.S. patent application Ser. No. 16/087,475 (filed on Sep. 21, 2018), which is a National Stage Patent Application of PCT International Patent Application No. PCT/JP2017/011715 (filed on Mar. 23, 2017) under 35 U.S.C. § 371, which claims priority to Japanese Patent Application Nos. 2016-097170 (filed on May 13, 2016) and 2016-114755 (filed on Jun. 8, 2016), which are all hereby incorporated by reference in their entirety.

TECHNICAL FIELD

The present disclosure relates to an information processing apparatus and method, and particularly to an information processing apparatus and method that make it possible to suppress decrease of the encoding efficiency.

BACKGROUND ART

In the past, it has been disclosed that, in image encoding, after primary transform is performed for a prediction residual that is a difference between an image and a prediction image of the image, in order to increase the energy compaction (to concentrate transform coefficients to a low frequency region), secondary transform is further applied for each sub block in a transform block (for example, refer to NPL 1). In NPL 1, also it is disclosed that a secondary transform identifier indicative of which secondary transform is to be applied is signaled in a unit of a CU.

Further, it is disclosed that, in an encoder, to determine which secondary transform is to be applied in a unit of a CU as disclosed in NPL 1 on the basis of RDO (Rate-Distortion Optimization) indicates a high degree of calculation complicatedness and a secondary transform flag indicative of whether or not secondary transform in a unit of a transform block is to be applied is signaled (for example, refer to NPL 2). In NPL 2, also it is disclosed that a secondary transform identifier indicative of which secondary transform is to be applied is derived on the basis of a primary transform identifier and an intra-prediction mode.

CITATION LIST

Non Patent Literature

[NPL 1]
J. Chen. Alshina, G. J. Sullivan, J. R. Ohm, J. Boyce, "Algorithm. Description of Joint Exploration Test Model 2," JVET-B1001_v3, Joint Video Exploration Team (JVET) of ITU-T SG 16 WP 3 and ISO/IEC JTC 1/SC 29/WG 11 2nd Meeting: San Diego, USA, 20-26 Feb. 2016
[NPL 2]
X. Zhao, A. Said, V. Seregin, M. Karczewicz, J. Chen, R. Joshi, "TU-level non-separable secondary transform," JVET-B0059, Joint Video Exploration Team (JVET) of ITU-T SG 16 WP 3 and ISO/IEC JTC 1/SC 29/WG 11 2nd Meeting: San Diego, USA, 20-26 Feb. 2016

SUMMARY

Technical Problems

However, in any one of the methods disclosed in NPL 1 and NPL 2, in the case where the transform skip flag is 1 in a unit of a transform block, namely, it is indicated that transform skip is to be applied, the transform skip is applied only to primary transform. In other words, also in the case where the transform skip is applied only to primary transform, secondary transform can be applied. Therefore, even if the transform skip is applied by a transform skip flag to a residual signal to which it is better to apply the transform skip such as, for example, a sparse residual signal in which the number of non-zero coefficients is small, secondary transform is applied and the energy compaction decreases, and there is the possibility that the encoding efficiency may be degraded.

The present disclosure has been made taking such a situation as described above into consideration and makes it possible to suppress degradation of the encoding efficiency.

Solution to Problems

An image processing apparatus according to a first aspect of the present technology is an image processing apparatus, including a control section configured to cause, where primary transform that is a transform process for a prediction residual that is a difference between an image and a prediction image of the image is to be skipped, also secondary transform, which is a transform process for a primary transform coefficient obtained by the primary transform of the prediction residual, to be skipped.

An image processing method according to the first aspect of the present technology is an image processing method including causing, where primary transform that is a transform process for a prediction residual that is a difference between an image and a prediction image of the image is to be skipped, also secondary transform, which is a transform process for a primary transform coefficient obtained by the primary transform of the prediction residual, to be skipped.

An image processing apparatus according to a second aspect of the present technology is an image processing apparatus including a control section configured to cause, where inverse primary transform that is inverse transform to primary transform that is a transform process for a prediction residual that is a difference between an image and a prediction image of the image is to be skipped, also inverse secondary transform, which is inverse transform to secondary transform that is a transform process for a primary transform coefficient obtained by the primary transform of the prediction residual, to be skipped.

An image processing method according to the second aspect of the present technology is an image processing method including causing, where inverse primary transform that is inverse transform to primary transform that is a transform process for a prediction residual that is a difference between an image and a prediction image of the image is to be skipped, also inverse secondary transform, which is inverse transform to secondary transform that is a transform process for a primary transform coefficient obtained by the primary transform of the prediction residual, to be skipped.

An image processing apparatus according to a third aspect of the present technology is an image processing apparatus including an encoding section configured to skip, where secondary transform is to be performed for a primary transform coefficient obtained by primary transform of a prediction residual that is a difference between an image and a prediction image of the image, encoding of first information relating to skip of the primary transform.

An image processing method according to the third aspect of the present technology is an image processing method including skipping, where secondary transform is to be performed for a primary transform coefficient obtained by primary transform of a prediction residual that is a difference between an image and a prediction image of the image, encoding of first information relating to skip of the primary transform.

An image processing apparatus according to a fourth aspect of the present technology is an image processing apparatus including a decoding section configured to skip, where inverse secondary transform that is inverse transform to secondary transform that is a transform process for a primary transform coefficient obtained by primary transform of a prediction residual that is a difference between an image and a prediction image of the image is to be performed, decoding of encoded data of first information relating to skip of inverse primary transform that is inverse transform to the primary transform.

An image processing method according to the fourth aspect of the present technology is an image processing method including skipping, where inverse secondary transform that is inverse transform to secondary transform that is a transform process for a primary transform coefficient obtained by primary transform of a prediction residual that is a difference between an image and a prediction image of the image is to be performed, decoding of encoded data of first information relating to skip of inverse primary transform that is inverse transform to the primary transform.

An image processing apparatus according to a fifth aspect of the present technology is an image processing apparatus including an encoding section configured to skip, where primary transform that is a transform process for a prediction residual that is a difference between an image and a prediction image of the image is to be skipped, encoding of first information relating to skip of secondary transform that is a transform process for a primary transform coefficient obtained by the primary transform of the prediction residual.

An image processing method according to the fifth aspect of the present technology is an image processing method including skipping, where primary transform that is a transform process for a prediction residual that is a difference between an image and a prediction image of the image is to be skipped, encoding of first information relating to skip of secondary transform that is a transform process for a primary transform coefficient obtained by the primary transform of the prediction residual.

An image processing apparatus according to a sixth aspect of the present technology is an image processing apparatus including a decoding section configured to skip, where inverse primary transform that is inverse transform to primary transform that is a transform process for a prediction residual that is a difference between an image and a prediction image of the image is to be skipped, decoding of encoded data of first information relating to skip of inverse secondary transform that is inverse transform to secondary transform that is a transform process for a primary transform coefficient obtained by the primary transform of the prediction residual.

An image processing method according to the sixth aspect of the present technology is an image processing method including skipping, where inverse primary transform that is inverse transform to primary transform that is a transform process for a prediction residual that is a difference between an image and a prediction image of the image is to be skipped, decoding of encoded data of first information relating to skip of inverse secondary transform that is inverse transform to secondary transform that is a transform process for a primary transform coefficient obtained by the primary transform of the prediction residual.

An image processing apparatus according to a seventh aspect of the present technology is an image processing apparatus including an encoding section configured to skip, where primary transform that is a transform process for a prediction residual that is a difference between an image and a prediction image of the image, secondary transform that is a transform process for a primary transform coefficient obtained by the primary transform of the prediction residual and quantization for a secondary transform coefficient obtained by the secondary transform of the primary transform coefficient are to be skipped, encoding of first information indicative of the substance of the primary transform.

An image processing method according to the seventh aspect of the present technology is an image processing method including skipping, where primary transform that is a transform process for a prediction residual that is a difference between an image and a prediction image of the image, secondary transform that is a transform process for a primary transform coefficient obtained by the primary transform of the prediction residual and quantization for a secondary transform coefficient obtained by the secondary transform of the primary transform coefficient are to be skipped, encoding of first information indicative of the substance of the primary transform.

An image processing apparatus according to an eighth aspect of the present technology is an image processing apparatus including a decoding section configured to skip, where dequantization for a quantization transform coefficient level obtained by decoding encoded data, inverse secondary transform for transforming a secondary transform coefficient obtained by the dequantization of the quantization transform coefficient level into a primary transform coefficient and inverse primary transform for transforming the primary transform coefficient into a prediction residual that is a difference between an image and a prediction image of the image are to be skipped, decoding of encoded data of first information relating to the substance of the inverse primary transform.

An image processing method according to the eighth aspect of the present technology is an image processing method including skipping, where dequantization for a quantization transform coefficient level obtained by decoding encoded data, inverse secondary transform for transforming a secondary transform coefficient obtained by the dequantization of the quantization transform coefficient level into a primary transform coefficient and inverse primary transform for transforming the primary transform coefficient into a prediction residual that is a difference between an image and a prediction image of the image are to be skipped, decoding of encoded data of first information relating to the substance of the inverse primary transform.

In the image processing apparatus and method according to the first aspect of the present technology, where primary transform that is a transform process for a prediction residual that is a difference between an image and a prediction image of the image is to be skipped, also secondary transform, which is a transform process for a primary transform coefficient obtained by the primary transform of the prediction residual, is skipped.

In the image processing apparatus and method according to the second aspect of the present technology, where inverse primary transform that is inverse transform to primary transform that is a transform process for a prediction residual that is a difference between an image and a prediction image of the image is to be skipped, also inverse secondary transform, which is inverse transform to secondary transform that is a transform process for a primary transform coefficient obtained by the primary transform of the prediction residual, is skipped.

In the image processing apparatus and method according to the third aspect of the present technology, where secondary transform is to be performed for a primary transform coefficient obtained by primary transform of a prediction residual that is a difference between an image and a prediction image of the image, encoding of first information relating to skip of the primary transform is skipped.

In the image processing apparatus and method according to the fourth aspect of the present technology, where inverse secondary transform that is inverse transform to secondary transform that is a transform process for a primary transform coefficient obtained by primary transform of a prediction residual that is a difference between an image and a prediction image of the image is to be performed, decoding of encoded data of first information relating to skip of inverse primary transform that is inverse transform to the primary transform is skipped.

In the image processing apparatus and method according to the fifth aspect of the present technology, where primary transform that is a transform process for a prediction residual that is a difference between an image and a prediction image of the image is to be skipped, encoding of first information relating to skip of secondary transform that is a transform process for a primary transform coefficient obtained by the primary transform of the prediction residual is skipped.

In the image processing apparatus and method according to the sixth aspect of the present technology, where inverse primary transform that is inverse transform to primary transform that is a transform process for a prediction residual that is a difference between an image and a prediction image of the image is to be skipped, decoding of encoded data of first information relating to skip of inverse secondary transform that is inverse transform to secondary transform that is a transform process for a primary transform coefficient obtained by the primary transform of the prediction residual is skipped.

In the image processing apparatus and method according to the seventh aspect of the present technology, where primary transform that is a transform process for a prediction residual that is a difference between an image and a prediction image of the image, secondary transform that is a transform process for a primary transform coefficient obtained by the primary transform of the prediction residual and quantization for a secondary transform coefficient obtained by the secondary transform of the primary transform coefficient are to be skipped, encoding of first information indicative of the substance of the primary transform is skipped.

In the image processing apparatus and method according to the eighth aspect of the present technology, where dequantization for a quantization transform coefficient level obtained by decoding encoded data, inverse secondary transform for transforming a secondary transform coefficient obtained by the dequantization of the quantization transform coefficient level into a primary transform coefficient and inverse primary transform for transforming the primary transform coefficient into a prediction residual that is a difference between an image and a prediction image of the image are to be skipped, decoding of encoded data of first information relating to the substance of the inverse primary transform is skipped.

Advantageous Effect of Invention

According to the present disclosure, an image can be processed. Especially, degradation of the encoding efficiency can be suppressed.

BRIEF DESCRIPTION OF DRAWINGS

FIG. 7 is a view depicting an example of scanning methods corresponding to scanning identifiers.

FIG. 15 is a view depicting an example of syntax.

FIG. 20 is a view depicting an example of syntax.

FIG. 27 is a view depicting an example of syntax.

FIG. 32 is a view illustrating an example of a manner of encoding of a primary transform identifier.

FIG. 33 is a view illustrating an example of a manner of decoding of a primary transform identifier.

FIG. 34 is a view depicting an example of syntax.

FIG. 38 is a view depicting an example of arithmetic encoding and arithmetic decoding corresponding to context indexes.

FIG. 39 is a view depicting an example of a pseudo code depicting a manner of encoding of a primary transform identifier.

FIG. 43 is a view depicting an example of a pseudo code depicting a manner of decoding of a primary transform identifier.

FIG. 45 is a view depicting an example of syntax table.

FIG. 52 is a view illustrating redundant syntax in JEM-4.0.

FIG. 53 is a view illustrating an example of a method for suppressing redundant syntax.

FIG. 54 is a view illustrating an example of syntax of a transform unit.

FIG. 55 is a view illustrating an example of syntax of residual encoding.

FIG. 56 is a block diagram depicting a principal configuration example of an encoding section.

FIG. 58 is a view illustrating an example of syntax of a transform unit.

FIG. 59 is a view illustrating an example of syntax of residual encoding.

FIG. 60 is a view illustrating an example of syntax of residual encoding.

FIG. 63 is a view illustrating redundant syntax in JVET-E0037.

FIG. 64 is a view illustrating an example of a method for suppressing redundant syntax.

FIG. 65 is a view illustrating an example of syntax of a transform unit.

FIG. 66 is a view illustrating an example of syntax of residual encoding.

FIG. 68 is a view illustrating an example of syntax of residual encoding.

FIG. 78 is a block diagram depicting an example of a schematic configuration of a network system.

DESCRIPTION OF EMBODIMENTS

Figure 1:
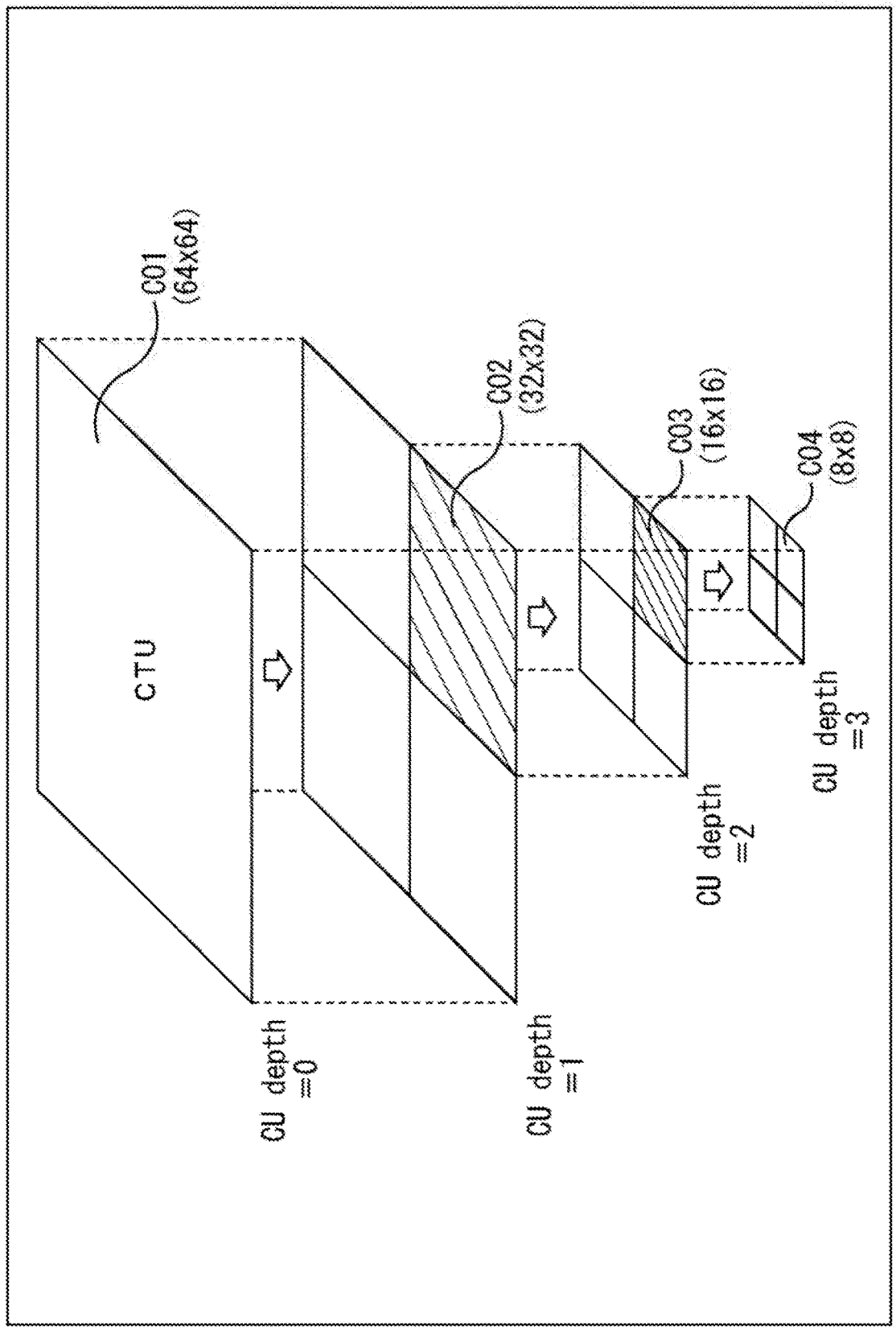
FIG. 1 is an explanatory view illustrating an overview of recursive block segmentation of a CU.

In the following, modes for carrying out the present disclosure (hereinafter referred to as embodiments) are described. It is to be noted that the description is given in the following order.

1. First Embodiment (skip of (inverse) secondary transform according to (inverse) transform skip)
2. Second Embodiment (skip of encoding and decoding of transform skip flag according to (inverse) secondary transform)
3. Third Embodiment (skip of encoding and decoding of secondary transform flag according to (inverse) transform skip)
4. Fourth Embodiment (skip of encoding and decoding of secondary transform flag according to sub block average of non-zero coefficients)
5. Fifth Embodiment (skip of encoding and decoding of primary transform identifier according to bypass of transform quantization)
6. Sixth Embodiment (skip of encoding and decoding of transform skip flag where block is rectangle formed from square or oblong)
7. Seventh Embodiment (control of adaptive primary transform flag and transform skip flag)
8. Eighth Embodiment (control of adaptive primary transform flag and transform skip flag)
9. Ninth Embodiment (others)

1. First Embodiment

<Skip of Transform Process>

It is disclosed, for example, in NPL 1 that, in image encoding, after primary transform is performed for a prediction residual that is a difference between an image and a prediction image of the image, in order to increase the energy compaction (to concentrate transform coefficients to a low frequency region), secondary transform is further applied for each sub block in a transform block. Further, in NPL 1, also it is disclosed that a secondary transform identifier indicative of which secondary transform is to be applied is signaled in a unit of a CU.

Further, for example, in NPL 2, it is disclosed that, in an encoder, to determine which secondary transform is to be applied in a unit of a CU as disclosed in NPL 1 on the basis of RDO (Rate-Distortion Optimization) indicates a high degree of calculation complicatedness and a secondary transform flag indicative of whether or not secondary transform in a unit of a transform block is to be applied is signaled. Further, in NPL 2, also it is disclosed that a secondary transform identifier indicative of which secondary transform is to be applied is derived on the basis of a primary transform identifier and an intra-prediction mode.

However, in any one of the methods disclosed in NPL 1 and NPL 2, in the case where the transform skip flag is 1 in a unit of a transform block, namely, it is indicated that transform skip is to be applied, the transform skip is applied only to primary transform. In other words, also in the case where the transform skip is applied only to primary transform, secondary transform can be applied. Therefore, in the case where the concept of transform skip is considered, the secondary transform cannot be skipped (omitted), and there is the possibility that the arithmetic operation amount may increase. Further, even if the transform skip is applied by a transform skip flag to a residual signal to which it is better to apply the transform skip such as, for example, a sparse residual signal in which the number of non-zero coefficients (also referred to as non-zero transform coefficients) is small, secondary transform is applied and the energy compaction decreases, and there is the possibility that the encoding efficiency may be degraded.

In the primary transform, primary transform Phor in the horizontal direction and primary transform Pver in the vertical direction designated by a primary transform identifier pt_idx are selected, and for a prediction residual D, matrix arithmetic operation is performed as indicated, for example, by the following expression (1) to obtain transform coefficients Coeff_P after primary transform (referred to also as primary transform coefficients).

$$\text{Coeff\_P} = \text{Phor} \cdot D \cdot \text{Pver}^T \quad (1)$$

It is to be noted that, in the expression (1), the operator "·" indicates an operation for performing inner product between matrices (matrix product), and the operator "T" indicates an operation of a transposed matrix. The primary transform coefficient (Coeff_P) determined in such a manner as described above is subsequently subjected to secondary transform. Further, in the case such primary transform as described above is skipped (omitted), the prediction residual D is secondary-transformed.

For example, it is assumed that the prediction residual D is a 4×4 matrix=[[255, 0, 0, 0], [0, 0, 0, 0], [0, 0, 0, 0], [0, 0, 0, 0]] as indicated by an expression (2) given below and a scan identifier scanIdx indicates horizontal scan hor.

[Math. 1]

$$D = \begin{bmatrix} 255 & 0 & 0 & 0 \\ 0 & 0 & 0 & 0 \\ 0 & 0 & 0 & 0 \\ 0 & 0 & 0 & 0 \end{bmatrix} \quad (2)$$

The prediction residual D is scanned in accordance with a scanning order of coefficients of horizontal scan and is transformed into such a 1×16-dimensional vector $X_{1d}$ as represented by the following expression (3).

[Math. 2]

$$X_{1d} = [255,0,0,0,0,0,0,0,0,0,0,0,0,0,0,0] \quad (3)$$

Such matrix arithmetic operation as represented by an expression (4) given below using this 1×16-dimensional vector $X_{1d}$ and a matrix R for secondary transform to determine such a signal $Y_{1d}$ as represented by the expression (4) given below.

$$Y_{1d}^T = R \cdot X_{1d}^T \quad (4)$$

Here, the operator "T" represents an operation of a transposed matrix. By this matrix arithmetic operation, for example, such a signal $Y_{1d}$ as represented by the following expression (5).

[Math. 3]

$$Y_{1d} = [62730, -10710, -4590, -7650, -7650, -7905, \\ 765, -510, 2805, -1020, -2295, 1020, 765, \\ -510, 255, 0] \quad (5)$$

In order to normalize the norm of this arithmetic operation result $Y_{1d}$, bit shift arithmetic operation of N bits as represented by the following expression (6) is performed to determine a signal $Z_{1d}$ after bit shift.

$$Z_{1d} = (Y_{1d}) \gg N \quad (6)$$

By this bit shift arithmetic operation, such a signal $Z_{1d}$ as represented, for example, by the following expression (7) is obtained.

[Math. 4]

$$Z_{1d} = [245, -42, -18, -30, -30, -31, 3, -2, 11, -4, \\ -9, 4, 3, -2, 1, 0] \quad (7)$$

The 1×16-dimensional vector $Z_{1d}$ of the signal $Z_{1d}$ after the norm normalization is transformed into such a 4×4 matrix Coeff as represented by the following expression (8) on the basis of a scan method designated by a scan identifier scanIdx.

[Math. 5]

$$Coeff = \begin{bmatrix} 245 & -42 & -18 & -30 \\ -30 & -31 & 3 & -2 \\ 11 & -4 & -9 & 4 \\ 3 & -2 & 1 & 0 \end{bmatrix} \quad (8)$$

In the case of a residual signal (prediction residual) in which the number of non-zero coefficients is small (sparse residual signal) like the expression (2), if primary transform is skipped and secondary transform is applied after then, then there is the possibility that non-zero coefficients may spread over the overall frequency domain as in the expression (8). In other words, by applying the secondary transform, there is the possibility that the energy compaction may decrease, resulting in decrease of the encoding efficiency.

<Skip of Secondary Transform and Inverse Secondary Transform>

Therefore, in the case where primary transform that is a transform process for a prediction residual that is a difference between an image and a prediction image of the image is skipped, also secondary transform that is a transform process for primary transform coefficients obtained by primary transform of the prediction residual is skipped.

Since this makes it possible to skip not only primary transform but also secondary transform, increase of the arithmetic operation amount can be suppressed. Further, it can be suppressed to apply secondary transform to a residual signal whose number of non-zero coefficients is small and to which it is desirable to apply the transform skip as in the example described above, and decrease of the energy compaction can be suppressed. In other words, decrease of the encoding efficiency can be suppressed.

Further, in the case where inverse primary transform that is inverse transform to primary transform that is a transform process for a prediction residual that is the difference between an image and a prediction image of the image is to be skipped, also inverse secondary transform that is inverse transform to secondary transform that is a transform process for primary transform coefficients obtained by primary transform of the prediction residual is skipped.

Since this makes it possible to skip not only inverse primary transform but also inverse secondary transform, increase of the arithmetic operation amount can be suppressed. Further, it can be suppressed to apply inverse secondary transform to a residual signal whose number of non-zero coefficients is small and to which it is desirable to apply the transform skip as in the example described above, and decrease of the energy compaction can be suppressed. In other words, decrease of the encoding efficiency can be suppressed.

<Block Segmentation>

In an old-fashioned image encoding method such as MPEG2 (Moving Picture Experts Group 2 (ISO/IEC 13818-2)) or MPEG-4 Part 10 (Advanced Video Coding, hereinafter referred to as AVC), an encoding process is executed in a processing unit called macro block. The macro block is a block having a uniform size of 16×16 pixels. In contrast, in HEVC (High Efficiency Video Coding), an encoding process is executed in a processing unit (encoding unit) called CU (Coding Unit). A CU is a block having a variable size, which is formed by recursively segmenting an LCU (Largest Coding Unit) that is a maximum encoding unit. The maximum size of a CU that can be selected is 64×64 pixels. The minimum size of a CU that can be selected is 8×8 pixels. A CU of the minimum size is called SCU (Smallest Coding Unit). It is to be noted that the maximum size of a CU is not limited to 64×64 pixels but may be a greater block size such as 128×128 pixels, 256×256 pixels or the like.

As a result of adoption of a CU having a variable size in this manner, according to HEVC, it is possible to adaptively adjust the picture quality and the encoding efficiency in response to the substance of an image. A prediction process for prediction encoding is executed in a processing unit (prediction unit) called PU (Prediction Unit). A PU is formed by segmenting a CU in one of several segmentation patterns. Further, a PU is configured from a processing unit (prediction block) called PB (Prediction Block) for each of the luminance (Y) and the color differences (Cb and Cr). Furthermore, an orthogonal transform process is executed in a processing unit (transform unit) called TU (Transform Unit). A TU is formed by segmenting a CU or a PU to a certain depth. Further, a TU is configured from a processing unit (transform block) called TB (Transform block) for each of the luminance (y) and the color differences (Cb and Cr).

<Recursive Block Segmentation>

FIG. 1 is an explanatory view illustrating an overview of recursive block segmentation regarding a CU in HEVC. The block segmentation of a CU is performed by recursively repeating segmentation of one block into four (=2×2) sub blocks, and as a result, a tree structure in the form of a quad tree (Quad-Tree) is formed. The entirety of one quad tree is called CTB (Coding Tree Block), and a logical unit corresponding to the CTB is called CTU (Coding Tree Unit).

At an upper portion in FIG. 1, C01 that is a CU having a size of 64×64 pixels is depicted as an example. The depth of segmentation of C01 is equal to 0. This signifies that C01 is the root of a CTU and corresponds to an LCU. The LCU size can be designated by a parameter that is encoded in an SPS (Sequence Parameter Set) or a PPS (Picture Parameter Set). C02 that is a CU is one of four CUs segmented from C01 and has a size of 32×32 pixels. The depth of segmentation of C02 is equal to 1. C03 that is a CU is one of four CUs segmented from C02 and has a size of 16×16 pixels. The depth of segmentation of C03 is equal to 2. C04 that is a CU is one of four CUs segmented from C03 and has a size of 8×8 pixels. The depth of segmentation of C04 is equal to 3. In this manner, a CU is formed by recursively segmenting an image to be encoded. The depth of segmentation is variable. For example, to a flat image region like the blue sky, a CU of a comparatively great size (namely, of a small depth) can be set. On the other hand, to a steep image region including many edges, a CU of a comparatively small size (namely, of a great depth) can be set. Then, each of such set CUs becomes a processing unit in an encoding process.

<Setting of PU to CU>

Figure 2:
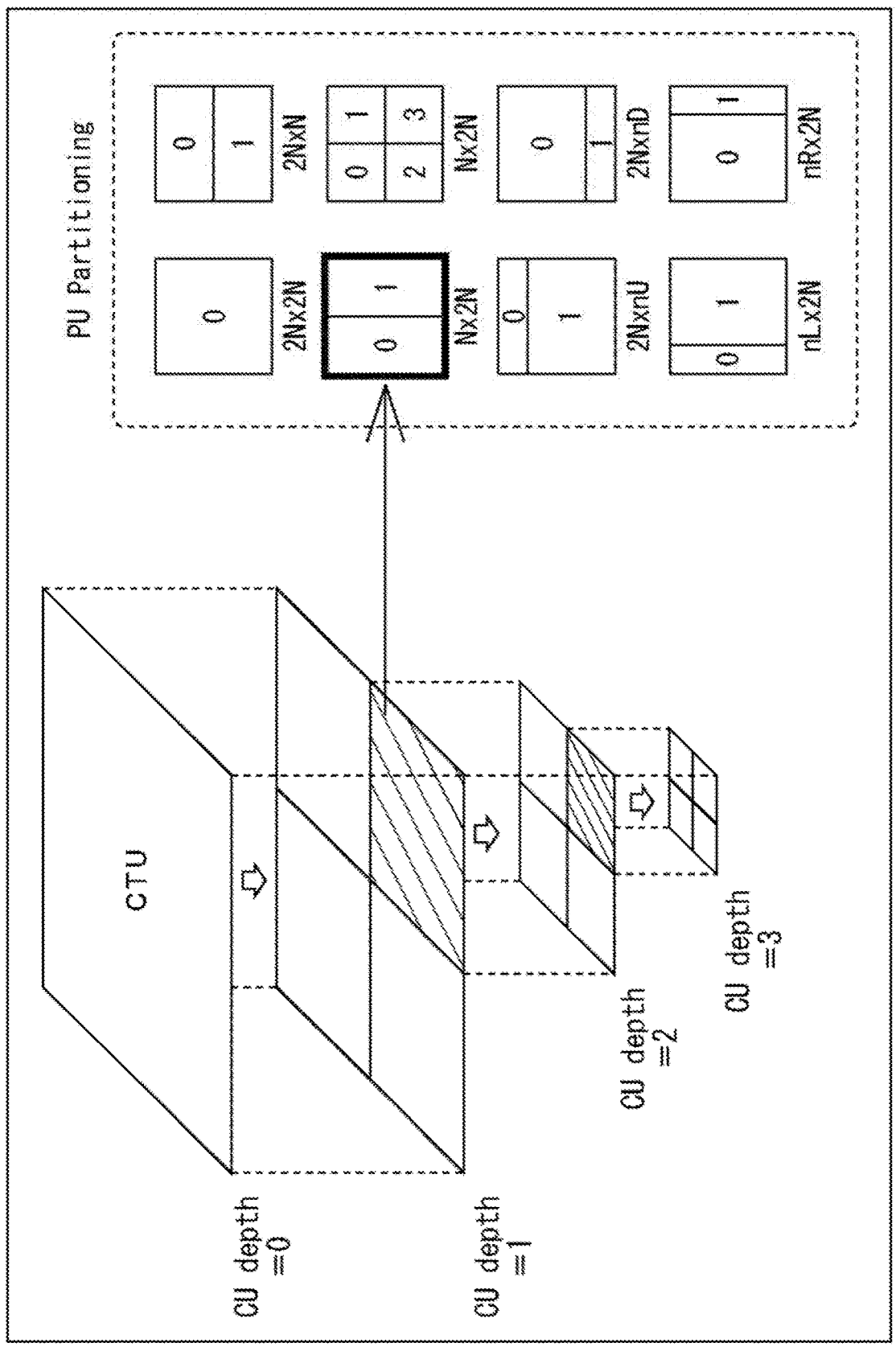
FIG. 2 is an explanatory view illustrating setting of a PU to the CU depicted in FIG. 1.

A PU is a processing unit is a prediction process including intra prediction and inter production. A PU is formed by segmenting a CU by one of several segmentation patterns. FIG. 2 is an explanatory view illustrating setting of a PU to a CU depicted in FIG. 1. In a right region in FIG. 2, eight segmentation patterns of 2N×2N, 2N×N, N×2N, N×N, 2N×nU, 2N×nD, nL×2N and nR×2N are depicted. In intra prediction, the two segmentation patterns of 2N×2N and N×N can be selected from among the eight segmentation patterns (N×N can be selected only in the SCU). In contrast, in inter prediction, all of the eight segmentation patterns can be selected in the case where asymmetrical motion segmentation is enabled.

<Setting of TU to CU>

Figure 3:
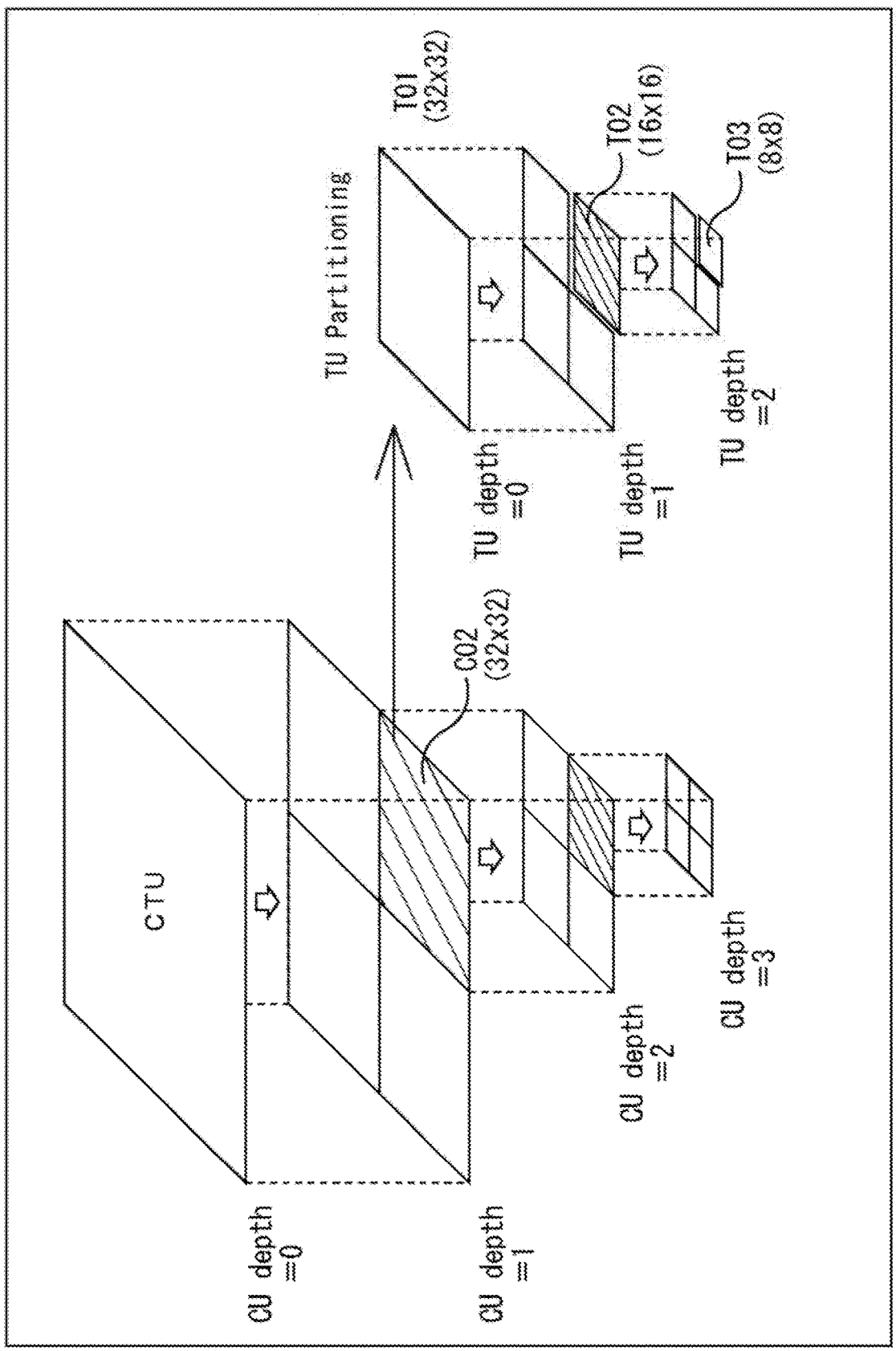
FIG. 3 is an explanatory view illustrating setting of a TU to the CU depicted in FIG. 1.

A TU is a processing unit of an orthogonal transform process. A TU is formed by segmenting a CU (in regard to an intra CU, each PU in the CU) to a certain depth. FIG. 3 is an explanatory view illustrating setting of a TU to a CU depicted in FIG. 2. In a right region in FIG. 3, one or more TUs that can be set to C02 are depicted. For example, T01 that is a TU has a size of 32×32 pixels, and the depth of the TU segmentation is equal to 0. T02 that is a TU has a size of 16×16 pixels, and the depth of the TU segmentation is equal to 1. T03 that is a TU has a size of 8×8 and the depth of the TU segmentation is equal to 2.

What block segmentation is to be performed in order to set such a block as a CU, a PU or a TU described above is determined typically on the basis of comparison in cost that affects the encoding efficiency. An encoder compares the cost, for example, between one CU of 2M×2M pixels and four CUs of M×M pixels, and if the setting of four CUs of M×M pixels indicates a higher encoding efficiency, then the encoder determines to segment a CU of 2M×2M into four CUs of M×M segments.

<Scanning Order of CUs and PUs>

Figure 4:
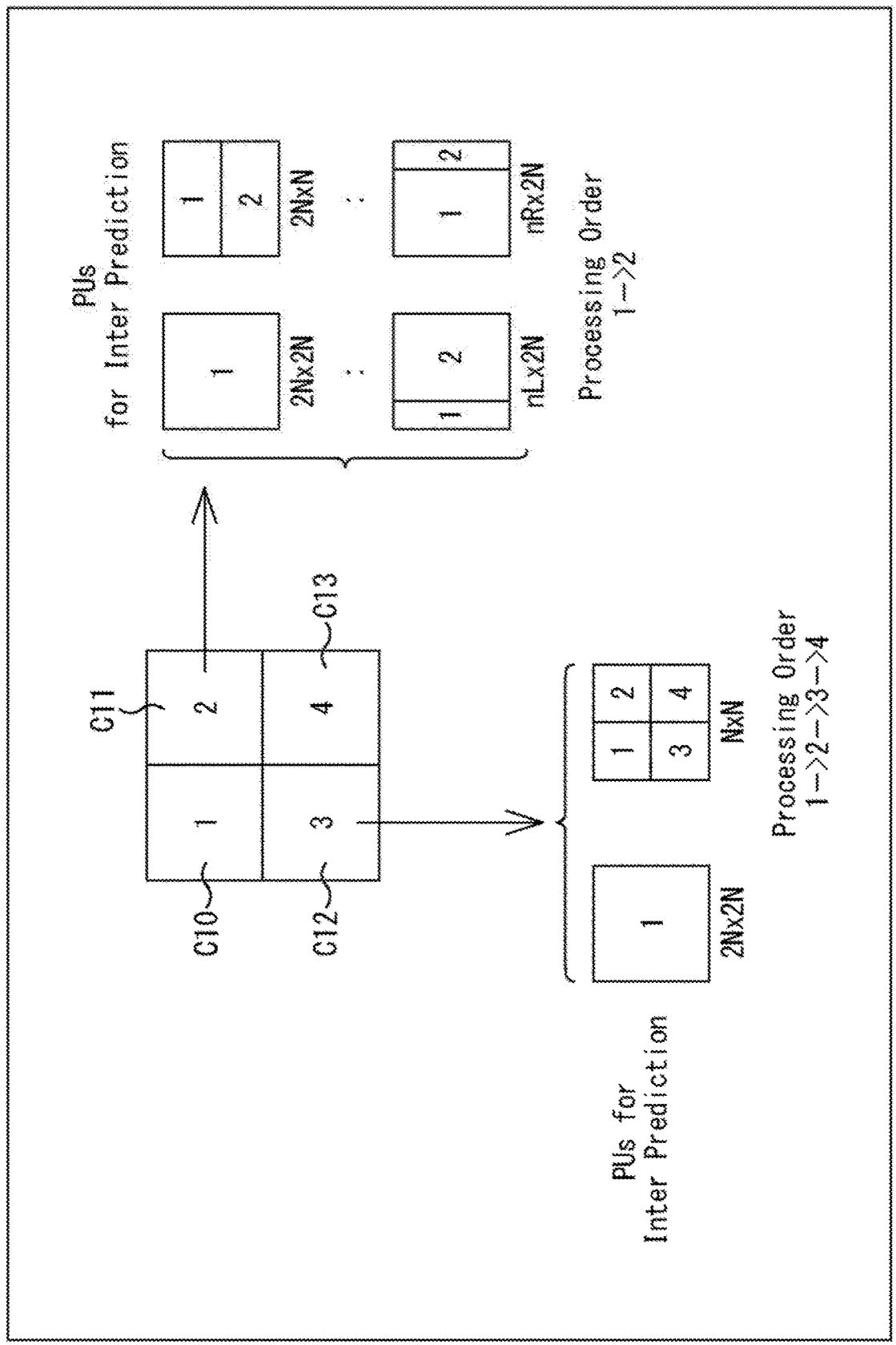
FIG. 4 is an explanatory view illustrating a scanning order of CUs/PUs.

When an image is to be encoded, a CTB (or an LCU) set in a lattice-like pattern in the image (or in a slice or a tile) is scanned in a raster scan order. In one CTB, CUs are scanned so as to follow the quad tree from the left to the right and from the top to the bottom. When a current block is to be processed, information of the upper and left adjacent blocks is utilized as input information. FIG. 4 is an explanatory view illustrating a scanning order of CUs and PUs. At a left upper portion in FIG. 4, C10, C11, C12 and C13 that are four CUs that can be included in one CTB are depicted. A numeral in a framework of each CU represents an order number of processing. The encoding process is executed in an order of C10 that is the left upper CU, C11 of the right upper CU, C12 of the left lower CU and C13 of the right lower CU. At a right portion in FIG. 4, one or more PUs for inter prediction capable of being set to C11 that is a CU are depicted. At a lower portion of FIG. 4, one or more PUs for intra prediction capable of being set to C12 that is a CU are depicted. As indicated by numerals in frameworks of the PUs, also the PUs are scanned so as to follow from the left to the right and from the top to the bottom.

In the following description, description is sometimes given using a "block" as a partial region or a processing unit of an image (picture) (the "block" is not a block of a processing section). The "block" in this case indicates an arbitrary partial region in the picture, and the size, shape, characteristic or the like of it is not restricted. In other words, it is assumed that the "block" in this case includes an arbitrary partial region (processing unit) such as, for example, a TB, a TU, a PB, a PU, an SCU, a CU, an LCU (CTB), a sub block, a macro block, a tile, a slice or the like.

<Image Encoding Apparatus>

Figure 5:
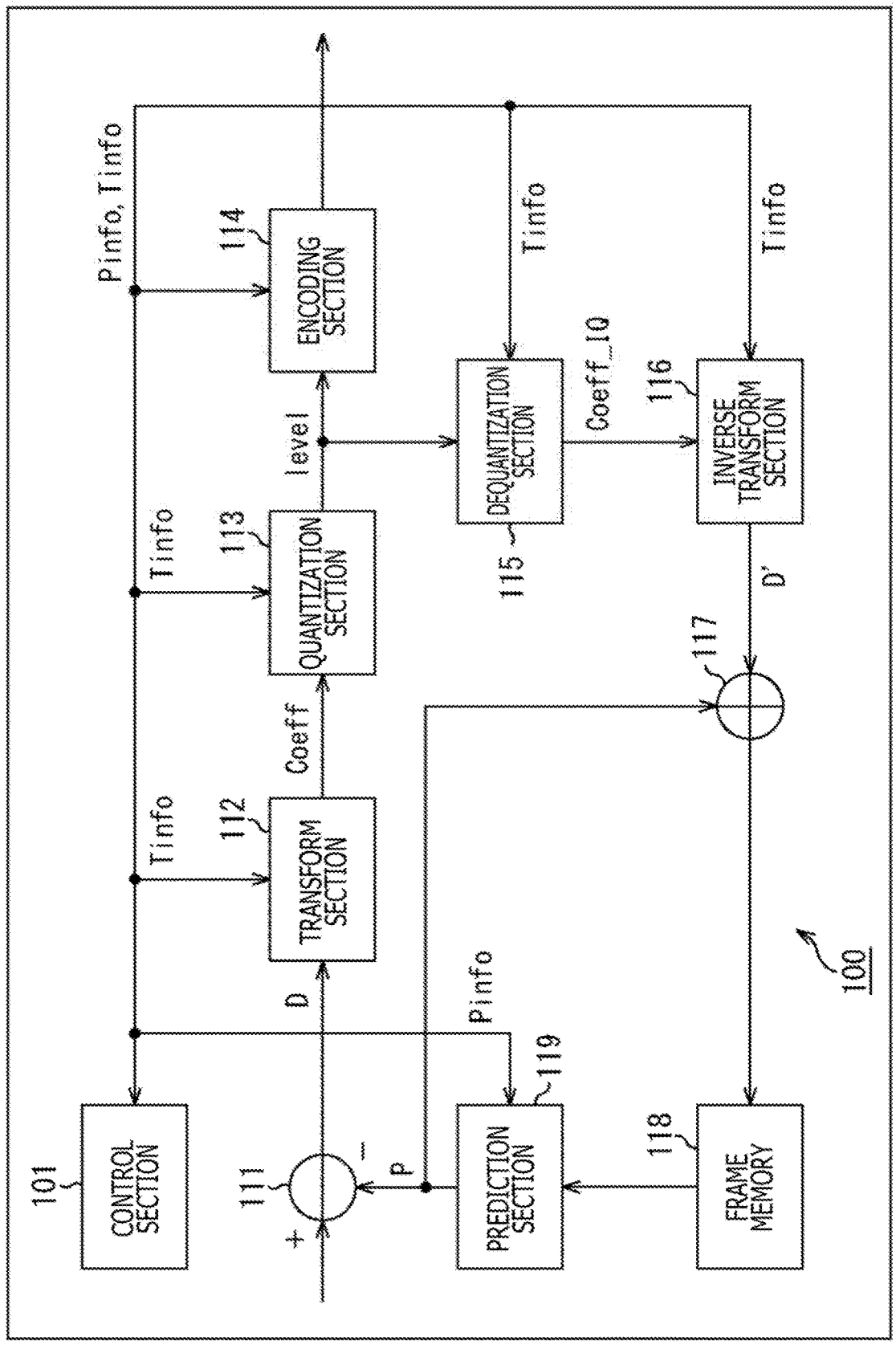
FIG. 5 is a block diagram depicting a principal configuration example of an image encoding apparatus.

FIG. 5 is a block diagram depicting an example of a configuration of an image encoding apparatus that is a form of an image processing apparatus to which the present technology is applied. An image encoding apparatus 100 depicted in FIG. 5 is an apparatus that encodes a prediction residual between an image and a prediction image of the image like AVC or HEVC. For example, the image encoding apparatus 100 incorporates a technology proposed by HEVC or a technology proposed by JVET (Joint Video Exploration Team).

It is to be noted that, in FIG. 5, principal ones of processing sections, data flows and so forth are depicted and all such processing sections, data flows and so forth are not necessarily depicted in FIG. 5. In other words, the image encoding apparatus 100 may include processing sections that are not indicated as blocks in FIG. 5 or may include processes or data flows that are not indicated as arrow marks or the like in FIG. 5.

As depicted in FIG. 5, the image encoding apparatus 100 includes, a control section 101, an arithmetic operation section 111, a transform section 112, a quantization section 113, an encoding section 114, a dequantization section 115, an inverse transform section 116, another arithmetic operation section 117, a frame memory 118 and a prediction section 119.

The control section 101 segments a moving image inputted to the image encoding apparatus 100 into blocks (CUs, PUs, transform blocks (TBs) or the like) of processing units on the basis of a block size of processing unit designated externally or in advance and supplies images I corresponding to the segmented blocks to the arithmetic operation section 111. Further, the control section 101 determines encoding parameters (header information Hinfo, prediction mode information Pinfo, transform information Tinfo and so forth) to be supplied to the associated blocks, for example, on the basis of RDC (Rate-Distortion Optimization). The determined encoding parameters are supplied to the associated blocks.

The header information Hinfo includes such information as, for example, a video parameter set (VPS (Video Parameter Set)), a sequence parameter set (SPS (Sequence Parameter Set)), a picture parameter set (PPS (Picture Parameter Set)), a slice header (SH) and so forth. For example, the header information Hinfo includes information that defines an image size (horizontal width PicWidth, vertical width PicHeight), a bit density (luminance bitDepthY, color difference bitDepthC), a maximum value MaxCUsize/minimum value MinCUSize of the CU size, a maximum value MaxTBSize/minimum value MinTBSize of the transform block size, a maximum value MaxTSSize of the transform skip block (referred to also as maximum transform skip block size), an on/off flag (also referred to as validity flag) of each encoding tool and so forth.

For example, as the on/off flags for encoding tools included in the header information Hinfo, on/off flags relating to transform and quantization processes indicated below are available. It is to be noted that the on/off flag of each encoding tool can be interpreted also as a flag indicative of whether or not syntax relating to the encoding tool exists in encoded data. Further, in the case where the value of the on/off flag is 1 (true), this indicates that the encoding tool is usable, but in the case where the value of the on/off flag is 0 (false), this indicates that the encoding tool is not usable. It is to be noted that the interpretations of the flag value may be reversed.

The secondary transform validity flag (st_enabled_flag) is a flag indicative of whether or not an encoding tool for performing secondary transform or an encoding tool for performing inverse transform (inverse secondary transform) as one of a transform process and an inverse process to the transform process is usable. In other words, the secondary transform validity flag is information indicative of whether or not secondary transform or inverse secondary transform (referred to also as (inverse) secondary transform) is permitted in a data unit that is made a target. Furthermore, this secondary transform validity flag is information relating to permission of (inverse) secondary transform of a data unit to be made a target.

For example, in the case where the secondary transform validity flag st_enabled_flag is 1 (true), (inverse) secondary transform is permitted ((inverse) secondary transform can be executed). On the other hand, in the case where the secondary transform validity flag st_enabled_flag is 0 (false), (inverse) secondary transform is not permitted ((inverse) secondary transform cannot be executed).

The transform quantization bypass validity flag (transquant_bypass_enabled_flag) is a flag indicative of whether or not an encoding tool for skipping, as one of transform and quantization or inverse processes to them (inverse transform and dequantization), transform and quantization or dequantization and inverse transform is usable. In other words, the transform quantization bypass validity flag is information indicative of whether or not skip (bypass) of transform and quantization or dequantization and inverse transform (also referred to as (inverse) transform and (de) quantization) is to be permitted. Furthermore, this transform quantization bypass validity flag is information relating to permission of skip (bypass) of (inverse) transform and (de) quantization of a data unit to be made a target.

For example, in the case where the transform quantization bypass validity flag transquant_bypass_enabled_flag is 1 (true), bypass of (inverse) transform and (de) quantization is permitted. In other words, (inverse) transform and (de) quantization can be bypassed. On the other hand, in the case where the transform quantization bypass validity flag transquant_bypass_enabled_flag is 0 (false), bypass of (inverse) transform and (de) quantization is not permitted. In other words, (inverse) transform and (de) quantization cannot be bypassed.

The transform skip validity flag (ts_enabled_flag) is a flag indicative of whether or not an encoding tool for skipping (inverse) transform including primary transform and secondary transform as one of a transform process and an inverse process to the transform process is usable. In other words, the transform skip validity flag is information indicative of whether or not skip of (inverse) transform is permitted in regard to a data unit that is made a target. Furthermore, the transform skip validity flag is information relating to permission of skip of (inverse) transform is regard to a data unit to be made a target.

For example, in the case where the transform skip validity flag ts_enabled_flag is 1 (true), skip of (inverse) transform is permitted. In other words, (inverse) transform can be skipped. On the other hand, in the case where the transform skip validity flag ts_enabled_flag is 0 (false), skip of (inverse) transform is not permitted. In other words, (inverse) transform cannot be skipped.

It is to be noted that, in the case of the method disclosed in NPL 1 or NPL 2, the transform skip validity flag acts only upon primary transform or inverse primary transform (referred to also as (inverse) primary transform as described hereinabove. Therefore, in the present specification, description is sometimes given regarding the transform skip validity flag as information relating to '(inverse) primary transform.' In short, description is sometimes given regarding the transform skip validity flag as "information regarding permission of skip of '(inverse) primary transform' regarding a data unit to be made a target (information indicative of whether or not skip of '(inverse) primary transform' in regard to the data unit to be made a target)."

Naturally, the substance of the header information Hinfo is arbitrary, and any information other than the examples described above may be included in this header information Hinfo.

The prediction mode information Pinfo includes, for example, such information as described below.

PU size PUSize is information indicative of a PU size of a processing target PU (prediction block size). Intra prediction mode information IPinfo (for example, prev_intra_luma_pred_flag, mpm_idx, rem_intra_pred_mode and so forth in JCTVC-W1005, 7.3.8.5 Coding Unit syntax) is information relating to an intro-prediction mode of a block of a processing target. Motion prediction information. MVinfo (for example, merge_idx, merge_flag, inter_pred_idc, ref_idx_LX, mvp_1X_flag, X={0,1}, mvd and so forth in JCTVC-W1005, 7.3.8.6 Prediction Unit Syntax) is information relating to motion prediction of a block of a processing target.

Naturally, the substance of the prediction mode information. Pinfo is arbitrary, and any information other than the examples described above may be included in this prediction mode information Pinfo.

The transform information (info includes, for example, such information as described below.

A block side TBSize (or a logarithm value log2TBSize of TBSize with base 2, also referred to as transform block size) is information indicative of a block size of a processing target transform block.

The transform quantization bypass flag (transquant_bypass_flag) is information indicative of whether or not (inverse) transform and (de) quantization are to be skipped (bypassed) in a data unit to be made a target (for example, cu_transquant_bypass_flag and so forth in JCTVC-W1005, 7.3.8.5 Coding unit syntax). In other words, the transform quantization bypass flag is information relating to skip (bypass) of (inverse) transform and (de) quantization in a data unit to be made a target.

For example, in the case where the transform quantization bypass flag transquant_bypass_flag is 1 (true), (inverse) transform and (de) quantization are bypassed. On the other hand, in the case where the transform quantization bypass validity flag transquant_bypass_flag is 0 (false), (inverse) transform and (de) quantization are not bypassed.

A transform skip flag (ts_flag) is information indicative of whether or not (inverse) transform is to be skipped (for example, transfrom_skip_flag and so forth in JCTVC-W1005, 7.3.8.11 Residual coding syntax syntax). In other words, this transform skip flag is information relating to skip of (inverse) transform of a data unit to be made a target.

For example, in the case where the transform skip flag ts_flag is 1 (true), (inverse) transform ((inverse) primary transform) is skipped. On the other hand, in the case where the transform skip flag ts_flag is 0 (false), (inverse) transform ((inverse) primary transform) is executed.

It is to be noted that, in the case of the method disclosed in NPL 1 or NPL 2, the transform skip flag acts only upon also called (inverse) primary transform as described hereinabove. Therefore, in the present specification, description is sometimes given regarding the transform skip flag as information relating to '(inverse) primary transform.' In short, description is sometimes given regarding the transform skip flag as "information regarding skip of '(inverse) primary transform' regarding a data unit to be made a target (information indicative of whether or not skip of '(inverse) primary transform' in regard to the data unit is to be made a target)."

The primary transform identifier (pt-idx) is identifier indicative of which (inverse) primary transform is to be applied to (inverse) primary transform in the vertical direction and the horizontal direction for a data unit to be made a target (for example, refer to JVET-B1001, 2.5.1 Adaptive multiple Core transform. In JEM2, also referred to as emt_idx). In other words, the primary transform identifier is information relating to the substance of (inverse) primary transform for a data unit to be made a target.

The secondary transform identifier (st_idx) is identifier indicative of which (inverse) secondary transform is to be applied for a data unit to be made a target (for example, refer to JVET-B1001, 2.5.2 Secondary Transforms. In JEM2, also referred to as nsst_idx or rot_idx). In other words, the secondary transform identifier is information relating to the substance of (inverse) secondary transform for a data unit to be made a target.

The secondary transform identifier st_idx is identifier that designates, in the case where the value thereof is greater than 0, a matrix for (inverse) secondary transform. In other words, in this case, the secondary transform identifier st_idx indicates execution of (inverse) secondary transform. Further, for example, in the case where secondary transform identifier st_idx has a value 0, it indicates skip of (inverse) secondary transform.

The scan identifier (scanIdx) is information relating to a scan method. The quantization parameter (qp) is information indicative of a quantization parameter to be used in (de) quantization for a data unit to be made a target. The quantization matrix (scaling_matrix) is information indicative of a quantization matrix to be used in (de) quantization for a data unit to be made a target (for example, JCTVC-W1005, 7.3.4 scaling list data syntax).

Naturally, the substance of the transform information Tinfo is arbitrary, and any information other than the examples described above may be included in this transform information Tinfo.

The header information Hinfo is supplied, for example, to the associated blocks. The prediction mode information Pinfo is supplied, for example, to the encoding section 114 and the prediction section 119. The transform information Tinfo is supplied, for example, to the transform section 112, quantization section 113, encoding section 114, dequantization section 115 and inverse transform section 116.

The arithmetic operation section 111 subtracts a prediction image P supplied from the prediction section 119 from an image I corresponding to the block of the inputted processing unit as indicated by the expression (9) to determine a prediction residual D and supplies the prediction residual D to the transform section 112.

$$D = I - P \qquad (9)$$

The transform section 112 performs a transform process for the prediction residual D supplied from the arithmetic operation section 111 on the basis of the transform information Tinfo supplied from the control section 101 to derive transform coefficients Coeff. The transform section 112 supplies the transform coefficients Coeff to the quantization section 113. It is to be noted that the transform section 112 can, upon transform skip or upon transform quantization bypass, skip (omit) a transform process (primary transform and secondary transform) and supply the prediction residual D as transform coefficients Coeff to the quantization section 113.

The quantization section 113 performs scaling (quantization) of the transform coefficients Coeff supplied from the transform section 112 on the basis of transform information Tinfo supplied from the control section 101. In short, the quantization section 113 performs quantization of transform coefficients Coeff for which a transform process has been performed or transform coefficients Coeff whose transform process has been skipped (omitted) (namely, the prediction residual D). The quantization section 113 supplies the transform coefficients after the quantization obtained by the quantization, namely, quantization transform coefficient levels level obtained by the quantization, to the encoding section 114 and the dequantization section 115. It is to be noted that also it is possible for the quantization section 113 to skip (omit), upon transform quantization bypass, the quantization process and supply the transform coefficients Coeff as the quantization transform coefficient levels level to the encoding section 114.

The encoding section 114 encodes quantization transform coefficient levels level and so forth supplied from the quantization section 113 by a predetermined method. For example, the encoding section 114 converts encoding parameters (header information Hinfo, prediction mode information Pinfo, transform information Tinfo and so forth) supplied from the control section 101 and the quantization transform coefficient levels level supplied from the quantization section 113 into syntax values of individual syntax elements, and encodes (for example, arithmetically encodes) the syntax values to generate a bit string (encoded data).

Further, the encoding section 114 derives residual information RInfo from the quantization transform coefficient levels level, and encodes the residual information RInfo to generate a bit string (encoded data).

The residual information RInfo includes, for example, a last non-zero coefficient X coordinate (last_sig_coeff_x_pos), a last non-zero coefficient Y coordinate (last_sig_coeff_y_pos), a sub block non-zero coefficient presence/absence flag (coded_sub_block_flag), a non-zero coefficient presence/absence flag (sig_coeff_flag), a GR1 flag (gr1_flag) that ts_flag information indicative of whether or not the level of a non-zero coefficient is greater than 1, a GR2 flag (gr2_flag) that ts_flag information indicative of whether or not the level of a non-zero coefficient is greater than 2, a sign code (sign flag) that is a code indicative of whether the non-zero coefficient is in the positive or in the negative, a non-zero coefficient remaining level that is information indicative of a remaining level of the non-zero coefficient (coeff_abs_level_remaining) and so forth (refer to, for example, JCTVC-W1005, 7.3.8.11 Residua Coding syntax).

Naturally, the substance of the residual information RInfo is arbitrary, and any information other than the examples described above may be included in the residual information RInfo.

The encoding section 114 multiplexes, for example, a bit string (encoded data) of encoded syntax elements and outputs the bit string as a bit stream.

The dequantization section 115 scales (dequantizes) the value of the quantization transform coefficient levels level supplied from the quantization section 113 on the basis of the transform information Tinfo supplied from the control section 101 and derives transform coefficients Coeff_IQ after the dequantization. The dequantization section 115 supplies the transform coefficients Coeff_IQ to the inverse transform section 116. It is to be noted that the dequantization section 115 can skip (omit), upon transform quantization bypass, the dequantization process and supply the quantization transform coefficient levels level as transform coefficients Coeff_IQ to the inverse transform section 116. The dequantization performed by the dequantization section 115 is an inverse process to the quantization performed by the quantization section 113 and is a process similar to dequantization performed by the image decoding apparatus hereinafter described. Accordingly, the dequantization is hereinafter described in the description regarding the image decoding apparatus.

The inverse transform section 116 performs inverse transform for the transform coefficients Coeff_IQ supplied from the dequantization section 115 on the basis of the transform information Tinfo supplied from the control section 101 to derive a prediction residual D'. The inverse transform section 116 supplies the prediction residual D' to the arithmetic operation section 117. It is to be noted that also it is possible for the inverse transform section 116 to skip (omit), upon transform skip or upon transform quantization bypass, the inverse transform processes (inverse secondary transform and inverse primary transform) and supply the transform coefficients Coeff_IQ as the prediction residual D' to the arithmetic operation section 117. The inverse transform performed by the inverse transform section 116 is an inverse process to the transform performed by the transform section 112 and is a process similar to inverse transform performed by the image decoding apparatus hereinafter described.

The arithmetic operation section 117 adds the prediction residual D' supplied from the inverse transform section 116 and a prediction image P (prediction signal) supplied from the prediction section 119 and corresponding to the prediction residual D' as represented by the expression (10) given below to derive a locally decoded image Rec. The arithmetic operation section 117 supplies the locally decoded image Rec to the frame memory 118.

$$Rec = D' + P \qquad (10)$$

The frame memory 118 re-constructs a decoded image for each unit of a picture using the locally decoded image Rec supplied from the arithmetic operation section 117 and stores the decoded image into a buffer in the frame memory 118. The frame memory 118 reads out a decoded image designated by the prediction section 119 as a reference image from the buffer and supplies the decoded image to the prediction section 119. Further, the frame memory 118 may store header information Hinfo, prediction mode information Pinfo, transform information Tinfo and so forth relating to generation of a decoded image into a buffer in the frame memory 118.

The prediction section 119 acquires a decoded image stored in the frame memory 118 and designated by prediction mode information Pinfo as a reference image and uses the reference image to generate a prediction image P by a prediction method designated by the prediction mode information Pinfo. The prediction section 119 supplies the generated prediction image P to the arithmetic operation section 111 and the arithmetic operation section 117.

Such an image encoding apparatus 100 as described above includes a control section that skips, in the case where primary transform that is a transform process for a prediction residual that is a difference between an image and a prediction image of the image is to be skipped, also secondary transform that is a transform process for a primary transform coefficient obtained by the primary transform of the prediction residual.

<Transform Section>

Figure 6:
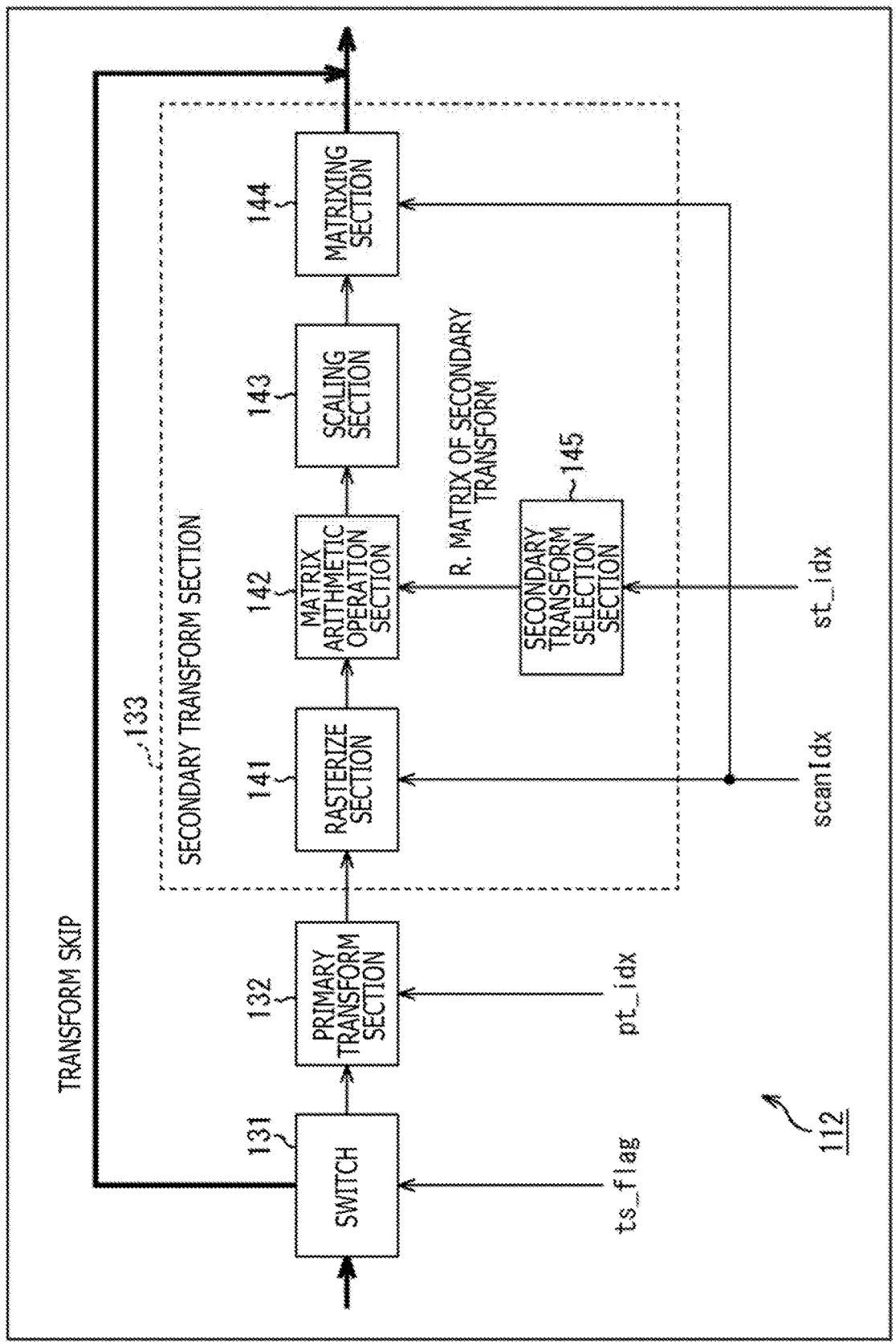
FIG. 6 is a block diagram depicting a principal configuration example of a transform section.

FIG. 6 is a block diagram depicting a principal configuration example of the transform section 112. Referring to FIG. 6, the transform section 112 includes a switch 131, a primary transform section 132 and a secondary transform section 133.

The switch 131 is an embodiment of a control section for controlling execution of primary transform and secondary transform. For example, in the case where the switch 131 is to skip primary transform, it controls that also secondary transform is skipped. For example, the switch 131 controls the supplying destination of a prediction residual D supplied from the arithmetic operation section 111 in response to the value of the transform skip flag ts_flag relating to skip of primary information and included in the transform information Tinfo.

For example, in the case where the value of the transform skip flag ts_flag is 0, namely, in the case where the transform skip flag ts_flag indicates execution of transform (primary transform), the switch 131 controls such that at least primary transform is executed. In short, in this case, the switch 131 supplies the prediction residual D to the primary transform section 132.

On the other hand, in the case where the value of the transform skip flag ts_flag is 1, namely, in the case where the transform skip flag ts_flag indicates skip (omission) of transform (primary transform), the switch 131 controls such that primary transform and secondary transform are skipped. In short, in this case, the switch 131 supplies the prediction residual D as the transform coefficients Coeff to the quantization section 113.

Accordingly, the transform section 112 can readily suppress unnecessary increase of the processing amount of the transform.

For example, to a sparse residual signal (prediction residual D) in which the number of non-zero coefficients is small like the prediction residual D of a 4×4 matrix=[[255, 0, 0, 0], [0, 0, 0, 0], [0, 0, 0, 0], [0, 0, 0, 0]], it is desirable to apply transform skip (skip of primary transform and secondary transform) in order to suppress decrease of the energy compaction to suppress degradation of the encoding efficiency. By controlling execution of transform in response to the value of the transform skip flag ts_flag as described above, the switch 131 can skip not only primary transform but also secondary transform more readily particularly in regard to a sparse residual signal in which the number of non-zero coefficients is small in this manner, and increase of the processing amount for transform can be suppressed to suppress degradation of the encoding efficiency.

It is to be noted that the switch 131 may control the supplying destination of the prediction residual D supplied from the arithmetic operation section 111 in response to the value of the transform quantization bypass flag transquant_bypass_flag included in the transform information Tinfo.

For example, in the case where the value of the transform quantization bypass flag transquant_bypass_flag is 0, namely, in the case where the transform quantization bypass flag transquant_bypass_flag indicates execution of transform and quantization, the switch 131 controls such that at least primary transform is executed. In short, in this case, the switch 131 supplies the prediction residual D to the primary transform section 132.

On the other hand, in the case where the value of the transform quantization bypass flag transquant_bypass_flag is 1, namely, in the case where the transform quantization bypass flag transquant_bypass_flag indicates skip (omission) of transform and quantization, the switch 131 controls such that primary transform and secondary transform are skipped. In short, in this case, the switch 131 supplies the prediction residual D as the transform coefficients Coeff to the quantization section 113.

This makes it possible for the transform section 112 to readily suppress unnecessary increase of the processing amount of transform similarly as in the case of the transform skip.

The primary transform section 132 executes primary transform such as, for example, orthogonal transform or the like for the prediction residual D supplied from the switch 131. In short, the primary transform section 132 performs primary transform under the control of the switch 131.

In the case where primary transform is to be performed, the primary transform section 132 executes primary transform by a method according to the value of the primary transform identifier pt_idx that is information, for example, relating to the substance of primary transform. For example, the primary transform section 132 selects primary transform Phor in the horizontal direction and primary transform Pver in the vertical direction designated by the primary transform identifier pt_idx and performs matrix arithmetic operation as represented, for example, by the following expression (11) for the prediction residual D supplied from the switch 131 to derive transform coefficients Coeff_P after the primary transform (referred to also as primary transform coefficient).

$$\text{Coeff\_}P = Phor \cdot D \cdot Pver^T \quad (11)$$

It is to be noted that the expression (11) may be such as given by the following expression (12).

$$\text{Coeff\_}P = Pver \cdot D \cdot Phor^T \quad (12)$$

It is to be noted that the operator "·" represents an operation for performing inner product (matrix Product) between matrices, and the operator "T" represents an operation for a transposed matrix. The primary transform section 132 supplies the derived primary transform coefficients Coeff_P to the secondary transform section 133.

The secondary transform section 133 converts the primary transform coefficients Coeff_P supplied from the primary transform section 132 into one-dimensional vector, performs matrix arithmetic operation for the one-dimensional vector, performs scaling for the one-dimensional vector for which the matrix arithmetic operation has been performed, and performs secondary transform that is a transform process for matrixing the scaled one-dimensional vector. In short, the secondary transform section 133 performs secondary transform under the control of the switch 131.

The secondary transform section 133 performs secondary transform for primary transform coefficients Coeff_P on the basis of a secondary transform identifier st_idx that is information relating to the substance of secondary transform and a scan identifier scanIdx that is information relating to a scan method for transform coefficients to derive transform coefficients Coeff after the secondary transform (also referred to as secondary transform coefficient).

As depicted in FIG. 6, the secondary transform section 133 includes a rasterize section 141, a matrix arithmetic operation section 142, a scaling section 143, a matrixing section 144 and a secondary transform selection section 145.

The rasterize section 141 converts the primary transform coefficients Coeff_P supplied from the primary transform section 132 for each unit of a sub block (4×4 sub block) into a 1×16-dimensional vector $X_{1d}$ on the basis of a scan method for transform coefficients designated by the scan identifier scanIdx. The rasterize section 141 supplies the resulting vector $X_{1d}$ to the matrix arithmetic operation section 142.

A of FIG. 7 depicts scan types scanType designated by various values of the scan identifier scanIdx. As depicted in A of FIG. 7, in the case where the scan identifier scanIdx is 0, an oblique direction scan (up-right diagonal scan) is designated; in the case where the scan identifier scanIdx is 1, a horizontal direction scan (horizontal fast scan) is designated; and in the case where the scan identifier scanIdx is 2, a vertical direction scan (vertical fast scan) is designated. B of FIG. 7 to D of FIG. 7 depict scan orders of coefficients of the various scans for a 4×4 sub block. In B of FIG. 7 to D of FIG. 7, a number applied to each coefficient position indicates an order number at which the coefficient position is scanned. B of FIG. 7 depicts as example of a scan order in the horizontal direction scan (horizontal fast scan); C of FIG. 7 depicts an example of a scan order in the vertical direction scan (vertical fast scan); and D of FIG. 7 depicts an example of a scan order in the oblique direction scan (up-right diagonal scan).

For example, it is assumed that the transform skip flag ts_flag is 0 and the primary transform coefficients Coeff_P supplied from the primary transform section 132 are such a 4×4 matrix as indicated by the following expression (13).

[Math. 6]

$$\text{Coeff\_P} = \begin{bmatrix} 245 & -42 & -18 & -30 \\ -30 & -31 & 3 & -2 \\ 11 & -4 & -9 & 4 \\ 3 & -2 & 1 & 0 \end{bmatrix} \quad (13)$$

Further, it is assumed that the scan identifier scanIdx indicates the horizontal scan hor. In this case, the rasterize section 141 scans the primary transform coefficients Coeff_P in accordance with a scan order of coefficients of the horizontal scan of B of FIG. 7 and converts the primary transform coefficients Coeff_P into such a 1×16-dimensional vector $X_{1d}$ as indicated by the following expression (14). The rasterize section 141 supplies the determined vector $X_{1d}$ to the matrix arithmetic operation section 142.

[Math. 7]

$$X_{1d}[245, -42, -18, -30, -30, -31, 3, -2, 11, -4, -9,\\ 4, 3, -2, 1, 0] \quad (14)$$

The secondary transform selection section 145 reads out a matrix R for secondary transform designated by the secondary transform identifier st_idx from an internal memory (not depicted) of the secondary transform selection section 145 and supplies the matrix R to the matrix arithmetic operation section 142. For example, when the secondary transform identifier st_idx has a certain value, the secondary transform selection section 145 reads out the matrix R of 16×16 depicted in FIG. 8 for secondary transform and supplies the matrix R to the matrix arithmetic operation section 142.

It is to be noted that the secondary transform selection section 145 may select a matrix R for secondary transform in response to a secondary transform identifier st_idx and intra prediction mode information IPinfo (for example, a prediction mode number). As an alternative, the secondary transform selection section 145 may select a matrix R in response to motion prediction information MVinfo and secondary transform identifier st_idx in place of intra prediction mode information IPinfo.

The matrix arithmetic operation section 142 performs such matrix arithmetic operation as represented by the following expression (15) using the one-dimensional vector $X_{1d}$ and the matrix R for secondary transform and supplies a result $Y_{1d}$ of the matrix arithmetic operation to the scaling section 143.

$$Y_{1d}{}^T = R \cdot X_{1d}{}^T \quad (15)$$

Here, the operator "T" represents an operation of a transposed matrix. For example, by matrix product of the vector $X_{1d}$ of the expression (14) and the matrix R for secondary transform depicted in FIG. 8, such a result $Y_{1d}$ as indicated by the following expression (16) is obtained.

[Math. 8]

$$Y_{1d}=[63055, 138, -639, 1088, -8168, -12139,\\ -2581, -3003, -4190, -5866, 1984, 2271,\\ 1989, -878, -681, 319] \quad (16)$$

The scaling section 143 performs, in order to normalize the norm of the signal $Y_{1d}$ supplied from the matrix arithmetic operation section 142, bit shift arithmetic operation of N (N is a natural number) bits as represented by the following expression (17) to determine a signal $Z_{1d}$ after the bit shift.

$$Z_{1d} = (Y_{1d}) >> N \quad (17)$$

It is to be noted that, before the shift arithmetic operation of N bits, the value of $1 << (N-1)$ may be added as an offset to each element of the signal $Z_{1d}$ as represented by the following expression (18).

$$Z_{1d} = (Y_{1d} + ((N-1) << 1) \cdot E) >> N \quad (18)$$

Figure 8:
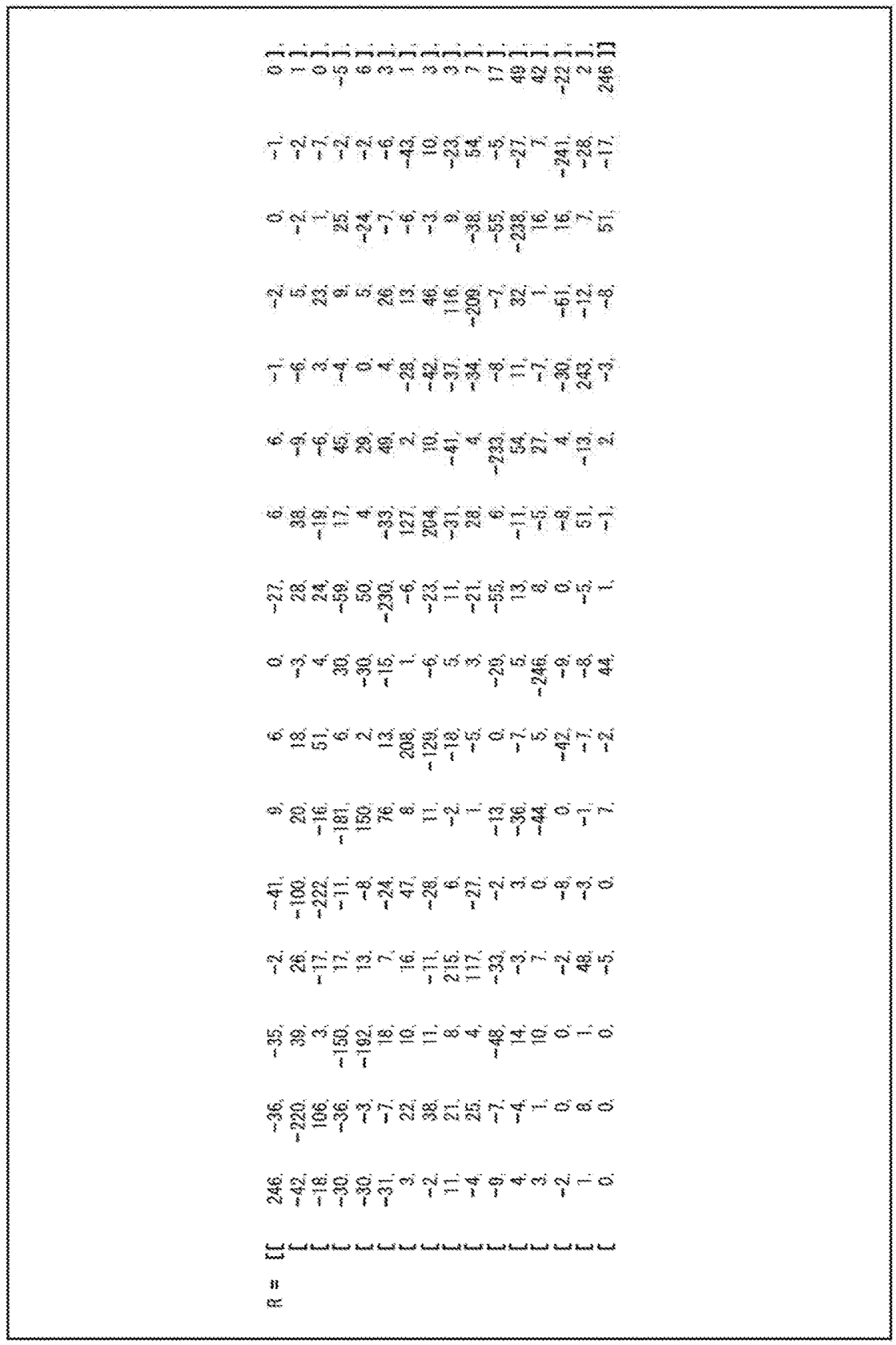
FIG. 8 is a view depicting an example of a matrix of secondary transform.

It is to be noted that, in the expression (18), E is a 1×16-dimensional vector in which all elements have the value 1. For example, since the matrix R for secondary transform depicted in FIG. 8 is an 8-bit scaled matrix, the value of N to be used for normalization of the norm by the scaling section 143 is 8. For example, if the signal $Y_{1d}$ indicated in the expression (16) is arithmetically operated setting N to N=8 in the expression (18), such a result $Z_{1d}$ as indicated by the expression (19) is obtained.

[Math. 9]

$$Z_{1d} = [246, 1, -2, 4, -32, -47, -10, -12, -16, -23, 8, 9, 8, -3, -3, -1] \quad (19)$$

Generally, in the case where the matrix R for secondary transform is in an N-bit scaled state, the bit shift amount in norm normalization is N bits. The scaling section 143 supplies the signal $Z_{1d}$ obtained in such a manner as described above to the matrixing section 144.

The matrixing section 144 converts the 1×16-dimensional vector $X_{1d}$ after the norm normalization into a 4×4 matrix X on the basis of the scan method designated by the scan identifier scanIdx. For example, the matrixing section 144 matrixes the 1×16-dimensional vector $Z_{1d}$ indicated by the expression (19) on the basis of horizontal scan indicated in B of FIG. 7 and thereby obtains transform coefficients Coeff of a 4×4 matrix represented by the following expression (20).

[Math. 10]

$$Coeff = \begin{bmatrix} 246 & 1 & -2 & 4 \\ -32 & -47 & -10 & -12 \\ -16 & -23 & 8 & 9 \\ 8 & -3 & -3 & 1 \end{bmatrix} \quad (20)$$

The matrixing section 144 supplies the resulting transform coefficients Coeff to the quantization section 113.

For example, in the case where the transform skip flag ts_flag indicates skip of a transform process (primary transform), the switch 131 may cause primary transform and secondary transform to be skipped such that the quantization section 113 performs quantization for the prediction residual D and the encoding section 114 encodes the quantization transform coefficient level and the transform skip flag ts_flag to generate a bit stream including encoded data of them.

<Flow of Image Encoding Process>

Now, an example of a flow of processing executed by the image encoding apparatus 100. First, an example of a flow of an image encoding process is described with reference to a flow chart of FIG. 9.

After the image encoding process is started, at step S101, the control section 101 performs an encoding controlling process and performs block segmentation, setting of encoding parameters and so forth.

At step S102, the prediction section 119 performs a prediction process to generate a prediction image of an optimum prediction mode and so forth. For example, in the prediction process, the prediction section 119 performs intra prediction to generate a prediction image of an optimum intra prediction mode and so forth, performs inter prediction to generate a prediction image of an optimum inter prediction mode and so forth and selects an optimum prediction mode from between the prediction modes on the basis of the cost function value or the like.

At step S103, the arithmetic operation section 111 arithmetically operates a difference between the input image and the prediction image of the optimum mode selected by the prediction process at step S102. In short, the arithmetic operation section 111 generates a prediction residual D between the input image and the prediction image. The prediction residual D determined in this manner is reduced in data amount in comparison with the original image data. Accordingly, the data amount can be compressed in comparison with that in an alternative case in which the image is encoded as it is.

At step S104, the transform section 112 performs a transform process for the prediction residual D generated by the process at step S103 to derive transform coefficients Coeff. Details of the process at step S104 are hereinafter described.

At step S105, the quantization section 113 uses a quantization parameter calculated by the control section 101 and so forth to quantize the transform coefficients Coeff obtained by the process at step S104 and derive quantization transform coefficient levels level.

At step S106, the dequantization section 115 dequantizes the quantization transform coefficient levels level generated by the process at step S105 with a characteristic corresponding to the characteristic of quantization at step S105 to derive transform coefficients Coeff_IQ.

At step S107, the inverse transform section 116 inversely transforms the transform coefficients Coeff_IQ obtained by the process at step S106 by a method corresponding to the transform process at step S104 to derive a prediction residual D'. It is to be noted that this inverse transform process is an inverse process to the transform process at step S104 and is executed similarly to the inverse transform process executed in an image decoding process hereinafter described. Therefore, description of the inverse transform process is given in the description of the decoding side.

At step S108, the arithmetic operation section 117 adds the prediction image obtained by the prediction process at step S102 to the prediction residual D' derived by the process at step S107 to generate a decoded image that is decoded locally.

At step S109, the frame memory 118 stores the decoded image obtained by the process at step S108 and locally decoded.

At step S110, the encoding section 114 encodes the quantization transform coefficient levels level obtained by the process at step S105. For example, the encoding section 114 encodes the quantization transform coefficient levels level that are information relating to the image by arithmetic encoding or the like to generate encoded data. Further, at this time, the encoding section 114 encodes various encoding parameters (header information Hinfo, prediction mode information Pinfo and transform information Tinfo). Furthermore, the encoding section 114 derives residual information RInfo from the quantization transform coefficient levels level and encodes the residual information RInfo. The encoding section 114 outputs the encoded data of the various information generated in this manner collectively as a bit stream to the outside of the image encoding apparatus 100. This bit stream is transmitted to the decoding side, for example, through a transmission line or a recording medium.

When the process at step S110 ends, the image encoding process ends.

It is to be noted that the processing units in the various processes are arbitrary and may not be same as each other. Accordingly, it is possible for the processes at the individual steps to be suitably executed in parallel to processes at other steps or the like or in a changed processing order.

<Flow of Transform Process>

Figure 9:
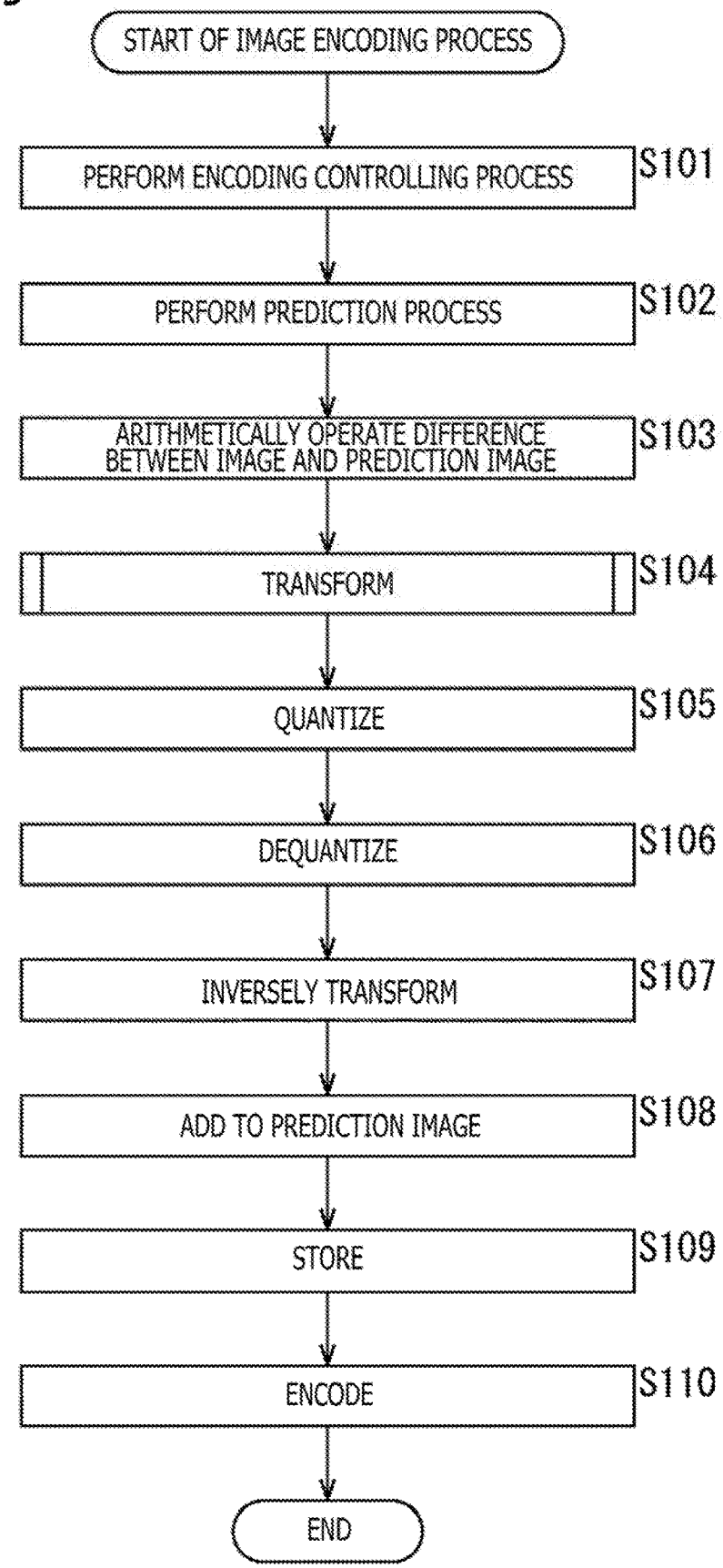
FIG. 9 is a flow chart illustrating an example of a flow of as image encoding process.
Figure 10:
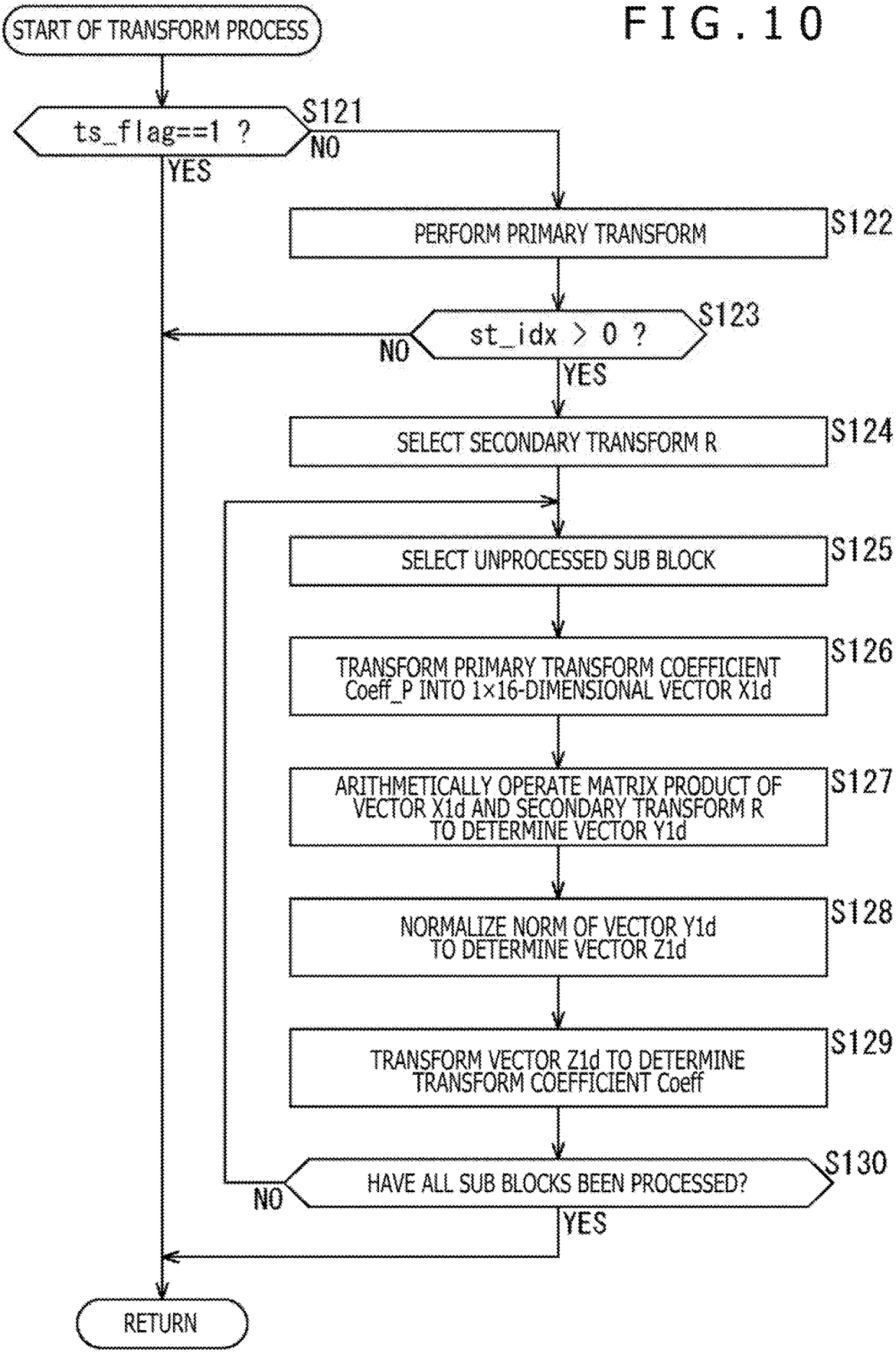
FIG. 10 is a flow chart illustrating an example of a flow of a transform process.

Now, an example of a flow of the transform process executed at step S104 of FIG. 9 is described with reference to a flow chart of FIG. 10.

After the transform process is started, at step S121, the switch 131 decides whether or not the transform skip flag ts_flag is 1 (true). In the case where it is decided that the transform skip flag ts_flag is 1 (true) (the transform skip flag ts_flag indicates skip of a transform process), primary transform and secondary transform (processes at steps S122 to S130) are skipped and the transform process comes to an end, and the processing returns to FIG. 9. In short, the switch 131 supplies the prediction residual D as transform coefficients Coeff to the quantization section 113. On the other hand, in the case where it is decided at step S121 that the transform skip flag ts_flag is 0 (false) (the transform skip flag ts_flag indicates execution of a transform process), the processing advances to step S122.

It is to be noted that, at step S121, the switch 131 may further decide whether or not the transform quantization bypass flag transquant_bypass_flag is 1 (true). Along with this, in the case where it is decided that the transform quantization bypass flag transquant_bypass_flag is 1 (true) (the transform quantization bypass flag transquant_bypass_flag indicates skip of a transform process and a quantization process), primary transform and secondary transform (processes at steps S122 to S130) are skipped and the transform process is ended, and the processing returns to FIG. 9. In particular, the switch 131 supplies the prediction residual D as the transform coefficients Coeff to the quantization section 113. On the other hand, if it is decided at step S121 that the transform quantization bypass flag transquant_bypass_flag is 0 (false) (the transform quantization bypass flag transquant_bypass_flag indicates execution of a transform process and a quantization process), the processing advances to step S122.

At step S122, the primary transform section 132 performs primary transform for the prediction residual D on the basis of the primary transform identifier pt_idx to derive primary transform coefficients Coeff_P.

At step S123, the secondary transform section 133 decides whether or not the secondary transform identifier st_idx applies secondary transform (st_idx>0). In the case where it is decided that the secondary transform identifier st_idx is 0 (the secondary transform identifier st_idx indicates skip of secondary transform), secondary transform (processes at steps S124 to S130) is skipped and the transform process is ended, and the processing returns to FIG. 9. In particular, the secondary transform section 133 supplies the primary transform coefficients Coeff_P as transform coefficients Coeff to the quantization section 113.

On the other hand, in the case where it is decided at step S123 that the secondary transform identifier st_idx is greater than 0 (the secondary transform identifier st_idx indicates execution of secondary transform), the processing advances to step S124. Secondary transform is executed by the processes at steps S124 to S130.

At step S124, the secondary transform selection section 145 selects a matrix R for secondary transform designated by the secondary transform identifier st_idx.

At step S125, the secondary transform section 133 segments a transform block of a processing target into sub blocks and selects an unprocessed sub block.

At step S126, the rasterize section 141 converts the primary transform coefficients Coeff_P into a 1×16-dimensional vector $X_{1d}$ on the basis of the scan method designated by the scan identifier scanIdx.

At step S127, the matrix arithmetic operation section 142 arithmetically operates a column product between the vector $X_{1d}$ and the matrix R for secondary transform to determine a vector $Y_{1d}$.

At step S128, the scaling section 143 normalizes the norm of the vector $Y_{1d}$ to determine a vector $Z_{1d}$.

At step S129, the matrixing section 144 converts the vector $Z_{1d}$ into a 4×4 matrix on the basis of the scan method designated by the scan identifier scanIdx to determine transform coefficients Coeff of the sub block of the processing target. The transform coefficients Coeff are supplied to the quantization section 113.

At step S130, the secondary transform section 133 decides whether or not all sub blocks of the transform block of the processing target have been processed. In the case where it is decided that an unprocessed sub block exists, the processing returns to step S125, and the later processes are repeated. In short, the processes at steps S125 to S130 (secondary transform) are executed for each sub block of the transform block of the processing target. In the case where it is decided at step S130 that all sub blocks have been processed (secondary transform of all sub blocks has been performed), the transform process is ended and the processing returns to FIG. 9.

It is to be noted that the transform process may perform change of the processing order of the steps or may change the substance of the processes within a range within which it can be performed. For example, in the case where it is decided at step S123 that the secondary transform identifier st_idx=0, the unit matrix of 16×16 may be selected as a matrix R for secondary transform such that the processes at steps S125 to S130 are executed.

By executing the processes in such a manner as described above, the image encoding apparatus 100 can skip not only primary transform but also secondary transform by indicating a skip of a transform process by the transform skip flag ts_flag. Accordingly, it is possible to perform, for example, in regard to a sparse residual signal in which the number of non-zero coefficients is small and to which it is desirable to apply transform skip, a transform process that achieves reduction of the processing amount of transform and reduction of degradation of the energy compaction more readily and improves the encoding efficiency.

<Image Decoding Apparatus>

Figure 11:
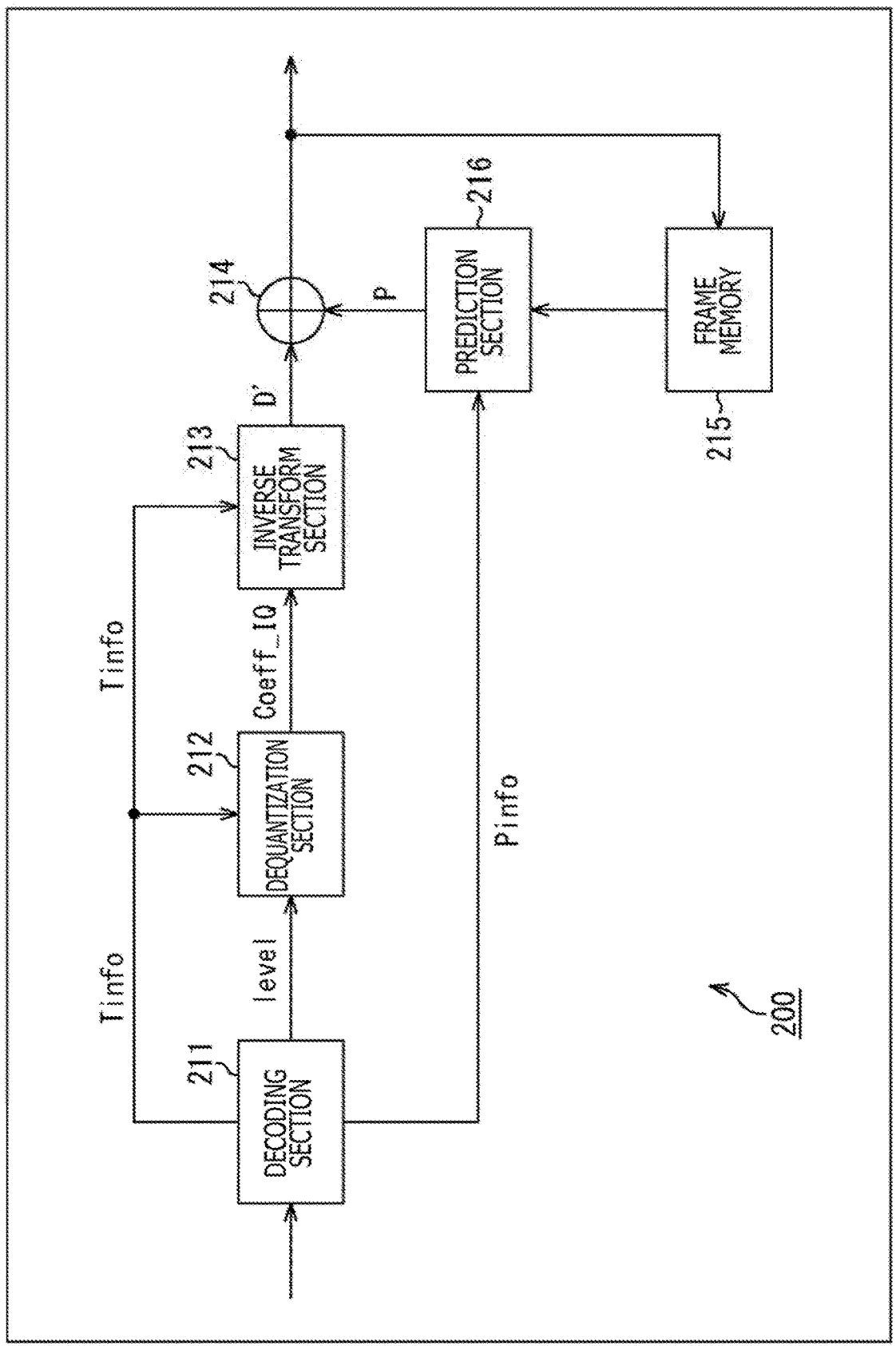
FIG. 11 is a block diagram depicting a principal configuration example of as image decoding apparatus.

In the following, decoding of encoded data encoded in such a manner as described above is described. FIG. 11 is a block diagram depicting an example of a configuration of an image decoding apparatus that is a form of as image processing apparatus to which the present technology is applied. An image decoding apparatus 200 depicted in FIG. 11 is an image decoding apparatus that corresponds to the image encoding apparatus 100 of FIG. 5 and decodes encoded data (bit stream) generated by the image encoding apparatus 100 by a decoding method corresponding to the encoding method by the image encoding apparatus 100. For example, the image decoding apparatus 200 incorporates the technology proposed in HEVC or the technology proposed in JVET.

It is to be noted that, in FIG. 11, principal ones of processing sections, flows of data and so forth are depicted and full ones are not necessarily depicted in FIG. 11. In other words, the image decoding apparatus 200 may include processing sections that are not depicted as blocks in FIG. 11 or may include processes or flows of data not depicted as arrow marks or the like in FIG. 11.

As depicted in FIG. 11, the image decoding apparatus 200 includes a decoding section 211, a dequantization section 212, an inverse transform section 213, an arithmetic operation section 214, a frame memory 215 and a prediction section 216. To the image decoding apparatus 200, encoded data generated by the image encoding apparatus 100 or the like are supplied, for example, as a bit stream or the like, for example, through a transmission medium, a recording medium or the like.

The decoding section 211 decodes encoded data supplied thereto by a predetermined decoding method corresponding to the encoding method. For example, the decoding section 211 decodes syntax values of syntax elements from the bit string of encoded data (bit stream) supplied thereto in accordance with a definition of a syntax table. The syntax elements include such information as, for example, header information Hinfo, prediction mode information Pinfo, transform information Tinfo, residual information Rinfo and so forth.

The decoding section 211 refers to the residual information Rinfo to derive quantization transform coefficient levels level of each coefficient position in each transform block. The decoding section 211 supplies the prediction mode information Pinfo, quantization transform coefficient levels level and transform information. Tinfo obtained by the decoding to the associated blocks. For example, the decoding section 211 supplies the prediction mode information Pinfo to the prediction section 216, supplies the quantization transform coefficient levels level to the dequantization section 212 and supplies the transform information Tinfo to the dequantization section 212 and the inverse transform section 213.

The dequantization section 212 scales (dequantizes) the values of the quantization transform coefficient levels level supplied thereto from the decoding section 211 on the basis of the transform information Tinfo supplied thereto from the decoding section 211 to derive transform coefficients Coeff_IQ after the dequantization. This dequantization is an inverse process to the quantization performed by the quantization section 113 (FIG. 5) of the image encoding apparatus 100. It is to be noted that the dequantization section 115 (FIG. 5) performs dequantization similar to that by the dequantization section 212. The dequantization section 212 supplies the transform coefficients Coeff_IQ to the inverse transform section 213. It is to be noted that also it is possible for the dequantization section 212 to skip (omit), upon transform quantization bypass, the dequantization process and supply the transform coefficients Coeff_IQ as transform coefficients Coeff_IQ to the inverse transform section 213.

The inverse transform section 213 inversely transforms the transform coefficients Coeff_IQ supplied from the dequantization section 212 on the basis of the transform information Tinfo supplied from the decoding section 211 to derive a prediction residual D'. This inverse transform is a process inverse to the transform process performed by the transform section 112 (FIG. 5) of the image encoding apparatus 100. It is to be noted that the inverse transform section 116 performs inverse transform similar to that by the inverse transform section 213. Details of the inverse transform are hereinafter described. The inverse transform section 213 supplies the obtained prediction residual D' to the arithmetic operation section 214. It is to be noted that also it is possible for the inverse transform section 213 to skip (omit) the inverse transform process (inverse secondary transform and inverse primary transform) and supply the transform coefficients Coeff_IQ as the prediction residual D' to the arithmetic operation section 214.

The arithmetic operation section 214 adds the prediction residual D' supplied from the inverse transform section 213 and a prediction image P (prediction signal) corresponding to the prediction residual D' to derive a locally decoded image Rec as indicated by an expression (21) given below. The arithmetic operation section 214 re-constructs a decoded image for each picture unit using the resulting locally decoded image Rec and outputs the resulting locally decoded image to the outside of the image decoding apparatus 200. Further, the arithmetic operation section 214 supplies the locally decoded image Rec also to the frame memory 215.

$$Rec=D'+P \qquad (21)$$

The frame memory 215 re-constructs a decoded image for each picture unit using the locally decoded image Rec supplied from the arithmetic operation section 214 and stores the decoded image into the buffer in the frame memory 215. The frame memory 215 reads out a decoded image designated by the prediction mode information Pinfo of the prediction section 216 as a reference image from the buffer and supplies the reference image to the prediction section 216. Further, the frame memory 215 may store header information Hinfo, prediction mode information Pinfo, transform information Tinfo and so forth relating to generation of the decoded image into the buffer in the frame memory 215.

The prediction section 216 acquires a decoded image stored in the frame memory 215 and designated by prediction mode information Pinfo supplied from the decoding section 211 as a reference image and uses the reference image to generate a prediction image P by a prediction method designated by the prediction mode information Pinfo. The prediction section 216 supplies the generated prediction image P to the arithmetic operation section 214.

Such an image decoding apparatus 200 as described above includes a control section that skips, in the case where inverse primary transform that is inverse transform to primary transform that is a transform process for a prediction residual that is a difference between an image and a prediction image of the image is to be skipped, also inverse secondary transform that is inverse transform to secondary transform that is a transform process for primary transform coefficients obtained by primary transform of the prediction residual.

<Inverse Transform Section>

Figure 12:
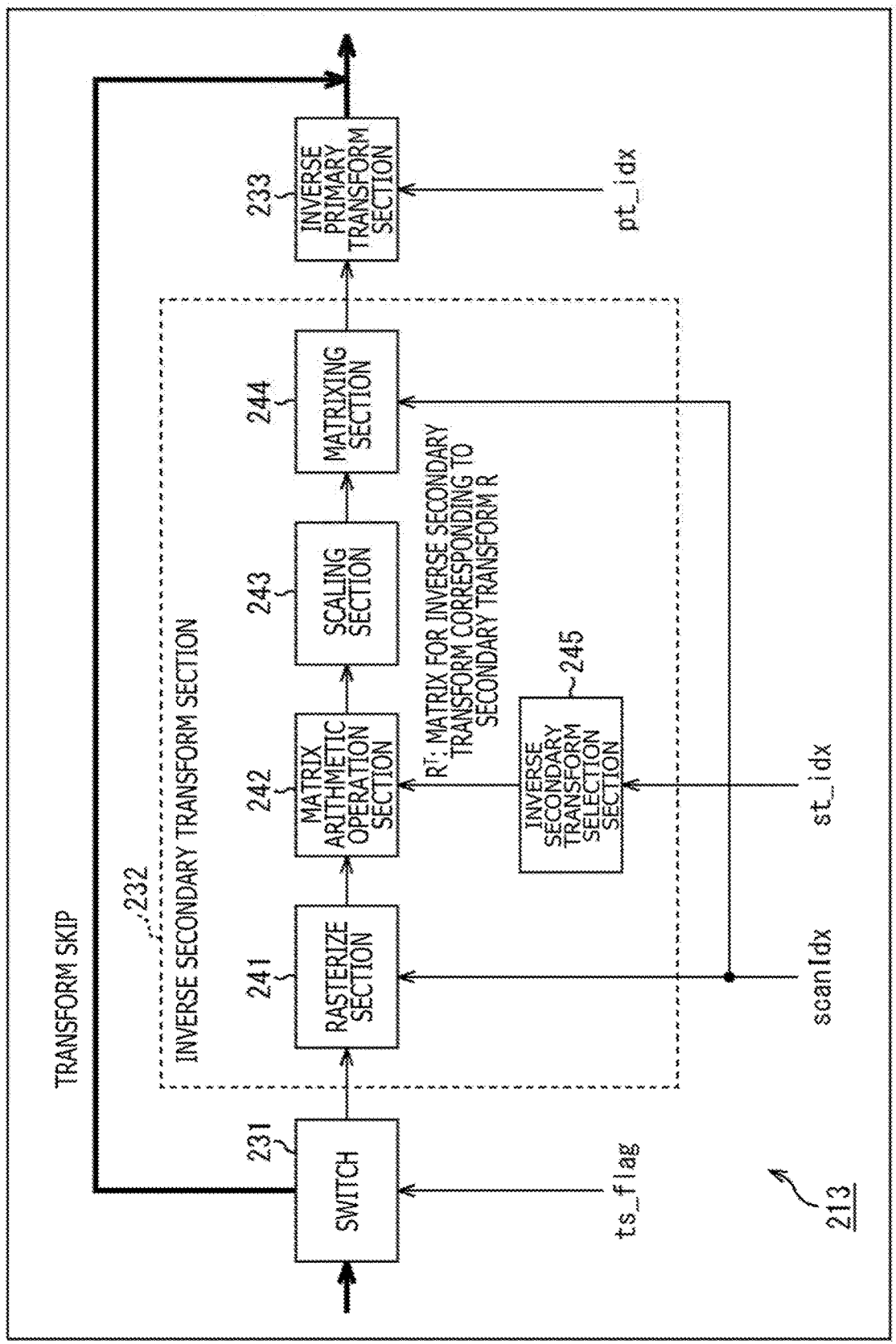
FIG. 12 is a block diagram depicting a principal configuration example of an inverse transform section.

FIG. 12 is a block diagram depicting a principal configuration example of the inverse transform section 213 of FIG. 11. As depicted in FIG. 12, the inverse transform section 213 includes a switch 231, an inverse secondary transform section 232 and an inverse primary transform section 233.

The switch 231 is an embodiment of a control section for controlling execution of inverse secondary transform and inverse primary transform. For example, the switch 231 controls such that, is the case where inverse primary transform is to be skipped, also inverse secondary transform is skipped. For example, the switch 231 performs such control in response to the value of the value of the transform skip flag ts_flag that is information relating to skip of inverse primary transform.

For example, in the case where the value of the transform skip flag ts_flag is 0, namely, in the case where the transform skip flag ts_flag indicates execution of inverse transform ((inverse primary transform), the switch 231 causes inverse secondary transform and inverse primary transform to be executed. In short, in this case, the switch 231 supplies the transform coefficients Coeff_IQ to the inverse secondary transform section 232.

In contrast, in the case where the value of the transform skip flag ts_flag is 1, namely, in the case where transform skip flag ts_flag indicates skip (omission) of inverse transform (inverse primary transform), the switch 231 causes inverse secondary transform and inverse primary transform to be skipped. In short, in this case, the switch 231 supplies the transform coefficients Coeff_IQ as the prediction residual D' to the arithmetic operation section 214.

Accordingly, the inverse transform section 213 can suppress unnecessary increase of the processing amount of inverse transform readily.

For example, to a sparse residual signal (transform coefficients Coeff_IQ) whose number of non-zero coefficients is small like the transform coefficients Coeff_IQ of a 4×4 matrix=[[255, 0, 0, 0], [0, 0, 0, 0], [0, 0, 0, 0], [0, 0, 0, 0]], it is desirable to apply transform skip (skip of inverse secondary transform and inverse primary transform) in order to suppress decrease of the energy compaction to suppress degradation of the encoding efficiency. By controlling execution of inverse transform in response to the value of the transform skip flag ts_flag as described above, the switch 231 can skip not only inverse primary transform but also inverse secondary transform more readily particularly in regard to such a sparse residual signal whose number of non-zero coefficients is small as described above, and increase of the processing amount for inverse transform can be suppressed to suppress decrease of the encoding efficiency.

It is to be noted that the switch 231 may control the supplying destination of the transform coefficients Coeff_IQ supplied from the outside in response to the value of the transform quantization bypass flag transquant_bypass_flag included in the transform information Tinfo.

For example, is the case where the value of the transform quantization bypass flag transquant_bypass_flag is 0, namely, in the case where the transform quantization bypass flag transquant_bypass_flag indicates execution of inverse transform and dequantization, the switch 231 supplies the transform coefficients Coeff_IQ to the inverse secondary transform section 232.

On the other hand, in the case where the value of the transform quantization bypass flag transquant_bypass_flag is 1, namely, in the case where the transform quantization bypass flag transquant_bypass_flag indicates skip (omission) of transform and quantization, the switch 231 causes inverse secondary transform and inverse primary transform to be skipped. In short, in this case, the switch 231 supplies the transform coefficients Coeff_IQ as the prediction residual D' to the arithmetic operation section 214.

Accordingly, the inverse transform section 213 can readily suppress unnecessary increase of the processing amount of transform similarly as in transform skip.

The inverse secondary transform section 232 converts secondary transform coefficients supplied from the switch 231, namely, secondary transform coefficients obtained by decoding and dequantizing encoded data, into a one-dimensional vector, performs matrix arithmetic operation for the one-dimensional vector, performs scaling for the one-dimensional vector for which the matrix arithmetic operation has been performed, and performs inverse secondary transform that is a transform process for matrixing the scaled one-dimensional vector. In short, the inverse secondary transform section 232 performs inverse secondary transform under the control of the switch 231.

The inverse secondary transform section 232 performs inverse secondary transform for the transform coefficients Coeff_IQ on the basis of the secondary transform identifier st_idx that is information relating to the subject of the secondary transform and the scan identifier scanIdx that is information relating to the scan method of transform coefficients to derive transform coefficients Coeff_IS after the inverse secondary transform (referred to also as primary transform coefficients). The inverse secondary transform section 232 supplies the primary transform coefficients Coeff_IS to the inverse primary transform section 233. It is to be noted that details of the inverse secondary transform section 232 are hereinafter described.

The inverse primary transform section 233 executes inverse primary transform such as, for example, inverse orthogonal transform or the like for the primary transform coefficients Coeff_IS supplied from the inverse secondary transform section 232. In short, the inverse primary transform section 233 performs inverse primary transform under the control of the switch 231.

In the case where inverse primary transform is to be performed, the inverse primary transform section 233 executes the inverse primary transform, for example, by a method according to the value of the primary transform identifier pt_idx that is information relating to the substance of the inverse primary transform. For example, the inverse primary transform section 233 selects inverse primary transform IPhor in the horizontal direction and inverse primary transform IPver in the vertical direction designated by the primary transform identifier pt_idx supplied from the decoding section 211 and performs such matrix arithmetic operation as represented, for example, by the expression (22) to derive a prediction residual D'.

$$D'=IPhor \cdot Coeff\_IS \cdot IPver^T \qquad (22)$$

Here, the operator "·" represents an operation for performing inner product (matrix product) between matrices, and the operator "T" represents an operation of a transposed matrix. Further, the inverse primary transform IPhor in the horizontal direction is inverse transform to the primary transform Phor in the horizontal direction and is represented also as $Phor^T$ (=$Phor^{-1}$). Similarly, inverse primary transform IPver in the vertical direction is inverse transform to the primary transform Pver in the vertical direction and is represented also as $Pver^T$ (=$Pver^{-1}$). It is to be noted that the expression (22) given above may be represented like the following expression (23).

$$D'=IPver \cdot Coeff\_IS \cdot IPhor^T \qquad (23)$$

The inverse primary transform section 233 supplies the resulting prediction residual D' to the arithmetic operation section 214.

Now, the inverse secondary transform section 232 is described. As depicted in FIG. 12, the inverse secondary transform section 232 includes a rasterize section 241, a matrix arithmetic operation section 242, a scaling section 243, a matrixing section 244 and an inverse secondary transform selection section 245.

The rasterize section 241 converts transform coefficients Coeff_IQ supplied from the switch 231 for each sub block (4×4 sub block) into a 1×16-dimensional vector $X_{1d}$ on the basis of a scan method for transform coefficients designated by the scan identifier scanIdx supplied from the decoding section 211. The rasterize section 241 supplies the resulting vector $X_{1d}$ to the matrix arithmetic operation section 242. It is to be noted that the scan methods corresponding to the scan identifiers scanIdx that are information relating to scan methods for transform coefficients are such as described hereinabove with reference to FIG. 7.

For example, it is assumed that each transform coefficients Coeff_IQ supplied to the inverse transform section 213 is such a 4×4 matrix as represented by the following expression (24).

[Math. 11]

$$\text{Coeff\_IQ} = \begin{bmatrix} 245 & -42 & -18 & -30 \\ -30 & -31 & 3 & -2 \\ 11 & -4 & -9 & 4 \\ 3 & -2 & 1 & 0 \end{bmatrix} \quad (24)$$

In the case where the transform skip flag ts_flag is 0 and the scan identifier scanIdx indicates horizontal scan hor, the rasterize section 241 scans the transform coefficients Coeff_IQ in accordance with a scan order of coefficients of horizontal scan depicted in B of FIG. 7 to convert the transform coefficients Coeff_IQ into such a 1×16-dimensional vector $X_{1d}$ as represented by the following expression (25). Then, the rasterize section 241 supplies the resulting vector $X_{1d}$ to the matrix arithmetic operation section 242.

[Math. 12]

$$X_{1d} = [245, -42, -18, -30, -30, -31, 3, -2, 11, -4, \\ -9, 4, 3, -2, 1, 0] \quad (25)$$

The inverse secondary transform selection section 245 reads out a matrix IR ($=R^T$) for inverse secondary transform supplied from the decoding section 211 and designated by the secondary transform identifier st_idx that is information relating to the substance of secondary transform from an internal memory (not depicted) of the inverse secondary transform selection section 245 and supplies the read out the matrix IR to the matrix arithmetic operation section 242. For example, when the secondary transform identifier st_idx has a certain value, the inverse secondary transform selection section 245 reads out the transposed matrix $R^T$ of the matrix R of 16×16 depicted in FIG. 8 as the matrix IR for inverse secondary transform and supplies the transposed matrix $R^T$ to the matrix arithmetic operation section 242.

It is to be noted that the inverse secondary transform selection section 245 may select the matrix IR ($=R^T$) for inverse secondary transform, for example, in response to secondary transform identifier st_idx or to intra prediction mode information IPinfo (for example, intra prediction mode number) supplied from the decoding section 211. Alternatively, an inverse matrix IR may be selected in response to the motion prediction information MVinfo and the secondary transform identifier st_idx in place of the intra prediction mode information IPinfo.

The matrix arithmetic operation section 242 performs, for each sub block (4×4 sub block), such matrix arithmetic operation as represented by the following expression (26) using a 1×16-dimensional vector $X_{1d}$ and a matrix IR ($=R^T$) for inverse secondary transform to derive a vector $Y_{1d}$ as a result of the matrix arithmetic operation.

$$Y_{1d}{}^T = IR \cdot X_{1d}{}^T = R^T \cdot X_{1d}{}^T \quad (26)$$

Here, the operator "T" represents an operation of a transposed matrix. For example, the matrix arithmetic operation section 242 performs such matrix product as represented by the expression (26) using the vector $X_{1d}$ represented by the expression (25) given hereinabove and a transposed matrix $R^T$ of the matrix R after the secondary transform depicted in FIG. 8 to derive such a vector $Y_{1d}$ as represented by the following expression (27). The matrix arithmetic operation section 242 supplies the resulting vector $Y_{1d}$ to the scaling section 243.

[Math. 13]

$$Y_{1d} = [65380, 78, 34, -68, -121, 43, -79, 130, -24, \\ 83, 109, 76, 23, 58, 65, 52] \quad (27)$$

The scaling section 243 performs, in order to normalize the norm of the signal $Y_{1d}$ supplied from the matrix arithmetic operation section 242 for each sub block (4×4 sub block), such bit shift arithmetic operation of N (N is a natural number) bits as represented by the following expression (28) for all elements of the signal $Y_{1d}$ to determine a signal $Z_{1d}$ after the bit shift.

$$Z_{1d} = (Y_{1d}) >> N \quad (28)$$

It is to be noted that, before shift arithmetic operation of N bits, the value of 1<<(N−1) may be added as an offset to each element of the signal $Z_{1d}$ as represented by the expression (29) given below. It is to be noted that, in the expression (29), a vector E is a 1×16-dimensional vector in which the value of all elements is 1.

$$Z1d = (Y1d + ((N-1) << 1) \cdot E) >> N \quad (29)$$

For example, since the matrix IR ($=R^T$) for inverse secondary transform depicted in FIG. 8 is an 8-bit scaled matrix, the value of N to be used in normalization of the norm by the scaling section 243 is 8.

For example, a result (signal $Z_{1d}$) when arithmetic operation is performed setting N to N=8 in the expression (29) becomes such as represented by the following expression (30).

[Math. 14]

$$Z_{1d} = [255, 0, 0, 0, 0, 0, 0, 0, 0, 0, 0, 0, 0, 0, 0, 0] \quad (30)$$

Generally, in the case where the matrix IR ($=R^T$) for inverse secondary transform is in an N-bit scaled state, the bit shift amount after norm normalization is N bits.

The matrixing section 244 accepts, for each sub block (4×4 sub block), the signal $Z_{1d}$ after the norm normalization and the scan identifier scanIdx as inputs thereto and converts the 1×16-dimensional vector $Z_{1d}$ supplied from the scaling section 243 into primary transform coefficients Coeff_IS of a 4×4 matrix on the basis of a scan method designated by the scan identifier scanIdx supplied from the decoding section 211.

For example, the matrixing section 244 matrixes the 1×16-dimensional vector $Z_{1d}$ represented by the expression (30) on the basis of horizontal scan indicated by B of FIG. 7 and obtains such primary transform coefficients Coeff_IS of a 4×4 matrix as represented by the following expression (31).

[Math. 15]

$$\text{Coeff\_IS} = \begin{bmatrix} 255 & 0 & 0 & 0 \\ 0 & 0 & 0 & 0 \\ 0 & 0 & 0 & 0 \\ 0 & 0 & 0 & 0 \end{bmatrix} \quad (31)$$

The matrixing section 244 supplies the resulting primary transform coefficients Coeff_IS to the inverse primary transform section 233.

<Flow of Image Decoding Process>

Now, a flow of processes executed by such an image decoding apparatus 200 as described above is described. First, an example of a flow of an image decoding process is described with reference to a flow chart of FIG. 13.

After the image decoding process is started, at step S201, the decoding section 211 decodes a bit stream (encoded data) supplied to the image decoding apparatus 200 to obtain information such as header information Hinfo, prediction mode information Pinto, transform information Tinfo, residual information Rinfo, quantization transform coefficient levels level and so forth.

At step S202, the dequantization section 212 dequantizes the quantization transform coefficient levels level obtained by the process at step S201 to derive transform coefficients Coeff_IQ. This dequantization is an inverse process to the quantization performed at step S105 (FIG. 9) of the image encoding process and is a process similar to the dequantization performed at step S106 (FIG. 9) of the image encoding process.

At step S203, the inverse transform section 213 inversely transforms the transform coefficients Coeff_IQ obtained by the process at step S202 to derive a prediction residual D'. This inverse transform is an inverse process to the transform process performed at step S104 (FIG. 9) of the image encoding process and is a process similar to the inverse transform performed at step S107 (FIG. 9) of the image encoding process.

At step S204, the prediction section 216 performs prediction in a prediction mode same as that upon encoding on the basis of the prediction mode information Pinfo to generate a prediction image.

At step S205, the arithmetic operation section 214 adds the prediction image obtained by the process at step S204 to the prediction residual D' obtained by the process at step S203 to obtain a decoded image.

When the process at step S205 ends, the image decoding process ends.

<Flow of Inverse Transform Process>

Figure 13:
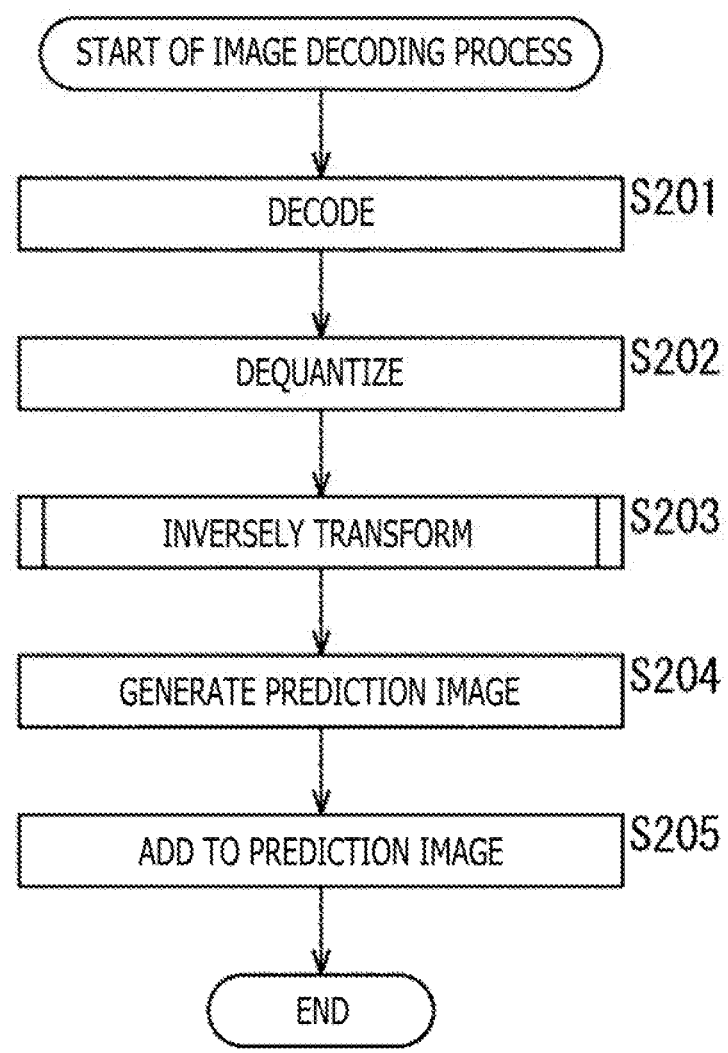
FIG. 13 is a flow chart illustrating an example of a flow of an image decoding process.
Figure 14:
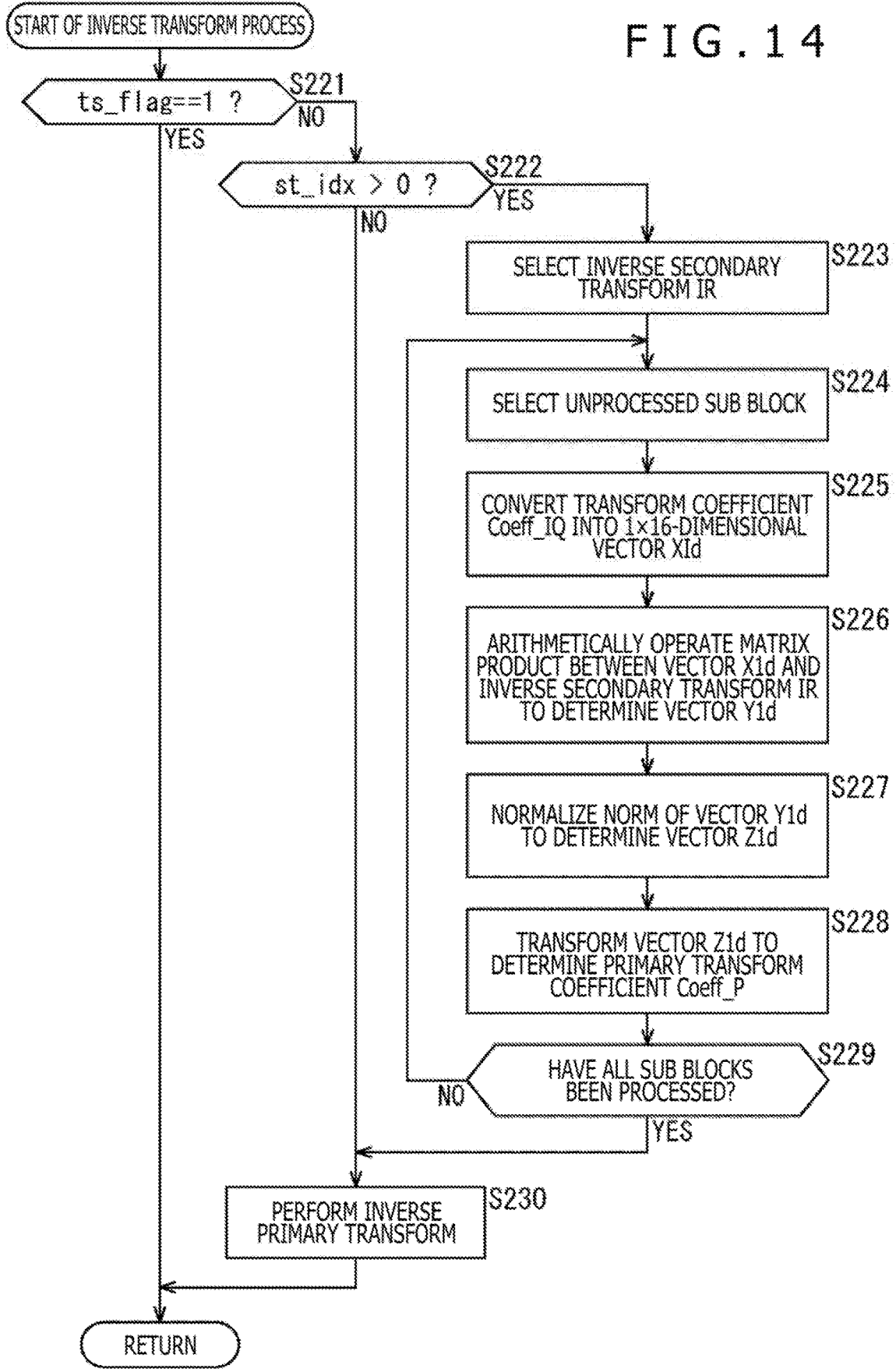
FIG. 14 is a flow chart illustrating an example of a flow of an inverse transform process.

Now, an example of a flow of the inverse transform process executed at step S203 of FIG. 13 is described with reference to a flow chart of FIG. 14.

After the inverse transform process is started, at step S221, the switch 231 decides whether or not the transform skip flag ts_flag is 1 (true). In the case where it is decided that the transform skip flag ts_flag is 1 (true) (the transform skip flag ts_flag indicates skip of an inverse transform process), inverse secondary transform and inverse primary transform (processes at steps S222 to S230) are skipped and the inverse transform process ends, and the processing returns to FIG. 13. In short, the switch 231 supplies the transform coefficients Coeff_IQ as the prediction residual D' to the arithmetic operation section 214. On the other hand, in the case where it is decided that the transform skip flag ts_flag is 0 (false) (the transform skip flag ts_flag indicates execution of an inverse transform process), the processing advances to step S222.

It is to be noted that, at step S221, the switch 231 may further decide whether or not the transform quantization bypass flag transquant_bypass_flag is 1 (true). Along with this, in the case where transform quantization bypass flag transquant_bypass_flag is 1 (true) (the transform quantization bypass flag transquant_bypass_flag indicates skip of a dequantization process and an inverse transform process), inverse secondary transform and inverse primary transform (processes at steps S222 to S230) are skipped, and the inverse transform process ends and the processing returns to FIG. 13. In short, the switch 231 supplies the transform coefficients Coeff_IQ as the prediction residual D' to the arithmetic operation section 214. On the other hand, in the case where transform quantization bypass flag transquant_bypass_flag is 0 (false) (the transform quantization bypass flag transquant_bypass_flag indicates execution of a dequantization process and an inverse transform process), the processing advances to step S222.

At step S222, the inverse secondary transform section 232 decides whether or not the secondary transform identifier st_idx applies inverse secondary transform (sd_idx>0). In the case where it is decided that the secondary transform identifier st_idx is 0 (the secondary transform identifier st_idx indicates skip of inverse secondary transform), inverse secondary transform (processes at steps S223 to S229) is skipped, and the processing advances to step S230. In short, the inverse secondary transform section 232 supplies the transform coefficients Coeff_IQ as primary transform coefficients Coeff_P to the inverse primary transform section 233.

On the other hand, in the case where it is decided at step S222 that the secondary transform identifier st_idx is greater than 0 (the secondary transform identifier st_idx indicates execution of inverse secondary transform), the processing advances to step S223. Inverse secondary transform is executed by the processes at steps S223 to S229.

At step S223, the inverse secondary transform selection section 245 selects a matrix IR for inverse secondary transform designated by the secondary transform identifier st_idx.

At step S224, the inverse secondary transform section 232 selects an unprocessed sub block included in a transform block of a processing target.

At step S225, the rasterize section 241 converts the transform coefficients Coeff_IQ into a 1×16-dimensional vector $X_{1d}$ on the basis of a scan method designated by the scan identifier scanIdx.

At step S226, the matrix arithmetic operation section 242 arithmetically operates a matrix product between the vector $X_{1d}$ and the matrix IR for inverse secondary transform to determine a vector $Y_{1d}$.

At step S227, the scaling section 243 normalizes the norm of the vector $Y_{1d}$ to determine a vector $Z_{1d}$.

At step S228, the matrixing section 244 converts the vector $Z1d$ into a matrix of 4×4 on the basis of a scan method designated by the scan identifier scanIdx to determine primary transform coefficients Coeff_P of the sub block of the processing target.

At step S229, the inverse secondary transform section 232 decides whether or not all sub blocks of the transform block of the processing target have been processed. In the case where an unprocessed sub block exists, the processing returns to step S224 and the later processes are repeated. In short, for each sub block of the transform block of the processing target, the processes at steps S224 to S229 (inverse secondary transform) are executed. In the case where it is decided at step S229 that all sub blocks have been processed (inverse secondary transform for all sub blocks has been performed), the processing advances to step S230.

At step S230, the inverse primary transform section 223 performs inverse primary transform for the primary transform coefficients Coeff_P on the basis of the primary transform identifier pt_idx to derive a prediction residual D'. The prediction residual D' is supplied to the arithmetic operation section 214.

When the process at step S230 ends, the inverse transform process ends and the processing returns to FIG. 13.

It is to be noted that, in the inverse transform process described above, change of the processing order of the steps or change of the substance of a process may be performed within a range within which it can be carried out. For example, in the case where it is decided at step S222 that the secondary transform identifier st_idx is 0, a unit matrix of 16×16 may be selected as a matrix IR for inverse secondary transform such that the processes at steps S223 to S229 are executed.

By executing the processes in such a manner as described above, the image decoding apparatus 200 can skip not only inverse primary transform but also inverse secondary transform by indicating skip of a transform process by the transform skip flag ts_flag. Accordingly, it is possible to perform, for example, for a sparse residual signal in which the number of non-zero coefficients is small and to which it is desirable to apply transform skip, an inverse transform process that achieves reduction of the processing amount of inverse transform and reduction of degradation of the energy compaction and improves the encoding efficiency.

2. Second Embodiment

<Skip of Encoding and Decoding of Transform Skip Flag>

In the technology disclosed in NPL 1 (JEM2), the secondary transform identifier st_idx is encoded in a unit of a CU, and the transform skip flag ts_flag is encoded in a unit of each transform block included in a CU.

For example, the present technology described hereinabove in connection with the first embodiment is applied to this technology (JEM2) such that, in the case where the transform skip flag ts_flag is 1 (transform skip is applied), (inverse) primary transform and (inverse) secondary transform are skipped. In this case, in the case where the secondary transform identifier st_idx indicates execution of secondary transform, the transform skip flag ts_flag cannot indicate skip of the (inverse) transform process in the CU, and the transform skip flag ts_flag is determines to 0. In short, in this case, encoding of the transform skip flag ts_flag becomes redundant. Accordingly, there is the possibility that the encoding efficiency may be degraded.

Therefore, in the case where secondary transform is performed for primary transform coefficients obtained by primary transform of a prediction residual that is a difference between an image and a prediction image of the image, encoding of first information relating to skip of the primary transform is skipped.

Since this makes it possible to skip encoding of first information in the case where secondary transform is performed, degradation of the encoding efficiency can be suppressed.

Further, in the case where inverse secondary transform that is inverse transform to secondary transform that is a transform process for primary transform coefficients obtained by primary transform of a prediction residual that is a difference between an image and a prediction image of the image is performed, decoding of encoded data of first information relating to skip of inverse primary transform that is inverse transform to primary transform is skipped.

Since this makes it possible to skip decoding of encoded data of first information in the case where inverse secondary transform is performed. Degradation of the encoding efficiency can be suppressed.

<Syntax>

An example of a syntax table in which pseudo codes representing such control as described above are described is depicted in FIG. 15. As indicated at the fourth stage from above in FIG. 15, for encoding of the transform skip flag ts_flag (namely, decoding of encoded data of the transform skip flag ts_flag), it is one of conditions that the secondary transform identifier st_idx is 0. In particular, in the case where the secondary transform identifier st_idx is not 0, namely, in the case where (inverse) secondary transform is executed, encoding of the transform skip flag ts_flag (decoding of encoded data of the transform skip flag ts_flag) is skipped.

<Encoding Section>

Also in this case, the image encoding apparatus 100 has a configuration basically similar to that in the case of the first embodiment. However, in the case where secondary transform is to be performed for primary transform coefficients obtained by primary transform of a prediction residual that is a difference between an image and a prediction image of the image, the image encoding apparatus 100 includes an encoding section for skipping encoding of first information relating to skip of primary transform. In short, the encoding section 114 in this case skips, in the case where secondary transform is to be performed for primary transform coefficients obtained by primary transform of a prediction residual that is a difference between an image and a prediction image of the image, encoding of first information relating to skip of primary transform.

Figure 16:
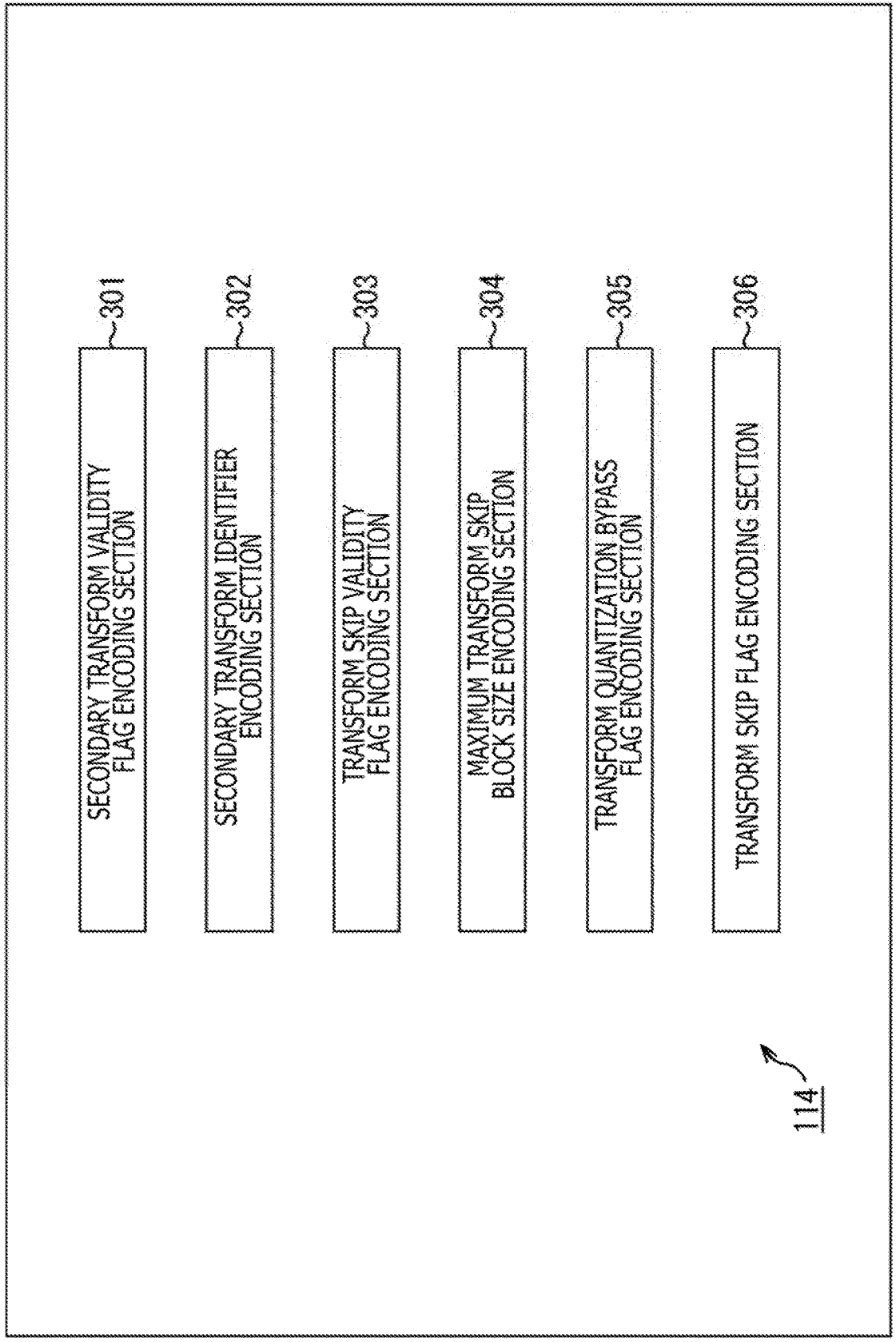
FIG. 16 is a block diagram depicting a principal configuration example of an encoding section.

FIG. 16 is a functional block diagram depicting an example of principal functions relating to encoding of a transform skip flag ts_flag, which is executed by executing a program or the like by the encoding section 114 in this case. As depicted in FIG. 16, by executing a program, the encoding section 114 can include, as functions relating to encoding of the transform skip flag ts_flag, for example, functions of a secondary transform validity flag encoding section 301, a secondary transform identifier encoding section 302, a transform skip validity flag encoding section 303, a maximum transform skip block size encoding section 304, a transform quantization bypass flag encoding section 305 and a transform skip flag encoding section 306.

The secondary transform validity flag encoding section 301 performs a process relating to encoding of the secondary transform validity flag st_enabled_flag that is information relating to permission of secondary transform. The secondary transform identifier encoding section 302 performs a process relating to encoding of the secondary transform identifier st_idx that is information relating to the substance of secondary transform. The transform skip validity flag encoding section 303 performs a process relating to encoding of the transform skip validity flag ts_enabled_flag that is information relating to permission of skip of transform (primary transform). The maximum transform skip block size encoding section 304 performs a process relating to encoding of the maximum transform skip block size MaxTSSize indicative of a maximum size of a transform block with which skip of transform (primary transform) is permitted. The transform quantization bypass flag encoding section 305 performs a process relating to encoding of the transform quantization bypass flag transquant_bypass_flag that is information relating to skip (bypass) of transform (primary transform and secondary transform) and quantization. The transform skip flag encoding section 306 performs a process relating to encoding of the transform skip flag ts_flag that is information relating to skip of transform (primary transform).

<Flow of Encoding Process>

Figure 17:
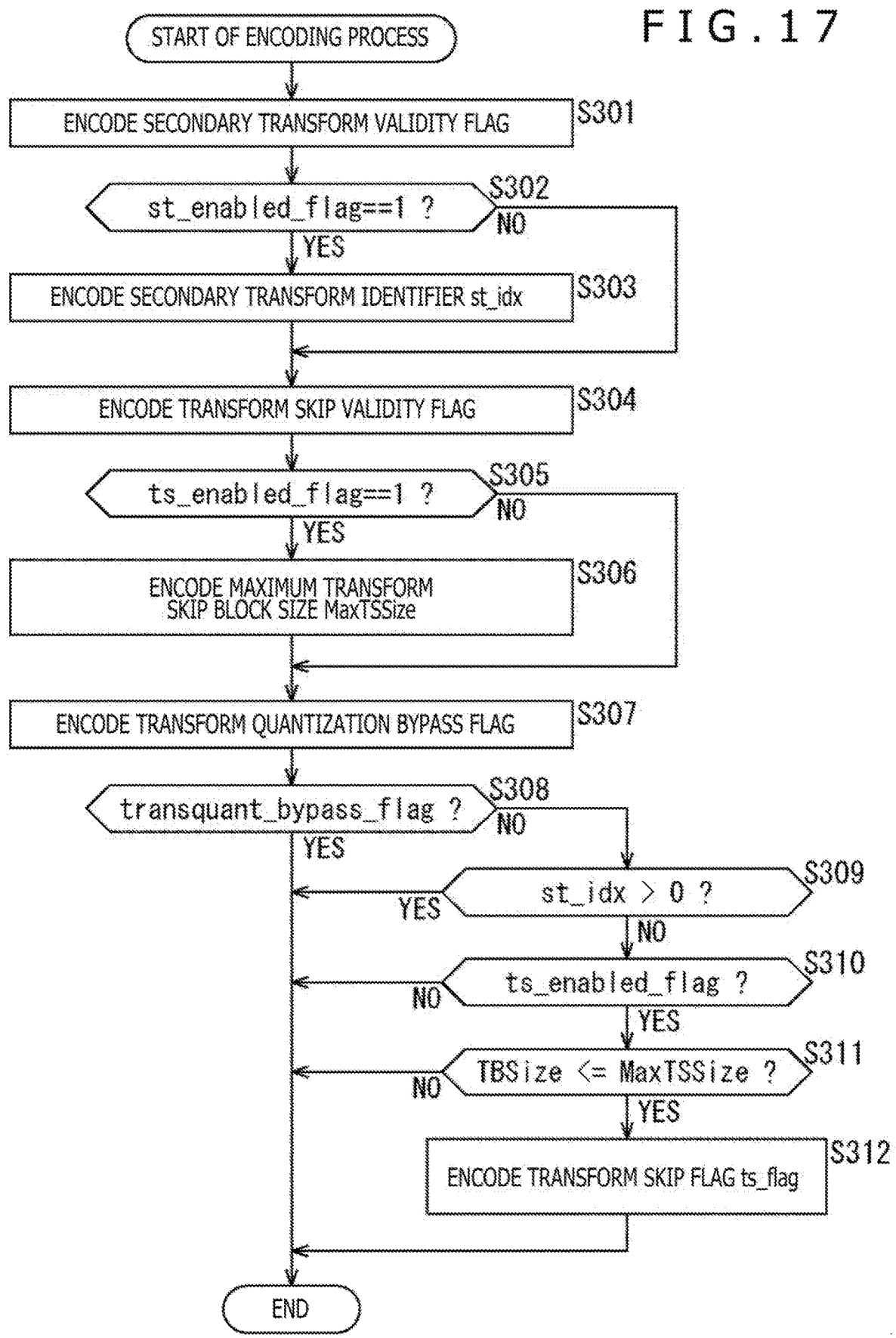
FIG. 17 is a flow chart illustrating an example of a flow of an encoding process.

Now, as example of a flow of processes executed by the image encoding apparatus 100 is described. The image encoding apparatus 100 performs as image encoding process basically similarly to that in the case of the first embodiment. However, in this case, the image encoding apparatus 100 performs encoding of the transform skip flag ts_flag and so forth in response to the value of the secondary transform identifier st_idx and so forth at step S110 (FIG. 9) of the image encoding process. An example of a flow of the encoding of the transform skip flag ts_flag and so forth is described with reference to a flow chart of FIG. 17. In short, the encoding process depicted in FIG. 17 is executed as part of the encoding process performed at step S110 of FIG. 9. Encoding of other encoding parameters and the quantization transform coefficient levels level is performed by arbitrary methods.

After the encoding process is started, at step S301, the secondary transform validity flag encoding section 301 encodes the secondary transform validity flag st_enabled_flag included in the header information Hinfo to generate a bit string (encoded data) and outputs the encoded data. The encoded data of the secondary transform validity flag st_enabled_flag obtained by this encoding is included into a bit stream that includes encoded data of the quantization transform coefficient levels level.

At step S302, the secondary transform identifier encoding section 302 decides whether or not the secondary transform validity flag st_enabled_flag included in the header information Hinfo is 1 (true). In the case where it is decided that the secondary transform validity flag st_enabled_flag is 1, namely, in the case where it is decided that execution of secondary transform is permitted, the processing advances to step S303.

At step S303, the secondary transform identifier encoding section 302 encodes the secondary transform identifier st_idx to generate a bit string (encoded data) and outputs the encoded data. The encoded data of the secondary transform identifier st_idx obtained by this encoding is included into a bit stream that includes encoded data of the quantization transform coefficient levels level. After the processing at step S303 ends, the processing advances to step S304.

On the other hand, in the case where it is decided at step S302 that the secondary transform validity flag st_enabled_flag 0 (false), namely, in the case where execution of secondary transform is not permitted, the process at step S303 is skipped, and the processing advances to step S304.

If secondary transform is not performed, then the secondary transform identifier st_idx is unnecessary. Accordingly, in this case, the secondary transform identifier encoding section 302 skips encoding of the secondary transform identifier st_idx. Since this makes it possible to skip encoding of redundant information, it is possible to suppress increase of the load of an encoding process and suppress degradation of the encoding efficiency.

At step S304, the transform skip validity flag encoding section 303 encodes the transform skip validity flag ts_enabled_flag included in the header information Hinfo to generate a bit string (encoded data) and outputs the encoded data. The encoded data of the transform skip validity flag ts_enabled_flag obtained by the encoding is included into a bit stream that includes encoded data of the quantization transform coefficient levels level.

At step S305, the maximum transform skip block size encoding section 304 decides whether or not the transform skip validity flag ts_enabled_flag included in the header information Hinfo is 1 (true). In the case where it is decided that the transform skip validity flag ts_enabled_flag is 1, namely, in the case where it is decided that transform skip (skip of primary transform and secondary transform) is permitted, the processing advances to step S306.

At step S306, the maximum transform skip block size encoding section 304 encodes the maximum transform skip block size MaxTSSize (or the logarithm value log2MaxTSSize with base 2) to generate a bit string (encoded data) and outputs the encoded data. The encoded data of the maximum transform skip block size MaxTSSize obtained by the encoding is included into a bit stream including the encoded data of the quantization transform coefficient levels level. When the process at step S306 ends, the processing advances to step S307.

On the other hand, in the case where it is decided at step S305 that the transform skip validity flag ts_enabled_flag is 0, namely, in the case where transform skip is not permitted, the process at step S306 is skipped and the processing advances to step S307.

If transform skip cannot be performed, then the maximum transform skip block size MaxTSSize (or log2TSSize) is unnecessary. Accordingly, in this case, the maximum transform skip block size encoding section 304 skips encoding of the maximum transform skip block size MaxTSSize (or log2MaxTSSize). Since this makes it possible to skip encoding of redundant information, it is possible to suppress increase of the load of the encoding process and suppress degradation of the encoding efficiency.

At step S307, the transform quantization bypass flag encoding section 305 encodes the transform quantization bypass flag transquant_bypass_flag to generate a bit string (encoded data) and outputs the encoded data. The encoded data of the transform quantization bypass flag transquant_bypass_flag obtained this encoding is included into a bit stream that includes encoded data of the quantization transform coefficient levels level.

At step S308, the transform skip flag encoding section 306 decides whether or not the transform quantization bypass flag transquant_bypass_flag included in the transform information Tinfo is 1 (true). In the case where it is decided that the transform quantization bypass flag transquant_bypass_flag is 1, namely, in the case where transform (primary transform and secondary transform) and quantization are to be skipped (bypassed), processes at steps S309 to S312 are skipped and the encoding process ends, and the processing returns to FIG. 9.

If transform and quantization are bypassed, then the transform skip flag ts_flag is unnecessary. Accordingly, in this case, the transform skip flag encoding section 306 skips encoding of the transform skip flag ts_flag. Since this makes it possible to skip encoding of redundant information, it as possible to suppress increase of the load of an encoding process and suppress degradation of the encoding efficiency.

In the case where it is decided at step S308 that the transform quantization bypass flag transquant_bypass_flag is 0, namely, in the case where it is decided that transform and quantization are not to be skipped (bypassed), the processing advances to step S309.

At step S309, the transform skip flag encoding section 306 decides whether or not the value of the secondary transform identifier st_idx is greater than 0 (st_idx>0). In the case where the value of the secondary transform identifier st_idx is greater than 0, namely, in the case where it is decided that secondary transform is to be executed, processes at steps S310 to S312 are skipped and the encoding process ends, and the processing returns to FIG. 9.

If secondary transform is executed, then since transform skip is not performed, the value of the transform skip flag ts_flag is fixed to 0. Accordingly, in this case, since there is no necessity to transmit the transform skip flag ts_flag to the decoding side, the transform skip flag encoding section 306 skips encoding of the transform skip flag ts_flag. Since this makes it possible to skip encoding of redundant information, it is possible to suppress increase of the load of an encoding process and suppress degradation of the encoding efficiency.

In the case where it is decided at step S309 that the value of the secondary transform identifier st_idx is 0, namely, that secondary transform is to be skipped, the processing advances to step S310.

At step S310, the transform skip flag encoding section 306 decides whether or not the transform skip validity flag ts_enabled_flag included in the header information Hinfo is 1 (true). In the case where it is decided that the transform skip validity flag ts_enabled_flag as 0, namely, that transform skip as not permitted, processes at steps S311 and S312 are skipped and the encoding process ends, and the processing returns to FIG. 9.

If transform skip cannot be performed, then the transform skip flag ts_flag is fixed to 0. Accordingly, in this case, since there is no necessity to transmit the transform skip flag ts_flag to the decoding side, the transform skip flag encoding section 306 skips encoding of the transform skip flag ts_flag. Since this makes it possible to skip encoding of redundant information, it is possible to suppress increase of the load of an encoding process and suppress degradation of the encoding efficiency.

In the case where it is decided at step S310 that the transform skip validity flag ts_enabled_flag is 1, namely, that transform skip is permitted, the processing advances to step S311.

At step S311, the transform skip flag encoding section 306 decides whether or not the size TBSize of a transform block of a processing target is greater than the maximum transform skip block size MaxTSSize (whether or not the conditional expression TBSize<=MaxTSSize is true). In the case where it is decided that the size TBSize of a transform block of a processing target is equal to or smaller than the maximum transform skip block size MaxTSSize, namely, in the case where the conditional expression given above is 0 (false), the process at step S312 is skipped and the encoding process ends, and the processing returns to FIG. 9.

In the case where the size of the transform block is greater than the maximum transform skip block size, since transform skip is not permitted, the value of the transform skip flag ts_flag is fixed to 0. Accordingly, in this case, since there is no necessity to transmit the transform skip flag ts_flag to the decoding side, the transform skip flag encoding section 306 skips encoding of the transform skip flag ts_flag. Since this makes it possible to skip encoding of redundant information, it is possible to suppress increase of the load of an encoding process and suppress degradation of the encoding efficiency.

In the case where it is decided at step S311 that the size TBSize of the transform block of the processing target is equal to or smaller the maximum transform skip block size MaxTSSize, namely, in the case where it is decided that the conditional expression given above is 1 (true), the processing advances to step S312.

It is to be noted that, at step S311, the conditional expression (TBSize<=MaxTSSize) given hereinabove may be replaced by another conditional expression (log2TrafroSize<=log2MaxTSSize) using a logarithm value log2TrafoSize (or log2TBSize) with base 2 of the TB size or a logarithm value log2MaxTSSize with base 2 of the maximum transform skip block size MaxTSSize.

At step S312, the transform skip flag encoding section 306 encodes the transform skip flag ts_flag to generate a bit stream (encoded data) and outputs the encoded data. The encoded data of the transform skip flag ts_flag obtained by this encoding is included into a bit stream that includes encoded data of the quantization transform coefficient levels level.

In other words, only in the case where a conditional expression (32) given below is 1 (true), the transform skip flag ts_flag is encoded. This corresponds to the fourth stage from above of the syntax described with reference to FIG. 15.

$$\text{Logical value}=(ts\_enable\_flag \;\&\&\; !transquant\_bypass\_flag \;\&\&\; (log2TrafoSize<=log2MaxTSSize) \;\&\&\; st\_idx==0) \quad (32)$$

When the process at step S312, the encoding process ends, and the processing returns to FIG. 9.

By executing the encoding process in such a manner as described above, the image encoding apparatus 100 can skip encoding of the transform skip flag ts_flag in the case where the secondary transform identifier st_idx applies secondary transform (st_idx>0) in the case where the secondary transform identifier st_idx is to be encoded in a unit of a CU. In other words, reduction of the code amount relating to the transform skip flag ts_flag and decrease of the process amount according to encoding can be achieved.

It is to be noted that the encoding process described above may be subject to change of the processing order of the steps or change of the substance of the processes within a range within which it can be carried out. Further, the syntax and the conditional expression (32) given hereinabove can be changed in terms of arithmetic operation thereof within a range within which it can be carried out.

<Decoding Section>

Now, an image decoding apparatus 200 is described. Also in this case, the image decoding apparatus 200 has a configuration basically similar to that in the first embodiment. However, the image decoding apparatus 200 in this case includes a decoding section that skips, is the case where inverse secondary transform that is inverse transform to secondary transform that is a transform process for primary transform coefficients obtained by primary transform of a prediction residual that is a difference between an image and a prediction image of the image, decoding of encoded data of first information relating to skip of inverse primary transform that is inverse transform to the primary transform. In short, in the case where inverse secondary transform that is inverse transform to secondary transform that is a transform process for primary transform coefficients obtained by primary transform of a prediction residual that is a difference between an image and a prediction image of the image, a decoding section 211 skips decoding of encoded data of first information relating to skip of inverse primary transform that is inverse transform to the primary transform.

Figure 18:
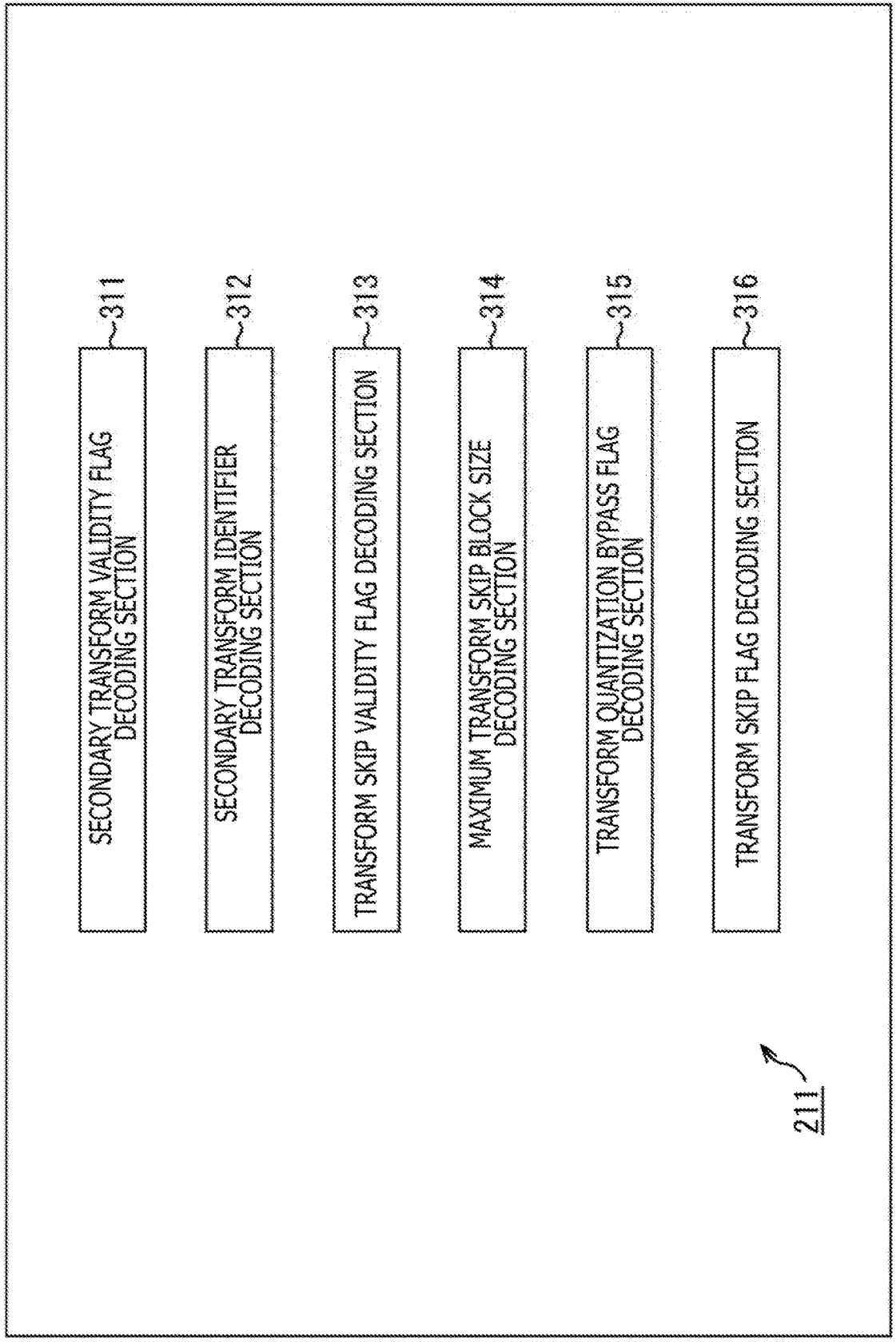
FIG. 18 is a block diagram depicting a principal configuration example of a decoding section.

FIG. 18 is a functional block diagram depicting an example of principle functions relating to decoding of the transform skip flag ts_flag, which is implemented by execution of a program and so forth by the decoding section 211 in this case. As depicted in FIG. 18, the decoding section 211 includes, as functions relating to decoding of the transform skip flag ts_flag by executing a program, for example, functions of a secondary transform validity flag decoding section 311, a secondary transform identifier decoding section 312, a transform skip validity flag decoding section 313, a maximum transform skip block size decoding section 314, a transform quantization bypass flag decoding section 315 and a transform skip flag decoding section 316.

The secondary transform validity flag decoding section 311 performs a process relating to decoding of encoded data of the secondary transform validity flag st_enabled_flag that is information relating to permission of inverse secondary transform. The secondary transform identifier decoding section 312 performs a process relating to decoding of encoded data of the secondary transform identifier st_idx that is information relating to the substance of inverse secondary transform. The transform skip validity flag decoding section 313 performs a process relating to decoding of encoded data of the transform skip validity flag ts_enabled_flag that is information relating to permission of skip of inverse transform (inverse primary transform). The maximum transform skip block size decoding section 314 performs a process relating to decoding of encoded data of the maximum transform skip block size MaxTSSize indicative of a maximum size of a transform block for which skip of inverse transform (inverse primary transform) is permitted. The transform quantization bypass flag decoding section 315 performs a process relating to decoding of encoded data of the transform quantization bypass flag transquant_bypass_flag that is information relating to skip (bypass) of inverse transform (inverse secondary transform and inverse primary transform) and dequantization. The transform skip flag decoding section 316 performs a process relating to decoding of encoded data of the transform skip flag ts_flag that is information relating to skip of inverse transform (inverse primary transform).

<Flow of Decoding Process>

Figure 19:
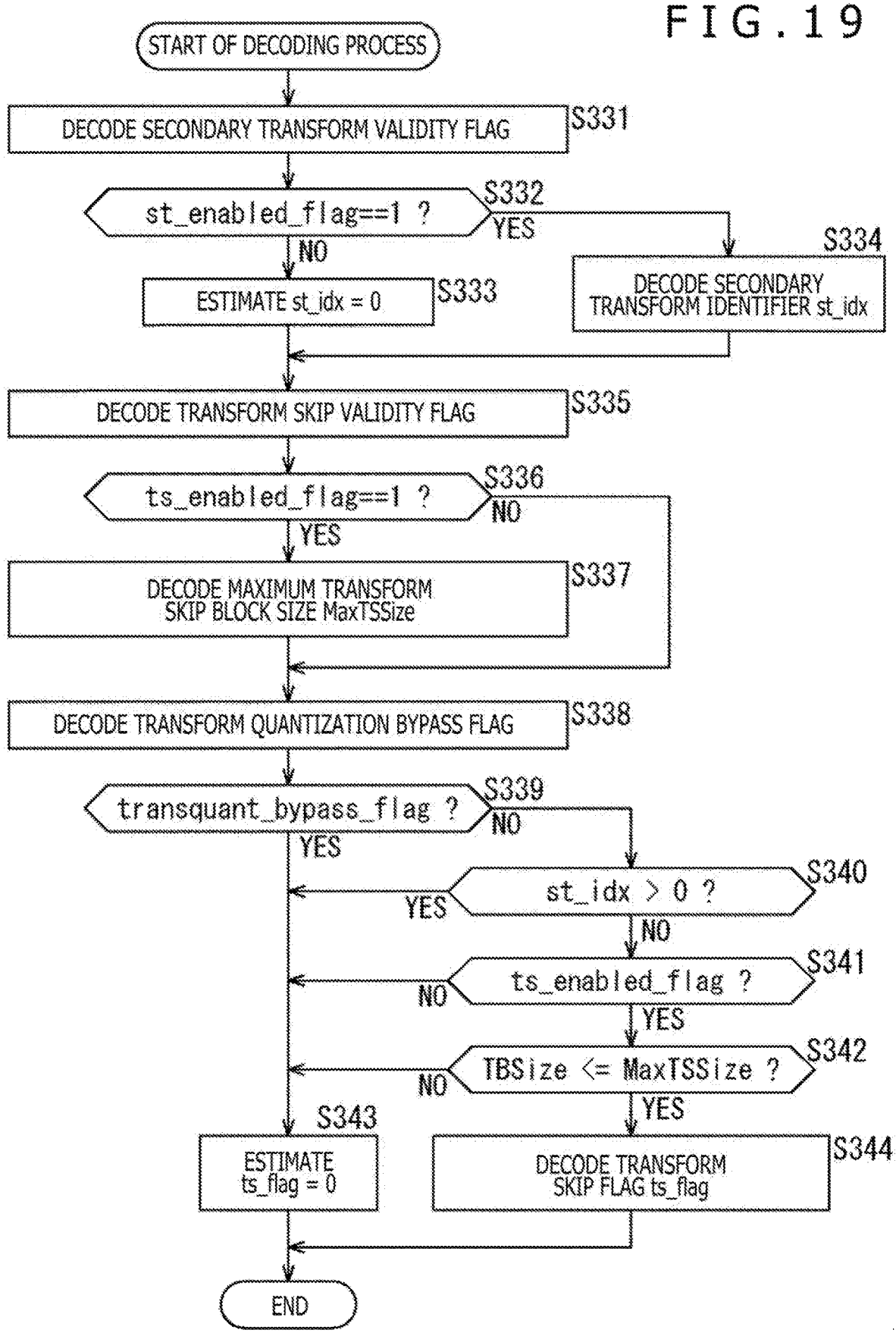
FIG. 19 is a flow chart illustrating an example of a flow of a decoding process.

Now, an example of a flow of processes executed by the image decoding apparatus 200 is described. In this case, the image decoding apparatus 200 performs an image decoding process basically similarly to that in the case of the first embodiment. However, in this case, at step S201 (FIG. 13) of the image decoding apparatus 200, decoding of encoded data of the transform skip flag ts_flag and so forth in response to the value of the secondary transform identifier st_idx and so forth is performed. An example of a flow of the decoding of encoded data of the transform skip flag ts_flag and so forth is described with reference to a flow chart of FIG. 19. In short, the decoding process depicted for FIG. 19 is executed as part of the decoding process performed at step S201 of FIG. 13. Decoding of other encoding parameters and encoded data of quantization transform coefficient levels level is performed by an arbitrary method.

After the decoding process is started, at step S331, the secondary transform validity flag decoding section 311 decodes the encoded data of the secondary transform validity flag st_enabled_flag included in a bit stream (encoded data) and outputs resulting data as part of the header information Hinfo.

At step S332, the secondary transform identifier decoding section 312 decides whether or not the decoded secondary transform validity flag st_enabled_flag is 1 (true). In the case where it is decided that the secondary transform validity flag st_enabled_flag is 0, namely, in the case where it is decided that execution of inverse secondary transform is not permitted, the processing advances to step S333.

In this case, since inverse secondary transform is skipped, the secondary transform identifier st_idx is not in an encoded state. Accordingly, at step S333, the secondary transform identifier decoding section 312 skips decoding of the encoded data of the secondary transform identifier st_idx. Further, in this case, since inverse secondary transform is skipped, the value of the secondary transform identifier st_idx is fixed to 0. Accordingly, the secondary transform identifier decoding section 312 estimates that the value of the secondary transform identifier st_idx is 0. In short, the secondary transform identifier decoding section 312 sets the value of the secondary transform identifier st_idx to 0 (st_idx=0). When the process at step S333 ends, the processing advances to step S335.

On the other hand, in the case where it is decided at step S332 that the secondary transform validity flag st_enabled_flag is 1, the processing advances to step S334. In this case, since execution of inverse secondary transform is permitted, at step S334, the secondary transform identifier decoding section 312 decodes the encoded data of the secondary transform identifier st_idx included in the bit stream (encoded data). After the process at step S334 ends, the processing advances to step S335.

It is to be noted that the processes relating to decoding of the secondary transform identifier st_idx described above may be subject to change of the processing order of the steps or change of the substance of the processes within a range within which it can be carried out.

At step S335, the transform skip validity flag decoding section 313 decodes the encoded data of the transform skip validity flag ts_enabled_flag included in the bit stream (encoded data) and outputs the decoded encoded data as part of the header information Hinfo.

At step S336, the maximum transform skip block size decoding section 314 decides whether or not the decoded transform skip validity flag ts_enabled_flag is 1 (true). In the case where it is decided that the transform skip validity flag ts_enabled_flag is 1, namely, in the case where it is decided that skip of inverse transform (inverse secondary transform and inverse primary transform) is permitted, the processing advances to step S337.

At step S337, the maximum transform skip block size decoding section 314 decodes encoded data of a maximum transform skip block size MaxTSSize (or a logarithm value log2MaxTSSize with base 2) included in the bit stream (encoded data.). After the process at step S337 ends, the processing advances to step S338.

On the other hand, in the case where it is decided at step S336 that the transform skip validity flag ts_enabled_flag is 0, namely, in the case where it is decided that skip of inverse transform is not permitted, since skip of inverse transform is not performed, the maximum transform skip block size MaxTSSize is unnecessary. Accordingly, in this case, the process at step S337 is skipped and the processing advances to step S338.

At step S338, the transform quantization bypass flag decoding section 315 decodes the encoded data of the transform quantization bypass flag transquant_bypass_flag included in the bit stream (encoded data) and outputs the encoded data as part of the transform information Tinfo.

At step S339, the transform skip flag decoding section 316 decides whether or not the transform quantization bypass flag transquant_bypass_flag is 1 (true). In the case where it is decided that the transform quantization bypass flag transquant_bypass_flag is 1, namely, in the case where it is decided that inverse transform (inverse secondary transform and inverse primary transform) and dequantization are to be skipped (bypassed), the processes at steps S340 and S342 are skipped, and the processing advances to step S343.

If inverse transform and quantization are to be bypassed, then the transform skip flag ts_flag is unnecessary. Accordingly, in this case, the transform skip flag decoding section 316 skips decoding of the encoded data of the transform skip flag ts_flag. Since this makes it possible to skip decoding of redundant information, it is possible to suppress increase of the load of a decoding process and suppress degradation of the encoding efficiency.

On the other hand, in the case where it is decided at step S339 that the transform quantization bypass flag transquant_bypass_flag is 0, namely, in the case where inverse transform and quantization are not to be skipped (bypassed), the processing advances to step S340.

At step S340, the transform skip flag decoding section 316 decides whether or not the value of the secondary transform identifier st_idx is greater than 0 (st_idx>0). In the case where it is decided that the value of the secondary transform identifier st_idx is greater than 0, namely, in the case where it is decided that inverse secondary transform is to be executed, the processes at steps S541 and S342 are skipped and the processing advances to step S343.

If secondary transform is to be executed, then since transform skip (skip of inverse transform) is not performed, the value of the transform skip flag ts_flag is fixed to 0. Accordingly, in this case, since the transform skip flag ts_flag is not transmitted from the encoding side, the transform skip flag decoding section 316 skips decoding of encoded data of the transform skip flag ts_flag. Since this makes it possible to skip decoding or redundant information, it is possible to suppress increase of the load of a decoding process and suppress degradation of the encoding efficiency.

In the case where it is decided at step S340 that the value of the secondary transform identifier st_idx is 0, namely, that inverse secondary transform is to be skipped, the processing advances to step S341.

At step S341, the transform skip flag decoding section 316 decides whether or not the transform skip validity flag ts_enabled_flag included in the header information Hinfo is 1 (true). In the case where it is decided that the transform skip validity flag ts_enabled_flag is 0, namely, in the case where it is decided that transform skip is not permitted, the processing at step S342 is skipped and the processing advances to step S343.

If transform skip (skip of inverse transform) cannot be performed, then the value of the transform skip flag ts_flag is fixed to 0. Accordingly, in this case, since the transform skip flag ts_flag is not transmitted from the encoding side, the transform skip flag decoding section 316 skips decoding of the encoded data of the transform skip flag ts_flag. Since this makes it possible to skip encoding of redundant information, it is possible to suppress increase of the load of an encoding process and suppress degradation of the encoding efficiency.

In the case where it is decided at step S341 that the transform skip validity flag is ts_enabled_flag is 1, namely, in the case where it is decided that transform skip (skip of inverse transform) is permitted, the processing advances to step S342.

At step S342, the transform skip flag decoding section 316 decides whether or not the transform skip block size TBSize of the transform block of the processing target is equal to or smaller than the maximum transform skip block size MaxTSSize (whether or not the conditional expression TBSize<=MaxTSSize is true). In the case where it is decided that the size TBSize of the transform block of the processing target is greater than the maximum transform skip block size MaxTSSize, namely, in the case where it is decided that the conditional expression given hereinabove is 0 (false), the processing advances to step S343.

In the case where the size of the transform block is greater than the maximum transform skip block size, since transform skip is not permitted, the transform skip flag ts_flag is fixed to 0. Accordingly, in this case, since the transform skip flag ts_flag is not transmitted from the encoding side, the transform skip flag decoding section 316 skips decoding of encoded data of the transform skip flag ts_flag. Since this makes it possible to skip encoding of redundant information, it is possible to suppress increase of the load of an encoding process and suppress degradation of the encoding efficiency.

It is to be noted that, at step S342, the conditional expression given above (TBSize<=MaxTSSize) may be replaced by another conditional expression (log2TrafoSize<=log2MaxTSSize) using a logarithm value log2TrafoSize (or log2TBSize) with base 2 of the TB size or a logarithm value log2MaxTSSize with base 2 of the maximum transform skip block size MaxTSSize.

At step S343, the transform skip flag decoding section 316 skips decoding of the encoded data of the transform skip flag ts_flag. Further, in this case, since transform skip (skip of inverse transform) is not performed, namely, since inverse transform is executed, the value of the transform skip flag ts_flag is fixed to 0. Accordingly, the transform skip flag decoding section 316 estimates that the value of the transform skip flag ts_flag is 0. In short, the transform skip flag decoding section 316 sets the value of the transform skip flag ts_flag to 0 (ts_flag=0). When the process at step S343 ends, the decoding process ends, and the processing returns to FIG. 13.

On the other hand, in the case where it is decided at step S342 that the size TBSize of the transform block of the processing target is equal to or smaller than the maximum transform skip block size MaxTSSize, namely, in the case where the conditional expression given above is 1 (true), the processing advances to step S344.

At step S344, the transform skip flag decoding section 316 decodes the encoded data of the transform skip flag ts_flag.

In short, only in the case where the conditional expression (32) given hereinabove is 1 (true), the encoded data of the transform skip flag ts_flag is decoded. This corresponds to the fourth stage from above of the syntax described hereinabove with reference to FIG. 15.

When the process at step S344 ends, the decoding process ends and the processing advances to FIG. 13.

By executing the decoding process in such a manner as described above, the image decoding apparatus 200 can skip decoding of encoded data of the transform skip flag ts_flag in the case where the secondary transform identifier st_idx indicates execution of inverse secondary transform (st_idx>0) in the case where the secondary transform identifier st_idx is encoded in a unit of a CU. In other words, reduction of the code amount relating to the transform skip flag ts_flag and decrease of the process amount according to decoding can be achieved.

It is to be noted that the decoding process described above may be subject to change of the processing order of the steps or change of the substance of the processes within a range within which it can be carried out. Further, the syntax and the conditional expression (32) given hereinabove can be changed in terms of arithmetic operation thereof within a range within which it can be carried out.

3. Third Embodiment

<Skip of Encoding and Decoding of Secondary Transform Flag>

NPL 2 states that a secondary transform identifier st_idx that is decoded in a unit of a UC by the technology (JEM2) described in NPL 1 is derived in a unit of a transform block on the basis of a secondary transform flag st_flag decoded is a unit of a transform block and indicative of whether or not secondary transform is to be applied and intra-prediction mode information IPinfo decoded in a unit of a PU.

For example, the present technology described in the description of the first embodiment is applied to the technology described in NPL 2 such that, in the case where the transform skip flag ts_flag is 1 (transform skip is applied), (inverse) primary transform and (inverse) secondary transform are skipped. In this case, in the case where the transform skip flag ts_flag decoded in a unit of a transform block indicates execution of skip of an (inverse) transform process (ts_flag=1), (inverse) secondary transform is skipped, and therefore, encoding of the secondary transform flag st_flag that is information relating to execution of the secondary transform becomes redundant. Accordingly, there is the possibility that the encoding efficiency may degrade.

Therefore, in the case where primary transform that is a transform process for a prediction residual that is a difference between an image and a prediction image of the image is skipped, encoding of first information relating to skip of secondary transform that is a transform process for primary transform coefficients obtained by the primary transform of the prediction residual is skipped.

Since this makes it possible to skip encoding of first information in the case where primary transform is skipped, degradation of the encoding efficiency can be suppressed.

Further, in the case where inverse primary transform that is inverse transform to primary transform that is a transform process for a prediction residual that is a difference between an image and a prediction image to the image is skipped, decoding of encoded data of first information relating to skip of inverse secondary transform that is inverse transform to secondary transform that is a transform process for primary transform coefficients obtained by the primary transform of the prediction residual is skipped.

Since this makes t possible to skip decoding of encoded data of first information in the case where inverse primary transform is skipped, degradation of the encoding efficiency can be suppressed.

<Syntax>

An example of a syntax table in which pseudo codes representative of such control are described is depicted in FIG. 20. As depicted at the seventh stage from above of FIG. 20, one of conditions for encoding of the secondary transform flag st_flag (namely, decoding of encoded data of the secondary transform flag st_flag) is that the transform skip flag ts_flag is 0. In particular, in the case where the transform skip flag ts_flag is 1, namely, in the case where (inverse) primary transform is to be skipped, encoding of the secondary transform flag st_flag (decoding of encoded data of the secondary transform flag st_flag) is skipped.

Further, also that the transform quantization bypass flag transquant_bypass_flag is 0 is one of conditions for encoding of the secondary transform flag st_flag (namely, for decoding of encoded data of the secondary transform flag st_flag). In short, in the case where the transform quantization bypass flag transquant_bypass_flag is 1, namely, (inverse) transform and (de)quantization are skipped, encoding of the secondary transform flag st_flag (decoding of encoded data of the secondary transform flag st_flag) is skipped.

<Encoding Section>

Also is this case, the image encoding apparatus 100 has a configuration basically similar to that in the first embodiment. In particular, the image encoding apparatus 100 described hereinabove in connection with the first embodiment includes an encoding section that skips, in the case where primary transform that is a transform process for a prediction residual that is a difference between an image and a prediction image of the image is skipped, encoding of first information relating to skip of secondary transform that is a transform process for primary transform coefficients obtained by the primary transform of the prediction residual. In particular, in the case where primary transform that is a transform process for a prediction residual that is a difference between an image and a prediction image of the image is skipped, the encoding section 114 skips encoding of first information relating to skip of secondary transform that is a transform process for primary transform coefficients obtained by the primary transform of the prediction residual.

Figure 21:
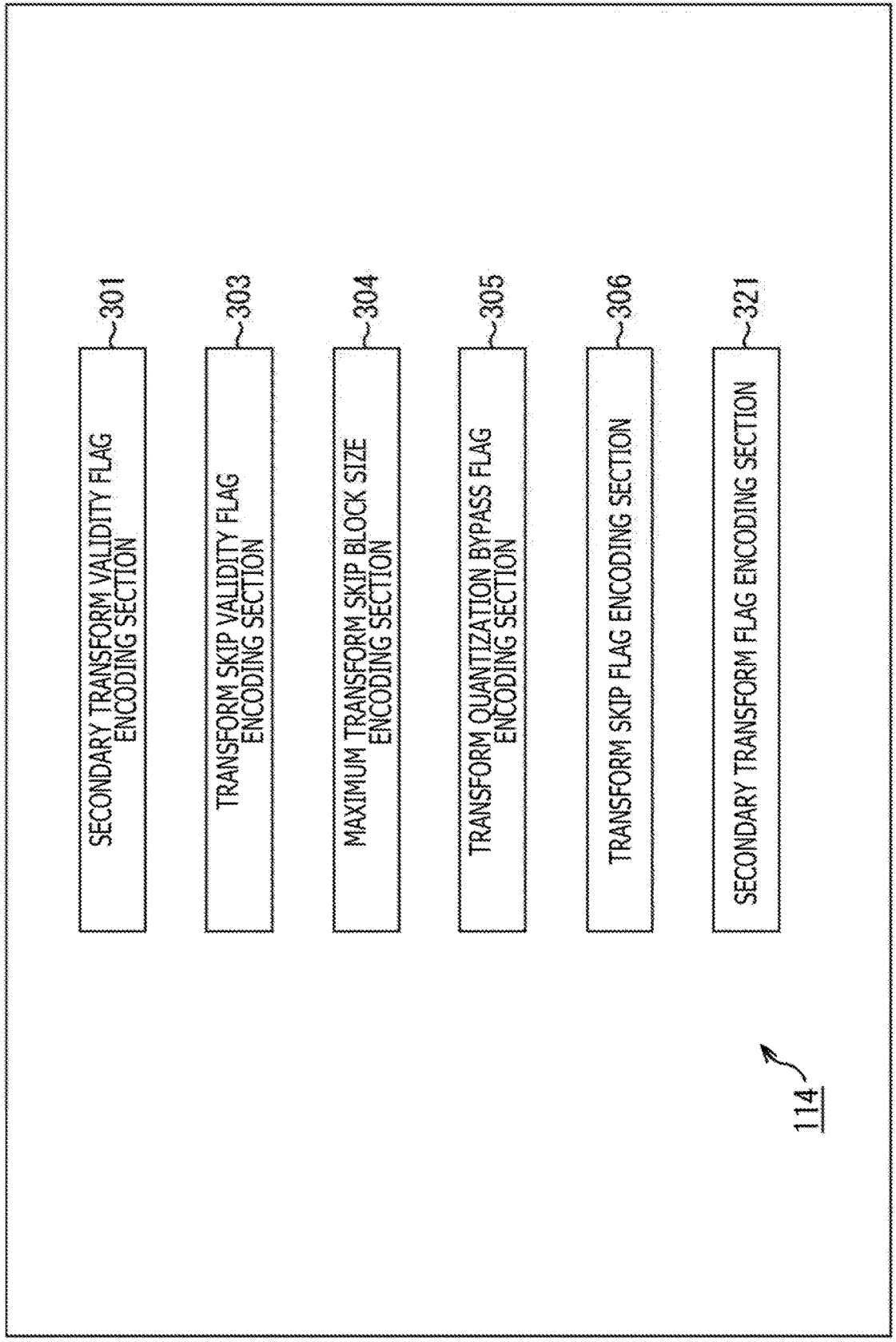
FIG. 21 is a block diagram depicting a principal configuration example of an encoding section.

FIG. 21 is a functional block diagram depicting an example of principal functions relating to encoding of the secondary transform flag st_flag, which is implemented by the encoding section 114 in this case executing a program and so forth. As depicted in FIG. 21, the encoding section 114 in this case can include, as functions relating to encoding of the secondary transform flag st_flag by executing a program, a secondary transform validity flag encoding section 301, a transform skip validity flag encoding section 303, a maximum transform skip block size encoding section 304, a transform quantization bypass flag encoding section 305 and a transform skip flag encoding section 306 similar to those, for example, of the encoding section 114 described in connection with the second embodiment. Further, the encoding section 114 can include, as a function relating to encoding of the secondary transform flag st_flag by executing a program, for example, a function of a secondary transform flag encoding section 321.

The secondary transform flag encoding section 321 performs a process relating to encoding of the secondary transform flag st_flag that is information relating to execution of secondary transform. For example, in the case where the secondary transform flag st_flag is 1 (true), secondary transform is executed. On the other hand, for example, in the case where the secondary transform flag st_flag is 0 (false), secondary transform is skipped.

<Flow of Encoding Process>

Figure 22:
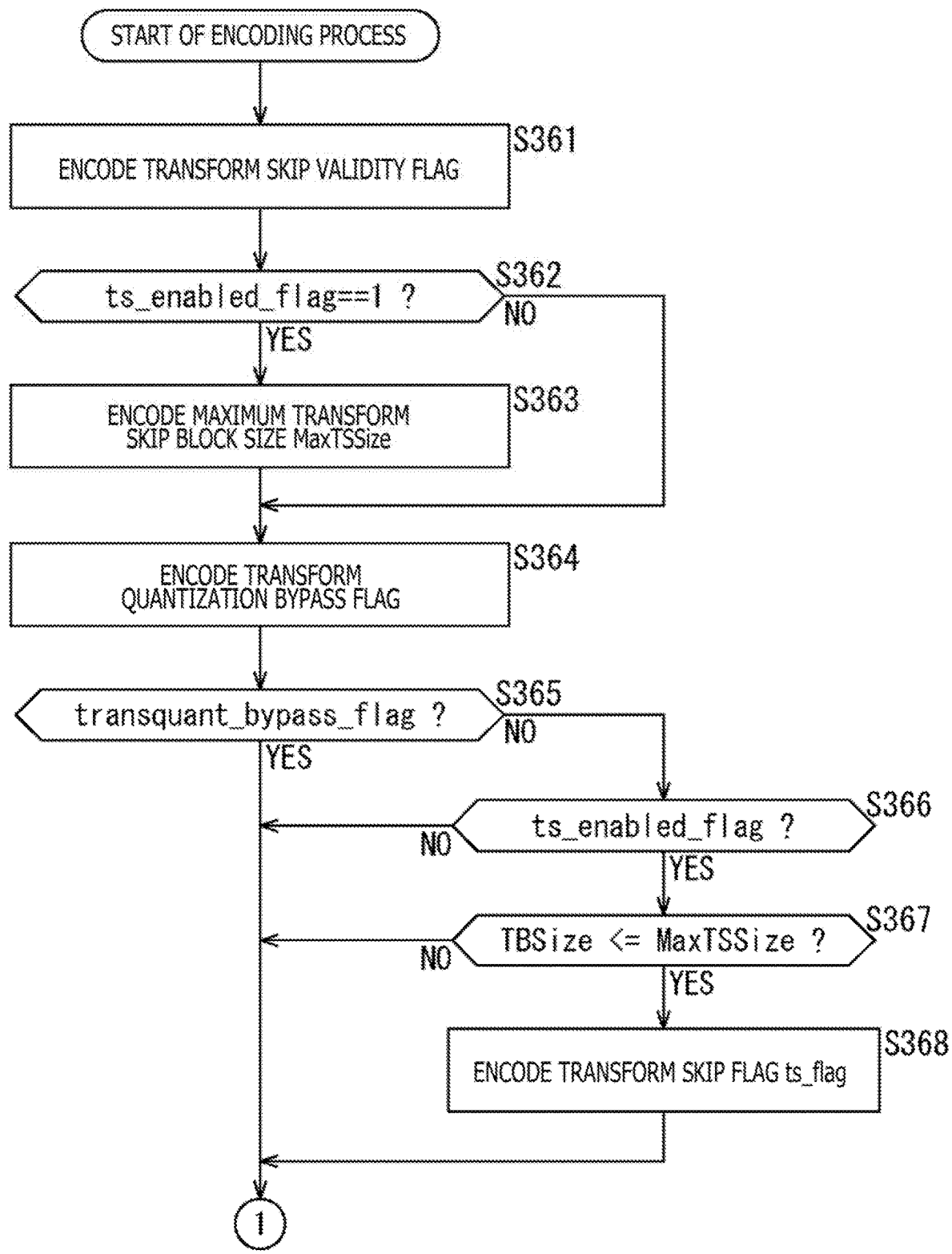
FIG. 22 is a flow chart illustrating an example of a flow of an encoding process.
Figure 23:
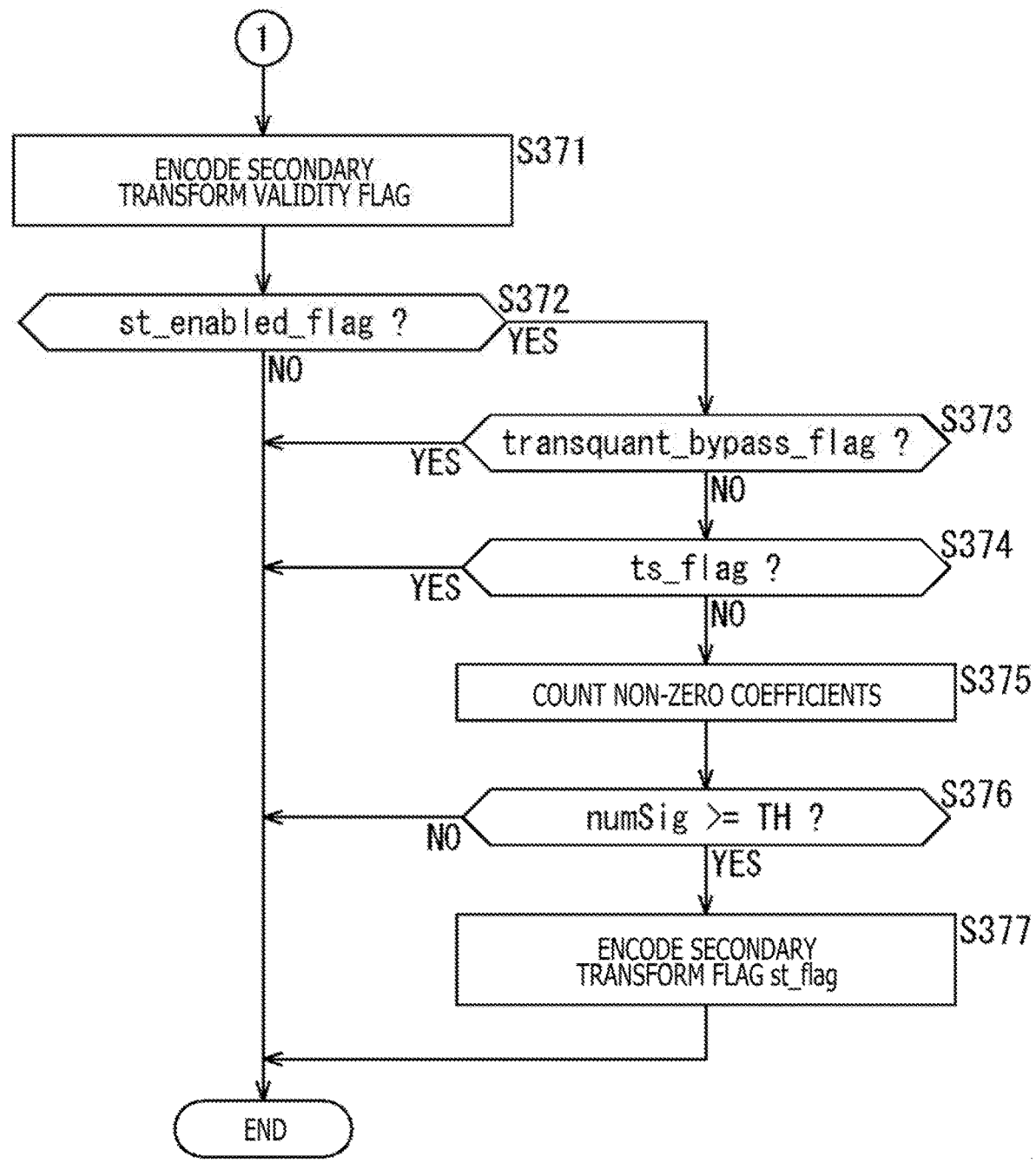
FIG. 23 is a flow chart continuing from FIG. 22 and illustrating an example of a flow of an encoding process.

Now, an example of a flow of processes executed by the image encoding apparatus 100 is described. The image encoding apparatus 100 performs an image encoding process basically similarly to that in the case of the first embodiment. However, in this case, the image encoding apparatus 100 performs encoding of the secondary transform flag st_flag and so forth in response to the value of the transform skip flag ts_flag and so forth at step S110 (FIG. 9) of the image encoding process. An example of a flow of the encoding of the secondary transform flag st_flag and so forth is described with reference to flow charts of FIGS. 22 and 23. In short, the encoding process depicted in FIGS. 22 and 23 is executed as part of the encoding process performed at step S110 of FIG. 9. Encoding of the other encoding parameters and quantization transform coefficient levels level is performed by an arbitrary method.

After the encoding process is started, processes at steps S361 to S368 of FIG. 22 are executed similarly to the processes (FIG. 17) at steps S304 to S308 and steps S310 to S312.

It is to be noted that, is the case where it is decided at step S365 that the transform quantization by flag transquant_bypass_flag that is information relating to skip (bypass) of transform (primary transform and secondary transform) and quantization is 1, namely, in the case where it is decided that transform (primary transform and secondary transform) and dequantization are to be skipped (bypassed), the processing advances to step S371 of FIG. 23. On the other hand, in the case where it is decided at step S365 that the transform quantization bypass flag transquant_bypass_flag is 0, namely, in the case where it is decided that transform and quantization are not to be skipped (bypassed), the processing advances to step S366.

Further, in the case where it is decided at step S366 that the transform skip validity flag ts_enabled_flag that is information relating to permission of skip of transform (primary transform) is 0, namely, in the case where it is decided that transform skip is not permitted, the processing advances to step S371 of FIG. 23. On the other hand, in the case where it is decided at step S366 that the transform skip validity flag ts_enabled_flag is 1, namely, in the case where it is decided that transform skip is permitted, the processing advances to step S367.

Further, in the case where it is decided at step S367 that the size TBSize of the transform block of the processing target is greater than the maximum transform skip block size MaxTSSize that is a maximum size of a transform block with which skip of transform (primary transform) is permitted, the processing advances to step S371 of FIG. 23. On the other hand, in the case where it is decided at step S367 that the size TBSize of the transform block of the processing target is equal to or smaller than the maximum transform skip block size MaxTSSize, the processing advances to step S368.

At step S368, a transform skip flag ts_flag that is information relating to skip of transform (primary transform) is generated, and after this process ends, the processing advances to step S371 of FIG. 23.

At step S371 of FIG. 23, the secondary transform validity flag encoding section 301 encodes the secondary transform validity flag st_enabled_flag that is included in the header information Hinfo and is information relating to permission of secondary transform to generate a bit string (encoded data) and outputs the encoded data. The encoded data of the secondary transform validity flag st_enabled_flag obtained by this encoding is included into a bit stream that includes encoded data of quantization transform coefficient levels level.

At step S372, the secondary transform flag encoding section 321 decides whether or not the secondary transform validity flag st_enabled_flag included in the header information Hinfo is 1 (true). In the case where it is decided that the secondary transform validity flag st_enabled_flag is 0, namely, in the case where it is decided that execution of secondary transform is not permitted, processes at steps S373 to step S377 are skipped and the encoding process ends, and the processing returns to FIG. 9.

If secondary transform is not performed, then the secondary transform flag ts_flag is fixed to 0. Accordingly, in this case, since there is no necessity to transmit the secondary transform flag ts_flag to the decoding side, the secondary transform flag encoding section 321 skips encoding of the secondary transform flag st_flag. Since this makes it possible to skip encoding of redundant information, it is possible to suppress increase of the load of an encoding process and suppress degradation of the encoding efficiency.

In the case where it is decided at step S372 that the secondary transform validity flag st_enabled_flag is 1, namely, in the case where it is decided that execution of secondary transform is permitted, the processing advances to step S373.

At step S373, the secondary transform flag encoding section 321 decides whether or not the transform quantization bypass flag transquant_bypass_flag is 1 (true). In the case where it is decided that the transform quantization bypass flag transquant_bypass_flag is 1, namely, in the case where it is decided that transform (primary transform and secondary transform) and quantization are to be skipped (bypassed), processes at steps S374 to S377 are skipped and the encoding process ends, and the processing returns to FIG. 9.

If transform and quantization are bypassed, then the secondary transform flag st_flag is unnecessary. Accordingly, in this case, the transform skip flag encoding section 306 skips encoding of the secondary transform flag st_flag. Since this makes it possible to skip encoding of redundant information, it is possible to suppress increase of the load of an encoding process and suppress degradation of the encoding efficiency.

In the case where it is decided at step S373 that the transform quantization bypass flag transquant_bypass_flag is 0, namely, in the case where it is decided that transform and quantization are not to be skipped (bypassed), the processing advances to step S374.

At step S374, the secondary transform flag encoding section 321 decides whether or not the transform skip flag ts_flag is 1 (true). In the case where it is decided that the transform skip flag ts_flag is 1, namely, in the case where it is decided that transform (primary transform) is to be skipped, processes at steps S375 to S377 are skipped and the encoding process ends, and the processing returns to FIG. 9.

In the case where primary transform is skipped, also secondary transform is skipped. Accordingly, the value of the secondary transform flag st_flag is fixed to 0. Accordingly, in this case, since there is no necessity to transmit the secondary transform flag st_flag to the decoding side, the secondary transform flag encoding section 321 skips encoding of the secondary transform flag st_flag. Since this makes it possible to skip encoding of redundant information, it is possible to suppress increase of the load of an encoding process and suppress degradation of the encoding efficiency.

In the case where it is decided at step S374 that the transform skip flag ts_flag is 0, namely, in the case where it is decided that transform (primary transform) is to be executed, the processing advances to step S375.

At step S375, the secondary transform flag encoding section 321 refers to the residual information Rinfo to count non-zero coefficients existing in the transform block and the total number numSig (total number of sig_coeff_flag==1) of the non-zero coefficients.

At step S376, the secondary transform flag encoding section 321 decides whether or not the total number numSig of non-zero coefficients is equal to or greater than a predetermined threshold value TH (numSig>=TH). In the case where it is decided that the total number numSig of non-zero coefficients is smaller than the predetermined threshold value TH (numSig<TH), a process at steps S377 is skipped and the encoding process ends, and the processing returns to FIG. 9.

In the case where it is decided that the total number numSig of non-zero coefficients is smaller than the threshold value TH, namely, in the case of a sparse residual signal in which the number of non-zero coefficients is small, since there is the possibility that the energy compaction may be degraded by secondary transform and the encoding efficiency may degrade, in order to suppress degradation of the encoding efficiency, it is desirable to skip secondary transform. Accordingly, the value of the secondary transform flag st_flag is fixed to 0. Accordingly, in this case, since there is no necessity to transmit the secondary transform flag st_flag to the decoding side, the secondary transform flag encoding section 321 skips encoding of the secondary transform flag st_flag. Since this makes it possible to skip encoding of redundant information, it is possible to suppress increase of the load of an encoding process and suppress degradation of the encoding efficiency.

In the case where it is decided at step S376 that the total number numSig of non-zero coefficients is equal to or greater than the predetermined threshold value TH, the processing advances to step S377.

At step S377, the secondary transform flag encoding section 321 encodes the secondary transform flag st_flag to generate a bit string (encoded data) and outputs the encoded data. The encoded data of the secondary transform flag st_flag obtained by this encoding is included into a bit stream that includes encoded data of quantization transform coefficient levels level.

In short, only in the case where the following conditional expression (33) is 1 (true), the secondary transform flag st_flag is encoded. This corresponds to the seventh stage from above of the syntax described hereinabove with reference to FIG. 20.

$$\text{Logical value} = (st\_\text{enabled\_flag} \&\& \\ (\text{transquant\_bypass\_flag}==0 || ts\_\text{flag}==0) \&\& \\ \text{numSig} >= TH) \quad (33)$$

When the process at step S377 ends, the encoding process ends and the processing returns to FIG. 9.

By executing the encoding process in such a manner as described above, the image encoding apparatus 100 can skip encoding of the secondary transform flag st_flag in the case where transform skip is applied (ts_flag=1) in the case where the secondary transform flag st_flag is encoded in a unit of a transform block. Further, in the case where bypass of transform and quantization are applied (transquant_bypass_flag=1), the image encoding apparatus 100 can skip encoding of the secondary transform flag st_flag. In particular, reduction of the code amount relating to the secondary transform flag st_flag and decrease of the process amount according to encoding can be achieved.

It is to be noted that the encoding process described above may be subject to change of the processing order of the steps or change of the substance of the processes within a range within which it can be carried out. Further, the syntax and the conditional expression (33) given hereinabove can be changed in terms of arithmetic operation thereof within a range within which it can be carried out.

While the example described above is directed to the description of an encoding process of the secondary transform flag st_flag in a unit of a transform block, the secondary transform identifier st_idx may be encoded for place of the secondary transform flag st_flag. In this case, the secondary transform flag st_flag depicted at the eighth stage from above of the syntax table depicted in FIG. 20 is replaced by the secondary transform identifier st_idx. Similarly, in FIG. 21, the secondary transform flag encoding section 321 is replaced by the secondary transform identifier encoding section 302 having a function relating to encoding of the secondary transform identifier st_idx depicted in FIG. 16. Similarly, the steps of the flow chart of FIG. 23 are interpreted replacing the term of secondary transform flag st_flag into the secondary transform identifier st_idx.

By executing an encoding process in such a manner as described above, in the case where a transform step is applied (ts_flag=1) in the case where the secondary transform identifier st_idx is encoded in a unit of a transform block, the image encoding apparatus 100 can skip encoding of the secondary transform identifier st_idx. Further, in the case where bypass of transform and quantization is applied (transquant_bypass_flag=1), the image encoding apparatus 100 can skip encoding of the secondary transform identifier st_dix. In other words, reduction of the code amount relating to the secondary transform identifier st_idx and decrease of the process amount according to encoding can be achieved.

Further, there is no restriction to the conditional expression (33) given hereinabove, and the conditional expression (33) may be changed to a conditional expression (34) given below such that the secondary transform flag st_flag (or the secondary transform identifier st_idx) is encoded only in the case of a luminance. In particular, in the case where an identifier cIdx indicative of a color space indicates a value some (=0) of the luminance, the secondary transform flag st_flag (or the secondary transform identifier st_idx) is encoded, but in the case where cIdx indicates a value Cb (=1) or Cr (=2) of a color difference, encoding of the secondary transform flag st_flag (or the secondary transform identifier st_idx) is omitted.

$$\text{Logical value} = (\text{cIdx}==\text{Luma} \&\& st\_\text{enabled\_flag} \\ \&\& (\text{transquant\_bypass\_flag}==0 || ts\_\text{flag}==0) \\ \&\& \text{numSig} >= TH) \quad (34)$$

Further, there is no restriction to the conditional expression (33) given hereinabove, and the conditional expression (33) may be changed to a conditional expression (35) given below such that the secondary transform flag st_flag (or the secondary transform identifier st_idx) is encoded only in the case of intra prediction. In particular, in the case where CuPredMode[x0][y0] indicative of a prediction mode of a CU indicates intra prediction (=MODE_INTRA), the secondary transform flag st_flag (or the secondary transform identifier st_idx) is encoded, and in the case of inter prediction, encoding is omitted.

$$\text{Logical value} = (\text{CuPredMode}[x0][y0]==\text{MODE\_IN-} \\ \text{TRA} \&\& st\_\text{enabled\_flag} \&\& \\ (\text{transquant\_bypass\_flag}==0 || ts\_\text{flag}==0) \&\& \\ \text{numSig} >= TH) \quad (35)$$

It is to be noted that the conditional expressions (33) to (35) may be combined with each other.

<Decoding Section>

Now, an image decoding apparatus 200 is described. Also in this case, the image decoding apparatus 200 has a configuration basically similar to that in the first embodiment. However, the image decoding apparatus 200 in this case includes a decoding section that skips, in the case where inverse primary transform that is inverse transform to primary transform that is a transform process for a prediction residual that is a difference between an image and a prediction image to the image is to be skipped, decoding of encoded data of first information relating to skip of inverse secondary transform that is inverse transform to secondary transform that is a transform process for primary transform coefficients obtained by primary transform of the prediction residual. In short, the decoding section 211 in this case skips, in the case where inverse primary transform that is inverse transform to primary transform that is a transform process for a prediction residual that is a difference between an image and a prediction image to the image is to be skipped, decoding of encoded data of first information relating to skip of inverse secondary transform that is inverse transform to secondary transform that is a transform process for primary transform coefficients obtained by primary transform of the prediction residual.

Figure 24:
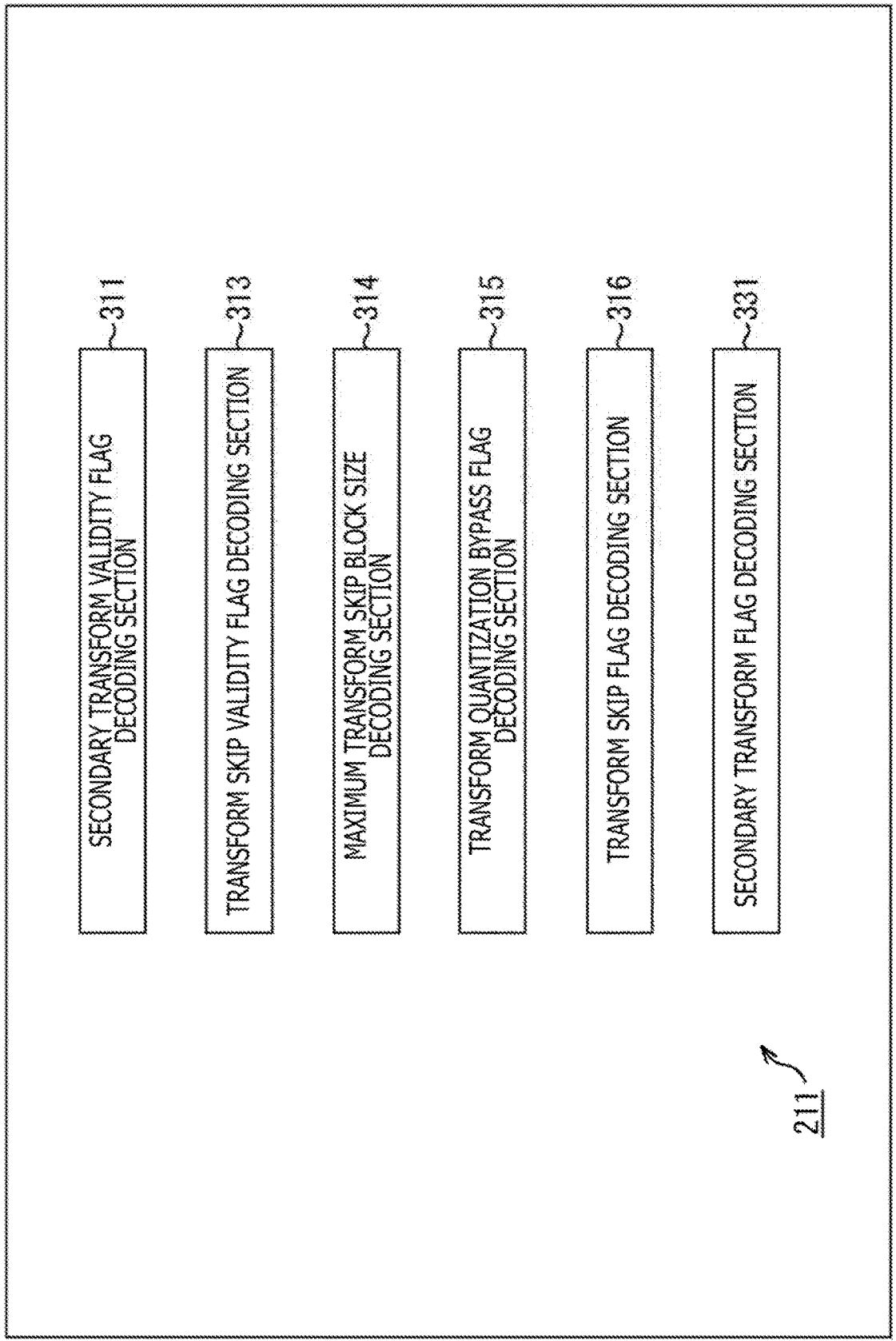
FIG. 24 is a block diagram depicting a principal configuration example of a decoding section.

FIG. 24 is a functional block diagram depicting an example of principal functions relating to decoding of the secondary transform flag st_flag, which is implemented by the decoding section 211 in this case executing a program and so forth. As depicted in FIG. 24, the decoding section 211 in this case includes, as functions relating to decoding of the secondary transform flag st_flag by executing a program, a secondary transform validity flag decoding section 311, a transform skip validity flag decoding section 313, a maximum transform skip block size decoding section 314, a transform quantization bypass flag decoding section 315 and a transform skip flag decoding section 316 similar, for example, to the decoding section 211 described hereinabove in connection with the second embodiment. The decoding section 211 further includes, as a function relating to decoding of the secondary transform flag st_flag by executing a program, for example, a function of a secondary transform flag decoding section 331.

The secondary transform flag decoding section 331 performs a process relating to decoding of encoded data of the secondary transform flag st_flag that is information relating to execution of inverse secondary transform. For example, in the case where the secondary transform flag st_flag is 1 (true), inverse secondary transform is executed. On the other hand, for example, in the case where the secondary transform flag st_flag is 0 (false), inverse secondary transform is skipped.

<Flow of Signal Processing>

Now, an example of a flow of processes executed by the image decoding apparatus 200 is described. The image decoding apparatus 200 in this case performs an image decoding process basically similar to that in the first embodiment. However, in this case, the image decoding apparatus 200 performs decoding of encoded data of secondary transform flag st_flag and so forth in response to the value of the transform skip flag ts_flag and so forth at step S201 (FIG. 13) of the image decoding process. An example of a flow of the decoding of encoded data of the secondary transform flag st_flag and so forth is described with reference to flow charts of FIGS. 25 and 26. In short, the encoding process indicated in FIGS. 25 and 26 is executed as part of the decoding process performed at step S201 of FIG. 13.

Figure 25:
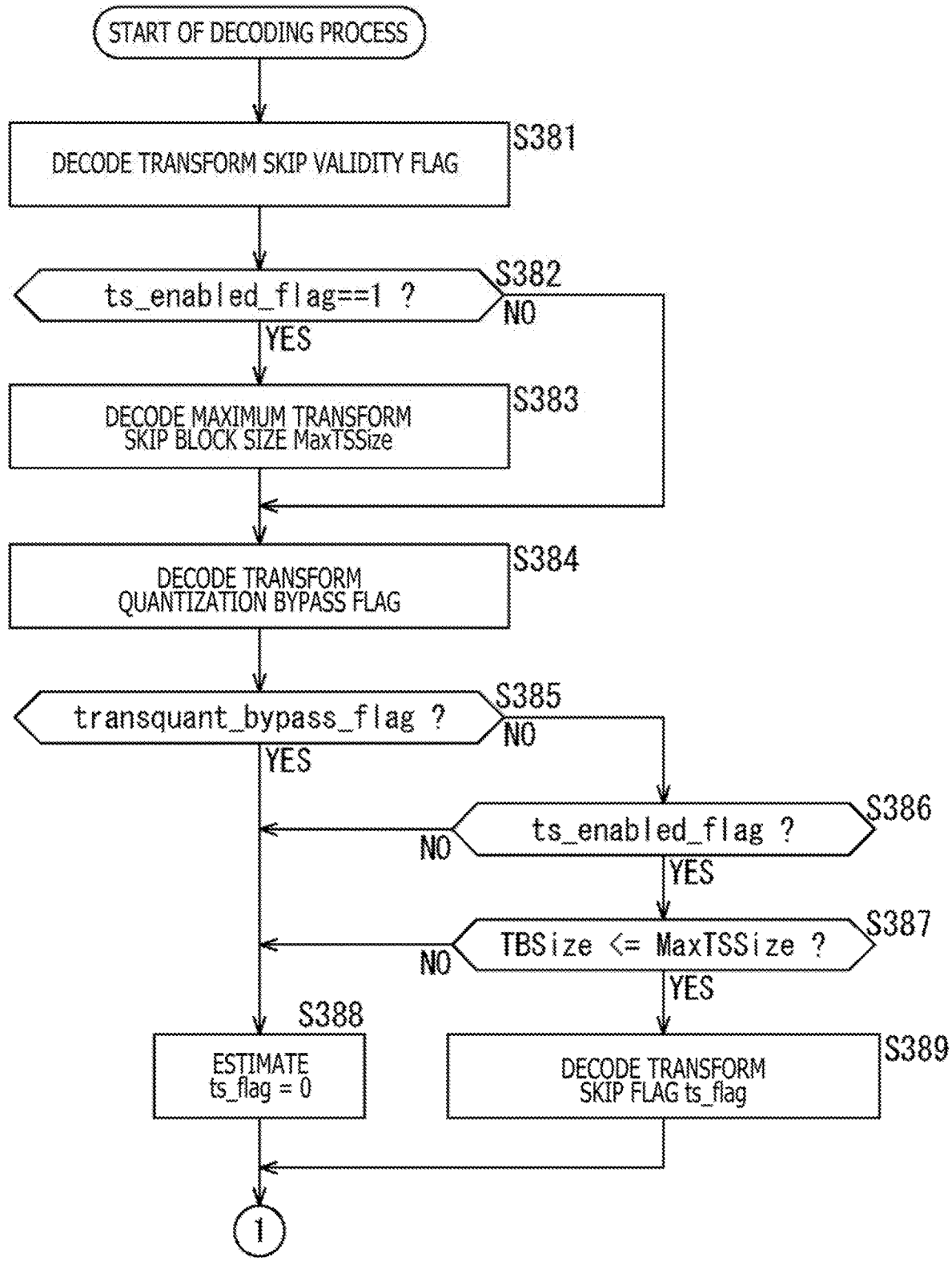
FIG. 25 is a flow chart illustrating an example of a flow of a decoding process.

After the decoding process is started, processes at steps S381 to S389 of FIG. 25 are executed similarly to the processes (FIG. 19) at steps S335 to S339 and steps S341 to S344.

It is to be noted that, in the case where it is decided at step S385 that the transform quantization bypass flag transquant_bypass_flag is 0, namely, in the case where transform and quantization are not to be skipped (bypassed), the processing advances to step S386.

Figure 26:
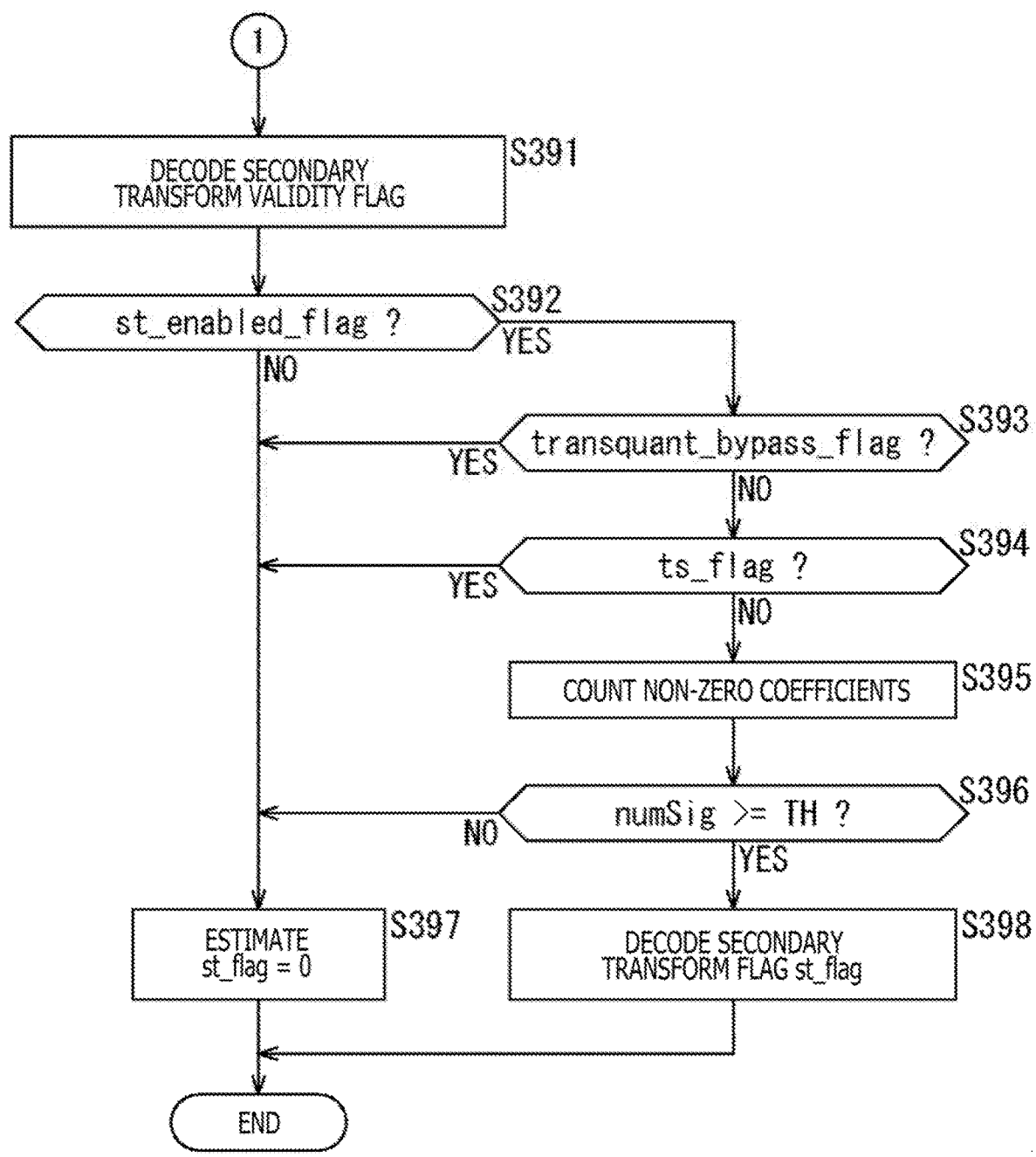
FIG. 26 is a flow chart continuing from FIG. 25 and illustrating an example of a flow of a decoding process.

Further, if it is decided at step S368 that the transform skip flag ts_flag is estimated to be 0 and the transform skip flag ts_flag is set to 0, then the processing advances to step S391 of FIG. 26. Similarly, if encoded data of the transform skip flag ts_flag is decoded at step S389, then the processing advances to step S391.

At step S391 of FIG. 26, the secondary transform validity flag decoding section 311 decodes encoded data of the secondary transform validity flag st_enabled_flag included in the bit stream (encoded data) and outputs the resulting data as part of the header information Hinfo.

At step S392, the secondary transform flag decoding section 331 decides whether or not the decoded secondary transform validity flag st_enabled_flag is 1 (true). In the case where it is decided that the secondary transform validity flag st_enabled_flag is 0, namely, in the case where it is decided that execution of inverse secondary transform is not permitted, processes at steps S393 to S396 are skipped, and the processing advances to step S397.

If inverse secondary transform is not permitted, then inverse secondary transform is skipped. In particular, the value of the secondary transform flag st_flag is fixed to 0. Accordingly, in this case, since the secondary transform flag st_flag is not transmitted from the encoding side, the secondary transform flag decoding section 331 skips decoding of encoded data of the secondary transform flag st_flag. Since this makes it possible to skip decoding of redundant information, it is possible to suppress increase of the load of a decoding process and suppress degradation of the encoding efficiency.

In the case where it is decided at step S392 that the secondary transform validity flag st_enabled_flag is 1, namely, in the case where it is decided that execution of inverse secondary transform is permitted, the processing advances to step S393.

At step S393, the secondary transform flag decoding section 331 decides whether or not the transform quantization bypass flag transquant_bypass_flag is 1 (true). In the case where it is decided that the transform quantization bypass flag transquant_bypass_flag is 1, namely, in the case where it is decided that inverse transform (inverse secondary transform and inverse primary transform) and dequantization are to be skipped (bypassed), processes at steps S394 to S396 are skipped, and the processing advances to step S397.

If inverse transform and dequantization are to be bypassed, then the secondary transform flag st_flag is unnecessary. Accordingly, in this case, the secondary transform flag decoding section 331 skips decoding of the encoded data of the secondary transform flag st_flag. Since this makes it possible to skip decoding of redundant information, it is possible to suppress increase of the load of a decoding process and suppress degradation of the encoding efficiency.

In the case where it is decided at step S393 that the transform quantization bypass flag transquant_bypass_flag is 0, namely, in the case where it is decided that inverse transform and dequantization are not to be skipped (bypassed), the processing advances to step S394.

At step S394, the secondary transform flag decoding section 331 decides whether or not the transform skip flag ts_flag is 1 (true). In the case where it is decided that the transform skip flag ts_flag is 1 (true), namely, in the case where it is decided that inverse transform (inverse primary transform) is to be skipped, processes at steps S395 and S396 are skipped, and the processing advances to step S397.

If inverse primary transform is to be skipped, then inverse secondary transform is skipped. In particular, the value of the secondary transform flag st_flag is fixed to 0. Accordingly, in this case, since the secondary transform flag st_flag is not transmitted from the encoding side, the secondary transform flag decoding section 331 skips decoding of encoded data of the secondary transform flag st_flag. Since this makes it possible to skip decoding of redundant information, it is possible to suppress increase of the load of a decoding process and suppress degradation of the encoding efficiency.

In the case where it is decided at step S394 that the transform skip flag ts_flag is 0 (false), namely, in the case where it is decided that inverse transform (inverse primary transform) is to be executed, the processing advances to step S395.

At step S395, the secondary transform flag decoding section 331 refers to the residual information Rinfo to count non-zero coefficients existing in the transform block to determine the total number numSig of non-zero coefficients (total number of sig_coeff_flag==1).

At step S396, the secondary transform flag decoding section 331 decides whether or not the total number numSig of non-zero coefficients is equal to or greater than a predetermined threshold value TH (numSig>=TH). In the case where it is decided that the total number numSig of non-zero coefficients is smaller than the predetermined threshold value TH (numSig<TH), the processing advances to step S397.

In the case where the total number numSig of non-zero coefficients is smaller than the predetermined threshold value TH, namely, in the case of a sparse residual signal in which the number of non-zero coefficients is small, since there is the possibility that the energy compaction may be degraded by inverse secondary transform and the encoding efficiency may degrade, in order to suppress degradation of the encoding efficiency, it is desirable to skip inverse secondary transform. Accordingly, the value of the secondary transform flag st_flag is fixed to 0. Accordingly, is this case, since the secondary transform flag st_flag is not transmitted from the encoding side, the secondary transform flag decoding section 331 skips decoding of the encoded data of the secondary transform flag st_flag. Since this makes it possible to skip decoding of redundant information, it is possible to suppress increase of the load of a decoding process and suppress degradation of the encoding efficiency.

At step S397, the secondary transform flag decoding section 331 skips decoding of encoded data of the secondary transform flag st_flag. Further, in this case, since inverse secondary transform is skipped, the value of the secondary transform flag st_flag is fixed to 0. Accordingly, the secondary transform flag decoding section 331 estimates that the value of the secondary transform flag st_flag is 0. In particular, the secondary transform flag decoding section 331 sets the value of the secondary transform flag st_flag to 0 (st_flag=0). When the process at step S397 ends, the decoding process ends and the processing returns to FIG. 13.

In the case where it is decided at step S396 that the total number numSig of non-zero coefficients is equal to or greater than the predetermined threshold value TH (numSig>=TH), the processing advances to step S398.

At step S398, the secondary transform flag decoding section 331 decodes the encoded data of the secondary transform flag st_flag.

In short, only in the case where the conditional expression (33) given hereinabove is 1 (true), encoded data of the secondary transform flag st_flag is decoded. This corresponds to the seventh stage from above of the syntax described hereinabove with reference to FIG. 20.

When the process at step S398 ends, the decoding process ends, and the processing returns to FIG. 13.

By executing the decoding process in such a manner as described above, the image decoding apparatus 200 can skip, in the case where transform skip is applied (ts_flag=1) in the case where the secondary transform flag st_flag is decoded in a unit of a transform block, decoding of encoded data of the secondary transform flag st_flag. Further, in the case where bypass of inverse transform and dequantization is to be applied (transquant_bypass_flag=1), the image decoding apparatus 200 can skip decoding of encoded data of the secondary transform flag st_flag. In other words, reduction of the code amount relating to the secondary transform flag st_flag and decrease of the process amount according to encoding can be achieved.

It is to be noted that the decoding process described above may be subject to change of the processing order of the steps or change of the substance of the processes within a range within which it can be carried out. Further, the syntax and the conditional expression (33) given hereinabove can be changed is terms of arithmetic operation thereof within a range within which it can be carried out.

Although the example described above is directed to the description of a decoding process of the secondary transform flag st_flag in a unit of a transform block, the secondary transform identifier st_idx may be decoded in place of the secondary transform flag st_flag. In this case, the secondary transform flag st_flag depicted at the eighth stage from above of the syntax table depicted in FIG. 27 is replaced by the secondary transform identifier st_idx. Similarly, in FIG. 24, the secondary transform flag decoding section 331 is replaced by the secondary transform identifier decoding section 312 having a function relating to decoding of the secondary transform identifier st_idx depicted in FIG. 18. Similarly, the steps of the flow chart of FIG. 26 are interpreted replacing the secondary transform flag st_flag into the secondary transform identifier st_idx.

By executing a decoding process in such a manner as described above, in the case where transform skip is applied (ts_flag=1) in the case where the secondary transform identifier st_idx is decoded in a unit of a transform block, the image decoding apparatus 200 can skip decoding of the secondary transform identifier st_idx. Further, in the case where bypass of dequantization and inverse transform is applied (transquant_bypass_flag=1), the image decoding apparatus 200 can skip decoding of the secondary transform identifier st_idx. In other words, reduction of the code amount relating to the secondary transform flag st_flag and decrease of the process amount according to encoding can be achieved.

Further, there is no restriction to the conditional expression (33) given hereinabove, and the conditional expression (33) may be changed to the conditional expression (34) given hereinabove such that the secondary transform flag st_flag (or the secondary transform identifier st_idx) is decoded only in the case of a luminance. In particular, in the case where the identifier cIdx indicative of a color space indicates a value Luma (=0) of the luminance, the secondary transform flag st_flag (or the secondary transform identifier st_idx) is decoded, and in the case where cIdx indicates a value Cb (=1) or Cr (=2) of a color difference, decoding of the secondary transform flag st_flag (or the secondary transform identifier st_idx) is omitted.

Further, there is no restriction to the conditional expression (33) given hereinabove, and the conditional expression (33) may be changed to the conditional expression (35) given hereinabove such that the secondary transform flag st_flag (or the secondary transform identifier st_idx) is decoded only in the case of infra prediction. In particular, in the case where CuPredMode[x0][y0] indicative of a prediction mode of a CU indicates intra prediction (=MODE_INTRA), the secondary transform flag st_flag (or the secondary transform identifier st_idx) is decoded, and in the case of inter prediction, decoding is omitted. It is to be noted that the conditions of the conditional expressions (33) to (35) may be combined suitably.

4. Fourth Embodiment

<Skip of Encoding and Decoding of Secondary Transform Flag>

NPL 2 discloses that, in order to suppress the overhead of the secondary transform flag st_flag, in the case where the number of non-zero coefficients in a transform block is equal to or smaller than a predetermined threshold value TH (for example, 2), secondary transform is not applied and signaling of the secondary transform flag st_flag is skipped.

For example, if it is assumed that, in an 8×8 matrix, one non-zero coefficient exists in each of sub blocks (4×4) of an 8×8 transform block, then the total number of non-zero coefficients in the transform block is 4. Accordingly, if this total number is compared with the threshold value TH (=2), then st_flag indicative of whether or not secondary transform is to be applied is signaled (encoded).

Accordingly, there is a subject given below. There is the possibility that secondary transform may be applied to a signal in which a sparse non-zero coefficient exists in each sub block, resulting in the possibility that the energy compaction may degrade. Further, in the case where skip of (inverse) secondary transform is apparent (in short, in the case where the secondary transform flag st_flag=0 is apparent), if this secondary transform flag st_flag is signaled (encoded), then the overhead of the secondary transform flag st_flag becomes wasteful, resulting in the possibility that the encoding efficiency may degrade.

Therefore, in the case where the average value, in a unit of a sub block, of numbers of non-zero coefficients included in a transform block of a processing target, encoding of first information relating to skip of secondary transform that is a transform process for primary transform coefficients obtained by primary transform of a prediction residual that is a reference between an image and a prediction image of the image is skipped.

This makes it possible to skip secondary transform in the case where non-zero coefficients of sub blocks are sparse. Consequently, it is possible to suppress degradation of the energy compaction and suppress reduction of the encoding efficiency.

Further, in the case where the average value, in a unit of a sub block, of numbers of non-zero coefficients included in a transform block of a processing target, decoding of encoded data of first information relating to skip of inverse secondary transform that is inverse transform to secondary transform that is a transform process for primary transform coefficients obtained by primary transform of a prediction residual that is a reference between an image and a prediction image of the image is skipped.

This makes it possible to skip inverse secondary transform in the case where non-zero coefficients of sub blocks are sparse. Consequently, it is possible to suppress degradation of the energy compaction and suppress reduction of the encoding efficiency.

<Syntax>

An example of a syntax table in which pseudo codes representative of such control are described is depicted in FIG. 27. As depicted at the seventh stage from above of FIG. 27, one of conditions for encoding of the secondary transform flag st_flag (decoding of encoded data of the secondary transform flag st_flag) is that an in-sub block average non-zero coefficient number numSigInSBK that is an average value, in a sub block unit, of numbers of non-zero coefficients included in a transform block of a processing target is equal to or greater than a predetermined threshold value (TH). In particular, in the case where the in-sub block average non-zero coefficient number numSigInSBK is smaller than the predetermined threshold value (TH), namely, in the case where non-zero coefficients of the sub block are sparse, encoding of the secondary transform flag st_flag (decoding of encoded data of the secondary transform flag st_flag) is skipped.

<Encoding Section>

In this case, the image encoding apparatus 100 has a configuration basically similar to that in the first embodiment. However, the image encoding apparatus 100 in this case includes an encoding section that skips, in the case where the average value, in a sub block unit, of numbers of non-zero coefficients included in a transform block of a processing target is smaller than a threshold value, encoding of first information relating to skip of secondary transform that is a transform process for primary transform coefficients obtained by the primary transform of a prediction residual that is a difference between an image and a prediction image of the image. In particular, in the case where the average value, in a sub block unit, of numbers of non-zero coefficients included in a transform block of a processing target is smaller than the threshold value, the encoding section 114 skips encoding of first information relating to skip of secondary transform that is a transform process for primary transform coefficients obtained by the primary transform of the prediction residual that is a difference between an image and a prediction image of the image.

The encoding section 114 in this case has a function basically similar to that described hereinabove in connection with the third embodiment by executing a program and so forth. In short, the encoding section 114 has such functional blocks as described hereinabove with reference to FIG. 21.

<Flow of Encoding Process>

Figure 28:
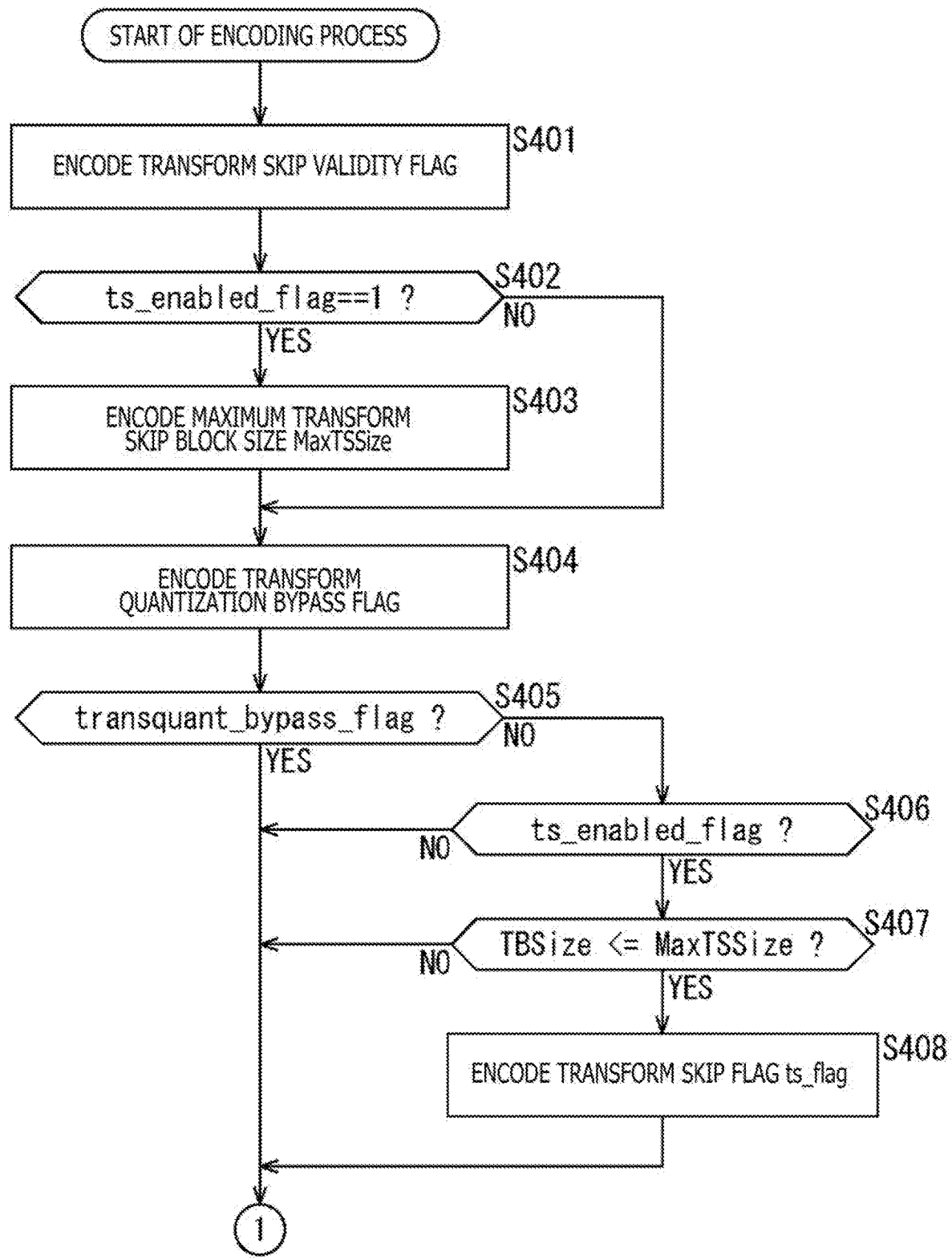
FIG. 28 is a flow chart illustrating an example of a flow of an encoding process.
Figure 29:
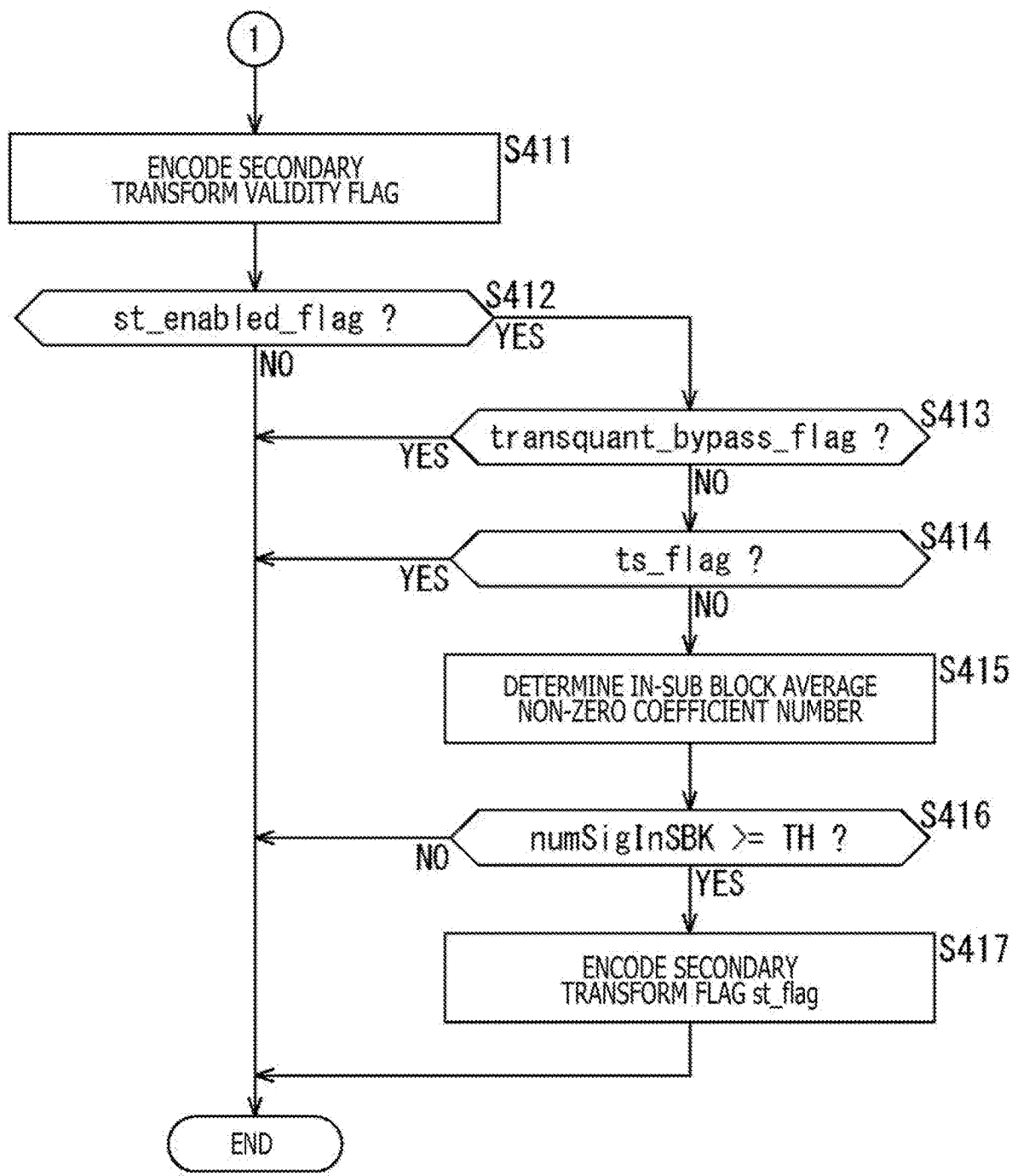
FIG. 29 is a flow chart continuing from FIG. 28 and illustrating an example of a flow of an encoding process.

Now, an example of a flow of processes executed by the image encoding apparatus 100 is described. In this case, the image encoding apparatus 100 performs an image encoding process basically similarly to that in the case of the first embodiment. However, in this case, the image encoding apparatus 100 performs encoding of the secondary transform flag st_flag and so forth in response to the in-sub block average non-zero coefficient number numSigInSBK and so forth at step S110 (FIG. 9) of the image encoding process. An example of a flow of the encoding of the secondary transform flag st_flag and so forth is described with reference to flow charts of FIGS. 28 and 29. In short, the encoding process depicted in FIGS. 28 and 29 is executed as part of the encoding process performed at step S110 of FIG. 9. Encoding of the other encoding parameters and quantization transform coefficient levels level is performed by an arbitrary method.

After the encoding process is started, processes at steps S401 to S408 of FIG. 28 are executed similarly to the processes at steps S361 to S368 of FIG. 22.

After a process at step S405 or S408 ends, the processing advances to step S411 of FIG. 29.

Processes at steps S411 to S414 of FIG. 29 are executed similarly to the processes at steps S371 to S374 of FIG. 23.

In the case where it is decided at step S414 that the transform skip flag ts_flag is 0, namely, in the case where transform (primary transform) is to be executed, the processing advances to step S415.

At step S415, the secondary transform flag encoding section 321 determines an in-sub block average non-zero coefficient number nmSigInSBK. For example, the secondary transform flag encoding section 321 refers to the residual information Rinfo to derive the total number numSig (total number of sig_coeff_flag==1) of non-zero coefficients existing in the transform block in accordance with the following expression (36).

$$\text{numSig}=\Sigma(\text{sig\_coeff\_flag}(i,j))\ (i=0\ldots\text{TBSize}-1,\ j=0\ldots\text{TBSze}-1) \qquad (36)$$

Then, the secondary transform flag encoding section 321 divides the determined total number numSig of non-zero coefficients by the total number of sub blocks in the transform block to derive the in-sub block average non-zero coefficient number numSigInSBK in accordance with the following expression (37).

$$\text{numSigInSBK}=\text{numSig}/(\text{TBSize}*\text{TBSize}/16) \qquad (37)$$

It is to be noted that, in the expression (37), shift arithmetic operation may be used in place of division to derive the in-sub block average non-zero coefficient number numSigInSBK as represented by the following expression (38).

$$\text{numSigInSBK} = \text{numSig} \gg (2*(\log 2\text{TBSize}-2)) \qquad (38)$$

Here, log2TBSize is a logarithm value with base 2 of the transform block size TBSize. It is to be noted that, while the transform block here is assumed to have a rectangular shape of TBSize×TBSize, it may have an oblong of TBXSize×TBYSize. In this case, the expression (36) given above may be replaced with the following expression (39), and the expression (38) given hereinabove may be replaced with the following expression (40).

$$\text{numSig} = \Sigma(\text{sig\_coeff\_flag}(i,j))\ (i=0 \ldots \text{TBXSize}-1, \\ j=0 \ldots \text{TBYSize}-1) \qquad (39)$$

$$\text{numSigInSBK} = \text{numSig} \gg ((\log 2\text{TBXSize}-2) + \\ (\log 2\text{TBYSize}-2)) \qquad (40)$$

Here, log2TBXSize is a logarithm value with base 2 of the horizontal width TBXSize of the transform block, and log2TBYSize is a logarithm value with base 2 of the vertical width TBYSize of the transform block.

Further, while, in the expressions (36) to (40) above, the number of non-zero coefficients in all sub blocks in a transform block is enumerated, the enumeration may be restricted to a predetermined region. For example, in a transform block of TBXSize×TBYSize, the number of non-zero coefficients in sub blocks existing is a low frequency region may be enumerated. For example, sub blocks existing in a left upper half of a transform block of TBXSize×TBYSize may be determined as indicated in the expression (41) given below. In this case, the expression (40) may be replaced by the following expression (42).

$$\text{numSig} = \Sigma(\text{sig\_coeff\_flag}(i,j))\ (i=0 \ldots \text{TBXSize}/2- \\ 1, j=0 \ldots \text{TBYSize}/2-1) \qquad (41)$$

$$\text{numSigInSBK} = \text{numSig} \gg ((\log 2\text{TBXSize}-3) + \\ (\log 2\text{TBYSize}-3)) \qquad (42)$$

Further, although, in the expressions (36) to (42) given hereinabove, the number numSig of non-zero coefficients in all of sub blocks (or sub blocks in a predetermined region) in a transform block is divided (or is subject to shift arithmetic operation) by the total number of all sub blocks (or sub blocks in the predetermined region) in the transform block, division (or shift arithmetic operation) may be performed after the value of the sub block number/2 (=numSBK>>1) is added as an offset before the division (or shift arithmetic operation) (for example, the following expressions (43), (44), (45) and (46)). Here, numSBK represents the number of all sub blocks (or sub blocks in the predetermined region) in the transform block, and numSBK in the expressions (43) to (45) becomes numSBK=TBXSize*TBYSize/16=1<<((log2TBXSize-2)+(logTBYSize-2)), and numSBK in the expression (46) is numSBK=1<<((log2TBXSize-3)+(logTBYSize-3)).

$$\text{numSigInSBK} = (\text{numSig}+(\text{numSBK} \gg 1))/ \\ (\text{TBSize}*\text{TBSize}/16) \qquad (43)$$

$$\text{numSigInSBK} = (\text{numSig}+(\text{numSBK} \gg 1)) \gg (2* \\ (\log 2\text{TBSize}-2)) \qquad (44)$$

$$\text{numSigInSBK} = (\text{numSig}+(\text{numSBK} \gg 1)) \gg \\ ((\log 2\text{TBXSize}-2)+(\log 2\text{TBYSize}-2)) \qquad (45)$$

$$\text{numSigInSBK} = (\text{numSig}+(\text{numSBK} \gg 1)) \gg \\ ((\log 2\text{TBXSize}-3)+(\log 2\text{TBYSize}-3)) \qquad (46)$$

Further, although, in the expressions (36) to (42) given hereinabove, the number numSig of non-zero coefficients in all of sub blocks (or sub blocks in a predetermined region) in a transform block is divided (or is subject to shift arithmetic operation) by the total number of all sub blocks (or sub blocks in the predetermined region) in the transform block to derive an in-sub block average non-zero coefficient number numSigInSBK, the sub block number to be used for the division may be replaced to a total number numNonZeroSBK (also called non-zero sub block number) of sub blocks in which a non-zero coefficient exists. For example, the non-zero sub block number numNonZeroSBK is derived by an expression (47) given below. In particular, by enumerating the number of sub blocks whose sub block non-zero coefficient presence/absence flag coded_sub_blck_flag (i,j) is 1, the non-zero sub block number numNonZeroSBK can be derived. In this case, the in-sub block average non-zero coefficient number numSigInSBK can be derived by an expression (48) given below in place of the expression (40). It is to be noted that, in the expression (48), in order to avoid division by zero, it is decided whether or not the total number numNonZeroSBK is 0, and if the non-zero sub block number numNonZeroSBK is 0, then 0 is set to numSigInSBK, but if the non-zero sub block number numNonZeroSBK is greater than 0, then a value obtained by dividing numSig by numNonZeroSBK is set to numSigInSBK.

$$\text{numNonZero} = \Sigma(\text{coded\_sub\_block\_flag}(i,j))\ (i=0 \ldots \\ (\text{TBXSize} \gg 2)-1, j=0 \ldots (\text{TBYSize} \gg 2)-1) \qquad (47)$$

$$\text{numSigInSBK} = \text{numNonZeroSBK} == 0 ? 0 : \text{numSig}/ \\ \text{numNonZeroSBK} \qquad (48)$$

Further, setting a predetermined region in a transform block as a target, the in-sub block average non-zero coefficient number numSigInSBK may be derived on the basis of the number of non-zero coefficients in sub blocks in the predetermined region and the number of sub-blocks having a non-zero coefficient. For example, sub blocks existing in a left upper half of a transform block of TBXSize×TBYSize may be determined as a target. In this case, the non-zero coefficient number numSig is derived by the expression (41) described hereinabove, and the non-zero sub block number numNonZeroSBK is derived by an expression (49) given below. The derived numSig and numNonZeroSBK are referred to such that the in-sub block average non-zero coefficient number numSigInSBK is derived by the expression (48) given above.

$$\text{numNonZero} = \Sigma(\text{coded\_sub\_block\_flag}(i,j))\ (i=0 \ldots \\ (\text{TBXSize} \gg 3)-1, j=0 \ldots (\text{TBYSize} \gg 3)-1) \qquad (49)$$

After the in-sub block average non-zero coefficient number nmSigInSBK is determined in such a manner as described above, the processing advances to step S416.

At step S416, the secondary transform flag encoding section 321 decides whether or not the in-sub block average non-zero coefficient number numSigInSBK is equal to or greater than a predetermined threshold value TH (numSigInSBK>=TH). In the case where the logical value of the conditional expression is 0 (false), namely, in the case where it is decided that numSigInSBK<TH is satisfied, namely, in the case where numSigInSBK<TH is satisfied, the process at step S417 is skipped and the encoding process ends, and the processing returns to FIG. 9.

In the case where the in-sub block average non-zero coefficient number numSigInSBK is smaller than the predetermined threshold value TH, a sub block in which non-zero coefficients are sparse exists. If secondary transform is performed for such a sub block as just described, then the energy compaction degrades and there is the possibility that the encoding efficiency may degrade. Accordingly, in order to suppress degradation of the encoding efficiency, it is desirable to skip secondary transform. In short, in this case, control is performed such that secondary transform is skipped. Accordingly, the value of the secondary transform flag st_flag is fixed to 0. Accordingly, in this case, there is no necessity to transmit the secondary transform flag st_flag to the decoding side. Accordingly, the secondary transform flag encoding section 321 skips encoding of the secondary transform flag st_flag. Since this mates it possible to skip encoding of redundant information, it is possible to suppress increase of the load of an encoding process and suppress degradation of the encoding efficiency.

In the case where it is decided at step S416 that the logical value of the conditional expression is 1 (true), namely, in the case where numSigInSBK>=TH is satisfied, the processing advances to step S417.

At step S417, the secondary transform flag encoding section 321 encodes the secondary transform flag st_flag to generate a bit string (encoded data), and outputs the encoded data. The encoded data of the secondary transform flag st_flag obtained by the encoding is included into a bit stream that includes encoded data of quantization transform coefficient levels level.

In short, only in the case where a conditional expression (50) given below is 1 (true), the secondary transform flag st_flag is encoded. This corresponds to the seventh stage from above of the syntax described with reference to FIG. 27.

Logical value=(st_enabled_flag &&
   (transquant_bypass_flag==0||ts_flag==0) &&
   numSigInSBK>=*TH*)                                 (50)

By executing an encoding process in such a manner as described above, the image encoding apparatus 100 can skip an encoding process of the secondary transform flag st_flag in regard to a signal in which sparse non-zero coefficients exist in sub blocks in a transform block. In particular, the processing amount relating to encoding of a secondary transform flag can be reduced. Further, in regard to a signal in which sparse non-zero coefficients exist in sub blocks in a transform block, degradation of the energy compaction can be suppressed. In other words, reduction of the encoding efficiency can be suppressed.

While the example described above is directed to the description of an encoding process of the secondary transform flag st_flag in a unit of a transform block, the secondary transform identifier st_idx may be encoded in place of the secondary transform flag st_flag. In this case, the secondary transform flag st_flag depicted at the eighth stage from above of the syntax table depicted in FIG. 27 is replaced to the secondary transform identifier st_idx. Similarly, in FIG. 21, the secondary transform flag encoding section 321 is replaced to the secondary transform identifier encoding section 302 having a function relating to encoding of the secondary transform identifier st_idx depicted in FIG. 16. Similarly, the steps of the flow chart of FIG. 29 are interpreted replacing the term of secondary transform flag st_flag into the secondary transform identifier st_idx.

By executing an encoding process in such a manner as described above, the image encoding apparatus 100 can skip an encoding process of the secondary transform flag st_flag in regard to a signal in which sparse non-zero coefficients exist in sub blocks in a transform block. In particular, the processing amount relating to encoding of a secondary transform flag can be reduced. Further, is regard to a signal in which sparse non-zero coefficients exist in sub blocks in a transform block, degradation of the energy compaction can be suppressed. In other words, reduction of the encoding efficiency can be suppressed.

Further, there is no restriction to the conditional expression (50) given hereinabove, and the conditional expression (50) may be changed to a conditional expression (51) given below such that the secondary transform flag st_flag (or the secondary transform identifier st_idx) is encoded only in the case of a luminance. In particular, in the case where the identifier cIdx indicative of a color space indicates a value Luma (=0) of the luminance, the secondary transform flag st_flag (or the secondary transform identifier st_idx) is encoded, and in the case where cIdx indicates a color difference Cb (=1) or Cr (=2), encoding of the secondary transform flag st_flag (or the secondary transform identifier st_idx) is omitted. In this case, since the secondary transform flag st_flag (or the secondary transform identifier st_idx) relating to a color difference is not encoded, it may be estimated equal to the secondary flag st_flag (or the secondary transform identifier st_idx) of the luminance. Alternatively, since a residual of a color difference frequently is a sparse residual signal generally in comparison with that of the luminance, the secondary transform flag st_flag (or the secondary transform identifier st_idx) may be estimated equal to the value (0) indicating that secondary transform is to be skipped (omitted).

Logical value=(cIdx==Luma && st_enabled_flag
   && (transquant_bypass_flag==0||ts_flag==0)
   && numSigInSBK>=*TH*)                    (51)

Further, there is no restriction to the conditional expression (50) given hereinabove, and the conditional expression (50) may be changed to a conditional expression (52) given below such that the secondary transform flag st_flag (or the secondary transform identifier st_idx) is encoded only in the case of intra prediction. In particular, in the case where CuPredMode[x0][y0] indicative of a prediction mode of a CU indicates intra prediction (=MODE_INTRA), the secondary transform flag st_flag (or the secondary transform identifier st_idx) is encoded, and in the case of inter prediction, encoding is omitted.

Logical value=(CuPredMode[*x*0][*y*0]==MODE_INTRA && st_enabled_flag &&
   (transquant_bypass_flag==0||ts_flag==0) &&
   numSigInSBK>=*TH*)                      (52)

It is to be noted that the conditions of the conditional expression (50) to (52) may be combined with each other.

It is to be noted that the encoding process described above may be subject to change of the processing order of the steps or change of the substance of the processes within a range within which it can be carried out. Further, the syntax and the conditional expressions (50) to (52) given hereinabove can be changed in terms of arithmetic operation thereof within a range within which it can be carried out.

<Decoding Section>

Now, an image decoding apparatus 200 is described. Also in this case, the image decoding apparatus 200 has a configuration basically similar to that in the first embodiment. However, the image decoding apparatus 200 in this case includes a decoding section that skips, in the case where as average value, in a sub block unit, of the number of non-zero coefficients included in a transform block of a processing target is smaller than a threshold value, decoding of encoded data of first information relating to skip of inverse secondary transform that is inverse transform to secondary transform that is a transform process for primary transform coefficients obtained by primary transform of a prediction residual that is a difference between an image and a prediction image of the image. In short, the decoding section 211 in this case skips, in the case where an average value, in a sub block unit, of the number of non-zero coefficients included in a transform block of the processing target is smaller than a threshold value, decoding of encoded data of first information relating to skip of inverse secondary transform that is inverse transform to secondary transform that is a transform process for primary transform coefficients obtained by primary transform of a prediction residual that is a difference between an image and a prediction image of the image.

The decoding section 211 has a function basically similar to that described hereinabove in connection with the third embodiment by executing a program and so forth. In short, the decoding section 211 has such functional blocks as described hereinabove with reference to FIG. 24.

<Flow of Decoding Process>

Figure 30:
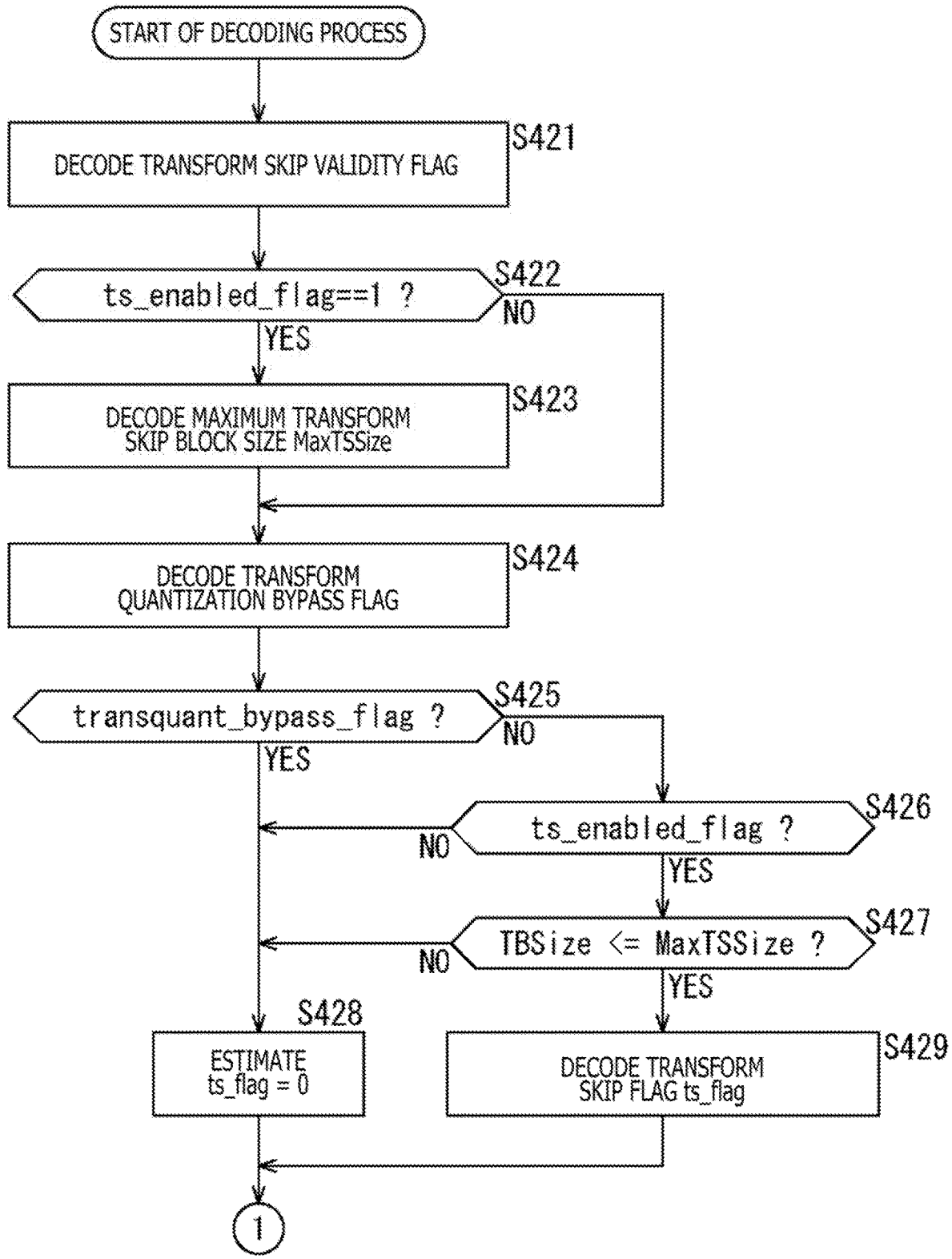
FIG. 30 is a flow chart illustrating an example of a flow of a decoding process.
Figure 31:
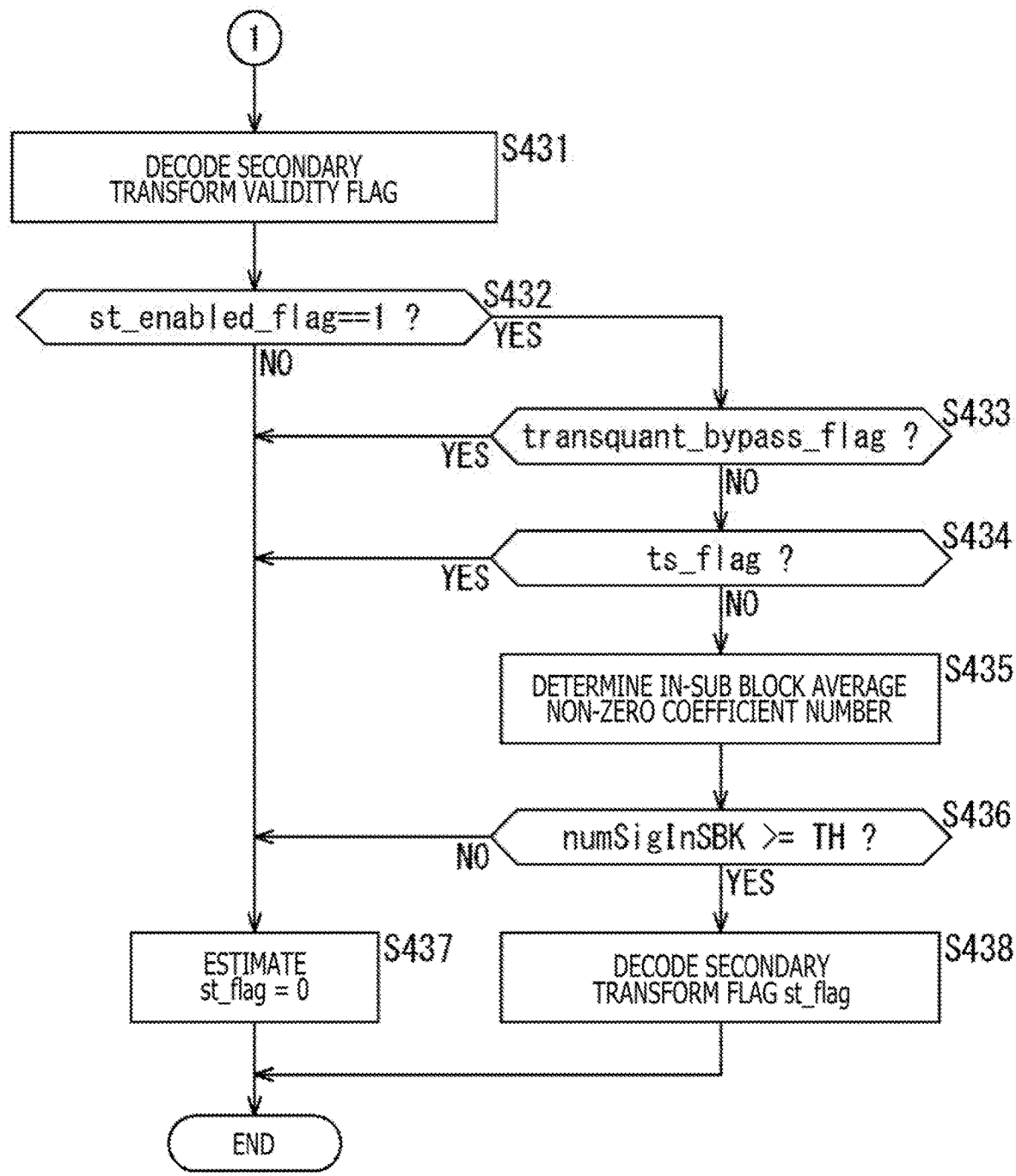
FIG. 31 is a flow chart continuing from FIG. 30 and illustrating an example of a flow of a decoding process.

Now, an example of a flow of processes executed by the image decoding apparatus 200 is described. In this case, the image decoding apparatus 200 performs an image decoding process basically similarly to that in the case of the first embodiment. However, in this case, at step S201 (FIG. 13) of the image decoding process, the image decoding apparatus 200 performs decoding of encoded data of the secondary transform flag st_flag and so forth in response to the value of the in-sub block average non-zero coefficient number numSigInSBK and so forth. An example of a flow of the decoding of encoded data of the secondary transform flag st_flag and so forth is described with reference to flow charts of FIGS. 30 and 31. In short, the decoding process depicted in FIGS. 30 and 31 is executed as part of the decoding process performed at step S201 of FIG. 13. Decoding of other encoding data and encoded data of quantization transform coefficient levels level is performed by an arbitrary method.

After the decoding process is started, processes at steps S421 to S429 of FIG. 30 are executed similarly to the processes at steps S381 to S389 of FIG. 25.

After the process at steps S428 or S429 ends, the processing advances to step S431 of FIG. 31.

Processes at steps S431 to S934 of FIG. 31 are executed similarly to the processes at steps S391 to S394 of FIG. 26.

In the case where it is decided at step S434 that the transform skip flag ts_flag is 0, namely, in the case where transform (primary transform) is to be executed, the processing advances to step S435.

At step S435, the secondary transform flag decoding section 331 determines the in-sub block average non-zero coefficient number nmSigInSBK that is an average value, in sub block units, of the number of non-zero coefficients included in the transform block of the processing target. For example, the secondary transform flag decoding section 331 refers to the residual information Rinfo to derive the total number numSig (total number of sig_coeff_flag==1) of non-zero coefficients existing in the transform block as given by the following expression (53).

$$\text{numSig}=\Sigma(\text{sig\_coeff\_flag}(i,j)) \ (i=0 \ldots \text{TBSize}-1, \ j=0 \ldots \text{TBSize}-1) \tag{53}$$

Then, the secondary transform flag decoding section 331 divides the total number numSig of non-zero coefficients by the total number of sub blocks in the transform block to derive the in-sub block average non-zero coefficient number numSigInSBK by the following expression (54).

$$\text{numSigInSBK}=\text{numSig}/(\text{TBSize}*\text{TBSize}/16) \tag{54}$$

It is to be noted that the expression (54) may be modified such that, by using shift arithmetic operation in place of division, the in-sub block average non-zero coefficient number numSigInSBK is derived like the following expression (55).

$$\text{numSigInSBK}=\text{numSig}>>(2*(\text{log2TBSize}-2)) \tag{55}$$

Here, log2TBSize is a logarithm value with base 2 of the transform block size TBSize. It is to be noted that, while it is assumed that the transform block is an oblong of TBSize×TBSize, it may be a quadrangular shape of TBXSize×TBYSize. In this case, the expression (53) given above may be replaced with the following expression (56), and the expression (55) given hereinabove may be replaced with the following expression (57).

$$\text{numSig}=\Sigma(\text{sig\_coeff\_flag}(i,j)) \ (i=0 \ldots \text{TBXSize}-1, \ j=0 \ldots \text{TBYSize}-1) \tag{56}$$

$$\text{numSigInSBK}=\text{numSig}>>((\text{log2TBXSize}-2)+(\text{log2TBYSize}-2)) \tag{57}$$

Here, log2TBXSize is a logarithm value with base 2 of the horizontal width TBXSize of the transform block, and log2TBYSize is a logarithm value with base 2 of the vertical width TBYSize of the transform block.

Further, while, in the expressions (53) to (57) above, the number of non-zero coefficients is all sub blocks in a transform block is enumerated, the enumeration may be restricted to a predetermined region. For example, in a transform block of TBXSize×TBYSize, the number of non-zero coefficients in sub blocks existing in a low frequency region may be enumerated. For example, sub blocks existing in a left upper half of a transform block of TBXSize×TBSSize may be determined as a target as indicated in the expression (58) given below. In this case, the expression (57) may be replaced to the following expression (59).

$$\text{numSig}=\rho(\text{sig\_coeff\_flag}(i,j)) \ (i=0 \ldots \text{TBXSize}/2-1, \ j=0 \ldots \text{TBYSize}/2-1) \tag{58}$$

$$\text{numSigInSBK}=\text{numSig}>>((\text{log2TBXSize}-3)+(\text{log2TBYSize}-3)) \tag{59}$$

Further, although, in the expressions (53) to (59) given hereinabove, the number numSig of non-zero coefficients in all of sub blocks (or sub blocks in a predetermined region) in a transform block is divided (or is subject to shift arithmetic operation) by the total number of all sub blocks (or sub blocks in the predetermined region) in the transform block, division (or shift arithmetic operation) may be performed after the value of the sub block number/2 (=numSBK>>1) is added as an offset before the division (or shift arithmetic operation) (for example, the following expressions (60), (61), (62) and (63)). Here, numSBK represents the number of all sub blocks (or sub blocks an the predetermined region) in the transform block, and numSBK in the expressions (60) to (62) becomes numSBK=TBXSize*TBYSize/16=1<<((log2TBXSize-2)+(logTBYSize-2)), and numSBK in the expression (63) is numSBK=1<<((log2TBXSize-3)+(logTBYSize-3)).

$$\text{numSigInSBK}=(\text{numSig}+(\text{numSBK}>>1))/(\text{TBSize}*\text{TBSize}/16) \tag{60}$$

$$\text{numSigInSBK}=(\text{numSig}+(\text{numSBK}>>1))>>(2*(\text{log2TBSize}-2)) \tag{61}$$

$$\text{numSigInSBK} = (\text{numSig} + (\text{namSBK} \gg 1)) \gg \\ ((\log2\text{TBXSize}-2)+(\log2\text{TBYSize}-2)) \qquad (62)$$

$$\text{numSigInSBK} = (\text{numSig} + (\text{numSB} \gg 1)) \gg \\ ((\log2\text{TBXSize}-3)+(\log2\text{TBYSize}-3)) \qquad (63)$$

Further, although, in the expressions (53) to (59) given hereinabove, the number numSig of non-zero coefficients in all of sub blocks (or sub blocks in a predetermined region) in a transform block is divided (or is subject to shift arithmetic operation) by the total number of all sub blocks (or sub blocks in the predetermined region) in the transform block to derive an in-sub block average non-zero coefficient number numSigInSBK, the sub block number to be used for the division may be replaced to a total number numNonZeroSBK (also called non-zero sub block number) of sub blocks in which a non-zero coefficient exists. For example, the non-zero sub block number numNonZeroSBK is derived by the expression (47) given hereinabove. In particular, by enumerating the number of sub blocks whose sub block non-zero coefficient presence/absence flag coded_sub_blck_flag(i,j) is 1, the non-zero sub block number numNonZeroSBK can be derived. In this case, the in-sub block average non-zero coefficient number numSigInSBK can be derived by the expression (48) given hereinabove in place of the expression (54). It is to be noted that, in the expression (48), in order to avoid division by zero, it is decided whether or not the non-zero sub block number numNonZeroSBK is 0, and if the non-zero sub block number numNonZeroSBK is 0, then 0 is set to numSigInSBK, but if the non-zero sub block number numNonZeroSBK is greater than 0, then a value obtained by dividing numSig by numNonZeroSBK is set to numSigInSBK.

Further, setting a predetermined region in a transform block as a target, the in-sub block average non-zero coefficient number numSigInSBK may be derived on the basis of the number of non-zero coefficients in sub blocks existing in the predetermined region and the number of sub-blocks having a non-zero coefficient. For example, sub blocks existing in a left upper half of a transform block of TBXSize×TBYSize may be determined as a target. In this case, the non-zero coefficient number numSig is derived by the expression (41) described hereinabove, and the non-zero sub block number numNonZeroSBK is derived by the expression (49) given below. The derived numSig and numNonZeroSBK are referred to such that the in-sub block average non-zero coefficient number numSigInSBK is derived by the expression (48) given hereinabove.

After the in-sub block average non-zero coefficient number nmSigInSBK is determined in such a manner as described above, the processing advances to step S436.

At step S416, the secondary transform flag decoding section 331 decides whether or not the in-sub block average non-zero coefficient number numSigInSBK is equal to or greater than a predetermined threshold value TH (numSigInSBK>=TH). In the case where it is decided that the logical value of the conditional expression is 0 (false), namely, in the case where it is decided that numSigInSBK<TH is satisfied, then the processing advances to step S437.

In the case where the in-sub block average non-zero coefficient number numSigInSBK is smaller than the predetermined threshold value TH, a sub block in which non-zero coefficients are sparse exists. If inverse secondary transform is performed for such a sub block as just described, then the energy compaction degrades and there is the possibility that the encoding efficiency may degrade. Accordingly, in order to suppress degradation of the encoding efficiency, it is desirable to skip inverse secondary transform. In short, in this case, control is performed such that inverse secondary transform is skipped. Accordingly, the value of the secondary transform flag st_flag is fixed to 0. Accordingly, in this case, the secondary transform flag st_flag is not transmitted from the encoding side, the secondary transform flag decoding section 331 skips decoding of encoded data of the secondary transform flag st_flag. Since this makes it possible to skip decoding of redundant information, it is possible to suppress increase of the load of a decoding process and suppress degradation of the encoding efficiency.

At step S137, decoding of encoded data of the secondary transform flag st_flag is skipped. Further, in this case, since inverse secondary transform is skipped, the value of the secondary transform flag st_flag is fixed to 0. Accordingly, the secondary transform flag decoding section 331 estimates that the value of the secondary transform flag st_flag is 0. In short, the secondary transform flag decoding section 331 sets the value of the secondary transform flag st_flag to 0 (st_flag=0). When the process at step S437 ends, the decoding process ends, and the processing returns to FIG. 13.

In the case where it is decided at step S436 that the logical value of the conditional expression is 1 (true), namely, in the case where numSigInSBK>=TH is satisfied, the processing advances to step S438.

At step S438, the secondary transform flag decoding section 331 decodes encoded data of the secondary transform flag st_flag.

In short, only in the case where the conditional expression (50) given hereinabove is 1 (true), encoded data of the secondary transform flag st_flag is decoded. This corresponds to the seventh stage from above of the syntax described hereinabove with reference to FIG. 27.

When the process at step S438 ends, the decoding process ends and the processing returns to FIG. 13.

By executing the decoding process in such a manner as described above, the image decoding apparatus 200 can skip a decoding process of the secondary transform flag st_flag for a signal in which sparse non-zero coefficients exist in sub blocks in a transform block. In particular, the processing amount relating to decoding of encoded data of a secondary transform flag can be reduced. Further, degradation of the energy compaction can be suppressed in regard to a signal in which sparse non-zero coefficients exist in sub blocks in a transform block. In other words, decrease of the encoding efficiency can be suppressed.

Although the example described above is directed to the description of a decoding process of the secondary transform flag st_flag in a unit of a transform block, the secondary transform identifier st_idx may be decoded in place of the secondary transform flag st_flag. In this case, the secondary transform flag st_flag depicted at the eighth stage from above of the syntax table depicted in FIG. 27 is replaced by the secondary transform identifier st_idx. Similarly, in FIG. 24, the secondary transform flag decoding section 331 is replaced by the secondary transform identifier decoding section 312 having a function relating to decoding of the secondary transform identifier st_idx depicted in FIG. 18. Similarly, the steps of the flow chart of FIG. 31 are interpreted replacing the secondary transform flag st_flag into the secondary transform identifier st_idx.

By executing a decoding process in such a manner as described above, in regard to a signal in which sparse non-zero coefficients exist in sub blocks in a transform block, the image decoding apparatus 200 can skip a decoding process of the secondary transform identifier st_idx. In particular, the processing amount relating to a decoding process of a secondary transform identifier can be reduced. Further, in regard to a signal in which sparse non-zero coefficients exist in sub blocks in a transform block, degradation of the energy compaction can be suppressed. In other words, decrease of the encoding efficiency can be suppressed.

Further, there is no restriction to the conditional expression (50) given hereinabove, and the conditional expression (50) may be changed to the conditional expression (51) given hereinabove such that the secondary transform flag st_flag (or the secondary transform identifier st_idx) is decoded only in the case of a luminance. In particular, in the case where the identifier cIdx indicative of a color space indicates a value Luma (=0) of the luminance, the secondary transform flag st_flag (or the secondary transform identifier st_idx) is decoded, and in the case where cIdx indicates a value Cb (=1) or Cr (=2) of a color difference, decoding of the secondary transform flag st_flag (or the secondary transform identifier st_idx) is omitted. In this case, since the secondary transform flag st_flag (or the secondary transform identifier st_idx) relating to a color difference is not decoded, it may be estimated equal to the secondary flag st_flag (or the secondary transform identifier st_idx) of the luminance. In other words, same inverse secondary transform is applied. Alternatively, since a residual of a color difference frequently is a sparse residual signal generally in comparison with that of the luminance, the secondary transform flag st_flag (or the secondary transform identifier st_idx) may be estimated equal to the value (0) indicating that inverse secondary transform is to be skipped (omitted).

Further, there is no restriction to the conditional expression (50) given hereinabove, and the conditional expression (50) may be changed to the conditional expression (52) given hereinabove such that the secondary transform flag st_flag (or the secondary transform identifier st_idx) is decoded only in the case of intra prediction. In particular, in the case where CuPredMode[x0][y0] indicative of a prediction mode of a CU indicates intra prediction (=MODE_INTRA), the secondary transform flag st_flag (or the secondary transform identifier st_idx) is decoded, and in the case of inter prediction, decoding is omitted. It is to be noted that the conditions of the conditional expressions (50) to (52) may be combined suitably.

It is to be noted that the decoding process described above may be subject to change of the processing order of the steps or change of the substance of the processes within a range within which it can be carried out. Further, the syntax and the conditional expressions (50) to (52) given hereinabove can be changed in terms of arithmetic operation thereof within a range within which it can be carried out.

5. Fifth Embodiment

<Skip of Encoding and Decoding of Primary Transform Identifier>

In the method disclosed in NPL 1, a primary transform identifier pt_idx that designates which primary transform is to be applied to primary transform Phor in the horizontal direction and primary transform Pver in the vertical direction for each transform block. More particularly, a primary transform identifier pt_idx of a fixed length code is derived in such a manner as indicated by an expression (64) given below from a horizontal direction primary transform destination flag pt_hor_flag that designates which one of Thor1 and Thor2 is to be applied as the primary transform Phor in the horizontal direction and which one of Tver1 and Tver2 is to be applied as the primary transform Pver in the vertical direction.

$$pt\_idx = \{(pt\_hor\_flag \ll 1) \, pt\_ver\_flag\} \quad (64)$$

Thereafter, encoding is carried out by applying arithmetic encoding to a bin string of the primary transform identifier pt_idx to generate a bit string. A manner of the encoding is depicted in FIG. 32. Further, a manner of decoding of the primary transform identifier pt_idx corresponding to the encoding is depicted in FIG. 33. As indicated by A of FIG. 32 or A of FIG. 33, the primary transform identifier pt_idx is binarized into a fixed length code. Selection of a context in arithmetic encoding and arithmetic decoding is performed as indicated by a table depicted in B of FIG. 32 or B of FIG. 33.

However, in NPL 1, since a primary transform identifier pt_idx is signaled in the case where the transform quantization bypass flag transquant_bypass_flag is 1 (true) (in the case where transform quantization bypass is to be applied), the overhead of the identifier is wasteful, and there is the possibility that the encoding efficiency may degrade.

Therefore, in the case where, upon image encoding, the transform quantization bypass flag transquant_bypass_flag indicates that transform quantization bypass is to be performed, encoding of the primary transform identifier pt_idx is skipped (omitted). This makes it possible to suppress degradation of the encoding efficiency.

On the other hand, in the case where, upon image decoding, the transform quantization bypass flag transquant_bypass_flag indicates that transform quantization bypass is to be performed, decoding of the primary transform identifier pt_idx is skipped (omitted) and besides it is estimated that the value of the primary transform identifier pt_idx is a value of an identifier (for example, −1) that indicates to use a predetermined orthogonal transform (for example, DCT-Type 2) for the primary transform Phor in the horizontal direction and the primary transform Pver in the vertical direction. This makes it possible to suppress degradation of the encoding efficiency.

Further, in the method disclosed in NPL 1, since the binarization does not take the appearance frequency of a value of the primary transform identifier pt_idx into consideration, there is the possibility that, upon arithmetic encoding, the encoding efficiency may degrade.

Therefore, as a binarization method for the primary transform identifier pt_idx, truncated unary binarization (Truncated Unary Binarization) (also referred to as TU) is applied. This makes it possible to suppress degradation of the encoding efficiency.

<Syntax>

An example of a syntax table in which pseudo codes representing such control are described is depicted in FIG. 34. As indicated at the seventh stage from above in FIG. 34, for encoding of the primary transform identifier pt_idx (namely, for decoding of encoded data of the primary transform identifier pt_idx), it is one of conditions that the transform quantization bypass flag transquant_bypass_flag is 0. In particular, in the case where the transform quantization bypass flag transquant_bypass_flag is 1, namely, in the case where (inverse) transform and (de)quantization are to be skipped, encoding of the primary transform identifier pt_idx (decoding of encoded data of the primary transform identifier pt_idx) is skipped.

<Encoding Section>

Also in this case, the image encoding apparatus 100 has a configuration basically similar to that in the case of the first embodiment. In particular, the image encoding apparatus 100 described in connection with the first, embodiment includes an encoding section that skips, in the case where primary transform that is a transform process for a prediction residual that is a difference between an image and a prediction image of the image, secondary transform that is a transform process for primary transform coefficients obtained by the primary transform of the prediction residual and quantization for secondary transform coefficients obtained by the secondary transform of the primary transform coefficients are to be skipped, encoding of first information representative of the substance of the primary transform.

In particular, the encoding section 114 in this case skips, in the case where primary transform that is a transform process for a prediction residual that is a difference between an image and a prediction image of the image, secondary transform that is a transform process for primary transform coefficients obtained by the primary transform of the prediction residual and quantization for secondary transform coefficients obtained by the secondary transform of the primary transform coefficients are to be skipped, encoding of first information representative of the substance of the primary transform.

Figure 35:
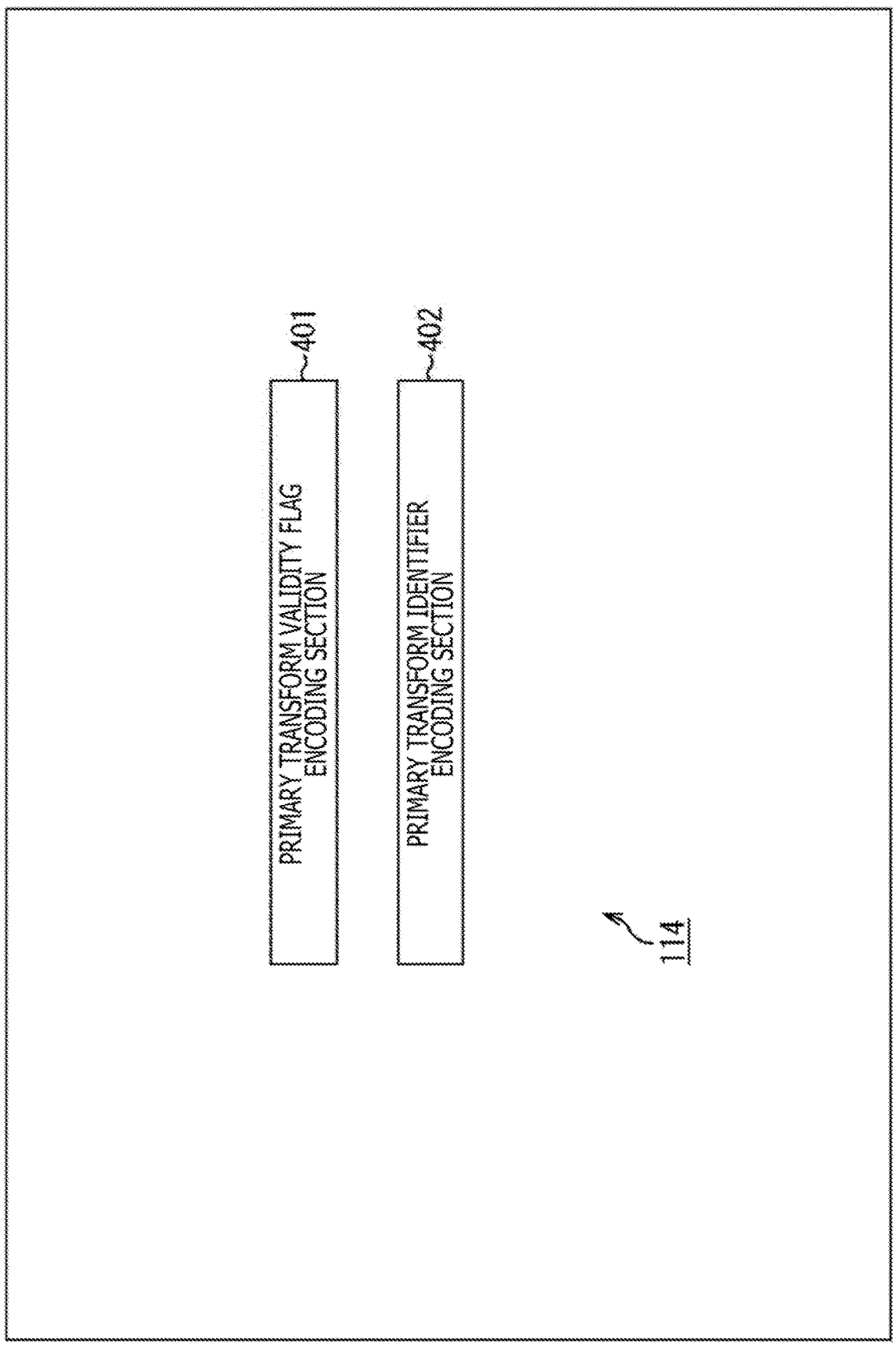
FIG. 35 is a block diagram depicting a principal configuration example of an encoding section.

FIG. 35 is a functional block diagram depicting an example of principal functions relating to encoding of a primary transform identifier, which is implemented by the encoding section 114 in this case executing a program and so forth. As depicted in FIG. 34, the encoding section 114 in this case can include, as functions relating to encoding of a primary transform identifier by executing a program, a primary transform validity flag encoding section 401 and a primary transform identifier encoding section 402, for example.

The primary transform validity flag encoding section 401 performs a process relating to encoding of a primary transform validity flag pt_enabled_flag that is information relating to permission of primary transform. The primary transform identifier encoding section 402 performs a process relating to encoding of the primary transform identifier pt_idx that is information relating to the substance of primary transform.

<Flow of Encoding Process>

Figure 36:
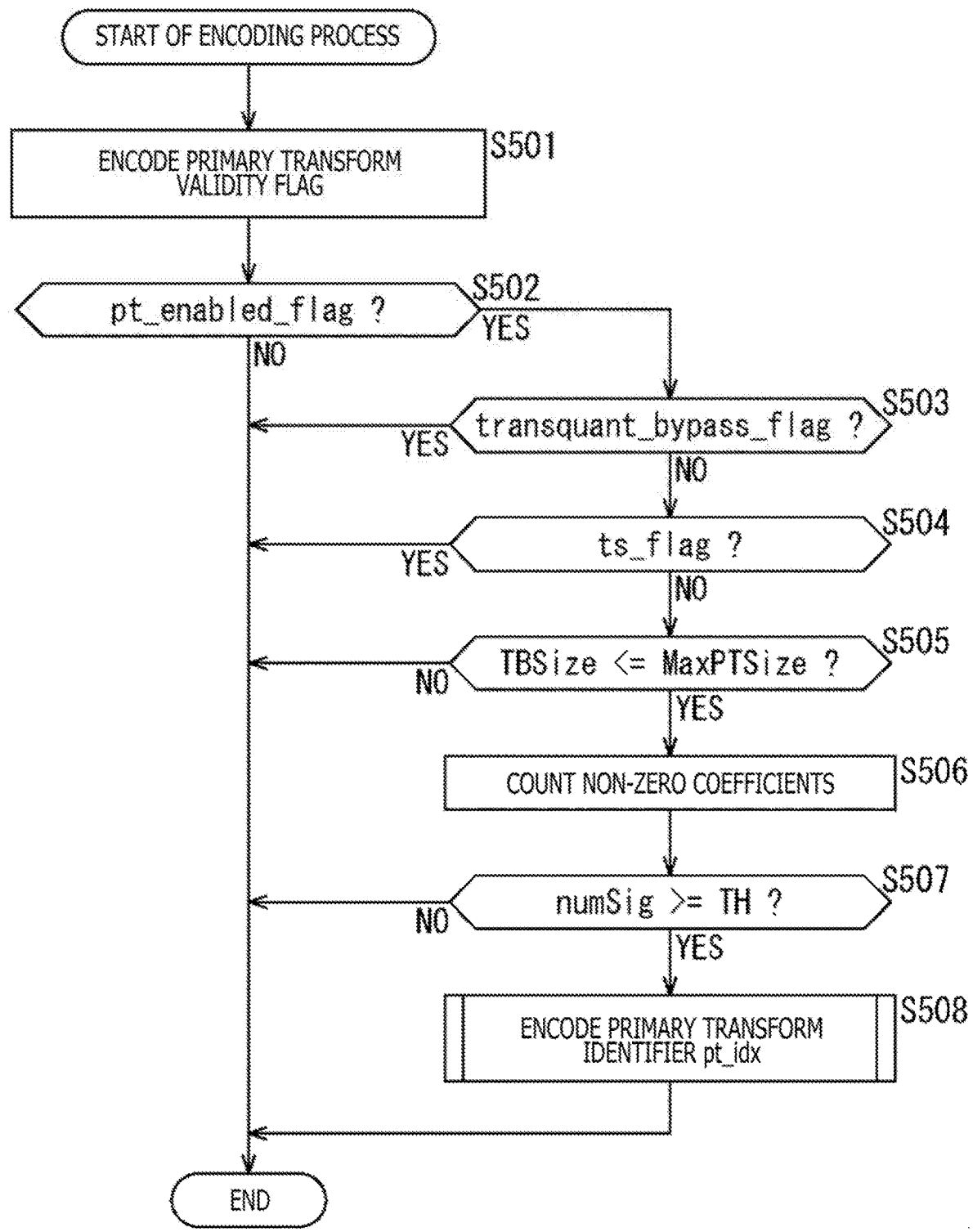
FIG. 36 is a flow chart illustrating an example of a flow of an encoding process.

Now, an example of a flow of processes executed by the image encoding apparatus 100 is described. In this case, the image encoding apparatus 100 performs an image encoding process basically similarly to that is the case of the first embodiment. However, in this case, the image encoding apparatus 100 performs encoding of the primary transform identifier pt_idx and so forth in response to the value of the transform quantization bypass flag transquant_bypass_flag and so forth at step S110 (FIG. 9) of the image encoding process. An example of a flow of the encoding of the primary transform identifier pt_idx and so forth is described with reference to flow charts of FIG. 36. In short, the encoding process depicted in FIG. 36 is executed as part of the encoding process performed at step S110 of FIG. 9. Encoding of the other encoding parameters and quantization transform coefficient levels level is performed by an arbitrary method.

After the encoding process is started, at step S501, the primary transform validity flag encoding section 401 encodes the primary transform validity flag pt_enabled_flag that is included in the header information Hinfo to generate a bit string (encoded data) and outputs the encoded data. The encoded data of the primary transform validity flag pt_enabled_flag obtained by this encoding is included into a bit stream that includes encoded data of quantization transform coefficient levels level.

At step S502, the primary transform identifier encoding section 402 decides whether or not the primary transform validity flag pt_enabled_flag included in the header information Hinfo is 1 (true). In the case where it is decided that the primary transform validity flag pt_enabled_flag is 0, namely, is the case where it is decided that execution of primary transform is not permitted, processes at steps S503 to step S508 are skipped and the encoding process ends, and the processing returns to FIG. 9.

If execution of primary transform is not permitted, then primary transform is not executed, and there is no necessity to transmit the primary transform identifier pt_idx to the decoding side. Accordingly, the primary transform identifier encoding section 402 skips encoding of the primary transform identifier pt_idx. Since this makes it possible to skip encoding of redundant information, it is possible to suppress increase of the load of an encoding process and suppress degradation of the encoding efficiency.

In the case where it is decided at step S502 that the primary transform validity flag pt_enabled_flag is 1, namely, in the case where it is decided that execution of primary transform is permitted, the processing advances to step S503.

At step S503, the primary transform identifier encoding section 402 decides whether or not the transform quantization bypass flag transquant_bypass_flag included in the transform information Tinfo is 1 (true). In the case where it is decided that the transform quantization bypass flag transquant_bypass_flag is 1, namely, in the case where it is decided that transform (primary transform and secondary transform) and quantization are to be skipped (bypassed), processes at steps S504 to S508 are skipped and the encoding process ends, and the processing returns to FIG. 9.

If transform and quantization are to be bypassed, then there is no necessity to transmit the primary transform identifier pt_idx to the decoding side. Accordingly, the primary transform identifier encoding section 402 skips encoding of the primary transform identifier pt_idx. Since this makes it possible to skip encoding of redundant information, it is possible to suppress increase of the load of an encoding process and suppress degradation of the encoding efficiency.

In the case where it is decided at step S503 that the transform quantization bypass flag transquant_bypass_flag is 0, namely, in the case where it is decided that transform and quantization are not to be skipped (bypassed), the processing advances to step S504.

At step S504, the primary transform identifier encoding section 402 decides whether or not the transform skip flag ts_flag included in the transform information Tinfo is 1 (true). In the case where it is decided that the transform skip flag ts_flag is 1, namely, in the case where it is decided that transform (primary transform) is to be skipped, processes at steps S505 to S508 are skipped and the encoding process ends, and the processing returns to FIG. 9.

If transform (primary transform) is to be skipped, then it is unnecessary to transmit the primary transform identifier pt_idx to the decoding side. Accordingly, the primary transform identifier encoding section 402 skips encoding of the primary transform identifier pt_idx. Since this makes it possible to skip encoding of redundant information, it is possible to suppress increase of the load of an encoding process and suppress degradation of the encoding efficiency.

In the case where it is decided at step S504 that the transform skip flag ts_flag is 0, namely, in the case where it is decided that transform (primary transform) is not to be skipped, the processing advances to step S505.

At step S505, the primary transform identifier encoding section 402 decides whether or not the size TBSize of the transform block of the processing target is equal to or smaller than a maximum primary transform block size MaxPTSize (whether or not the conditional expression TBSize<=MaxPTSize is true). In the case where it is decided that the size TBSize of the transform block of the processing target is greater than the maximum primary transform block size MaxPTSize, namely, in the case where the conditional expression given above is 0 (false), processes at steps S506 to S508 are skipped and the encoding process ends, and the processing returns to FIG. 9.

The maximum primary transform block size MaxPTSize is information indicative of a maximum block size with which execution of primary transform is permitted. In particular, in the case where the size of the transform block is greater than the maximum primary transform block size MaxPTSize, execution of primary transform is not permitted, and therefore, there is no necessity to transmit the primary transform identifier pt_idx to the decoding side. Accordingly, the primary transform identifier encoding section 402 skips encoding of the primary transform identifier pt_idx. Since this makes it possible to skip encoding of redundant information, it is possible to suppress increase of the load of an encoding process and suppress degradation of the encoding efficiency.

In the case where it is decided at step S505 that the size TBSize of the transform block of the processing target is equal to or smaller than the maximum primary transform block size MaxPTSize, namely, in the case where it is decided that the conditional expression given hereinabove is 1 (true), the processing advances to step S506.

It is to be noted that, at step S505, the conditional expression (TBSize<=MaxTSSize) given hereinabove may be replaced to another conditional expression (log2TBSize<=log2MaxPTSize) using a logarithm value log2TBSize with base 2 of the TB size and a logarithm value log2MaxPTSize with base 2 of the maximum transform block size MaxPTSize.

At step S506, the primary transform identifier encoding section 402 refers to the residual information Rinfo to count the total number numSig (total number of sig_coeff_flag==1) of non-zero coefficients existing in the transform block in accordance with the following expression (65).

$$\text{numSig} = \Sigma(\text{sig\_coeff\_flag}(i,j))\ (i=0\ldots\text{TBSize}-1,\ j=0\ldots\text{TBSize}-1) \tag{65}$$

At step S507, the primary transform identifier encoding section 402 decides whether or not the total number numSig of non-zero coefficients is equal to or greater than a predetermined threshold value TH (numSig>=TH). In the case where it is decided that the total number numSig of non-zero coefficients is smaller than the predetermined threshold value TH (numSig<TH), a process at step S508 is skipped and the encoding process ends, and the processing returns to FIG. 9.

In the case where the total number numSig of non-zero coefficients is smaller than the threshold value TH, namely, in the case of a sparse residual signal in which the number of non-zero coefficients is small, since there is the possibility that the energy compaction may degrade and the encoding efficiency may degrade, in order to suppress degradation of the encoding efficiency, it is desirable to apply transform skip or predetermined orthogonal transform (for example, of the DCT—Type 2). In short, in this case, there is no necessity to transmit the primary transform identifier pt_idx to the decoding side. Accordingly, the primary transform identifier encoding section 402 skips encoding of the primary transform identifier pt_idx. Since this makes it possible to skip decoding of redundant information, it is possible to suppress increase of the load of an encoding process and suppress degradation of the encoding efficiency.

In the case where it is decided at step S507 that the total number numSig of non-zero coefficients is equal to or greater than the predetermined threshold value TH, the processing advances to step S508.

At step S508, the primary transform identifier encoding section 402 variable length encodes the primary transform identifier pt_idx to generate a bit string (encoded data) and outputs the encoded data. Details of the encoding are hereinafter described. The encoded data of the primary transform identifier pt_idx obtained by this encoding is included into a bit stream that includes encoded data of quantization transform coefficient levels level.

In short, only in the case where the following conditional expression (66) is 1 (true), the primary transform identifier pt_idx is encoded. This corresponds to the seventh stage from above of the syntax described hereinabove with reference to FIG. 34.

$$\begin{aligned}\text{Logical value} = &(pt\_\text{enabled\_flag}\ \&\&\\ &(\text{transquant\_bypass\_flag}==0\|ts\_\text{flag}==0)\ \&\&\\ &(\text{log2TBSize}<=\text{log2MaxPTSize})\ \&\&\\ &\text{numSig}>=TH)\end{aligned} \tag{66}$$

When the process at step S508 ends, the encoding process ends and the processing returns to FIG. 9.

By executing the encoding process in such a manner as described above, the image encoding apparatus 100 can skip an encoding process of the primary transform identifier pt_idx in the case where transform quantization bypass is applied. In particular, reduction of the processing amount and the code amount relating to encoding of the primary transform identifier pt_idx can be reduced.

Further, there is no restriction to the conditional expression (66) given hereinabove, and the conditional expression (66) may be changed to a conditional expression (67) given below such that the primary transform identifier pt_idx is encoded only in the case of a luminance. In particular, in the case where an identifier cIdx indicative of a color space indicates a value Luma (=0) of the luminance, the primary transform identifier pt_idx is encoded, but in the case where cIdx indicates a color difference Cb (=1) or Cr (=2), encoding of the primary transform identifier pt_idx is omitted.

$$\begin{aligned}\text{Logical value} = &(\text{cIdx}==\text{Luma}\ \&\&\ st\_\text{enabled\_flag}\\ &\&\&\ (\text{transquant\_bypass\_flag}==0\|ts\_\text{flag}==0)\\ &\&\&\ \text{numSig}>=TH)\end{aligned} \tag{67}$$

It is to be noted that the conditions of the conditional expressions (66) and (67) may be combined with each other.

It is to be noted that the encoding process described above may be subject to change of the processing order of the steps or change of the substance of the processes within a range within which it can be carried out. Further, the syntax and the conditional expressions (66) and (67) given hereinabove can be changed in terms of arithmetic operation thereof within a range within which it can be carried out.

<Supplement: Skip of Encoding of CU Primary Transform Flag (Adaptive Primary Transform Flag)>

Although the image encoding apparatus 100 described above is directed to an example in which, in the case where transform quantization bypass is applied, an encoding process of the primary transform identifier pt_idx in a unit of a transform block is skipped, the image encoding apparatus is not limited to this. For example, in a unit of a CU, a CU primary transform flag cu_pt_flag (also referred to as adaptive primary transform flag apt_flag) indicative of whether or not a Primary transform identifier pt_idx in a unit of transform block is to be encoded is encoded in response to the value of the transform quantization bypass flag transquant_bypass_flag.

In the case where the CU primary transform flag cu_pt_flag is 1 (true), encoding of the primary transform identifier pt_idx in a unit of a transform block is performed, but in the case where the CU primary transform flag cu_pt_flag is 0 (false), encoding of the primary transform identifier pt_idx in a unit of a transform block may be omitted. In this case, the encoding section 114 further includes a CU primary transform flag encoding section 403 not depicted.

The CU primary transform flag encoding section 403 performs a process relating to encoding of the CU primary transform flag cu_pt_flag that is information relating to permission of encoding of the primary transform identifier pt_idx in a unit of a TU. Encoding of the CU primary transform flag cu_pt_flag by the CU primary transform flag encoding section 403 is performed, for example, on the basis of following pseudo codes.

```
If (!transquant_bypass_flag && pt_enabled_flag)
{
encode cu_pt_flag
}
```

In particular the CU primary transform flag encoding section 403 encodes the CU primary transform flag cu_pt_flag when the transform quantization bypass flag transquant_bypass_flag is 0 (false) and besides the primary transform validity flag pt_enabled_flag is 1 (true), but omits encoding of the CU primary transform flag cu_pt_flag in any other case (the transform quantization bypass flag transquant_bypass_flag is 1 (true) or the primary transform validity flag pt_enabled_flag is 0 (false)). In particular, in the case where the transform quantization bypass flag is applied, there is no necessity to transmit the CU primary transform flag cu_pt_flag to the decoding side. Accordingly, the CU primary transform flag encoding section 403 skips encoding of the CU primary transform flag cu_pt_flag. Since this makes it possible to skip encoding of redundant information, it is possible to suppress increase of the load of an encoding process and suppress degradation of the encoding efficiency.

It is to be noted that, in this case, the encoding condition of the primary transform identifier pt_idx by the primary transform identifier encoding section 402 is based, for example, or the following pseudo codes.

```
if (cu_pt_flag && ts_flag==0 && numSig >= TH)
{
encode pt_idx
}
```

In particular, the primary transform identifier encoding section 402 encodes the primary transform identifier pt_idx when the CU primary transform flag cu_pt_flag is 1 (true) and the transform skip flag ts_flag is 0 (false) and besides the non-zero coefficient number numSig is equal to or greater than a threshold value but omits encoding of the primary transform identifier pt_idx in any other case (the CU primary transform flag cu_pt_flag is 0 (false) or the transform skip flag ts_flag is 1 (true) or else the non-zero coefficient number numSig is smaller than the threshold value TH). In particular, in the case where the CU primary transform flag is 0, it is not necessary to transmit the primary transform identifier pt_idx to the decoding side. Accordingly, the primary transform identifier encoding section 402 skips encoding of the primary transform identifier pt_idx. Since this makes it possible to skip encoding of redundant information, it is possible to suppress increase of the load of an encoding process and suppress degradation of the encoding efficiency.

<Flow of Primary Transform Identifier Encoding Process>

Figure 37:
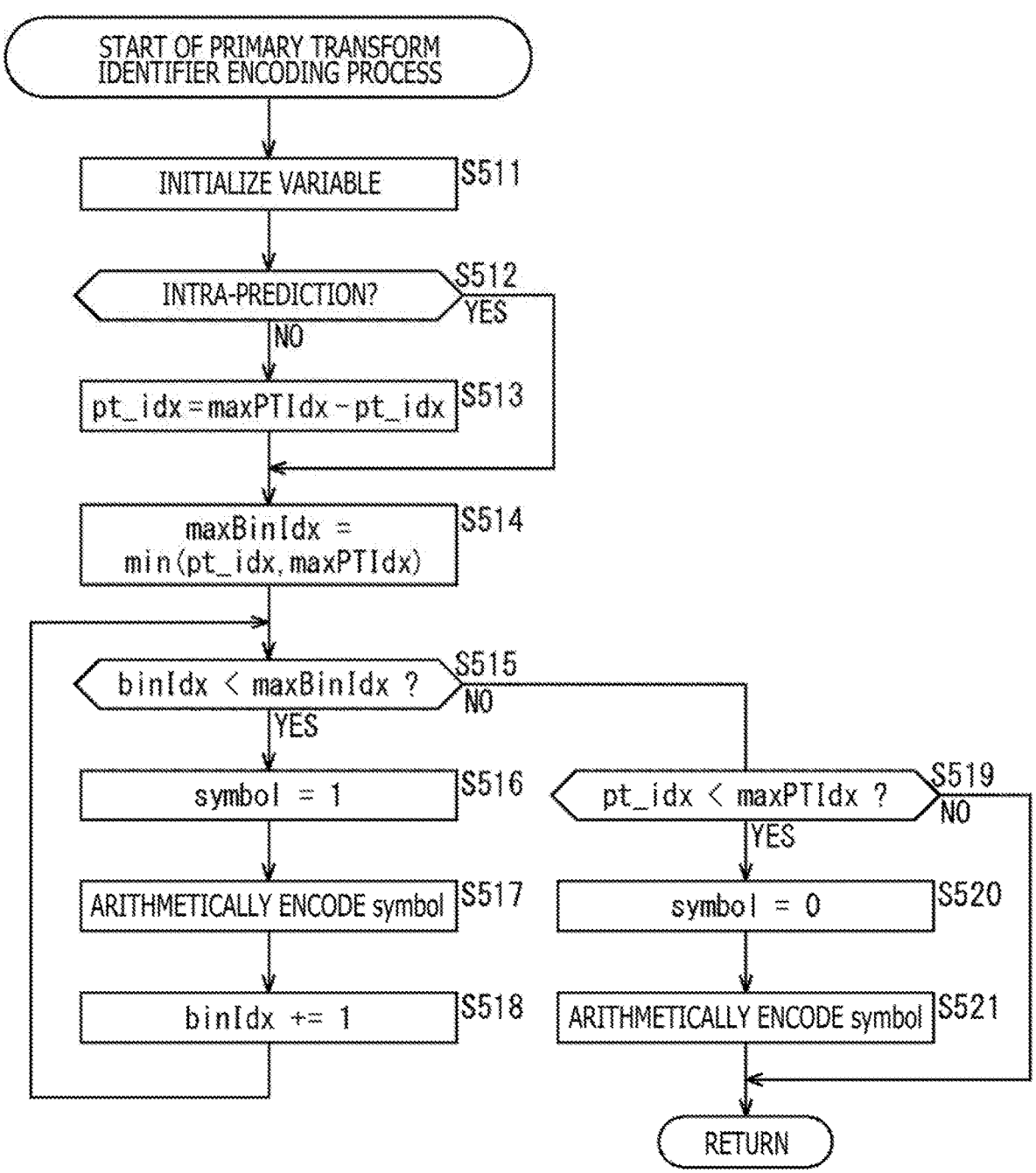
FIG. 37 is a flow chart illustrating an example of a flow of a primary transform identifier encoding process.

Now, an example of a flow of the primary transform identifier encoding process executed at step S508 of FIG. 36 with reference to a flow chart of FIG. 37.

After the primary transform identifier encoding process is started, the primary transform identifier encoding section 402 performs initialization of variables at step S511. For example, the primary transform identifier encoding section 402 sets maxPTIdx that is a maximum value of the primary transform identifier pt_idx to 3 (maxPTIdx=3).

At step S512, the primary transform identifier encoding section 402 refers to the prediction mode information Pinfo to decide whether a CU including a processing target transform block is intra prediction or inter prediction. In the case where it is decided that the CU is inter prediction, the processing advances to step S513.

At step S513, the primary transform identifier encoding section 402 corrects the value of the primary transform identifier pt_idx as given by the following expression (68).

$$pt\_idx = \text{maxPTIdx} - pt\_idx \qquad (68)$$

The appearance probability of values of the primary transform identifier pt_idx has a tendency that it is opposite between intra prediction and inter prediction. Therefore, in order that, in the case of intra prediction, the primary transform identifier encoding section 402 performs arithmetic encoding setting a value (0) whose appearance frequency is highest to 0, a value (1) whose appearance frequency is second highest to 1, a value (2) whose appearance frequency is third highest to 2, and a value (3) whose appearance frequency is fourth highest to 3, and in the case of inter prediction, the primary transform identifier encoding section 402 performs arithmetic encoding setting a value (3) whose appearance frequency is highest to 0, a value (2) whose appearance frequency is second highest to 1, a value (3) whose appearance frequency is third highest to 2, and a value (0) whose appearance frequency is fourth highest to 3, the value of the primary transform identifier pt_idx that is made a target of arithmetic encoding is changed as indicated by the expression (68) given hereinabove.

After the process at step S513 ends, the processing advances to step S514. On the other hand, in the case where it is decided at step S512 that the CU is intra prediction, the processing advances to step S514.

At step S514, the primary transform identifier encoding section 402 derives maxBinIdx indicative of the length of a bin string in the case where the primary transform identifier pt_idx is binarized with by TU as indicated by an expression (69) given below. In particular, a lower value between the primary transform identifier pt_idx and the maximum value maxPTIdx of the primary transform identifier pt_idx is determined as the value of maxBinIdx.

$$\text{maxBinIdx} = \min(pt\_idx, \text{maxPTIdx}) \qquad (69)$$

At step S515, the primary transform identifier encoding section 402 decides whether the value of binIdx indicative of the position of the bin at present of the bin string obtained by binarizing the primary transform identifier pt_idx is smaller than the maximum value maxBinIdx of binIdx. In the case where it is decided that the value of binIdx is smaller than the value of maxBinIdx (binIdx<maxBinIdx), the processing advances to step S516.

At step S516, the primary transform identifier encoding section 402 sets the value of a symbol of the bin at the position of binIdx=i to 1 (symbol=1).

At step S517, the primary transform identifier encoding section 402 arithmetically encodes the symbol of the bin at the position of binIdx=1 in the bin string of the binarized primary transform identifier pt_idx.

Here, the primary transform identifier encoding section 402 uses, when it arithmetically transforms the bin at the position of binIdx=i, a context according to each binIdx as depicted in FIG. 38 to perform arithmetic encoding. For example, in the case of M0 of FIG. 38, an example is depicted in which arithmetic encoding is performed in a bypass mode in which no context is used in regard to all bins of binIdx=0 to 2 it is to be noted that the bypass mode is a mode in which arithmetic encoding is performed assuming that the appearance probabilities of the symbol 0 and the symbol 1 are equal to each other.

Meanwhile, in the case of M1 of FIG. 38, an example is depicted in which, for the bin of binIdx=0 (top), arithmetic encoding is performed in a regular mode in which a context is used and, for the bins of binIdx=1 to 2, arithmetic encoding is performed in the bypass mode. It is to be noted that the regular mode is a mode in which arithmetic encoding is performed while the appearance probabilities of the symbol 0 and the symbol 1 are updated. For example, in the case of M1, for the bin of binIdx=0, in the case of intra prediction, the value of an index ctxInc that designates a context is set to 0, but in the case of inter prediction, 1 is allocated.

Meanwhile, in the case of M2 of FIG. 38, an example is depicted in which, for the bins of binIdx=0 to 1, arithmetic encoding is performed in the regular mode in which a context is used and, for the bin of binIdx=2, arithmetic encoding is performed in the bypass mode. For example, in the case of M2, for the bin of binIdx=0, in the case of intra prediction, the value of the index ctxInc that designates a context is set to 0, and is the case of inter prediction, 1 is allocated. Meanwhile, for the bin of binIdx=1, in the case of intra prediction, the value of the index ctxInc that designates a context is set to 2 and, in the case of inter prediction, 3 is allocated.

Further, in M1 and M2 of FIG. 38, to the bin at the position of binIdx=i that is a target of arithmetic encoding in the regular mode, the context index ctxInc that designates different contexts between intra prediction and inter prediction is allocated. However, the tendency that the appearance probability of values of the primary transform identifier pt_idx is opposite between intra prediction and inter prediction in the expression (68) given hereinabove is utilized to make such modification that, for the primary transform identifier pt_idx, in the case of intra prediction, a value (0) whose appearance frequency is highest is set to 0, a value (1) whose appearance frequency is second highest is set to 1, a value (2) whose appearance frequency is third highest is set to 2, and a value (3) whose appearance frequency is fourth highest is set to 3, and in the case of inter prediction, a value (3) whose appearance frequency is highest is set to 0, a value (2) whose appearance frequency is second highest is set to 1, a value (3) whose appearance frequency is third highest is set to 2, and a value (0) whose appearance frequency is fourth highest is set to 3. By the modification, the appearance possibility that the symbol of the bin of binIdx=0 of the primary transform identifier pt_idx after the expression (68) becomes 0 or 1 can be made equal between intra prediction and inter prediction. Accordingly, in the cases of intra prediction and inter prediction, a context index ctxInc that designates a same context to the bin at the position of binIdx=i that becomes a target of arithmetic encoding in the regular mode may be allocated. In this case, while an encoding efficiency equivalent to that in the case where a context index ctxInc that designates contexts different between intra prediction and inter prediction is achieved, the memory size for retaining contexts can be reduced.

For example, in the case of M3 of FIG. 38, an example is indicated in which, for the bin of binIdx=0 (top), arithmetic encoding is performed in the regular mode in which a context is used, and for the bins of binIdx=1 to 2, arithmetic encoding is performed in the bypass mode. In the case of M3, for the bin of binIdx=0, the value of the index ctxInc that designates a context is set to 0 irrespective of intra prediction or intra prediction.

Further, in the case of M4 of FIG. 38, an example is depicted in which, for the bins of binIdx=0 to 1, arithmetic encoding is performed in the regular mode in which a context is used, and for the bin of binIdx=2, arithmetic encoding is performed in the bypass mode. In the case of M4, irrespective of intra prediction or inter prediction, for the bin of binIdx=0, the value of the index ctxInc that designates a context is set to 0, and for the bin of binIdx=1, the value of the index ctxInc that designates a context is set to 1.

By using M0 of FIG. 38, arithmetic encoding is performed all in the bypass mode without performing arithmetic encoding in the regular mode that uses a context, and therefore, a bin string can be arithmetically encoded at a high speed in comparison with that by the method disclosed in NPL 1 and besides the memory size for retaining contexts can be reduced in comparison with that by the related art.

Further, by using M1 of FIG. 38, for the top bin (binIdx=0), arithmetic encoding in the regular mode is which a context is used is performed while the remaining bins are arithmetically encoded in the bypass mode. Therefore, a bin string can be arithmetically encoded at a high speed in comparison with that by the method disclosed in NPL 1 and besides the memory size for retaining contexts can be reduced. Also the encoding efficiency is improved.

The merit in use of M2 of FIG. 38 is that, since, for the bins of binIdx=0 to 1, arithmetic encoding is performed in the regular mode in which a context is used and the remaining bins are arithmetically encoded in the bypass mode, a bin string can be arithmetically encoded at a high speed in comparison with that by the method disclosed in NPL 1. Also the encoding efficiency is improved.

Meanwhile, in the case of M3 of FIG. 38, for the top bin (binIdx=0), a context index that designates a same context irrespective of intra prediction or inter prediction is allocated. Accordingly, in comparison with M1, while an equivalent processing amount and an equivalent encoding efficiency are achieved, the memory size for retaining contexts can be reduced.

In the case of M4 of FIG. 38, for the bins of binIdx=0 to 1, a context index that designates a same context irrespective of intra prediction or inter prediction is allocated. Accordingly, in comparison with M2, while an equivalent processing amount and an equivalent encoding efficiency are achieved, the memory size for retaining contexts can be reduced.

At step S518, the primary transform identifier encoding section 402 updates the value of the variable binIdx (binIdx+=1). After the process at step S518 ends, the processing returns to step S515 and the succeeding processes are repeated. In particular, the processes at steps S515 to S518 are repeated until after it is decided at step S515 that the value of binIdx is equal to or greater than the value of minBinIdx. In the case where it is decided at step S515 that the value of binIdx is equal to or greater than the value of minBinIdx, the processing advances to step S519.

At step S519, the primary transform identifier encoding section 402 decides whether or not the primary transform identifier pt_idx is smaller than the maximum value maxPTIdx of the primary transform identifier pt_idx. In the case where it is decided that the value of the primary transform identifier pt_idx is smaller than the value of maxPTIdx (pt_idx<maxPTIdx), the processing advances to step S520.

At step S520, the primary transform identifier encoding section 402 sets the value of the symbol of the bin at the position of binIdx=i to 0 (symbol=0).

At step S521, the primary transform identifier encoding section 402 arithmetically encodes the symbol of the bin at the position of binIdx=i in the bin string of the binarized primary transform identifier pt_idx.

After the process at step S521 ends, the primary transform identifier encoding process ends, and the processing returns to FIG. 36. Meanwhile, in the case where it is decided at step S519 that the value of the primary transform identifier pt_idx is equal to or greater than the value of maxPIIdx (pt_idx>=maxPTIdx), the processes at steps S520 and S521 are skipped and the primary transform identifier encoding process ends, and the processing returns to FIG. 36.

Pseudo codes of the processes described above are depicted in A of FIG. 39. This makes it possible to implement binarization using such TU (truncated unary binarization) as depicted in B of FIG. 39. For example, if the value of the primary transform identifier pt_idx is 0, then a bit string 0 is obtained. On the other hand, for example, if the value of the primary transform identifier pt_idx is 1, then a bit string 10 is obtained.

This makes it possible to suppress degradation of the encoding efficiency of the primary transform identifier pt_idx.

Further, by performing the process at step S513, the nature that the appearance probability of the primary transform identifier pt_idx has a tendency that it is opposite between intra prediction and inter prediction can be utilized, and more efficient arithmetic encoding can be performed.

Further, in the case where M0 of FIG. 38 is used in the process at step S517, since arithmetic encoding is all performed in the bypass mode without performing arithmetic operation in the regular mode in which a context is used, a bin string can be arithmetically encoded at a high speed in comparison with that by the method disclosed in NPL 1 and besides the memory size for retaining contexts can be reduced in comparison with that according to the related art.

Meanwhile, in the case where M1 of FIG. 38 is used in the process at step S517, since arithmetic encoding in the regular mode in which a context is used is performed for the top bin (binIdx=0) and arithmetic encoding in the bypass mode is performed for the remaining bins, a bin string can be arithmetically encoded at a high speed in comparison with that by the method disclosed in NPL 1 and besides the memory size for retaining contexts can be reduced. Also the encoding efficiency is improved.

Furthermore, in the case where M2 of FIG. 38 is used in the process at step S517, since arithmetic encoding in the regular mode in which a context is used is performed for the bins of binIdx=0 to 1 and arithmetic encoding in the bypass mode is performed for the remaining bin, a bin string can be arithmetically encoded at a high speed in comparison with that by the method disclosed in NPL 1. Also the encoding efficiency is improved.

Meanwhile, in the case where M3 of FIG. 38 is used in the process at step S517, since arithmetic encoding in the regular mode in which a same context is used irrespective of intra encoding or inter encoding is performed for the top bin (binIdx=0) and arithmetic encoding in the bypass mode is performed for the remaining bins, while an equivalent processing amount and an equivalent encoding efficiency are achieved in comparison with those in the case of M1, the memory size for retaining contexts can be reduced.

Furthermore, in the case where M4 of FIG. 38 is used in the process at step S517, arithmetic encoding in the regular mode in which a same context is used irrespective of intra encoding or inter encoding is performed for the bins of binIdx=0 to 1 and arithmetic encoding in the bypass mode is performed for the remaining bin. Accordingly, while an equivalent processing amount and an equivalent encoding efficiency in comparison with those in the case of M2 are achieved, the memory size for retaining contexts can be reduced.

It is to be noted that change of the processing order of the steps or change of the substance of the processes may be performed within a range within which it can be carried out. For example, arithmetic encoding may be set with the symbol at step S516 set to 0 and with the symbol at step S520 set to 1. In this case, binarization of the primary transform identifier pt_idx is performed using TU depicted in C FIG. 39.

Further, in place of the processes at steps S514 to S521, a lookup table of TU depicted in B of FIG. 39 or C of FIG. 39 may be referred to determine a bin string from the value of the primary transform identifier pt_idx to encode the bin string.

<Decoding Section>

Now, an image decoding apparatus 200 is described. Also in this case, the image decoding apparatus 200 has a configuration basically similar to that of the case of the first embodiment. However, the image decoding apparatus 200 in this case includes a decoding section that skips, in the case where dequantization for quantization transform coefficient levels obtained by decoding of encoded data, inverse secondary transform for transforming secondary transform coefficients obtained by the dequantization of the quantization transform coefficient levels into primary transform coefficients and inverse primary transform for transforming the primary transform coefficients into a prediction residual that is a difference between an image and a prediction image of the image are to be skipped, decoding of encoded data of first information relating to the substance of the inverse primary transform. In short, the decoding section 211 in this case skips, in the case where dequantization for quantization transform coefficient levels obtained by decoding of encoded data, inverse secondary transform for transforming secondary transform coefficients obtained by the dequantization of the quantization transform coefficient levels into primary transform coefficients and inverse primary transform for transforming the primary transform coefficients into a prediction residual that is a difference between an image and a prediction image of the image are to be skipped, decoding of encoded data of first information relating to the substance of the inverse primary transform.

Figure 40:
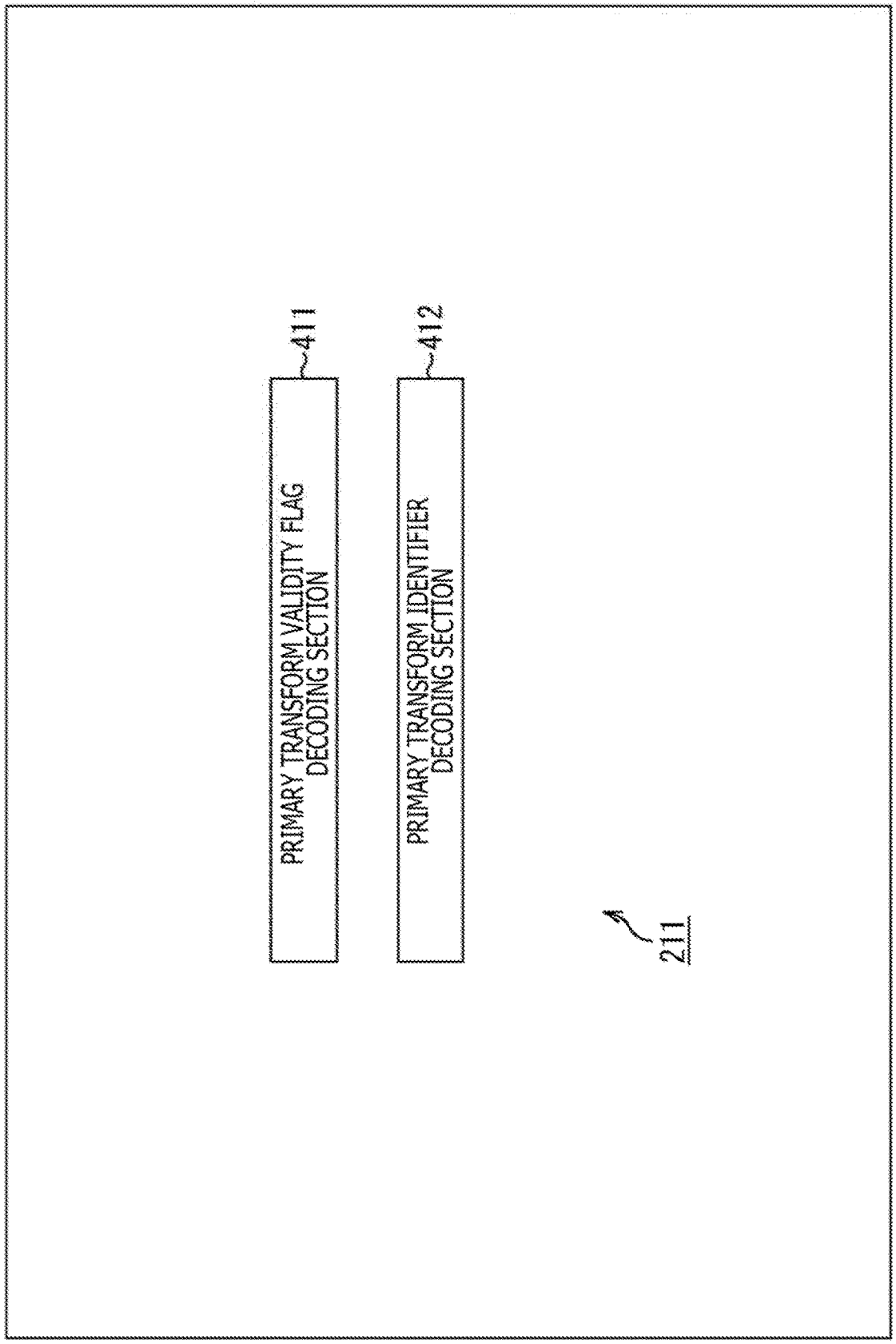
FIG. 40 is a block diagram depicting a principal configuration example of a decoding section.

FIG. 40 is a functional block diagram depicting an example of principal functions relating to decoding of a primary transform identifier, which is implemented by the decoding section 211 in this case executing a program or the like. As depicted in FIG. 40, the decoding section 211 in this case includes, as functions relating to decoding of a primary transform identifier by executing a program, for example, a primary transform validity flag decoding section 411 and a primary transform identifier decoding section 412.

The primary transform validity flag decoding section 411 performs a process relating to decoding of encoded data of a primary transform validity flag pt_enabled_flag that is information relating to permission of inverse primary transform. The primary transform identifier decoding section 412 performs a process relating to decoding of a primary transform identifier pt_idx that is information relating to the substance of inverse primary transform.

<Flow of Decoding Process>

Figure 41:
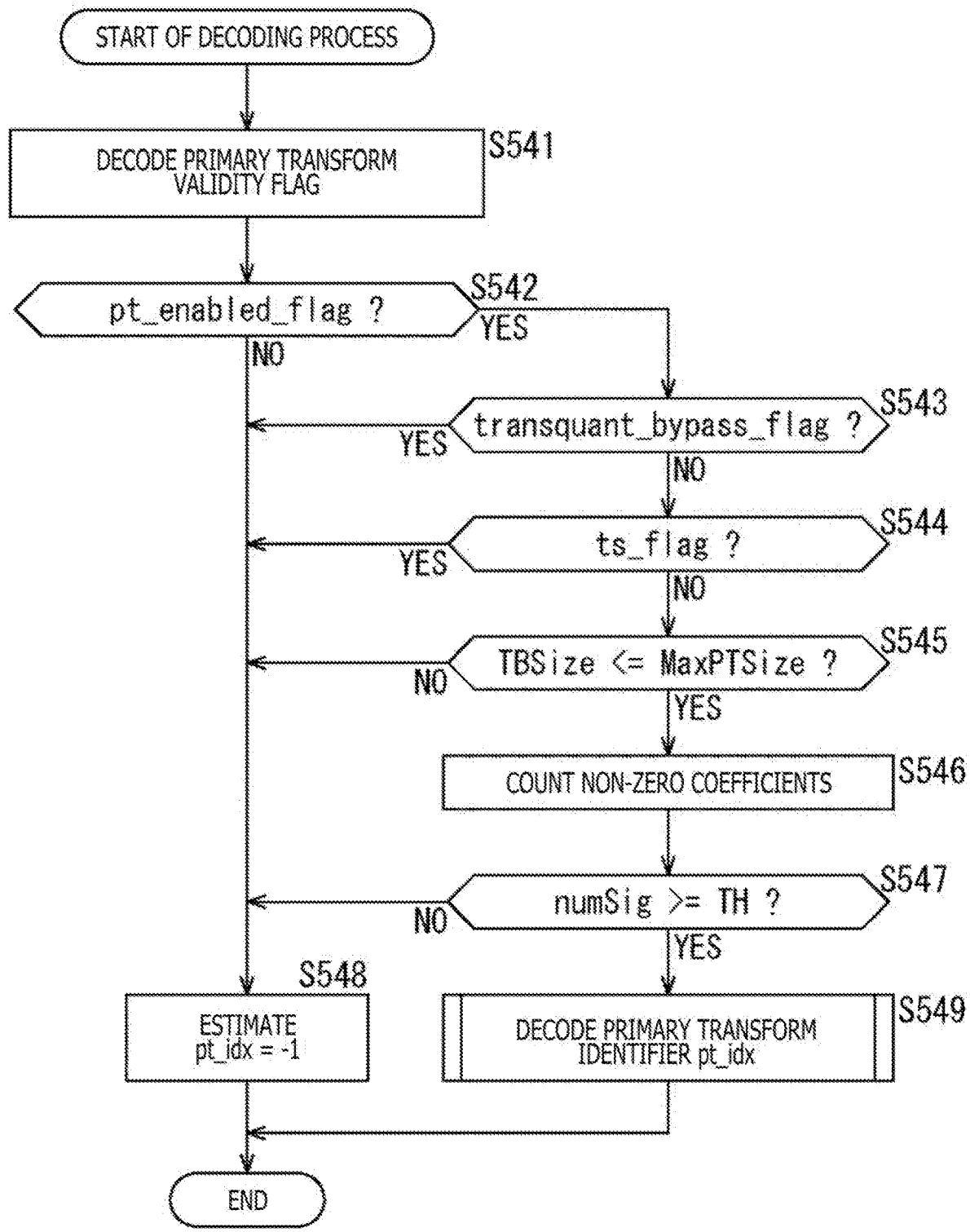
FIG. 41 is a flow chart illustrating an example of a flow of a decoding process.

Now, an example of a flow of processes executed by the image decoding apparatus 200 is described. In this case, the image decoding apparatus 200 performs an image decoding process basically similarly to that in the case of the first embodiment. However, in this case, at step S201 (FIG. 13) of the image decoding process, the image decoding apparatus 200 performs decoding of encoded data of the primary transform identifier pt_idx and so forth in response to the value of the transform quantization bypass flag transquant_bypass_flag and so forth. An example of a flow of the decoding of encoded data of the primary transform identifier pt_idx and so forth is described with reference to a flow chart of FIG. 41. In short, the decoding process depicted in FIG. 41 is executed as part of the decoding process performed at step S201 of FIG. 13. Decoding of other encoding parameters and encoded data of quantization transform coefficient levels level is performed by an arbitrary method.

After the decoding process is started, at step S541, the primary transform validity flag decoding section 411 decodes encoded data of the primary transform validity flag pt_enabled_flag from a bit stream (encoded data) and outputs the resulting data as part of header information.

At step S542, the primary transform identifier decoding section 412 decides whether or not a primary transform validity flag pt_enabled_flag included in the header information Hinfo is 1 (true). In the case where it is decided that the primary transform validity flag pt_enabled_flag is 0, processes at steps S543 to S547 are skipped, and the processing advances to step S548.

If execution of inverse primary transform is not permitted, then inverse primary transform is not executed and the primary transform identifier pt_idx is not transmitted from the encoding side, and therefore, the primary transform identifier decoding section 412 skips decoding of encoded data of the primary transform identifier pt_idx. Since this makes it possible to skip decoding of redundant information, it is possible to suppress increase of the load of a decoding process and suppress degradation of the encoding efficiency.

On the other hand, in the case where it is decided at step S542 that the primary transform validity flag pt_enabled_flag is 1, the processing advances to step S543.

At step S543, the primary transform identifier decoding section 412 decides whether or not the transform quantization bypass flag transquant_bypass_flag included in the transform information Tinfo is 1 (true). In the case where it is decided that the transform quantization bypass flag transquant_bypass_flag is 1, namely, in the case where it is decided that inverse transform (inverse secondary transform and inverse primary transform) and dequantization are to be skipped (bypassed), processes at steps S543 to S547 are skipped, and the processing advances to step S548.

If inverse transform and dequantization are to be bypassed, then the primary transform identifier pt_idx is unnecessary. Accordingly, in this case, since the primary transform identifier pt_idx is not transmitted from the encoding side, the primary transform identifier decoding section 412 skips decoding of the encoded data of the primary transform identifier pt_idx. Since this makes it possible to skip decoding of redundant information, it is possible to suppress increase of the load of a decoding process and suppress degradation of the encoding efficiency.

In the case where it is decided at step S543 that the transform quantization bypass flag transquant_bypass_flag is 0, namely, in the case where it is decided that inverse transform and dequantization are not to be skipped (bypassed), the processing advances to step S544.

At step S544, the primary transform identifier decoding section 412 decides whether or not the transform skip flag ts_flag included in the transform information Tinfo is 1 (true). In the case where it is decided that the transform skip flag ts_flag is 1, namely, is the case where it is decided that inverse transform (inverse primary transform) is to be skipped, processes at steps S545 to S547 are skipped, and the processing advances to step S548.

If inverse primary transform is to be skipped, then the primary transform identifier pt_idx is unnecessary. Accordingly, in this case, since the primary transform identifier pt_idx is not transmitted from the encoding side, the primary transform identifier decoding section 412 skips decoding of encoded data of the primary transform identifier pt_idx. Since this makes it possible to skip decoding of redundant information, it is possible to suppress increase of the load of a decoding process and suppress degradation of the encoding efficiency.

In the case where it is decided at step S544 that the transform skip flag ts_flag is 0, namely, is the case where it is decided that inverse transform (inverse primary transform) is to be executed, the processing advances to step S545.

At step S545, the primary transform identifier decoding section 412 decides whether or not the size TBSize of the transform block of the processing target is equal to or smaller than a maximum primary transform block size MaxPTSize (whether or not the logical value of the conditional expression (TBSize<=MaxPTSize) is 1 (true)). In the case where it is decided that the size TBSize of the transform block of the processing target is greater than the maximum primary transform block size MaxPTSize (TBSize>MaxPTSize), processes at steps S546 and S547 are skipped and the processing advances to step S548.

The maximum primary transform block size MaxPTSize is information indicative of a maximum block size with which execution of inverse primary transform is permitted. In particular, in the case where the size of the transform block is greater than the maximum primary transform block size MaxPTSize, execution of inverse primary transform is not permitted, and therefore, the primary transform identifier pt_idx is not transmitted from the encoding side. Accordingly, the primary transform identifier decoding section 412 skips decoding of encoded data of the primary transform identifier pt_idx. Since this makes it possible to skip decoding of redundant information, it is possible to suppress increase of the load of a decoding process and suppress degradation of the encoding efficiency.

In the case where it is decided at step S545 that the size TBSize of the transform block of the processing target is equal to or smaller than the maximum primary transform block size MaxPTSize (TBSize<=MaxPTSize), the processing advances to step S546.

It is to be noted that the conditional expression (TBSize<=MaxPTSize) may be replaced by another conditional expression (log2TBSize<=log2MaxPTSize) using a logarithm value log2TBSize with base 2 of the TB size and a logarithm value log2MaxPTSize with base 2 of the maximum primary transform skip block size MaxPTSize.

At step S546, the primary transform identifier decoding section 412 refers to the residual information Rinfo to derive the total number numSig of non-zero coefficients existing in the transform block (total number of sig_coeff_flag==1) as indicated by the following expression (70).

$$\text{sumSig} = \Sigma(\text{sig\_coeff\_flag}(i,j)) \ (i=0 \ldots \text{TBSize}-1, j=0 \ldots \text{TBSize}-1) \quad (70)$$

At step S547, the primary transform identifier decoding section 412 decides whether or not the number numSig of non-zero coefficients in the transform block is equal to or greater than a threshold value TH (numSig>=TH). In the case where it is decided that the total number numSig of non-zero coefficients is smaller than the predetermined threshold value TH (numSig<TH), the processing advances to step S548.

In the case where the total number numSig of non-zero coefficients is smaller than the predetermined threshold value TH, namely, in the case of a sparse residual signal in which the number of non-zero coefficients is small, since there is the possibility that the energy compaction may degrade and the encoding efficiency may degrade, in order to suppress degradation of the encoding efficiency, it is desirable to apply transform skip or predetermined inverse orthogonal transform (for example, inverse transform of the DPI-Type 2). In short, in this case, the primary transform identifier pt_idx is not transmitted from the encoding side. Accordingly, the primary transform identifier decoding section 412 skips decoding of the encoded data of the primary transform identifier pt_idx. Since this makes it possible to skip decoding of redundant information, it is possible to suppress increase of the load of a decoding process and suppress degradation of the encoding efficiency.

At step S548, the primary transform identifier decoding section 412 skips decoding of the primary transform identifier pt_idx. Further, in this case, the primary transform identifier decoding section 412 estimates that the value of the primary transform identifier pt_idx is a value (for example, −1) of an identifier, which indicates use of a predetermined orthogonal transform (for example, of the DCT-Type 2) for primary transform Phor in the horizontal direction and primary transform Pver in the vertical direction. In particular, the primary transform identifier decoding section 412 sets the value of the primary transform identifier pt_idx to −1 (pt_idx=−1). After the process at step S548 ends, the decoding process ends and the processing returns to FIG. 13.

In the case where it is decided at step S547 that the total number numSig of non-zero coefficients is equal to or greater than the predetermined threshold value TH (numSig>=TH), the processing advances to step S549.

At step S549, the primary transform identifier decoding section 412 decodes the encoded data of the primary transform identifier pt_idx. Details of the decoding are hereinafter described.

In short, only in the case where the conditional expression (66) given hereinabove is 1 (true), encoded data of the primary transform identifier pt_idx is decoded. This corresponds to the seventh stage from above of the syntax described hereinabove with reference to FIG. 34.

After the process at step S549 ends, the decoding process ends, and the processing returns to FIG. 13.

By executing the decoding process in such a manner as described above, the image decoding apparatus 200 can skip, in the case where transform quantization bypass is to be applied, a decoding process of the primary transform identifier pt_idx. In other words, reduction of the process amount and the code amount relating to decoding of the primary transform identifier pt_idx can be achieved.

It is to be noted that the decoding process described above may be subject to change of the processing order of the steps or change of the substance of the processes within a range within which it can be carried out. Further, the syntax and the conditional expression (66) given hereinabove can be changed in terms of arithmetic operation thereof within a range within which it can be carried out.

Although the image decoding apparatus 200 described above is directed to an example in which, in the case where transform quantization bypass is applied, a decoding process of the primary transform identifier pt_idx in a unit of a transform block is skipped, the image decoding apparatus is not limited to this. For example, in a unit of a CU, the CU primary transform flag cu_pt_flag indicative of whether or not a primary transform identifier pt_idx in a unit of a transform block is to be decoded (encoded) is decoded in response to the value of the transform quantization bypass flag transquant_bypass_flag. In the case where the CU primary transform flag cu_pt_flag is 1 (true), decoding of the primary transform identifier pt_idx in a unit of a transform block is performed, but in the case where the CU primary transform flag cu_pt_flag is 0 (false), decoding of the primary transform identifier pt_idx in a unit of a transform block may be omitted and the value of the primary transform identifier pt_idx may be estimated to be −1. In this case, the decoding section 214 further includes a CU primary transform flag decoding section 413 not depicted.

The CU primary transform flag decoding section 413 performs a process relating to decoding of the CU primary transform flag cu_pt_flag that is information relating to permission of decoding (encoding) of the primary transform identifier pt_idx in a unit of a TU. Decoding of the CU primary transform flag cu_pt_flag by the CU primary transform flag decoding section 413 is performed, for example, on the basis of the following pseudo codes.

```
If (!transquant_bypass_flag && pt_enabled_flag)
{
decode cu_pt_flag
}
```

In particular, the CU primary transform flag decoding section 413 decodes the CU primary transform flag cu_pt_flag when the transform quantization bypass flag transquant_bypass_flag is 0 (false) and besides the primary transform validity flag pt_enabled_flag is 1 (true), but in any other case (when the transform quantization bypass flag transquant_bypass_flag is 1 (true) or the primary transform validity flag pt_enabled_flag is 0 (false)), omits decoding of the CU primary transform flag cu_pt_flag and estimates the value of the CU primary transform flag cu_pt_flag to be 0. In particular, in the case where the transform quantization bypass flag is applied, the CU primary transform flag cu_pt_flag is not transmitted. Accordingly, the CU primary transform flag decoding section 413 skips decoding of the CU primary transform flag cu_pt_flag and estimates the value of the CU primary transform flag cu_pt_flag to be 0. Since this makes it possible to skip decoding of redundant information, it is possible to suppress increase of the load of a decoding process and suppress degradation of the encoding efficiency.

It is to be noted that, in this case, the decoding condition for the primary transform identifier pt_idx by the primary transform identifier decoding section 412 is based, for example, Cr the following pseudo codes.

```
if (cu_pt_flag && ts_flag==0 && numSig >= TH)
{
decode pt_idx
}
else {
pt_idx = -1
}
```

In particular, the primary transform identifier decoding section 412 decodes the primary transform identifier pt_idx when the CU primary transform flag cu_pt_flag 1 (true) and the transform skip flag ts_flag is 0 (false) and besides the non-zero coefficient number numSig is equal to or greater than the threshold value TH, but, in any other case (when the CU primary transform flag cu_pt_flag is 0 (false) or the transform skip flag ts_flag is 1 (true) or else the non-zero coefficient number numSig is smaller than the threshold value TH), omits decoding of the primary transform identifier pt_idx and estimates that the value of the primary transform identifier pt_idx is the value (−1) that indicates application of a predetermined orthogonal transform (for example, of the DCT-Type 2 or the like). In particular, in the case where the CU primary transform flag is 0, the primary transform identifier pt_idx is not transmitted to the decoding side. Accordingly, the primary transform identifier decoding section 412 skips decoding of the primary transform identifier pt_idx and estimates the value of the identifier as the as the value (−1) that indicates application of a predetermined orthogonal transform. Since this makes it possible to skip decoding of redundant information, it is possible to suppress increase of the load of a decoding process and suppress degradation of the encoding efficiency.

<Flow of Primary Transform Identifier Decoding Process>

Figure 42:
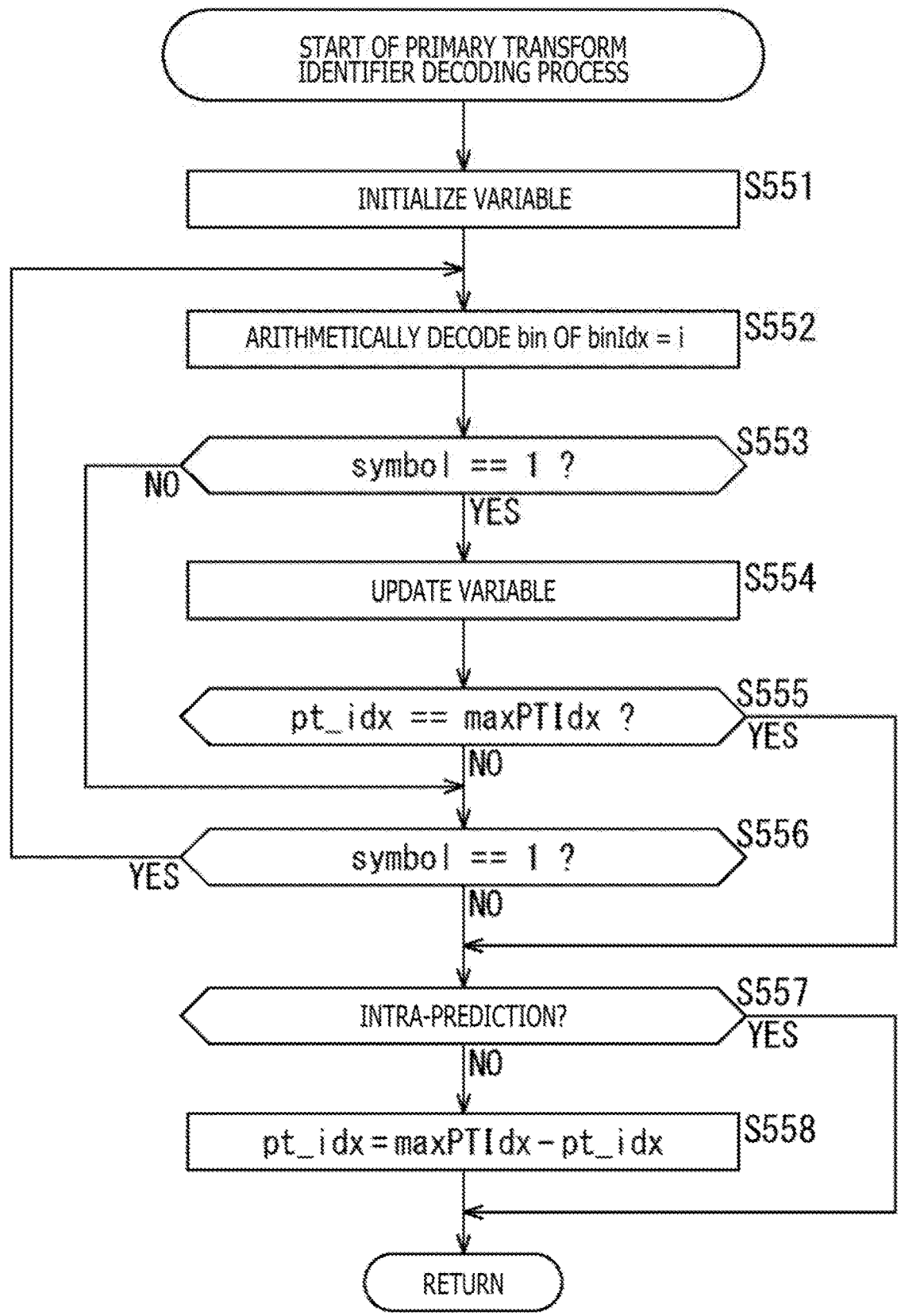
FIG. 42 is a flow chart illustrating an example of a flow of a primary transform identifier decoding process.

Now, an example of a flow of the primary transform identifier decoding process executed at step S549 of FIG. 41 is described with reference to a flow chart of FIG. 42.

After the primary transform identifier decoding process is started, the primary transform identifier decoding section 412 performs initialization of variables at step S551. For example, the primary transform identifier decoding section 412 sets the primary transform identifier pt_idx to 0 (pt_idx=0). Further, for example, the primary transform identifier decoding section 412 sets symbol that is a variable into which a value of a symbol obtained by arithmetically decoding one bin of a bit string of encoded data to 0 (symbol=0). Further, for example, the primary transform identifier decoding section 412 sets binIdx that is an index indicative of a position of a bin of a decoding target in the bit string of the encoded data of the primary transform identifier pt_idx to 0 (binIdx=0). Further, for example, the primary transform identifier decoding section 412 sets maxPTIdx that is a maximum value of the primary transform identifier pt_idx to 3 (maxPTIdx=3).

At step S552, the primary transform identifier decoding section 412 arithmetically decodes the bin at the position of binIdx=i in the bit string and sets the resulting value of the symbol to the variable symbol. Here, the primary transform identifier decoding section 412 performs, when the bin at the position of binIdx=i is to be arithmetically decoded, the arithmetic decoding using a context according to each binIdx as depicted in FIG. 38.

For example, in the case of M0 of FIG. 38, an example is indicated in which arithmetic decoding is performed in the bypass mode in which no context is used in regard to all bins of binIdx=0 to 2. It is to be noted that the bypass mode is a mode in which arithmetic decoding is performed assuming that the appearance probabilities of the symbol 0 and the symbol 1 are equal to each other.

Meanwhile, in the case of M1 of FIG. 38, an example is indicated in which, for the bin of binIdx=0 (top), arithmetic decoding is performed in the regular mode in which a context is used and, for the bins of binIdx=1 to 2, arithmetic decoding is performed in the bypass mode. It is to be noted that the regular mode is a mode in which arithmetic decoding is performed while the appearance probabilities of the symbol 0 and the symbol 1 are updated. For example, in the case of M1, for the bin of binIdx=0, in the case of intra prediction, the value of the index ctxInc that designates a context is set to 0, but in the case of inter prediction, 1 is allocated.

Meanwhile, in the case of M2 of FIG. 38, an example is indicated in which, for the bins of binIdx=0 to 1, arithmetic decoding is performed in the regular mode in which a context is used and, for the bin of binIdx=2, arithmetic decoding is performed in the bypass mode. For example, in the case of M2, for the bin of binIdx=0, in the case of intra prediction, the value of the index ctxInc that designates a context is set to 0, and in the case of inter prediction, 1 is allocated. Meanwhile, for the bin of binIdx=1, in the case of intra prediction, the value of the index ctxInc that designates a context is set to 2 and, in the case of inter prediction, 3 is allocated.

Further, in M1 and M2 of FIG. 38, to the bin at the position of binIdx=i that is a target of arithmetic decoding in the regular mode, the context index ctxInc that designates different contexts between intra prediction and inter prediction is allocated. However, in the image encoding apparatus 100, the tendency that the appearance probability of values of the primary transform identifier pt_idx is opposite between intra prediction and inter prediction in the expression (68) given hereinabove is utilized to make such modification that, for the primary transform identifier pt_idx, in the case of intra prediction, a value (0) whose appearance frequency is highest is set to 0, a value (1) whose appearance frequency is second highest is set to 1, a value (2) whose appearance frequency is third highest is set to 2, and a value (3) whose appearance frequency is fourth highest is set to 3, and in the case of inter prediction, a value (3) whose appearance frequency is highest is set to 0, a value (2) whose appearance frequency is second highest is set to 1, a value (3) whose appearance frequency is third highest is set to 2, and a value (0) whose appearance frequency is fourth highest is set to 3 to perform arithmetic encoding. By the modification, the appearance possibility that the symbol of the bin of binIdx=i of the primary transform identifier pt_idx after the expression (68) becomes 0 or 1 can be made equal between intra prediction and inter prediction. Accordingly, also in the image decoding apparatus 200, in the cases of intra prediction and inter prediction, a context index ctxInc that designates a same context to the bin at the position of binIdx=i that becomes a target of arithmetic decoding in the regular mode may be allocated. In this case, while an encoding efficiency equivalent to that in the case where a context index ctxInc that designates contexts different between intra prediction and inter prediction is allocated is achieved, the memory size for retaining contexts can be reduced.

For example, in the case of M3 of FIG. 38, an example is indicated in which, for the bin of binIdx=0 (top), arithmetic decoding is performed in the regular mode in which a context is used, and for the bins of binIdx=1 to 2, arithmetic decoding is performed in the bypass mode. In the case of M3, for the bin of binIdx=0, the value of the index ctxInc that designates a context is set to 0 irrespective of intra prediction or intra prediction.

Further, in the case of M4 of FIG. 36, an example is depicted in which, for the bins of binIdx=0 to 1, arithmetic decoding is performed in the regular mode in which a context is used, for the bin of binIdx=2, arithmetic decoding is performed in the bypass mode. In the case of M4, irrespective of intra prediction or inter prediction, for the bin of binIdx=0, the value of the index ctxInc that designates a context is set to 0, and for the bin of binIdx=1, the value of the index ctxInc that designates a context is set to 1.

By using M0 of FIG. 38, arithmetic decoding is performed all in the bypass mode without performing arithmetic decoding in the regular mode in which a context is used, and therefore, a symbol can be decoded at a high speed in comparison with that by the method disclosed in NPL 1 and besides the memory size for retaining contexts can be reduced in comparison with that by the method disclosed in NPL 1.

By using M1 of FIG. 38, for the top bin (binIdx=0), arithmetic decoding in the regular mode in which a context is used is performed while the remaining bins are arithmetically decoded in the bypass mode. Therefore, a symbol can be decoded at a comparatively high speed from a bin string in comparison with that by the method disclosed in NPL 1 and besides the memory size for retaining contexts can be reduced. Also the encoding efficiency is improved.

By using M2 of FIG. 38, since, for the bins of binIdx=0 to 1, arithmetic decoding is performed in the regular mode in which a context is used and the remaining bin is arithmetically decoded in the bypass mode, a symbol can be decoded at a high speed in comparison with that by the method disclosed in NPL 1. Also the encoding efficiency is improved.

Meanwhile, in the case of M3 of FIG. 38, to the top bin (binIdx=0), a context index that designates a same context irrespective of intra prediction or inter prediction is allocated. Accordingly, is comparison with M1, while an equivalent processing amount and an equivalent encoding efficiency are achieved, the memory size for retaining contexts can be reduced.

In the case of M4 of FIG. 38, to the bins of binIdx=0 to 1, a context index that designates a same context irrespective of intra prediction or inter prediction is allocated. Accordingly, in comparison with M2, while an equivalent processing amount and an equivalent encoding efficiency are achieved, the memory size for retaining contexts can be reduced.

At step S553, the primary transform identifier decoding section 412 decides whether the value of the symbol is 1. In the case where it is decided that the symbol is 1, the processing advances to step S554.

At step S554, the primary transform identifier decoding section 412 updates the values of the primary transform identifier pt_idx and the variable binIdx. For example, the primary transform identifier decoding section 412 increments the value of the primary transform identifier pt_idx by +1 (pt_idx+=1). Further, for example, the primary transform identifier decoding section 412 increments the value of the variable binIdx by +1 (binIdx+=1).

At step S555, the primary transform identifier decoding section 412 decides whether or not the value of the primary transform identifier pt_idx is equal to the maximum value maxPTIdx of the primary transform identifier pt_idx. In the case where the value of the primary transform identifier pt_idx is not equal to the maximum value maxPTIdx (pt_idx !=maxPTIdx), the processing advances to step S556. On the other hand, in the case where it is decided at step S553 that the symbol symbol is 0, the processing advances to step S556.

At step S556, the primary transform identifier decoding section 412 decides whether or not the value of the symbol symbol is 1. In the case where it is decided that the value of the symbol symbol is 1, the processing returns to step S552 and the processes at the succeeding steps are repeated.

On the other hand, in the case where it is decided at step S555 that the value of the primary transform identifier pt_idx is equal to the value of the maximum value maxPTIdx (pt_idx==maxPTIdx), the processing advances to step S557. Meanwhile, in the case where it is decided at step S556 that the value of the symbol symbol is 0, the processing advances to step S557.

At step S557, the primary transform identifier decoding section 412 refers to the prediction mode information Pinfo to decide whether a CU including the processing target transform block is intra prediction or inter prediction. In the case where it is decided that the CU is inter prediction, the processing advances to step S558.

At step S558, the primary transform identifier decoding section 412 corrects the value of the primary transform identifier pt_idx obtained by the decoding on the basis of the following expression (71).

$$pt\_idx = \text{maxPTIdx} - pt\_idx \qquad (71)$$

The appearance probability of values of the primary transform identifier pt_idx has a tendency that it is opposite between intra prediction and inter prediction. Therefore, in the case of intra prediction, arithmetic encoding is performed setting a value (0) whose appearance frequency is highest to 0, a value (1) whose appearance frequency is second highest to 1, a value (2) whose appearance frequency is third highest to 2, and a value (3) whose appearance frequency is fourth highest to 3, and in the case of inter prediction, arithmetic encoding is performed setting a value (3) whose appearance frequency is highest to 0, a value (2) whose appearance frequency is second highest to 1, a value (3) whose appearance frequency is third highest to 2, and a value (0) whose appearance frequency is fourth highest to 3. The primary transform identifier decoding section 412 performs processing as indicated by the expression (71) in order to restore collect allocation of such values of the primary transform identifier pt_idx.

After the process at step S558 ends, the primary transform identifier decoding process ends, and the processing returns to FIG. 41. On the other hand, in the case where it is decided at step S557 that the CU is intra prediction, the process at step S558 is skipped and the primary transform identifier decoding process ends, and the processing returns to FIG. 41.

Pseudo codes of the processes described above are depicted in A of FIG. 43. This makes it possible to implement multi-valuing (inverse binarization) in which such TU (truncated unary binarization) as depicted in B of FIG. 43 is used. For example, if the bit string is 0, then the value of the primary transform identifier pt_idx is 0. Meanwhile, for example, if the bit string is 10, then the value of the primary transform identifier pt_idx is 1.

This makes it possible to suppress degradation of the encoding efficiency of the primary transform identifier pt_idx.

Further, by performing the process at step S558, the nature that the appearance probability of the primary transform identifier pt_idx has a tendency that it is opposite between intra prediction and inter prediction can be utilized, and more efficient arithmetic decoding can be performed.

Further, in the case where M0 of FIG. 38 is used in the process at step S552, since arithmetic decoding is all performed in the bypass mode without performing arithmetic operation in the regular mode in which a context is used, a symbol can be decoded from a bin string at a high speed in comparison with that by the method disclosed in NPL 1 and besides the memory size for retaining contexts can be reduced in comparison with that by the method disclosed in NPL 1.

Meanwhile, in the case where M1 of FIG. 38 is used in the process at step S552, since arithmetic decoding in the regular mode in which a context is used is performed for the top bin (binIdx=0) and arithmetic decoding in the bypass mode is performed for the remaining bins, a symbol can be decoded from a bin string at a high speed in comparison with that by the method disclosed in NPL 1 and besides the memory size for retaining contexts can be reduced. Also the encoding efficiency is improved.

Further, in the case where M2 of FIG. 38 is used in the process at step S552, since arithmetic decoding in the regular mode in which a context is used is performed for the bins of binIdx=0 to 1 and arithmetic decoding in the bypass mode is performed for the remaining bin, a symbol can be decoded from a bin string at a high speed in comparison with that by the method disclosed in NPL 1. Also the encoding efficiency is improved.

Meanwhile, in the case where M3 of FIG. 38 is used in the process at step S552, arithmetic decoding in the regular mode in which a same context is used irrespective of intra prediction or inter prediction is performed for the top bin (binIdx=0) and arithmetic decoding in the bypass mode is performed for the remaining bins. Accordingly, while an equivalent processing amount and an equivalent encoding efficiency are achieved in comparison with those in the case of M1, the memory size for retaining contexts can be reduced.

Furthermore, in the case where M4 of FIG. 38 is used in the process at step S552, arithmetic decoding in the regular mode in which a same context is used irrespective of intra prediction or inter prediction is performed for the bins of binIdx=0 to 1 and arithmetic decoding in the bypass mode is performed for the remaining bin. Accordingly, while an equivalent processing amount and an equivalent encoding efficiency are achieved in comparison with those in the case of M2, the memory size for retaining contexts can be reduced.

It is to be noted that change of the processing order of the steps or change of the substance of the processes may be performed within a range within which it can be carried out. For example, while the decision condition of the symbols symbol is determined to be 1 at step S553 or S556, it may otherwise be equal to 0. In this case, inverse binarization of the primary transform identifier pt_idx is performed using the TU depicted in C of FIG. 43.

Further, in place of the processes at steps S552 to S556, a lookup table for the TU depicted in B of FIG. 43 or C of FIG. 43 may be referred to to determine the value of the primary transform identifier pt_idx directly from a bit string.

6. Sixth Embodiment

<Shape of CU, PU and TU>

Figure 44:
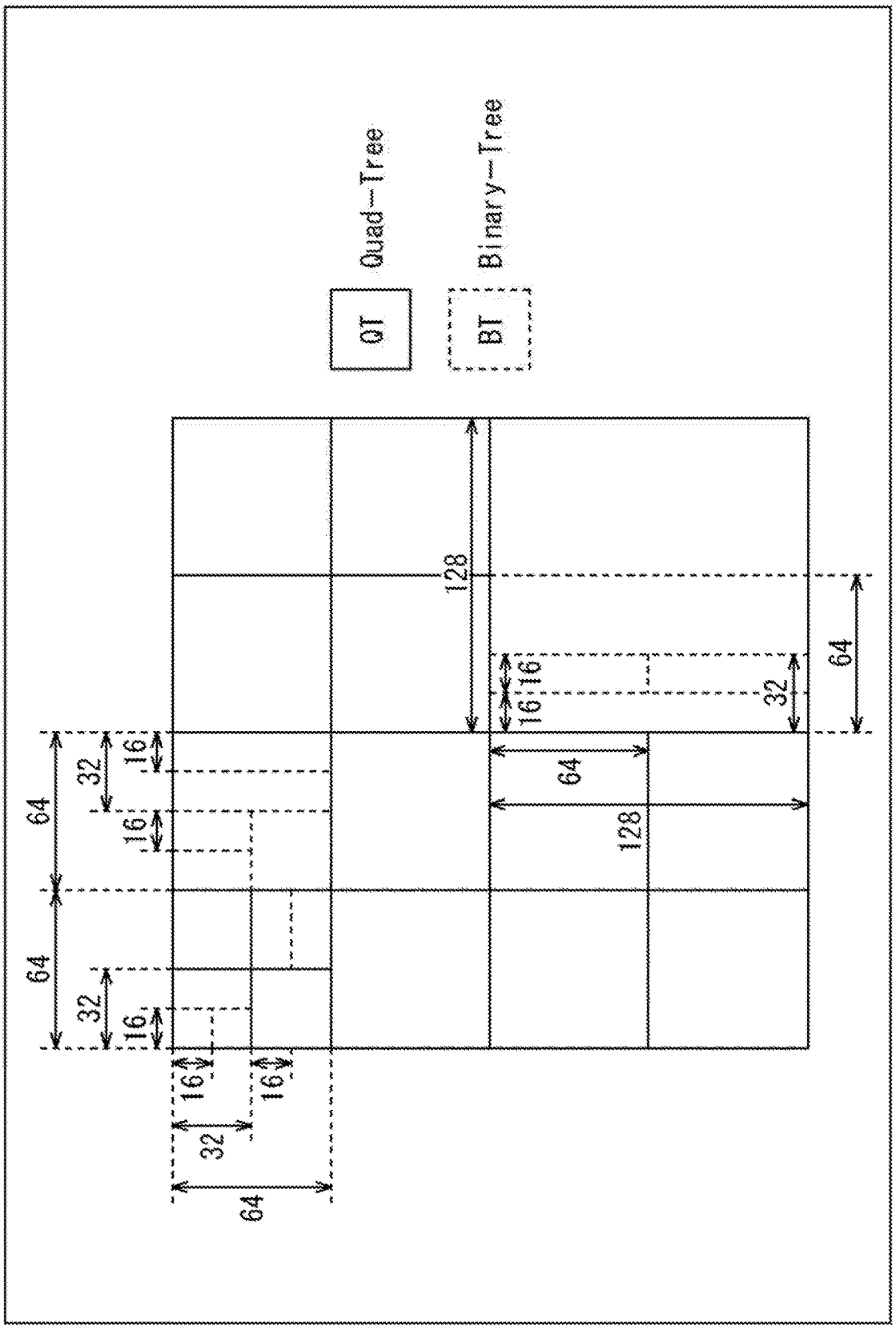
FIG. 44 is a view illustrating a shape of a CU, a PU and a TU.

FIG. 44 is a view illustrating a shape of a CU, a PU and a TU in a sixth embodiment.

The CU, PU and TU in the sixth embodiment are a CU, a PU and a TU of a QTBT (Quad tree plus binary tree) described in JVET-C0024, "EE2.1: Quadtree plus binary tree structure integration with JEM tools."

In particular, in block division of a CU in the sixth embodiment, one block can be divided not only into four (=2×2) sub blocks but also into two (=1×2, 2×1) sub blocks. In particular, in the sixth embodiment, division of a CU is performed by recursively repeating division of one block into four or two sub blocks, and as a result, a tree structure of a quad-tree (Quad-Tree) shape or of a binary-tree (Binary-Tree) shape in the horizontal direction or the vertical direction is formed.

As a result, there is the possibility that the shape of a CU may be a square or an oblong. For example, in the case where the LCU size is 128×128, as depicted in FIG. 44, there is the possibility that the size of a CU (size w in the horizontal direction×size h in the vertical direction) may not only be such a square shape as 128×128, 64×64, 32×32, 16×16, 8×8 or 4×4 but also be such an oblong shape as 128×64, 128×32, 128×16, 128×8, 128×4, 64×128, 32×128, 16×128, 8×128, 4×128, 64=32, 64×16, 64×8, 64×4, 32×64, 16×64, 8×64, 4×64, 32×16, 32×8, 32×4, 16×32, 8×32, 4×32, 16×8, 16×4, 8×16, 4×16, 8×4 or 4×8. Further, in the sixth embodiment, a PU and a TU are same as a CU.

<Skip of Encoding and Decoding of Transform Skip Flag>

From the foregoing, in the sixth embodiment, the size TBXSize in the horizontal direction and the size TBYSize in the vertical direction of a transform block are sometimes different from each other. Accordingly, in the sixth embodiment, as the maximum transform skip block size MaxTSSize, a greater one max(TBXSize, TBYSize) of the size TBXSize in the horizontal direction and the size TBYSize in the vertical direction of a transform skip block is set. Then, based on a comparison result between max(TBXSize, TBYSize) and the maximum transform skip block size MaxTSSize, encoding or decoding of the transform skip flag ts_flag relating to skip of (inverse) transform is skipped. Processes other than skip of encoding and decoding of the transform skip flag ts_flag in the sixth embodiment are similar to those in the third embodiment.

<Syntax>

FIG. 45 is a view depicting an example of a syntax table in which pseudo codes representative of control of encoding of the transform skip flag ts_flag and so forth in the sixth embodiment are described.

The syntax table of FIG. 45 is same as the syntax table of FIG. 20 except the fourth stage from above.

As depicted at the fourth stage from above in FIG. 45, it is one of conditions for encoding of the transform skip flag ts_flag (namely, for decoding of encoded data of the transform skip flag ts_flag) that max(TBXSize, TBYSize) is equal to or smaller than maximum transform skip block size MaxTSSize. In particular, in the case where max(TBXSize, TBYSize) is greater than the maximum transform skip block size MaxTSSize, encoding of the transform skip flag ts_flag (decoding of encoded data of the transform skip flag ts_flag) is skipped.

Also it is one of conditions for encoding of the transform skip flag ts_flag (decoding of encoded data of the transform skip flag ts_flag) that the transform skip validity flag ts_enabled_flag and the transform quantization bypass flag transquant_bypass_flag are 1. In short, in the case where both (inverse) transform and (de) quantization are to be skipped and in the case where transform skip is not permitted, encoding of the transform skip flag ts_flag (decoding of encoded data of the transform skip flag ts_flag) is skipped.

<Encoding Section>

Also in this case, the image encoding apparatus 100 has a configuration basically similar to that in the case of the first embodiment. In short, the image encoding apparatus 100 described in connection with the first embodiment includes an encoding section that skips encoding of the transform skip flag ts_flag on the basis of a result of comparison between max(TBXSize, TBYSize) and the maximum transform skip block size MaxTSSize. In short, the encoding section 114 skips encoding of the transform skip flag ts_flag on the basis of a comparison result between max (TBXSize, TBYSize) and the maximum transform skip block size MaxTSSize.

Figure 46:
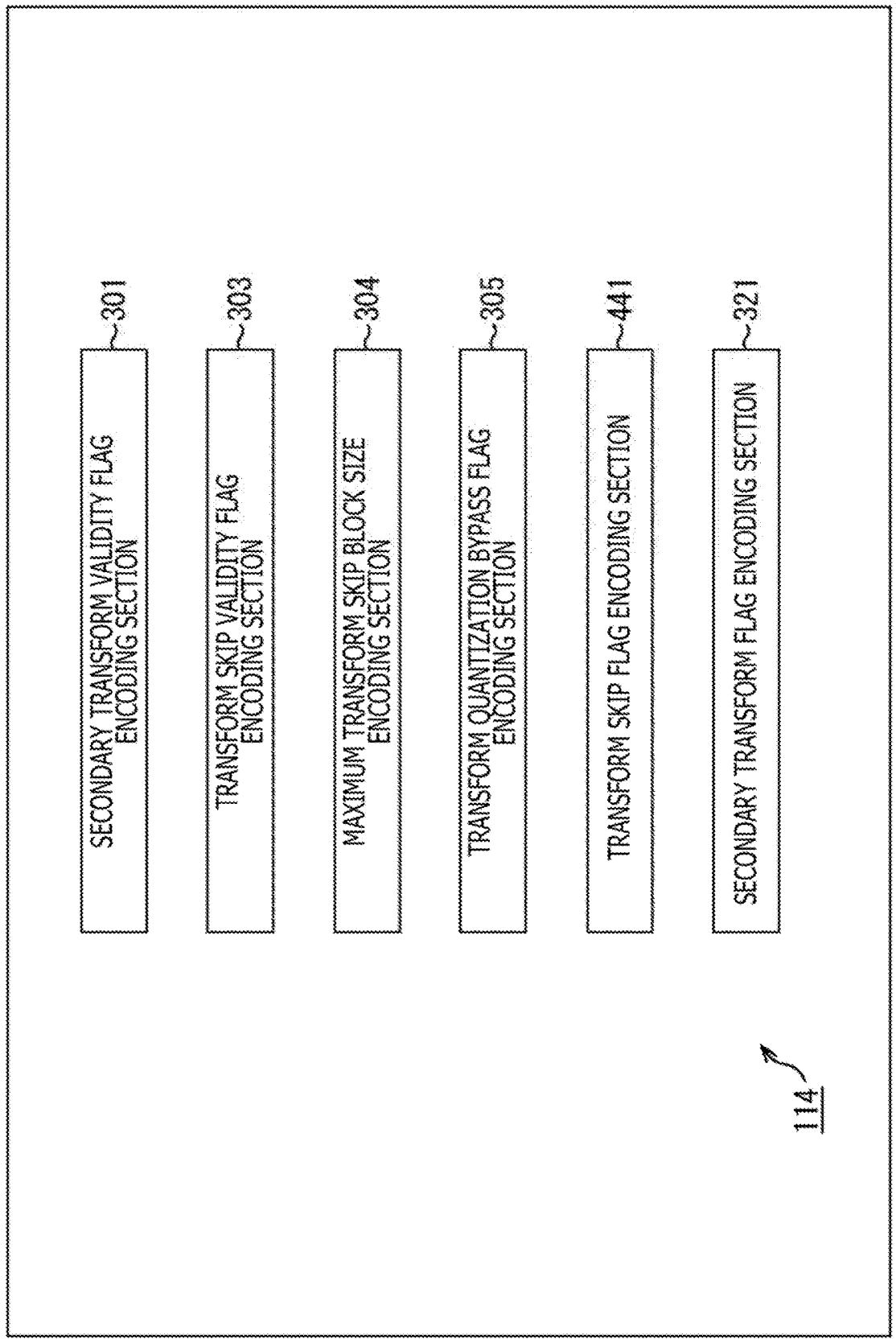
FIG. 46 is a block diagram depicting a principal configuration example of an encoding section.

FIG. 46 is a functional block diagram depicting an example of principal functions relating to encoding of the transform skip flag ts_flag, which are implemented by the encoding section 114 executing a program or the like. As depicted in FIG. 46, the encoding section 114 in this case can have, by executing a program, as functions relating to encoding of the transform skip flag ts_flag, a secondary transform validity flag encoding section 301, a transform skip validity flag encoding section 303, a maximum transform skip block size encoding section 304, a transform quantization bypass flag encoding section 305 and a secondary transform flag encoding section 321 similar to those, for example, of the encoding section 114 described in connection with the third embodiment. Furthermore, the encoding section 114 can have, as functions relating to encoding of the transform skip flag ts_flag, for example, a function of a transform skip flag encoding section 441 by executing a program.

The transform skip flag encoding section 441 performs a process relating to encoding of the transform skip flag ts_flag on the basis of a result of comparison between max(TBXSize, TBYSize) and the maximum transform skip block size MaxTSSize.

<Flow of Encoding Process>

Figure 47:
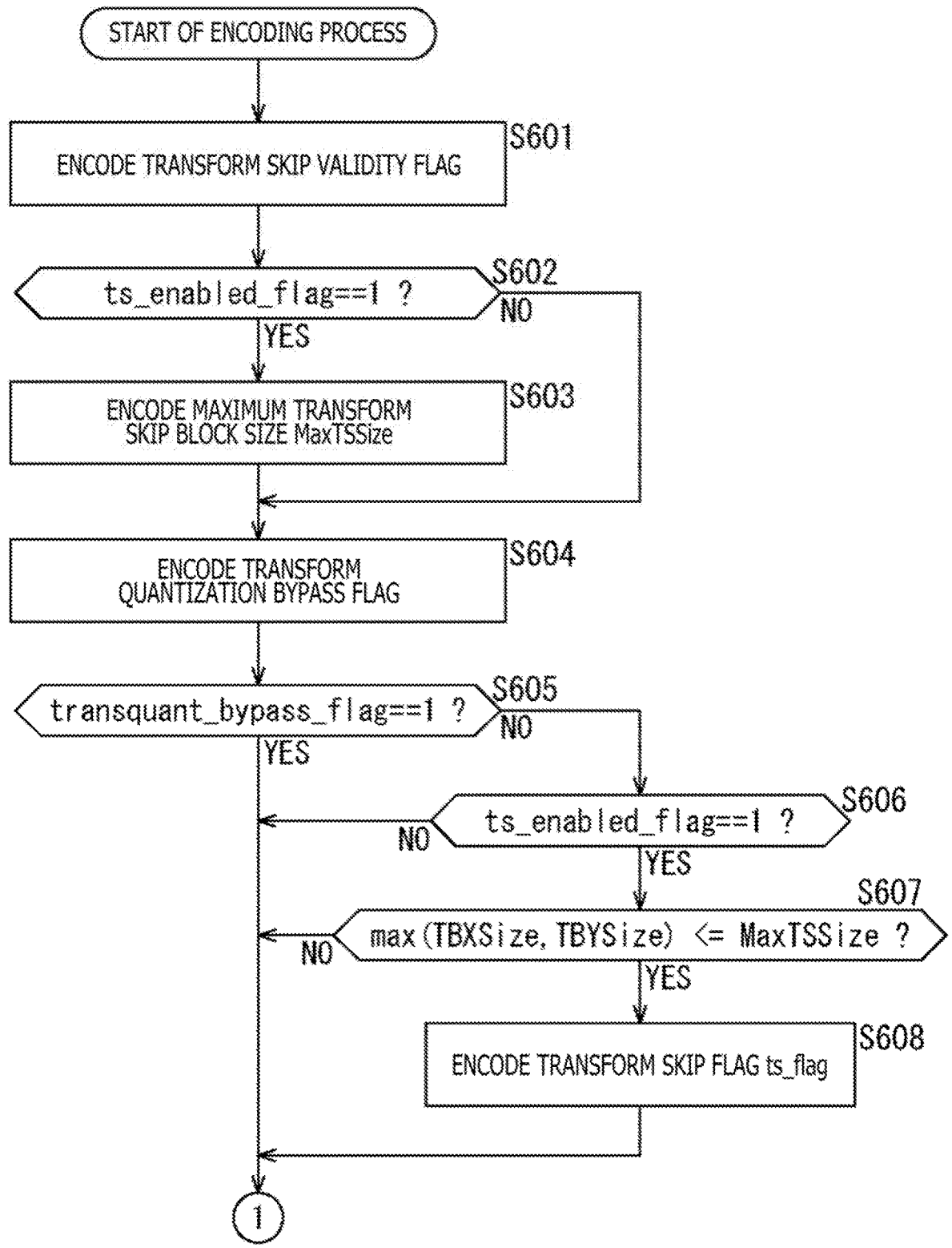
FIG. 47 is a flow chart illustrating an example of a flow of an encoding process.
Figure 48:
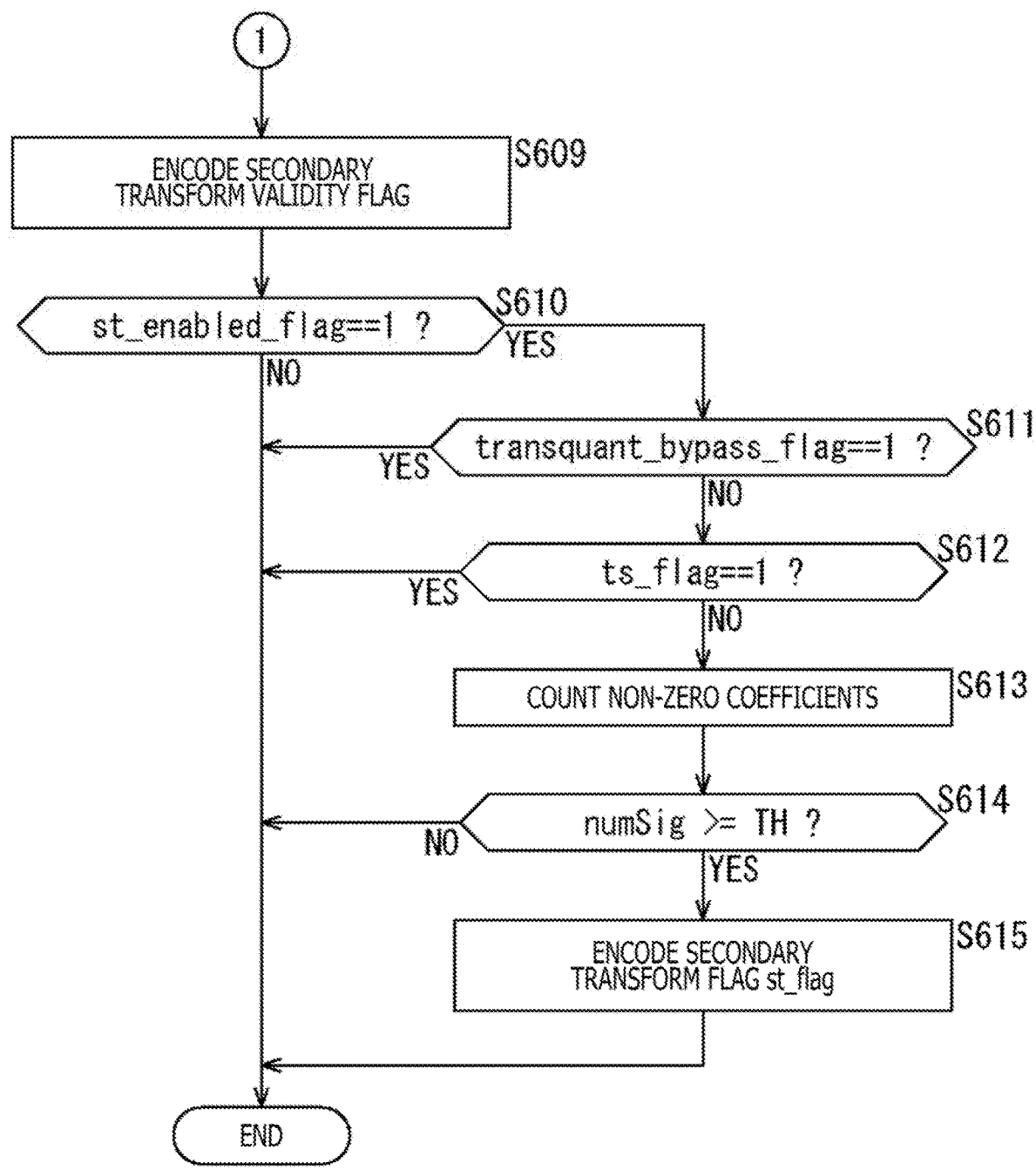
FIG. 48 is a flow chart continuing from FIG. 47 and illustrating an example of a flow of an encoding process.

Now, an example of a flow of processes executed by the image encoding apparatus 100 is described. The image encoding apparatus 100 performs the image encoding process basically similar to that in the case of the first embodiment. However, in this case, the image encoding apparatus 100 performs, at step S110 (FIG. 9) of the image encoding process, encoding of the transform skip flag ts_flag on the basis of a result of comparison between max(TBXSize, TBYSize) and the maximum transform skip block size MaxTSSize and so forth. An example of a flow of encoding of the transform skip flag ts_flag and so forth is described with reference to flow charts of FIGS. 47 and 48. In other words, the encoding process depicted in FIGS. 47 and 48 is executed as part of the encoding process performed at step S110 of FIG. 9. Encoding of other encoding parameters and quantization transform coefficient levels level is performed by an arbitrary method.

Processes at steps S601 to S606 of FIG. 47 are similar to those at steps S361 to S366 of FIG. 22, and therefore, description of them is omitted.

At step S607, the transform skip flag encoding section 441 decides whether or not max(TBXSize, TBYSize) of a transform block of a processing target is equal to or smaller than the maximum transform skip block size MaxTSSize (whether or not the conditional expression max(TBXSize, TBYSize)<=MaxTSSize is true). In the case where it is decided that max(TBXSize, TBYSize) of the transform block of the processing target is greater than the maximum transform skip block size MaxTSSize, namely, in the case where it is decided that the conditional expression given above is 0 (false), the process at step S608 is skipped (omitted), and the processing advances to step S609 of FIG. 48.

In the case where max(TBXSize, TBYSize) is greater than the maximum transform skip block size, since transform skip is not permitted, the value of the transform skip flag ts_flag is fixed to 0. Accordingly, in this case, since there is no necessity to transmit the transform skip flag ts_flag to the decoding side, the transform skip flag encoding section 441 skips encoding of the transform skip flag ts_flag. Since this makes it possible to skip encoding of redundant information, it is possible to suppress increase of the load of an encoding process and suppress degradation of the encoding efficiency.

In the case where it is decided at step S607 that max (TBYSize, TBYSize) of the transform block of the processing target is equal to or smaller than the maximum transform skip block size MaxTSSize, namely, in the case where it is decided that the conditional expression given above is 1 (true), the processing advances to step S608.

Processes at steps S608 to S615 are similar to the process at step S368 of FIG. 22 and the processes at steps S371 to S377 of FIG. 23, and therefore, description is omitted.

In this manner, the transform skip flag encoding section 441 skips encoding of the transform skip flag ts_flag on the basis of the size TBXSize in the horizontal direction and the size TBYSize in the vertical direction of the transform block. Accordingly, even in the case where the shape of the transform block is an oblong, encoding of the transform skip flag ts_flag can be skipped appropriately.

<Decoding Section>

Now, the image decoding apparatus 200 is described. Also in this case, the image decoding apparatus 200 has a configuration basically similar to that in the case of the first embodiment. However, the image decoding apparatus 200 in this case includes a decoding section that skips decoding of the transform skip flag ts_flag on the basis of a result of comparison between max(TBXSize, TBYSize) and the maximum transform skip block size MaxTSSize. In short, the decoding section 211 in this case skips decoding of the transform skip flag ts_flag on the basis of a result of comparison between max(TBXSize, TBYSize) and the maximum transform skip block size MaxTSSize.

Figure 49:
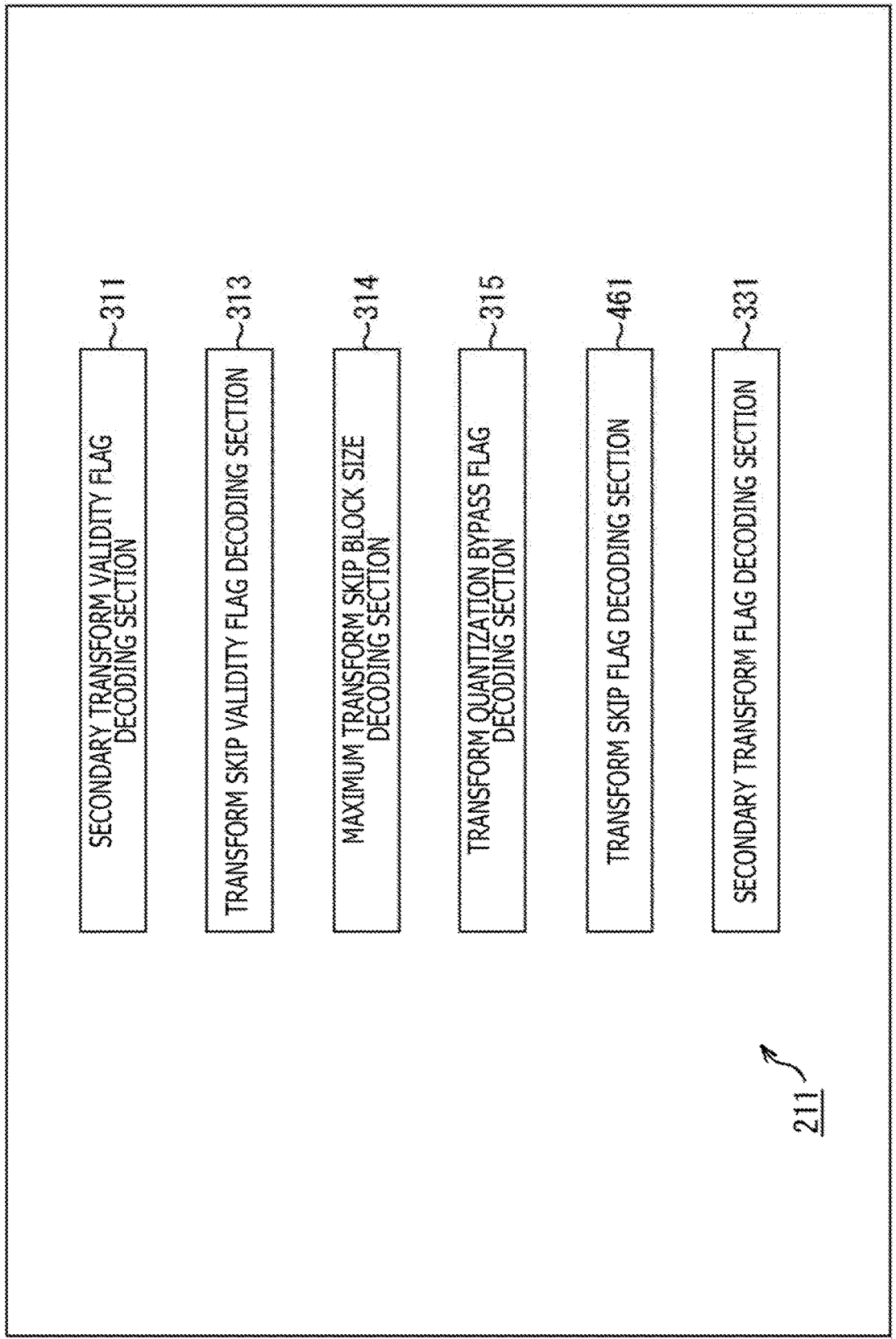
FIG. 49 is a block diagram depicting a principal configuration example of a decoding section.

FIG. 49 is a functional block diagram depicting an example of principal functions relating to decoding of encoded data of the transform skip flag ts_flag, which are implemented by the decoding section 211 in this case executing a program and so forth. As depicted in FIG. 49, the decoding section 211 in this case can have, as functions relating to decoding of encoded data of the transform skip flag ts_flag by executing a program, functions of a secondary transform validity flag decoding section 311, a transform skip validity flag decoding section 313, a maximum transform skip block size decoding section 314, a transform quantization bypass flag decoding section 315 and a secondary transform flag decoding section 331 similar to those, for example, of the decoding section 211 described hereinabove in connection with the third embodiment. Further, the decoding section 211 can have a function, for example, of a transform skip flag decoding section 461 as a function relating to decoding of encoded data of the transform skip flag ts_flag by executing a program.

The secondary transform flag decoding section 331 performs a process relating to decoding of encoded data of the transform skip flag ts_flag on the bases of a result of comparison between max(TBXSize, TBYSize) and the maximum transform skip block size MaxTSSize.

<Flow of Decoding Process>

Now, an example of a flow of processes executed by the image decoding apparatus 200 is described. The image decoding apparatus 200 in this case performs an image decoding process basically similarly to that in the case of the first embodiment. However, in this case, at step S201 (FIG. 13) of the image decoding process, the image decoding apparatus 200 performs decoding of encoded data of the transform skip flag ts_flag in response to a result of comparison between max(TBXSize, TBYSize) and the maximum transform skip block size MaxTSSize and so forth. An example of a flow of the decoding of encoded data of the transform skip flag ts_flag is described with reference to flow charts of FIGS. 50 and 51. In short, the encoding process depicted in FIGS. 50 and 51 is executed as part of the decoding process performed at step S201 of FIG. 13.

Figure 50:
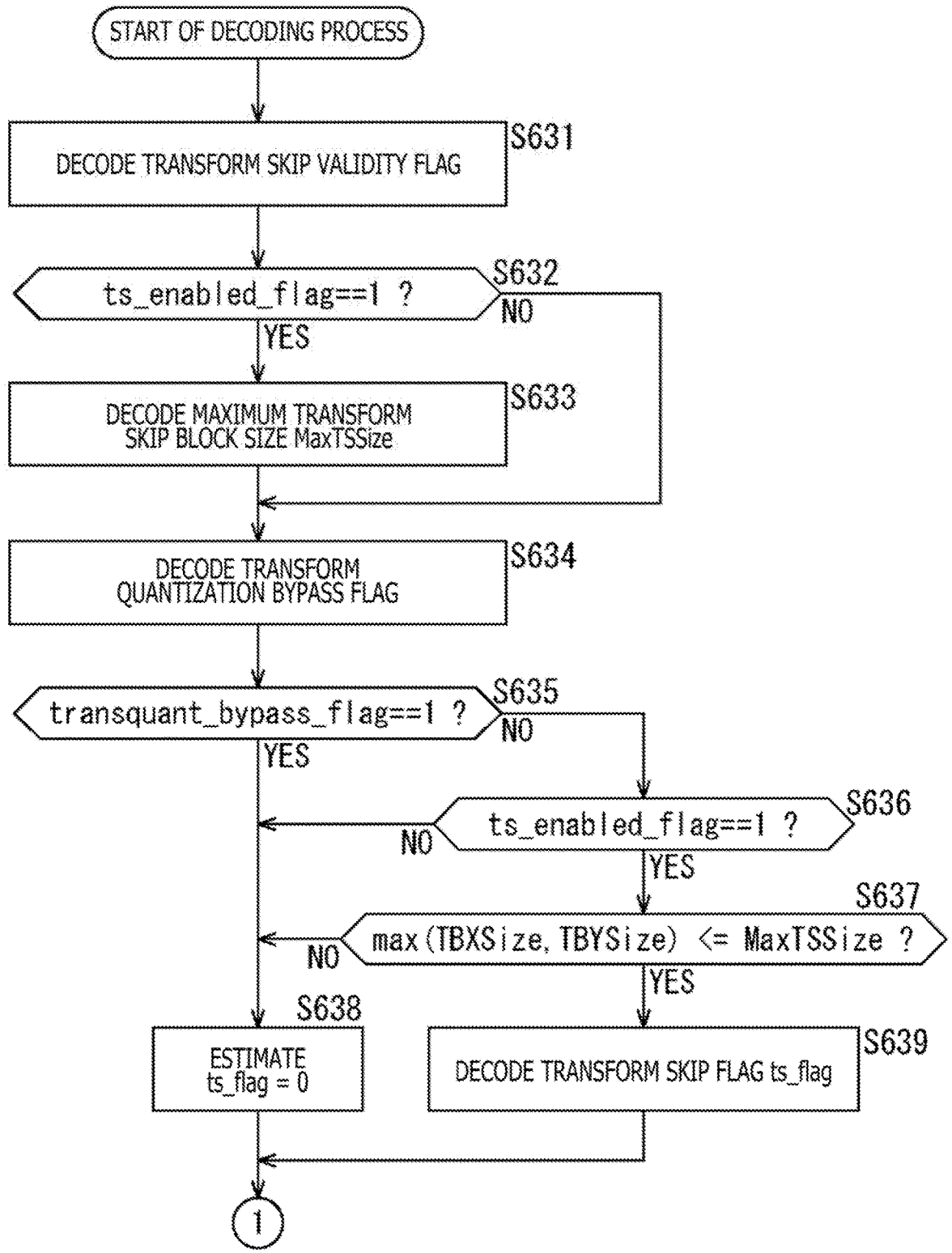
FIG. 50 is a flow chart illustrating an example of a flow of a decoding process.
Figure 51:
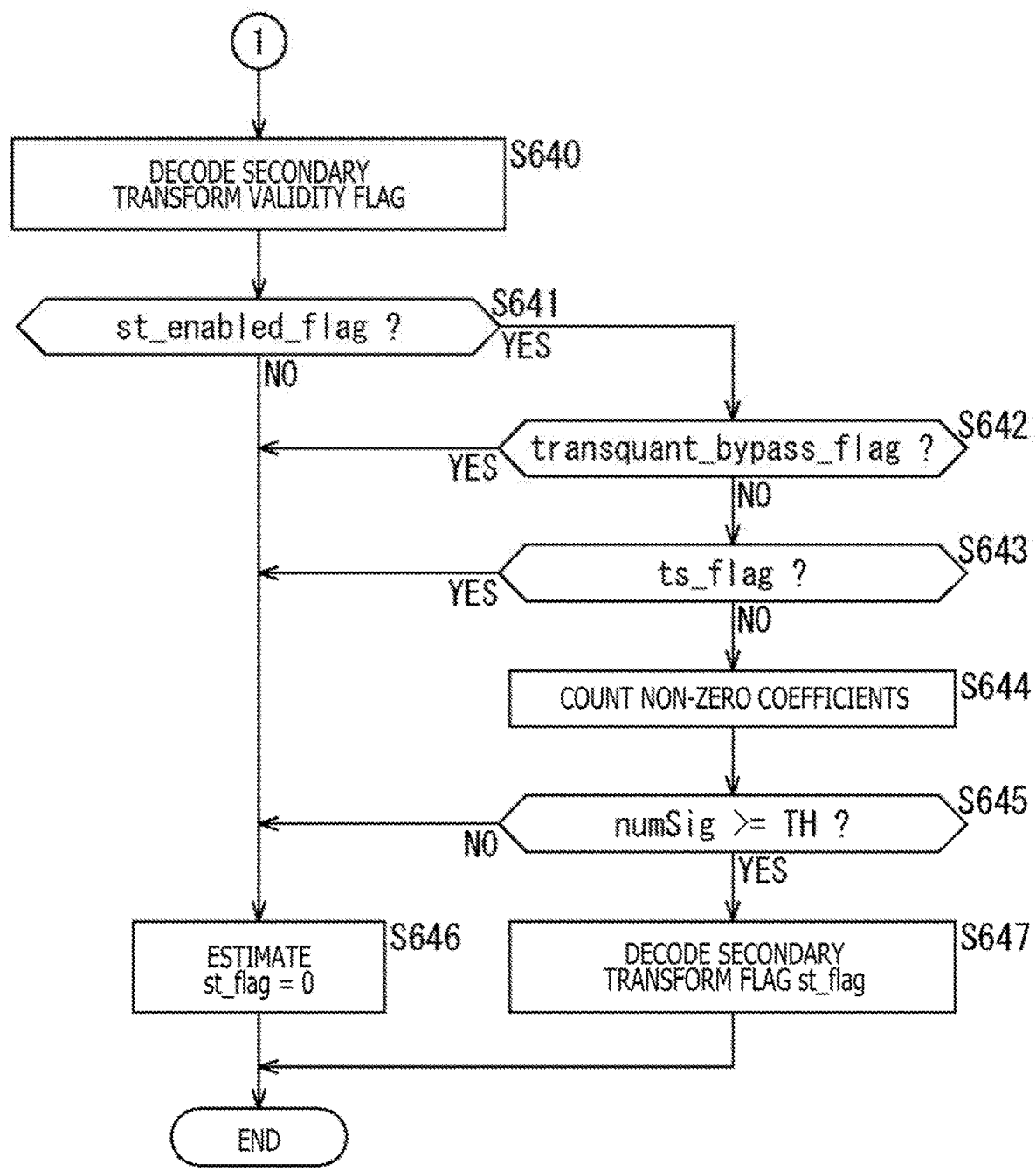
FIG. 51 is a flow chart continuing from FIG. 50 and illustrating an example of a flow of a decoding process.

Processes at steps S631 to S636 of FIG. 50 are similar to the processes at steps S381 to S386 of FIG. 25, and therefore, description of them is omitted.

At step S637, the transform skip flag decoding section 461 decides whether or not max(TBXSize, TBYSize) of the transform block of the processing target is equal to or smaller than the maximum transform skip block size MaxTSSize (whether or not the conditional expression max (TBXSize, TBYSize)<=MaxTSSize is true). In the case where it is decided that max(TBXSize, TBYSize) of the transform block of the processing target is greater than the maximum transform skip block size MaxTSSize, namely, in the case where it is decided that the conditional expression given above is 0 (false), the processing advances to step S638.

In the case where max(TBXSize, TBYSize) of the transform block is greater than the maximum transform skip block size MaxTSSize, since transform skip is not permitted, the value of the transform skip flag ts_flag is fixed to 0. Accordingly, in this case, since the transform skip flag ts_flag is not transmitted from the encoding side, the transform skip flag decoding section 461 skips decoding of the encoded data of the transform skip flag ts_flag. Since this makes it possible to skip encoding of redundant information, it is possible to suppress increase of the load of an encoding process and suppress degradation of the encoding efficiency.

On the other hand, in the case where it is decided at step S637 that max(TBXSize, TBYSize) of the transform block of the processing target is equal to or smaller than the maximum transform skip block size MaxTSSize, namely, in the case where the conditional expression given above is 1 (true), the processing advances to step S639.

Processes at steps S638 to S647 are similar to the processes at steps S388 and S389 of FIG. 25 and the processes at steps S391 to S398 of FIG. 26, and therefore, description of them is omitted.

In this manner, the transform skip flag decoding section 461 skips encoding of the transform skip flag ts_flag on the basis of the size TBXSize in the horizontal direction and the size TBYSize in the vertical direction of the transform block. Accordingly, even in the case where the shape of the transform block is an oblong, decoding of the transform skip flag ts_flag can be skipped appropriately.

It is to be noted that the decision method of whether or not skip of encoding or decoding of the transform skip flag ts_flag is to be performed is not limited to the method described above if it is a method that decides whether the size of a transform block is greater than a maximum value of the transform skip block size on the basis of the size TBXSize in the horizontal direction and the size TBYSize is the vertical direction.

For example, in the case where max(log2TBXSize, log2TBYSize) that is a greater one of logarithms of the size TBXSize in the horizontal direction and the size TBYSize in the vertical direction is greater than a logarithm log2MaxTSSize of a maximum value of the transform skip block size (max(log2TBXSize, log2TBYSize)>log 2MaxTSSize), skip of encoding and decoding of the transform skip flag ts_flag may be performed.

On the other hand, the maximum transform skip block size MaxTSSize may be determined as a sum of the size MaxTSXSize in the horizontal direction and the size MaxTSYSize in the vertical direction such that, in the case where the sum of the size TBXSize in the horizontal direction and the size TBYSize is the vertical direction is greater than the maximum transform skip block size MaxTSSize (TBXSize+TBYSize>MaxTSSize), skip of encoding and decoding of the transform skip flag ts_flag is performed.

Furthermore, in the case where the product of the size TBXSize in the horizontal direction and the size TBYSize in the vertical direction is greater than the product of the size MaxTSXSize is the horizontal direction and the size MaxTSYSize in the vertical direction of a maximum transform skip block (TBXSize*TBYSize>MaxTSXSize*MaxTSYSize), skip of encoding and decoding of the transform skip flag ts_flag may be performed.

Further, is the case where the sum of logarithms of the size TBXSize in the horizontal direction and the size TBYSize in the vertical direction (log2TBXSize+log2TBYSize) is greater than the sum (log2MaxTSXSize+log2MaxTSYSize) of logarithms of the size MaxTSXSize in the horizontal direction and the size MaxTSYSize in the vertical direction of a maximum transform skip block (log2TBXSize+log2TBYSize>log2MaxTSXSize+log2MaxTSYSize), skip of encoding and decoding of the transform skip flag ts_flag may be performed.

Furthermore, the logarithm log2MaxTSSize may be determined as a sum of logarithms of the MaxTSXSize in the horizontal direction and the MaxTSYSize in the vertical direction of the maximum transform skip block such that, in the case where the sum of logarithms of the size TBXSize in the horizontal direction and the size TBYSize in the vertical direction (log2TBXSize+log2TBYSize) is greater than the logarithm log2MaxTSSize (log2TBXSize+log2TBYSize>log2MaxTSSize), skip of encoding and decoding of the transform skip flag ts_flag is performed.

It is to be noted that the size MaxTSXSize in the horizontal direction (or its logarithm value log2MaxTSXSize) and the size MaxTSYSize in the vertical direction (or its logarithm value log2MaxTSYSize) of the maximum transform skip block used for the decision are set to a parameter set of an SPS, a PPS, a slice header (SH) or the like and conveyed from the encoding side to the decoding side.

Further, while, in the sixth embodiment, a rectangular block formed from a square or an oblong depicted in FIG. 44 is applied to the block in the third embodiment, a rectangular block depicted in FIG. 44 may be applied to a block in any embodiment other than the third embodiment. In this case, in the embodiments, skip of encoding and decoding of the transform skip flag ts_flag is performed on the basis of the size TBXSize in the horizontal direction and the size TBYSize in the vertical direction similarly as in the sixth embodiment.

7. Seventh Embodiment

<Overview of Prior Art>

In H. Huang, K. Mang, Y. -W. Huang, S. Lei, "EE2.1: Quadtree plus binary tree structure integration with JEM tools," JVET-O0024, Joint Video Exploration Team (JVET) of ITU-T SG 16 WP 3 and ISO/IEC JTC 1/SC 29/WG 11 3rd Meeting: Geneva, CH, 26 May-1 Jun. 2016 (hereinafter referred to as NPL 3) or J. Chen, E. Aishina, G. J. Sullivan, J. -R. Ohm, J. Boyce, "Algorithm Description of Joint Exploration Test Model 4" JVET-D1001, Joint Video Exploration Team (JVET) of ITU-T SG 16 WP 3 and ISO/IEC JTC 1/SC 29/WG 11 4th Meeting: Chendu, CN, 15-21 Oct. 2016 (hereinafter referred to as NPL 4), adaptive primary transform (AMT: Adaptive Multiple core Transform) by which, for a transform block of luminance, primary transform is adaptively selected from among a plurality of different one-dimensional orthogonal transforms for each of primary transform PThor in the horizontal direction and transform PTver in the vertical direction is disclosed.

An adaptive primary transform flag apt_flag (also referred to as CU primary transform flag cu_pt_flag) indicative of whether or not adaptive primary transform is to be carried out is signaled (transmitted to the decoding side) in a CU including a luminance transform block of a processing target.

However, in the related described above, in the case of apt_flag==1 (in the case where adaptive primary transform is to be applied), the transform skip flag ts_flag indicative of whether or not transform skip is appropriate is likely to be signaled. Accordingly, there is the possibility that the code amount relating to ts_flag or apt_flag may become redundant, resulting in unnecessary increase of the code amount.

Further, in the case where the transform quantization bypass flag transquant_bypass_flag==1 (in the case where transform quantization bypass is to be applied), the adaptive primary transform flag apt_flag is likely to be signaled. Accordingly, there is the possibility that the code amount relating to apt_flag may become redundant, resulting in unnecessary increase of the code amount.

An example of a case in which a redundant code amount is generated in the methods disclosed in NPL 3 and NPL 4 is depicted in FIG. 52. A table depicted in FIG. 52 indicates variations that can be taken by the transform quantization bypass flag transquant_bypass_flag, adaptive primary transform flag apt_flag, transform skip flag ts_flag, primary transform identifier pt_idx and secondary transform identifier st_idx in the methods disclosed in NPL 3 and NPL 4.

For example, in the table depicted in FIG. 52, it is depicted that the case #1 indicates a state of "transquant_bypass_flag==0, apt_flag==0, ts_flag==0 and st_idx==0 in which pt_idx is not signaled," and at this time, primary transform (1st tr.) indicates that DCT is selected and secondary transform (2nd Tr.) is skipped.

In contrast, while, in the case #3 and the case #4, apt_flag==1 and ts_flag==0 are signaled, since it is apparent that, in the case where it is necessary to signal the adaptive primary transform flag apt_flag, ts_flag==0, signaling of the transform skip flag ts_flag is unnecessary. In short, in this case, the transform skip flag ts_flag is redundant. Further, in the case #5, although ts_flag==1 is signaled, the adaptive primary transform flag apt_flag is signaled, which is redundant. In the case #6 and the case #7, although transquant_bypass_flag==1 is signaled, the adaptive primary transform flag apt_flag is signaled, which is redundant.

<Skip of Encoding and Decoding of Adaptive Primary Transform Flag and Transform Skip Flag>

As described above, according to the methods disclosed in NPL 3 and NPL 4, in the case where the adaptive primary transform flag apt_flag==1 (in the case where adaptive primary transform is to be applied), there is the possibility that the transform skip flag ts_flag indicative of whether or not transform skip is appropriate may be signaled, resulting in possibility in unnecessary increase of the code amount. Further, in the case of the transform skip flag ts_flag==1, there is the possibility that the adaptive primary transform flag apt_flag may be signaled, resulting in possibility in unnecessary increase of the code amount. Further, in the case of the transform quantization bypass flag transquant_bypass flag==1 (in the case where transform quantization bypass is to be applied), there is the possibility that the adaptive primary transform flag apt_flag may be signaled, resulting in possibility is unnecessary increase of the code amount.

Therefore, upon image encoding, in the case of the transform quantization bypass flag transquant_bypass_flag==1 (in the case where transform quantization bypass is to be performed), encoding of the adaptive primary transform flag apt_flag is skipped (omitted), for example, as in the case #5 of FIG. 53. This makes it possible to suppress degradation of the encoding efficiency.

Further, in the case of the adaptive primary transform flag apt_flag==1 (in the case where adaptive primary transform is to be applied), encoding of the transform skip flag ts_flag is skipped (omitted), for example, as in the case #3 and the case #4 of FIG. 53. This makes it possible to suppress degradation of the encoding efficiency.

Further, in the case of, upon image decoding, the transform quantization bypass flag transquant_bypass_flag==1, decoding of the adaptive primary transform flag apt_flag is skipped (omitted), for example, as in the case #5 of FIG. 53. This makes it possible to suppress degradation of the encoding efficiency.

Further, in the case of the adaptive primary transform flag apt_flag==1, decoding of the transform skip flag ts_flag is skipped (omitted), for example, as in the case #3 and the case #4 of FIG. 53. This makes it possible to suppress degradation of the encoding efficiency.

<Syntax>

Examples of a syntax table in which pseudo codes representative of such control as described above are described are depicted in FIGS. 54 and 55. It is to be noted that, in the syntaxes, countNonZeroCoeffs (compID) is a function that returns the number of non-zero coefficients (significant coefficients) existing in a transform block of a color signal indicated by compID. In the case of this example, as indicated at the sixth stage from above of FIG. 54, it is one of conditions for encoding of the adaptive primary transform flag apt_flag (decoding of encoded data of the adaptive primary transform flag apt_flag) that the transform quantization bypass flag transquant_bypass_flag is 0 (false). In short, in the case where the transform quantization bypass flag transquant_bypass_flag is 1 (true), namely, in the case where (inverse) transform and (de) quantization are to be skipped, encoding of the adaptive primary transform flag apt_flag (decoding of encoded data of the adaptive primary transform flag apt_flag) is skipped.

Further, as indicated at the third stage from above of FIG. 55, it is one of conditions for encoding of the transform skip flag ts_flag (decoding of encoded data of the transform skip flag ts_flag) that the adaptive primary transform flag apt_flag is 0 (false). In short, in the case where the adaptive primary transform flag apt_flag is 1 (true), namely, in the case where adaptive primary transform is to be applied, encoding of the transform skip flag ts_flag relating to a luminance transform block and transform blocks of color differences (decoding of encoded data of the transform skip flag ts_flag) is skipped.

<Encoding>

Also in this case, the image encoding apparatus 100 has a configuration basically similar to that of the case of the first embodiment. In particular, the image encoding apparatus 100 described in connection with the first embodiment includes an encoding section that skips, in the case where primary transform that is a transform process for a prediction residual that is a difference between an image and a prediction image of the image, secondary transform that is a transform process for primary transform coefficients obtained by the primary transform of the prediction residual and quantization for secondary transform coefficients obtained by the secondary transform of the primary transform coefficients are to be skipped (upon transform quantization bypass), encoding of first information representative of the substance of the primary transform, which indicates on/off of adaptive primary transform.

In particular, the encoding section 114 in this case skips, in the case where primary transform that is a transform process for a prediction residual that is a difference between an image and a prediction image of the image, secondary transform that is a transform process for primary transform coefficients obtained by the primary transform of the prediction residual and quantization for secondary transform coefficients obtained by the secondary transform of the primary transform coefficients are to be skipped, encoding of first information representative of on/off of adaptive primary transform.

Further, the image encoding apparatus 100 includes an encoding section that skips, in the case where adaptive primary transform is to be applied, encoding of second information indicative of on/off of transform skip. In particular, the encoding section 114 in this case skips, in the case where adaptive primary transform that is a transform process for a prediction residual that is a difference between an image and a prediction image of the image is to be carried out (apt_flag==1), encoding of second information indicative of on/off of transform skip.

FIG. 56 is a functional block diagram depicting an example of principal functions relating to encoding of an adaptive primary transform flag and encoding of a transform skip flag, which are implemented by the encoding section 114 in this case executing a program or the like. As depicted in FIG. 56, the encoding section 114 in this case includes, as a function relating to encoding of an adaptive primary transform flag, for example, an adaptive primary transform flag encoding section 501 and, as a function relating to encoding of a transform skip flag, a transform skip flag encoding section 502, by executing a program.

The adaptive primary transform flag encoding section 501 performs a process relating to encoding of the adaptive primary transform flag apt_flag that is information relating to on/off of adaptive primary transform. The transform skip flag encoding section 502 performs a process relating to encoding of the transform skip flag ts_flag that is information relating to on/off of transform skip.

<Flow of Encoding Process>

Figure 57:
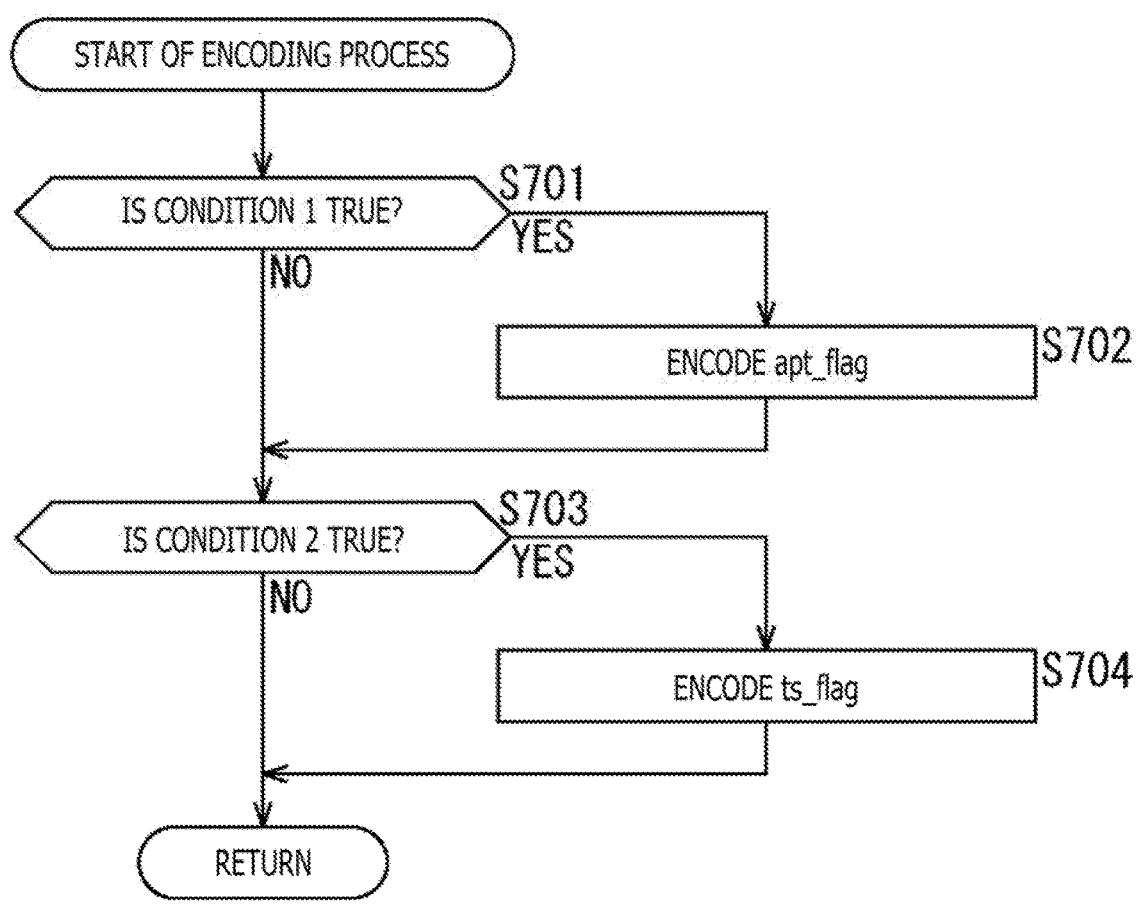
FIG. 57 is a flow chart illustrating an example of a flow of an encoding process.

Now, an example of a flow of processes executed by the image encoding apparatus 100 is described. The image encoding apparatus 100 in this case performs an image encoding process basically similar to that in the case of the first embodiment. However, in this case, the image encoding apparatus 100 performs, at step S110 (FIG. 9) of the image encoding process, encoding of the adaptive primary transform flag apt_flag and so forth in response to the value of the transform quantization bypass flag transquant_bypass_flag and so forth. An example of a flow of encoding of the adaptive primary transform flag apt_flag and so forth is described with reference to a flow chart of FIG. 57. In short, the encoding process depicted in FIG. 57 is executed as part of the encoding process performed at step S110 of FIG. 9. Encoding of other encoding parameters and encoded data of quantization transform coefficient levels level is performed by an arbitrary method.

After the encoding process is started, at step S701, the adaptive primary transform flag encoding section 501 decides whether or not a condition Condition 1 depicted is a conditional expression (72) given below is 1 (true). The condition Condition 1 corresponds to the sixth stage from above of the syntax described hereinabove with reference to FIG. 54.

Condition 1:
apt_enabled_flag
&& compID==COMPONENT_Y
&& width<=MaxPTSize
&& height<=MaxPTSize && !transquant_bypass_flag    (72)

Here, MaxPTSize represents a maximum value of the block size to which adaptive primary transform is applicable and is, for example, 64. It is to be noted that MaxPTSize is not limited to the value described above and may be set by a parameter that defines MaxPTSize conveyed in header information.

Further, in the conditional expression (72), a portion in which a block size and a threshold value are compared with each other may be replaced by a logarithmic representation as represented by the following conditional expression (73).

apt_enabled_flag
&& compID==COMPONENT_Y
&& log2TbWidth<=Log2MaxPTSize
&& log2TbHeight<=log2MaxPTSize && !transquant_bypass_flag    (73)

Here, the value of log2MaxPTSize is 6. It is to be noted that the value of log2MaxPTSize is not limited to this and may be set by a parameter that defines log2MaxPTSize conveyed in header information.

In the case where it is decided at step S701 that the condition Condition 1 is 1 (true), namely, in the case where it is decided that the adaptive primary transform flag is to be encoded, the processing advances to step S702. At step S702, the adaptive primary transform flag encoding section 501 variable length encodes the adaptive primary transform flag apt_flag to generate a bit string (encoded data) and outputs the encoded data. After the process at step S702 ends, the processing advances to step S703.

In contrast, in the case where it is decided at step S701 that the condition Condition 1 is 0 (false), namely, in the case where the adaptive primary transform flag is not to be encoded, the process at step S702 is skipped, and the processing advances to step S703.

If the encoding condition for the adaptive primary transform flag is not satisfied, then there is no necessity to transmit the adaptive primary transform flag apt_flag to the decoding side. Accordingly, the adaptive primary transform flag encoding section 501 skips encoding of the adaptive primary transform flag apt_flag. Since this makes it possible to skip encoding of redundant information, it is possible to suppress increase of the load of an encoding process and suppress degradation of the encoding efficiency.

At step S703, the transform skip flag encoding section 502 decides whether or not a condition Condition 2 indicated in a conditional expression (74) given below is 1 (true). The condition Condition 2 corresponds to the third stage from above of the syntax described hereinabove with reference to FIG. 55.

Condition 2:
ts_enabled_flag
&& width*height<=MaxTSSize
&& !transquant_bypass_flag && !apt_flag                                                 (74)

Here, MaxTSSize represents a maximum value of a block size to which transform skip can be applied and is, for example, 16. It is to be noted that MaxTSSize is not limited to the value described above and may be set by a parameter that defines MaxTSSize conveyed in header information.

Further, in the conditional expression (74), a portion in which a block size and a threshold value are compared with each other may be replaced by a logarithmic representation as represented by the following conditional expression (75).
ts_enabled_flag
&& (log2TbWidth*log2TbHeight)<=log2MaxTSSize
&& !transquant_bypass_flag && !apt_flag                                                 (75)

Here, the value of log2MaxTSSize is 4. It is to be noted that the value of log2MaxTSSize is not limited to this and may be set by a parameter that defines log2MaxTSSize conveyed in header information.

In the case where it is decided at step S703 that the condition Condition 2 is 1 (true), namely, in the case where it is decided that the transform skip flag is to be encoded, the processing advances to step S704. At step S704, the transform skip flag encoding section 502 variable length encodes the transform skip flag ts_flag to generate a bit string (encoded data) and outputs the encoded data. After the process at step S704 ends, the encoding process ends, and the processing returns to FIG. 9.

On the other hand, in case where it is decided at step S703 that the condition Condition 2 is 0 (false), namely, in the case where the transform skip flag is not to be encoded, the process at step S704 is skipped and the encoding process ends, and the processing returns to FIG. 9.

If the encoding condition for the transform skip flag is not satisfied, then there is no necessity to transmit the transform skip flag ts_flag to the decoding side. Accordingly, the transform skip flag encoding section 502 skips encoding of the transform skip flag ts_flag. Since this makes it possible to skip encoding of redundant information, it is possible to suppress increase of the load of an encoding process and suppress degradation of the encoding efficiency.

Encoded data of the adaptive primary transform flag apt_flag and encoded data of the transform skip flag ts_flag obtained by such encoding are included into a bit stream that includes encoded data of quantization transform coefficient levels level.

By executing the encoding process in such a manner as described above, in the case where the image encoding apparatus 100 applies transform quantization bypass, it can skip the encoding process of the adaptive primary transform flag apt_flag. In other words, the image encoding apparatus 100 can reduce the processing amount and the code amount relating to encoding of the adaptive primary transform flag apt_flag.

Further, when the image encoding apparatus 100 applies adaptive primary transform, it can skip the encoding process of the transform skip flag ts_flag. In particular, the processing amount and the code amount relating to encoding of the transform skip flag ts_flag can be reduced.

<Supplement>

The condition Condition 1 described above is not limited to the conditional expression (72) and may be changed to a conditional expression (76) given below such that the adaptive primary transform flag is encoded (decoded) for each color space. In this case, also the condition condition 2 indicated by the conditional expression (74) given hereinabove is preferably changed to the following expression (77).

Condition 1:
apt_enabled_flag
&& width<=MaxPTSize
&& height<=MaxPTSize

&& !transquant_bypass_flag                                   (76)

Condition 2b:
ts_enabled_flag
&& width*height<=MaxTSSize
&& !transquant_bypass_flag && !apt_flag [compID]                                        (77)

Syntax tables corresponding to the changes described above are depicted in FIGS. 58 and 59. It is to be noted that, in the syntaxes above, countNonZeroCoeffs (compID) is a function that returns the number of non-zero coefficients (significant coefficients) existing in a transform block of a color signal indicated by compID. The condition Condition 1b indicated in the conditional expression (76) corresponds to the sixth stage from above of the syntax of FIG. 58. Meanwhile, the condition Condition 2b indicated in the conditional expression (77) corresponds to the third stage from above the syntax of FIG. 59.

Meanwhile, the condition Condition 2 given hereinabove is not limited to the conditional expression (74) and may be changed, for example, for the case where the color space identifier compID indicates the luminance and besides the adaptive primary transform flag apt_flag is 1 (true), to a conditional expression (78) given below such that encoding (decoding) of the transform skip flag ts_flag is omitted.

Condition 2c:
ts_enabled_flag
&& width*height<=MaxTSSize
&& !transquant_bypass_flag && !(apt_flag && compID==COMPONENT_Y)                        (78)

A syntax table corresponding to the change described above is depicted in FIG. 60. countNonZeroCoeffs (compID) is a function that returns the number of non-zero coefficients (significant coefficients) existing in a transform block of a color signal represented by compID. The condition Condition 2c corresponds to the third stage from above of the syntax of FIG. 60.

It is to be noted that the encoding process described above may be subject to change of the processing order of the steps or change of the substance of the processes within a range within which it can be carried out. Further, the syntax and the conditional expressions (72) to (78) given hereinabove can be changed in terms of arithmetic operation thereof within a range within which it can be carried out.

<Decoding>

Now, an image decoding apparatus 200 is described. Also in this case, the image decoding apparatus 200 has a configuration basically similar to that of the case of the first embodiment. However, the image decoding apparatus 200 in this case includes a decoding section that skips, in the case where dequantization for quantization transform coefficient levels obtained by decoding of encoded data, inverse secondary transform for transforming secondary transform coefficients obtained by the dequantization of the quantization transform coefficient levels into primary transform coefficients and inverse primary transform for transforming the primary transform coefficients into a prediction residual that is a difference between an image and a prediction image of the image are to be skipped, decoding of encoded data of first information relating to on/off of the adaptive primary transform.

In short, the decoding section 211 in this case skips, in the case where dequantization for quantization transform coefficient levels obtained by decoding of encoded data, inverse secondary transform for transforming secondary transform coefficients obtained by the dequantization of the quantization transform coefficient levels into primary transform coefficients and inverse primary transform for transforming the primary transform coefficients into a prediction residual that is a difference between an image and a prediction image of the image are to be skipped, decoding of encoded data of first information relating to on/off of adaptive primary transform.

Further, the image decoding apparatus 200 includes the decoding section 211 that skips, in the case where adaptive primary transform is applied (apt_flag==1), decoding of encoded data of second information indicative of on/off of transform skip. In particular, the decoding section 211 in this case skips, in the case where an inverse process to adaptive primary transform, namely, inverse adaptive primary transform, is carried out for primary transform coefficients obtained by dequantization and inverse secondary transform for quantization transform coefficient levels obtained by decoding of encoded data, decoding of encoded data of second information indicative of on/off of transform skip.

Figure 61:
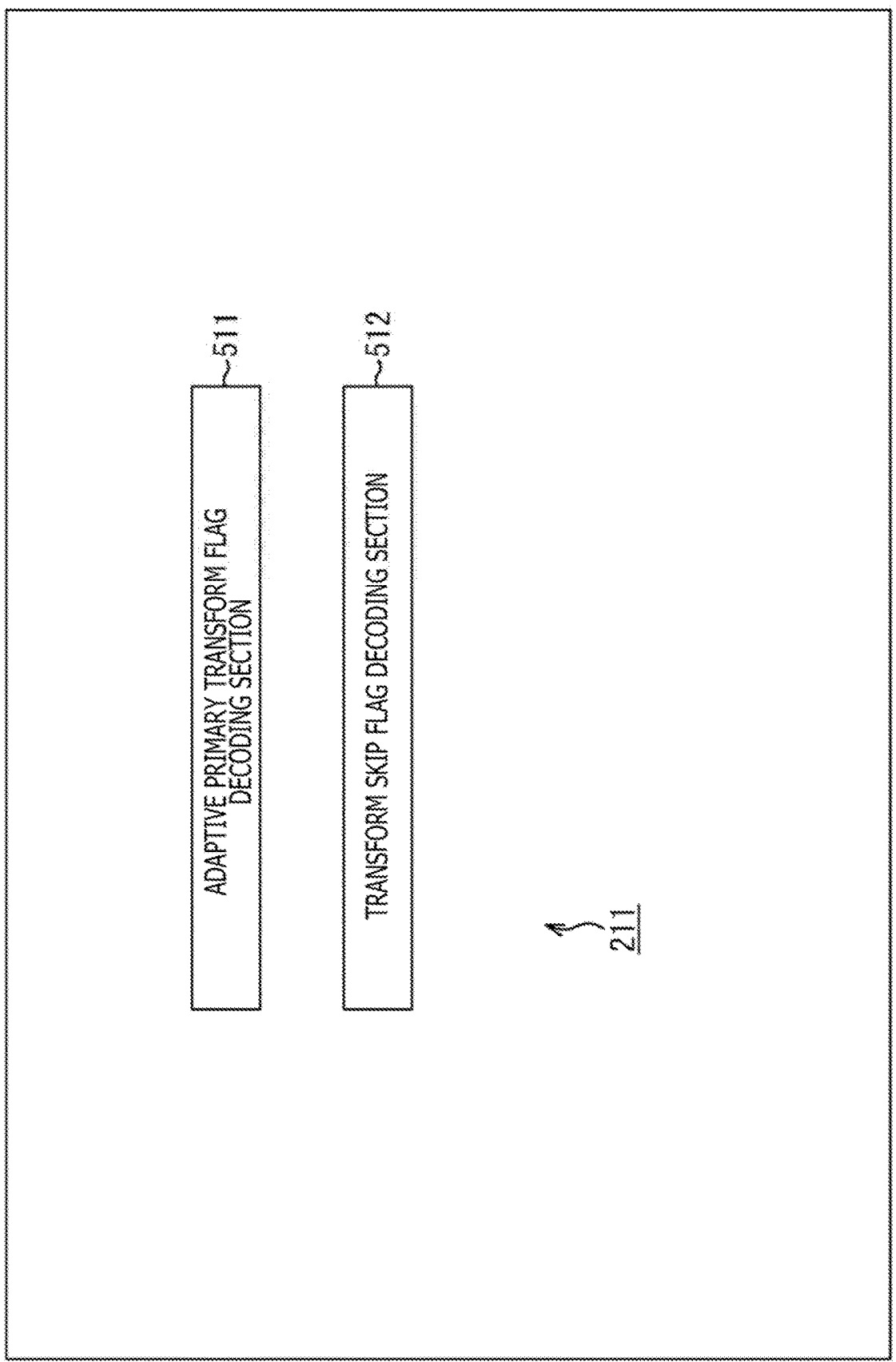
FIG. 61 is a block diagram depicting a principal configuration example of a decoding section.

FIG. 61 is a functional block diagram depicting an example of principal functions relating to decoding of a primary transform identifier implemented by the decoding section 211 in this case executing a program and so forth. As depicted in FIG. 61, the decoding section 211 in this case can have, for example, an adaptive primary transform flag decoding section 511 as a function relating to decoding of an adaptive primary transform flag and can have a transform skip flag decoding section 512 as a function relating to decoding of a transform skip flag, by executing a program.

The adaptive primary transform flag decoding section 511 performs a process relating to decoding of encoded data of the adaptive primary transform flag apt_flag that is information relating to on/off of inverse adaptive primary transform. The transform skip flag decoding section 512 performs a process relating to decoding of encoded data of the transform skip flag ts_flag that is information relating to on/off of transform skip.

<Flow of Decoding Process>

Figure 62:
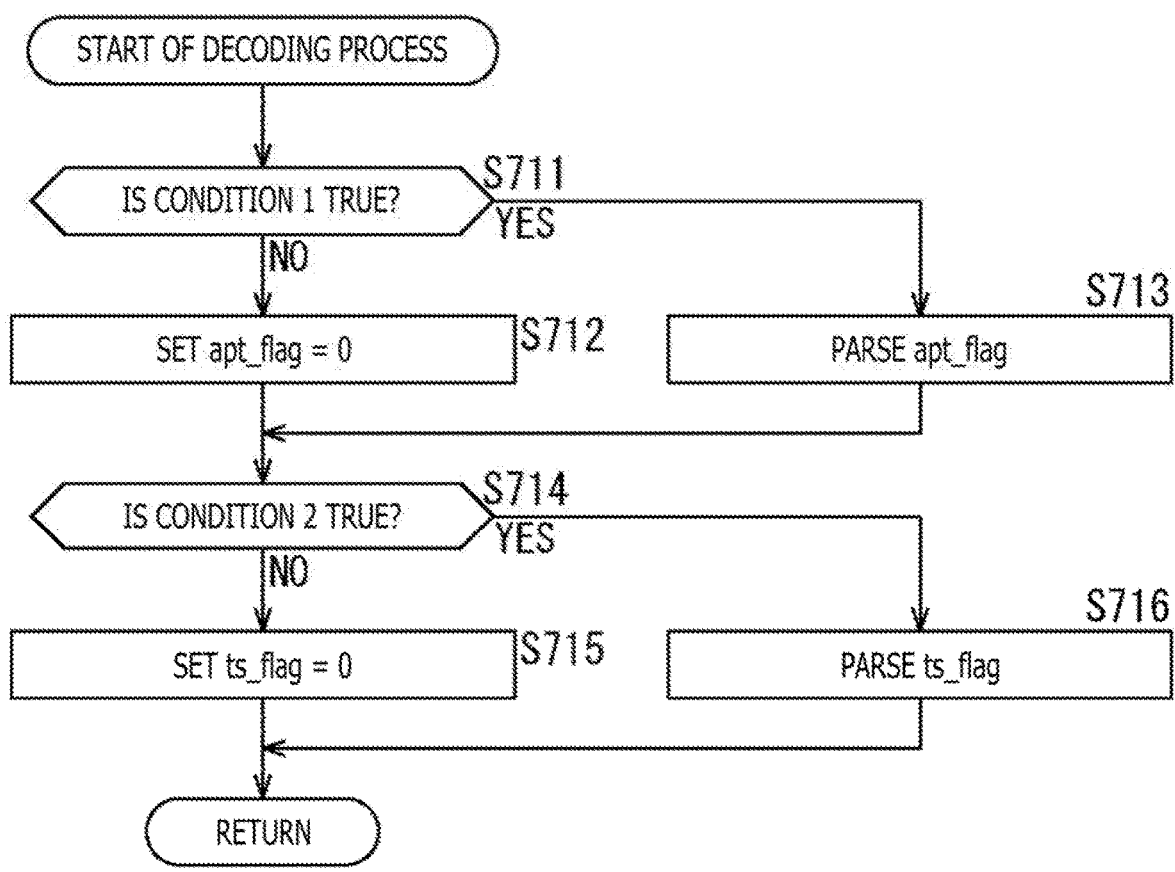
FIG. 62 is a flow chart illustrating an example of a flow of a decoding process.

Now, an example of a flow of processes executed by the image decoding apparatus 200 is described. The image decoding apparatus 200 in this case performs an image decoding process basically similarly to that in the case of the first embodiment. However, in this case, at step S201 (FIG. 13) of the image decoding process, the image decoding apparatus 200 performs decoding of encoded data of the adaptive primary transform flag apt_flag and so forth in response to the value of the transform quantization bypass flag transquant_bypass_flag and so forth. An example of a flow of decoding of the adaptive primary transform flag apt_flag is described with reference to a flow chart of FIG. 62. In short, the decoding process depicted in FIG. 62 is executed as part of the decoding process performed at step S201 of FIG. 13. Decoding of other encoding parameters and encoded data of quantization transform coefficient levels level is performed by an arbitrary method.

After the decoding process is started, at step S711, the adaptive primary transform flag decoding section 511 decides whether or not the condition condition 1 indicated by the conditional expression (72) given hereinabove is 1 (true). In the case where it is decided that the condition condition 1 is 0 (false), namely, in the case where the adaptive primary transform flag is not to be decoded, the processing advances to step S712.

At step S712, the adaptive primary transform flag decoding section 511 skips decoding of the adaptive primary transform flag apt_flag. In this case, the adaptive primary transform flag decoding section 511 interprets that adaptive primary transform is not to be carried out and sets the value (0) indicative of this to the adaptive primary transform flag apt_flag (apt_flag=0).

In particular, if the encoding condition for the adaptive primary transform flag is not satisfied, then since the adaptive primary transform flag apt_flag is not transmitted from the encoding side, the adaptive primary transform flag decoding section 511 skips decoding of encoded data of the adaptive primary transform flag apt_flag. Since this makes it possible to skip decoding of redundant information, it is possible to suppress increase of the load of a decoding process and suppress degradation of the encoding efficiency.

After the process at step S712 ends, the processing advances to step S714. Meanwhile, is the case where it is decided at step S711 that the condition condition 1 is 1 (true), namely, in the case where it is decided that the adaptive primary transform flag is to be decoded, the processing advances to step S713.

At step S713, the adaptive primary transform flag decoding section 511 decodes encoded data of the adaptive primary transform flag apt_flag. After the process at step S713 ends, the processing advances to step S714.

At step S714, the transform skip flag decoding section 512 decides whether or not condition 2 indicated by the conditional expression (74) given hereinabove is 1 (true). In the case where it is decided that the condition condition 2 is 0 (false), namely, in the case where it is decided that the transform skip flag is not to be decoded, the processing advances to step S715.

At step S715, the transform skip flag decoding section 512 skips decoding of the transform skip flag ts_flag. In this case, the transform skip flag decoding section 512 interprets that transform skip is not to be carried out and sets a value indicative of this (0) to the transform skip flag ts_flag (ts_flag=0).

In particular, the encoding condition for the transform skip flag is not satisfied, then since the transform skip flag ts_flag is not transmitted from the encoding side, the transform skip flag decoding section 512 skips decoding of encoded data of the transform skip flag ts_flag. Since this makes it possible to skip decoding of redundant information, it is possible to suppress increase of the load of a decoding process and suppress degradation of the encoding efficiency.

After the process at step S715 ends, the decoding process ends and the processing returns to FIG. 13. On the other hand, in the case where it is decided at step S714 that the condition condition 2 is 1 (true), namely, for the case where the transform skip flag is to be decoded, the processing advances to step S716.

At step S716, the transform skip flag decoding section 512 decodes encoded data of the transform skip flag ts_flag. After the process at step S716 ends, the decoding process ends, and the processing returns to FIG. 13.

By executing the decoding process in such a manner as described above, in the case where transform quantization bypass is applied, the image decoding apparatus 200 can skip the decoding process of the adaptive primary transform flag apt_flag. In particular, the processing amount and the code amount relating to decoding of the adaptive primary transform flag apt_flag can be reduced.

Further, in the case where adaptive primary transform is applied, the image decoding apparatus 200 can skip the decoding process of the transform skip flag ts_flag. In particular, the processing amount and the code amount relating to decoding of the transform skip flag ts_flag can be reduced.

<Supplement>

The condition condition 1 described hereinabove is not limited to the conditional expression (72) and may be changed to the conditional expression (76) given hereinabove such that the adaptive primary transform flag is decoded for each color space. In this case, it is desirable to change the conditional expression (74) given hereinabove in accordance with the conditional expression (77) given hereinabove.

Meanwhile, the condition Condition 2 given hereinabove is not limited to the conditional expression (74) given hereinabove and may be changed, in the case where the color space identifier compID indicates the luminance and besides the adaptive primary transform flag apt_flag indicates 0 (false), to the conditional expression (78) given hereinabove such that decoding of the transform skip flag ts_flag is omitted.

It is to be noted that the decoding process described above may be subject to change of the processing order of the steps or change of the substance of the processes within a range within which it can be carried out. Further, the syntax and the conditional expressions (72) to (78) given hereinabove can be changed terms of arithmetic operation thereof within a range within which it can be carried out.

8. Eighth Embodiment

<Overview of Related Art>

In H. Jang, J. Lim, J. Nam, S. -H. Kim, "Signaling for primary transform and transform skip" JVET-E0037, Joint Video Exploration Team (JVET) of ITU-T SG 16 WP 3 and ISO/IEC JTC 1/SC 29/WG 11 5th Meeting: Geneva, CH, 12-20 Jan. 2017 (hereinafter referred to as NPL 5), it is pointed out that, since an encoding unit CU and a transform unit TU have become same by introduction of the QTBT (Quad Tree+Binary Tree) disclosed in NPL 2, in the case of the transform skip flag ts_flag==1 (in the case where transform skip is applied), signaling of at adaptive primary transform flag apt_flag at the CU level is redundant.

Therefore, in NPL 5, it is proposed that a syntax position of the adaptive primary transform flag apt_flag is disposed at the succeeding side of the transform skip flag ts_flag such that, when ts_flag==1, decoding (encoding) of the adaptive primary transform flag apt_flag is omitted.

However, it is pointed out that, according to the configuration disclosed in NPL 5, the encoding coefficient is degraded. Further, according to the configuration disclosed in NPL 5, in the case where transform quantization bypass is applied (transquant_bypass_flag==1), the adaptive primary transform flag apt_flag can be signaled similarly as in the case of NPL 3 or NPL 4. Accordingly, there is the possibility that the code amount relating to apt_flag may become redundant, resulting in unnecessary increase of the code amount.

An example of a case in which a redundant code amount occurs in the method disclosed in NPL 5 is depicted in FIG. 63. The table depicted in FIG. 63 denotes variations that can be taken by the transform quantization bypass flag transquant_bypass_flag, transform skip flag ts_flag, adaptive primary transform flag apt_flag, primary transform identifier pt_idx and secondary transform identifier st_idx in the method disclosed in NPL 5.

For example, in the table depicted in FIG. 63, in case #6 and case #7, while transquant_bypass_flag==1 is signaled, the adaptive primary transform flag apt_flag is signaled, and this is redundant.

<Skip of Encoding and Decoding of Adaptive Primary Transform Flag and Transform Skip Flag>

As described above, in the method disclosed in NPL 5, there is the possibility that, in the case where transform quantization bypass is applied (transquant_bypass_flag==1), the adaptive primary transform flag apt_flag may be signaled and the code amount may increase unnecessarily.

Therefore, for example, as in case #6 of FIG. 64, upon image encoding, in the case of the transform quantization bypass transquant_bypass_flag==1 (in the case where it is indicated that the transform quantization bypass is to be performed), encoding of the adaptive primary transform flag apt_flag is skipped (omitted). This makes it possible to suppress degradation of the encoding efficiency.

Further, for example, as in case #4 of FIG. 64, in the case of the transform skip flag ts_flag==1 (in the case where transform skip is to be applied), encoding of the adaptive primary transform flag apt_flag is skipped (omitted). This makes it possible to suppress degradation of the encoding efficiency.

Further, for example, as in case #6 of FIG. 64, upon image decoding, in the case of the transform quantization bypass transquant_bypass_flag==1, decoding of the adaptive primary transform flag apt_flag is skipped (omitted). This makes it possible to suppress degradation of the encoding efficiency.

Further, for example, as in the case #4 of FIG. 64, in the case where the transform skip flag ts_flag==1, decoding of the adaptive primary transform flag apt_flag is skipped (omitted). This makes it possible to suppress degradation of the encoding efficiency.

<Syntax>

An example of a syntax table in which pseudo codes representing such control as described above are described is depicted in FIGS. 65 and 66. It is to be noted that, in the syntaxes, countNonZeroCoeffs (compID) is a function that returns the number of non-zero coefficients (significant coefficients) existing in a transform block of a color signal indicated by compID. In the case of the examples of FIGS.

65 and 66, a description relating to the adaptive primary transform flag apt_flag placed at the sixth to eighth stages from above (between the fifth and sixth stages from above in FIG. 65) in FIG. 54 is moved to the fifth and sixth stages from above in FIG. 66. Further, that the transform skip flag ts_flag is 0 (false) and the transform quantization bypass transquant_bypass_flag is 0 (false) is one of conditions for encoding of the adaptive primary transform flag apt_flag (decoding of encoded data of the adaptive primary transform flag apt_flag).

In particular, in the case where the transform quantization bypass transquant_bypass_flag is 1 (true), namely, in the case where (inverse) transform and (de) quantization are to be skipped, encoding of the adaptive primary transform flag apt_flag (decoding of encoded data of the adaptive primary transform flag apt_flag) is skipped. Further, in the case where the transform skip flag ts_flag is 1 (true), namely, in the case where transform skip is to be performed, encoding of the adaptive primary transform flag apt_flag (decoding of encoded data of the adaptive primary transform flag apt_flag) is skipped.

<Encoding>

Also in this case, the image encoding apparatus 100 has a configuration basically similar to that in the case of the first embodiment. In particular, the image encoding apparatus 100 described in connection with the first embodiment includes an encoding section that skips, in the case where primary transform that is a transform process for a prediction residual that is a difference between an image and a prediction image of the image, secondary transform that is a transform process for primary transform coefficients obtained by the primary transform for the prediction residual and quantization of the secondary transform coefficients obtained by the secondary transform for the primary transform coefficients are to be skipped (upon transform quantization bypass) or in the case where transform is to be skipped (upon transform skip), encoding of first information indicative of on/off of adaptive primary transform.

In particular, the encoding section 114 in this case skips, in the case where primary transform that is a transform process for a prediction residual that is a difference between an image and a prediction image of the image, secondary transform that is a transform process for primary transform coefficients obtained by the primary transform for the prediction residual and quantization of the secondary transform coefficients obtained by the secondary transform for the primary transform coefficients are to be skipped or in the case where transform is to be skipped, encoding of first information indicative of on/off of adaptive primary transform.

Since the function relating to encoding of the adaptive primary transform flag by the encoding section 114 in this case executing a program is similar to that in the case of the seventh embodiment described hereinabove with reference to FIG. 56, description of the function is omitted.

<Flow of Encoding Process>

Figure 67:
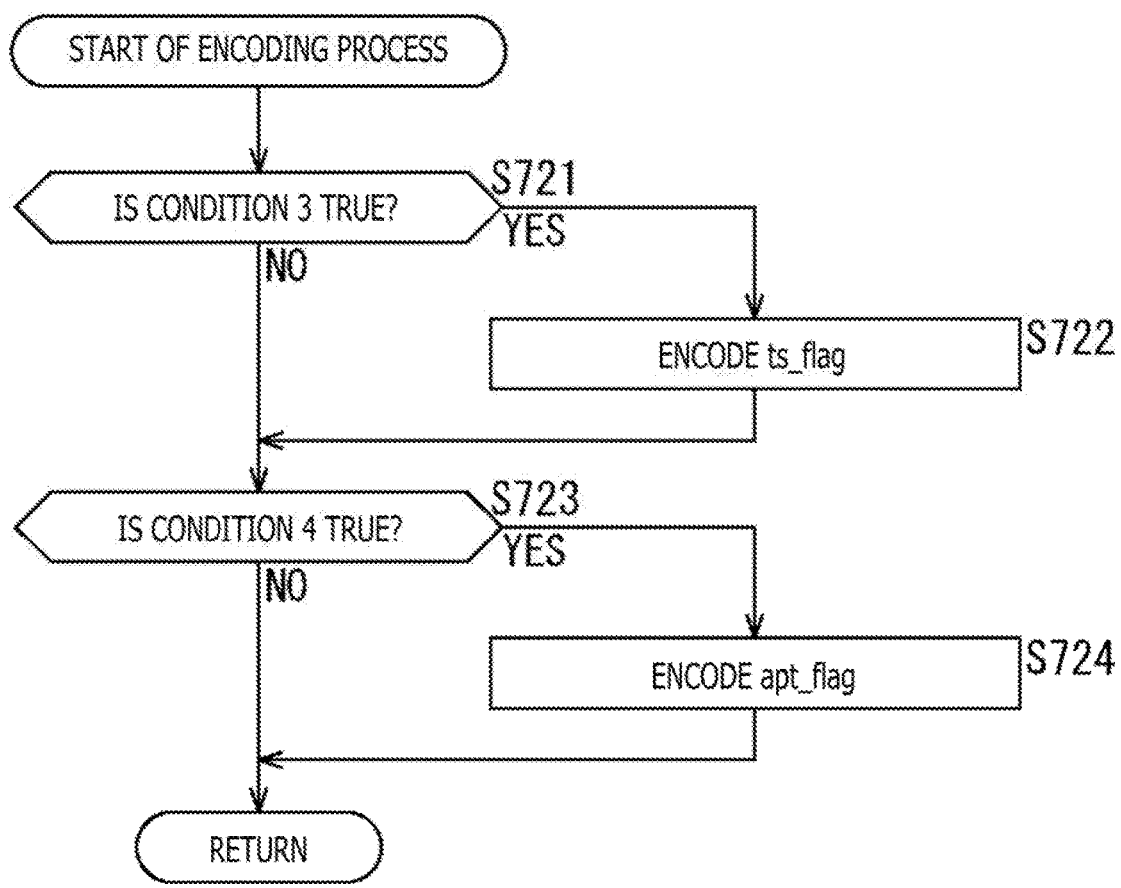
FIG. 67 is a flow chart illustrating an example of a flow of an encoding process.

Now, an example of a flow of processes executed by the image encoding apparatus 100 is described. In this case, the image encoding apparatus 100 performs the image encoding process basically similarly to that in the case of the first embodiment. However, in this case, the image encoding apparatus 100 performs encoding of the adaptive primary transform flag apt_flag and so forth at step S110 (FIG. 9) of the image encoding process in response to a value of the transform quantization bypass flag transquant_bypass_flag or the like. An example of a flow of the encoding of the adaptive primary transform flag apt_flag or the like is described with reference to a flow chart of FIG. 67. In particular, the encoding process depicted in FIG. 67 is executed as part of the encoding process performed at step S110 of FIG. 9. Encoding of the other encoding parameters and quantization transform coefficient levels level is performed by an arbitrary method.

After the encoding process is started, at step S721, the transform skip flag flag encoding section 502 decides whether or not a condition Condition 3 indicated by a conditional expression (79) given below is 1 (true). The condition Condition 3 corresponds to the third stage from above of the syntax described with reference to FIG. 66.

Condition 3:
ts_enabled_flag
&& width*height<=MaxTSSize

&& !transquant_bypass_flag  (79)

Here, MaxTSSize represents a maximum value of the block size with which transform skip can be applied and, for example, is 16. It is to be noted that MaxTSSize may not be set to the value just specified and may be set by a parameter that defines MaxTSSize conveyed in header information.

Further, in the conditional expression (79), a portion in which the block size and the threshold value are compared with each other may be replaced into a logarithm representation as in the following conditional expression (80).

ts_enabled_flag
&& ((log2TbWidth+log2TbHeight)<=log2MaxTSSize)

&& !transquant_bypass_flag  (80)

Here, the value of log2MaxTSSize is 4. It is to be noted that the value of log2MaxTSSize is not limited to this and may be set by a parameter that defines log2MaxTSSize conveyed in the header information.

In the case where it is decided at step S721 that the condition Condition 3 is 1 (true), namely, in the case where it is decided that the transform skip flag is to be encoded, the processing advances to step S722. At step S722, the transform skip flag encoding section 502 variable length encodes the transform skip flag ts_flag to generate a bit string (encoding data) and outputs the encoded data. After the process at step S722 ends, the processing advances to step S723.

On the other hand, in the case where it is decided at step S721 that the condition Condition 3 is 0 (false), namely, in the case where it is decided that the transform skip flag is not to be encoded, the process at step S722 is skipped and the processing advances to step S723.

If the encoding condition of the transform skip flag is not satisfied, then it is not necessary to transmit the transform skip flag ts_flag to the decoding side. Accordingly, the transform skip flag encoding section 502 skips encoding of the transform skip flag ts_flag. Since this makes it possible to skip encoding of redundant information, it is possible to suppress increase of the load of an encoding process and suppress degradation of the encoding efficiency.

At step S723, the adaptive primary transform flag encoding section 501 decides whether or not a condition Condition 4 indicated in a conditional expression (81) given below is 1 (true). The condition Condition 4 corresponds to the fifth stage from above of the syntax described with reference to FIG. 66.

Condition 4:
apt_enabled_flag
&& compID==COMPONENT_Y

&& width<=MaxPTSize
&& height<=MaxPTSize
&& its_flag [compID]

&& !transquant_bypass_flag      (81)

Here, MaxPTSize represents a maximum value of a block size with which adaptive primary transform can be applied and is, for example, 64. It is to be noted that MaxPTSize is not limited to the value just described and may be set by a parameter that defines MaxPTSize conveyed in header information.

Further, in the conditional expression (81), a portion in which the block size and the threshold value are compared with each other may be replaced into a logarithm representation as in the following conditional expression (82).
apt_enabled_flag
&& compID==COMPONENT_Y
&& log2TbWidth<=log2MaxPTSize
&& log2TbHeight<=log2MaxPTSize
&& !ts_flag [compID]

&& !transquant_bypass_flag      (82)

Here, the value of log2MaxPTSize is 6. It is to be noted that the value of log2MaxPTSize is not limited to this and may be set by a parameter that defines log2MaxPTSize conveyed in header information.

In the case where it is decided at step S723 that the condition Condition 4 is 1 (true), namely, in the case where it is decided that the adaptive primary transform flag is to be encoded, the processing advances to step S724. At step S724, the adaptive primary transform flag encoding section 501 variable length encodes the adaptive primary transform flag apt_flag to generate a bit string (encoded data) and outputs the encoded data. The encoding process ends and the processing returns to FIG. 9. After the process at step S724 ends, the encoding process ends and the processing returns to FIG. 9.

On the other hand, in the case where it is decided at step S723 that the condition Condition 4 is 0 (false), namely, in the case where it is decided that the adaptive primary transform flag is not to be encoded, the process at step S724 is skipped and the encoding process ends and the processing returns to FIG. 9.

If the encoding condition for the adaptive primary transform flag is not satisfied, then there is no necessity to transmit the adaptive primary transform flag apt_flag to the decoding side. Accordingly, the adaptive primary transform flag encoding section 501 skips encoding of the adaptive primary transform flag apt_flag. Since this makes it possible to skip encoding of redundant information, it is possible to suppress increase of the load of an encoding process and suppress degradation of the encoding efficiency.

The encoded data of the adaptive primary transform flag apt_flag and the encoded data of the transform skip flag ts_flag obtained by the encoding are included into a bit stream that including encoded data of the quantization transform coefficient levels level.

By executing the encoding process in such a manner as described above, the image encoding apparatus 100 can skip the encoding process of the adaptive primary transform flag apt_flag in the case where the transform quantization bypass is to be applied. In particular, the processing amount and the code amount relating to encoding of the adaptive primary transform flag apt_flag can be reduced.

Further, in the case where the transform skip is to be applied, the image encoding apparatus 100 can skip the encoding process of the adaptive primary transform flag apt_flag. In particular, the processing amount and the code amount relating to encoding of the adaptive primary transform flag apt_flag can be reduced.

<Supplement>

The condition Condition 4 described above is not limited to the expression (81) and may be changed to a conditional expression (83) given below such that the adaptive primary transform flag is encoded (decoded) for each color space.
Condition 4a:
apt_enabled_flag && compID==COMPONENT_Y
&& width<=MaxPTSize
&& height<=MaxPTSize && !*ts*_flag [compID] && !transquant_bypass_flag      (83)

A syntax table corresponding to the change described above is depicted in FIG. 68. It is to be noted that, in the syntax, countNonZeroCoeffs (compID) is a function that returns the number of non-zero coefficients (significant coefficients) existing in a transform block of a color signal indicated by compID. The condition Condition 4a corresponds to the fifth stage from above of the syntax of FIG. 68.

It is to be noted that change of the processing order of the steps or change of the substance of the encoding process described above may be performed within a range within which it can be carried out. Further, arithmetic operation relating to the syntax described above and the conditional expressions (79) to (83) can be changed within a range within which it can be carried out.

<Decoding>

Now, an image decoding apparatus 200 is described. Also in this case, the image decoding apparatus 200 has a configuration basically similar to that of the case of the first embodiment. However, the image decoding apparatus 200 in this case includes a decoding section that skips, in the case where dequantization for quantization transform coefficient levels obtained by decoding of encoded data, inverse secondary transform for transforming secondary transform coefficients obtained by dequantization of the quantization transform coefficient levels into primary transform coefficients and inverse primary transform for transforming the primary transform coefficients into a prediction residual that is a difference between an image and a prediction image of the image are to be skipped or in the case where transform is to be skipped (upon transform skip), decoding of encoded data of first information relating to on/off of adaptive primary transform.

In particular, the decoding section 211 in this case skips, in the case where dequantization for quantization transform coefficient levels obtained by decoding of encoded data, inverse secondary transform for transforming secondary transform coefficients obtained by dequantization of the quantization transform coefficient levels into primary transform coefficients and inverse primary transform for transforming the primary transform coefficients into a prediction residual that is a difference between an image and a prediction image of the image are to be skipped or in the case where transform is to be skipped, decoding of encoded data of first information relating to on/off of adaptive primary transform.

Since the function relating to encoding of the adaptive primary transform flag the decoding section 211 in this case has by executing a program is similar to that in the case of the seventh embodiment described hereinabove with reference to FIG. 61, description of the function is omitted.

<Flow of Decoding Process>

Figure 69:
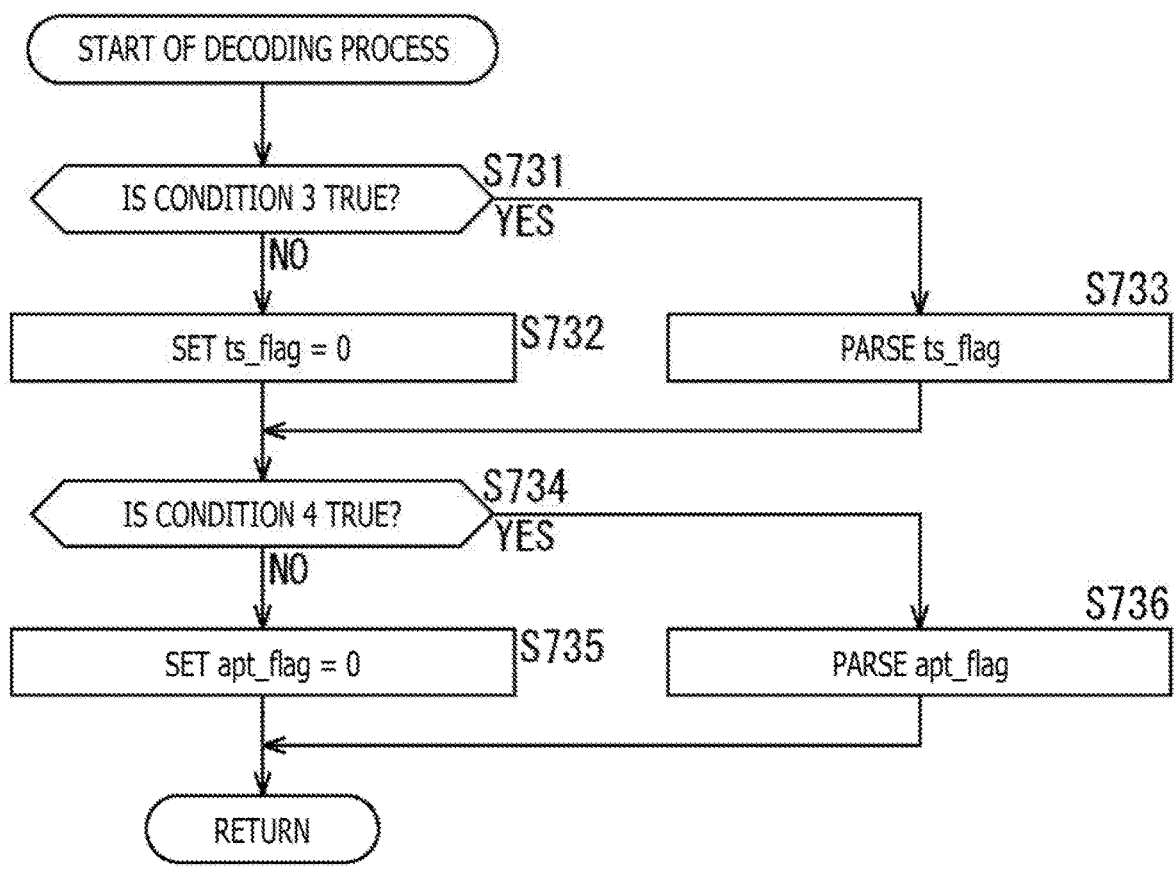
FIG. 69 is a flow chart illustrating an example of a flow of a decoding process.

Now, an example of a flow of processes executed by the image decoding apparatus 200 is described. In this case, the image decoding apparatus 200 performs the image decoding process basically similarly as in the case of the first embodiment. However, in this case, at step S201 (FIG. 13) of the image decoding process, the image decoding apparatus 200 performs decoding of encoded data of the adaptive primary transform flag apt_flag or the like in response to the value of the transform quantization bypass flag transquant_bypass_flag or the like. An example of a flow of decoding of the adaptive primary transform flag apt_flag or the like is described with reference to a flow chart of FIG. 69. In particular, the decoding process depicted in FIG. 69 is executed as part of the decoding process performed at step S201 of FIG. 13. Decoding of the other encoding parameters and quantization transform coefficient levels level is performed by as arbitrary method.

After the decoding process is started, at step S731, the transform skip flag decoding section 512 decides whether or not the condition Condition 3 indicated by the conditional expression (79) given hereinabove is 1 (true). In the case where it is decided that the condition Condition 3 is 0 (false), namely, is the case where it is decided that a transform skip flag is not to be decoded, the processing advances to step S732.

At step S732, the transform skip flag decoding section 512 skips decoding of the transform skip flag ts_flag. In this case, the transform skip flag decoding section 512 interprets that transform skip is not to be performed and sets a value (0) indicating this to the transform skip flag ts_flag (ts_flag=0).

In particular, if the encoding condition for the transform skip flag is not satisfied, then the transform skip flag ts_flag is not transmitted from the encoding side, and therefore, the transform skip flag decoding section 512 skips decoding of the encoded data of the transform skip flag ts_flag. Since this makes it possible to skip encoding of redundant information, it is possible to suppress increase of the load of a decoding process and suppress degradation of the encoding efficiency.

After the process at step S732 ends, the processing advances to step S734. Further, in the case where it is decided at step S731 that the condition Condition 3 is 1 (true), namely, in the case where it is decided that the transform skip flag is to be decoded, the processing advances to step S733.

At step S733, the transform skip flag decoding section 512 decodes the encoded data of the transform skip flag ts_flag. After the process at step S733 ends, the processing advances to step S734.

At step S734, the adaptive primary transform flag decoding section 511 decides whether or not the condition Condition 4 indicated by the conditional expression (81) given hereinabove is 1 (true). In the case where it is decided that the Condition 1 is 0 (false), namely, in the case where it is decided that the adaptive primary transform flag is not to be decoded, the processing advances to step S735.

At step S735, the adaptive primary transform flag decoding section 511 skips decoding of the adaptive primary transform flag apt_flag. In this case, the adaptive primary transform flag decoding section 511 interprets that adaptive primary transform is not to be performed, and sets the value (0) indicating this to the adaptive primary transform flag apt_flag (apt_flag=0). The decoding process ends and the processing returns to FIG. 13.

In particular, if the encoding condition for the adaptive primary transform flag is not satisfied, then the adaptive primary transform flag apt_flag is not transmitted from the encoding side, and therefore, the adaptive primary transform flag decoding section 511 skips decoding of the encoded data of the adaptive primary transform flag apt_flag. Since this makes it possible to skip decoding of redundant information, it is possible to suppress increase of the load of a decoding process and suppress degradation of the encoding efficiency.

After the process at step S735 ends, the decoding process ends and the processing returns to FIG. 13. Further, in the case where it is decided at step S734 that the condition Condition 2 is 1 (true), namely, in the case where it is decided that the transform skip flag is to be decoded, the processing advances to step S736.

At step S736, the adaptive primary transform flag decoding section 511 decodes the encoded data of the adaptive primary transform flag apt_flag. After the process at step S736 ends, the decoding process ends and the processing returns to FIG. 13.

By executing the decoding process in such a manner as described above, in the case where the transform quantization bypass is to be applied or in the case where the transform skip is to be applied, the image decoding apparatus 200 can skip the decoding process of the adaptive primary transform flag apt_flag. In particular, the processing amount and the code amount relating to decoding of the adaptive primary transform flag apt_flag can be decreased.

It is to be noted that change of the processing order of the steps or change of the substance of the processes of the decoding process described above may be performed within a range within which it can be carried out. Further, arithmetic operation relating to the syntax or the conditional expressions (79) to (82) described hereinabove can be changed within a range within which it can be carried out.

9. Ninth Embodiment

<Data Unit of Information>

The data unit to which information relating to an image or information relating to encoding and decoding of an image described in the foregoing description (or of data to be made a target) is set arbitrarily and is not limited to the examples described above. For example, the information may be set for each TU, TB, PU, PB, CU, LCU, sub block, block, tile, slice, picture, sequence or component, or data in such data units may be targeted. Naturally, the data unit is set for each piece of information. In other words, all pieces of information may not be set (targeted) for each same data unit. It is to be noted that the storage place of such information is arbitrary and such information may be stored into the header of the data unit, the parameter set or the like described above. Further, the information may be stored into a plurality of locations.

<Control Information>

The control information relating to the present technology described in connection with the foregoing embodiments may be transmitted from the encoding side to the decoding side. For example, control information (for example, enabled_flag) for controlling whether or not application of the present technology described above is to be permitted (or inhibited) may be transmitted. Further, control information for designating an upper limit or a lower limit or both of the limits to the block size with application of the present technology described above is to be permitted (or inhibited) may be transmitted.

<Encoding and Decoding>

The present technology can be applied to arbitrary image encoding and decoding in which primary transform, secondary transform and encoding (decoding, inverse secondary transform and inverse primary transform) are performed. In particular, specifications of transform (inverse transform), quantization (dequantization), encoding (decoding), prediction and so forth are arbitrary and are not limited to the examples described hereinabove. For example, in transform (inverse transform), (inverse) transform other than (inverse) primary transform and (inverse) secondary transform (namely, three or more kinds of (inverse) transforms) may be performed. Further, the encoding (decoding) may be or a reversible type or of an irreversible type. Further, quantization (dequantization), prediction or the like may be omitted. Further, a process has not been described above such as a filter process may be performed.

For example, as an in-loop filter, a deblocking filter, a sample adaptive offset (SAO; Sample Adaptive Offset) or an adaptive loop filter (ALF; Adaptive Loop Filter) may be applied. It is to be noted that, where lossless encoding is to be performed, in the image encoding apparatus 100, the transform quantization bypass effective flag transquant_bypass_enabled_flag is set to 1 and is encoded, and the transform quantization bypass flag transquant_bypass_flag is set to 1 and is encoded. Accordingly, in the case where the transform quantization bypass flag transquant_bypass_flag for each predetermined unit. (for example, a CTU or a CU) is 1, it is necessary to omit a process of a filter or an in-loop filter that have an action to correct a decoded image (deblocking filter, sample adaptive offset, adaptive loop filter). Further, in the case where the transform quantization bypass flag transquant_bypass_flag for each predetermined unit is 1, by omitting encoding of a syntax factor for each predetermined unit regarding a filter or an in-loop filter that have an action for correcting a decoded image (deblocking filter, sample adaptive offset, adaptive loop filter), a redundant code amount, can be decreased. For example, in the case of an adaptive loop filter, encoding of a syntax factor such as a filter coefficient or an on/off flag of a filter process is omitted.

Similarly, in the image decoding apparatus 200 that decodes encoded data encoded by lossless encoding decodes the transform quantization bypass validity flag transquant_bypass_enabled_flag and decodes the transform quantization bypass flag transquant_bypass_flag for each predetermined unit (for example, a CTU or a CU). Accordingly, in the case where the transform quantization bypass flag transquant_bypass_flag for each predetermined unit is 1, it is necessary to omit a process of a filter or an in-loop filter that have an action for correcting a decoded image (deblocking filter, sample adaptive offset, adaptive loop filter). Further, in the case where the transform quantization bypass flag transquant_bypass_flag for each predetermined unit is 1, by omitting decoding of a syntax factor for each predetermined unit regarding a filter or an in-loop filter that have an action for correcting a decoded image (deblocking filter, sample adaptive offset, adaptive loop filter), the processing amount relating to decoding of redundant codes can be reduced. For example, in the case of an adaptive loop filter, decoding of a syntax factor such as a filter coefficient or an on/off flag of a filter process is omitted.

<Application Field of Present Technology>

A system, an apparatus, a processing section and so forth to which the present technology is applied can be applied to arbitrary fields such as, for example, transportation, medical, crime prevention, agriculture, livestock industry, mining, beauty, factory, consumer electronics, weather, natural surveillance fields and so forth.

For example, the present technology can be applied also to a system or a device that transmits an image provided for appreciation. Further, for example, the present technology can be applied also to a system or a device that is provided for transportation. Furthermore, for example, the present technology can be applied also to a system or a device that is provided for security. Further, for example, the present technology can be applied also to a system or a device that is provided for sports. Furthermore, for example, the present technology can be applied also to a system or a device that is provided for agriculture. Further, for example, the present technology can be applied also to a system or a device that is provided for livestock industry. Furthermore, the present technology can be applied to a system or a device that supervises the state of the nature such as, for example, a volcano, a forest, an ocean or the like. Further, the present technology can be applied to a weather observation system or a weather observation device for observing, for example, a weather, a temperature, a humidity, a wind speed, sunshine hours or the like. Furthermore, the present technology can be applied also to a system, a device or the like for observing ecology of wildlife such as, for example, birds, fish, reptiles, amphibians, mammalians, insects, plants and so forth.

<Application to Multi-View Image Encoding and Decoding System>

The series of processes described hereinabove can be applied to a multi-view image encoding and decoding system that performs encoding and decoding of a multi-view image including images of a plurality of viewpoints (views (view)). In this case, the present technology may be applied to encoding or decoding of each viewpoint (view (view)).

<Application to Hierarchical Image Encoding and Decoding System>

Further, the series of processes described above can be applied to a hierarchical image encoding (scalable encoding) and decoding system that performs encoding and decoding of a hierarchical image layered (hierarchized) in a plurality of layers (hierarchies) so as to have a scalability (scalability) function in regard to a predetermined parameter. In this case, the present technology may be applied to encoding and decoding of each hierarchy (layer).

<Computer>

While the series of processes described above can be executed by hardware, it may otherwise be executed by software. Where the series of processes is executed by software, a program that constructs the software is installed into a computer. Here, the computer includes a computer incorporated in hardware for exclusive use, a personal computer, for example, for universal use that can execute various functions by installing various programs, and so forth.

Figure 70:
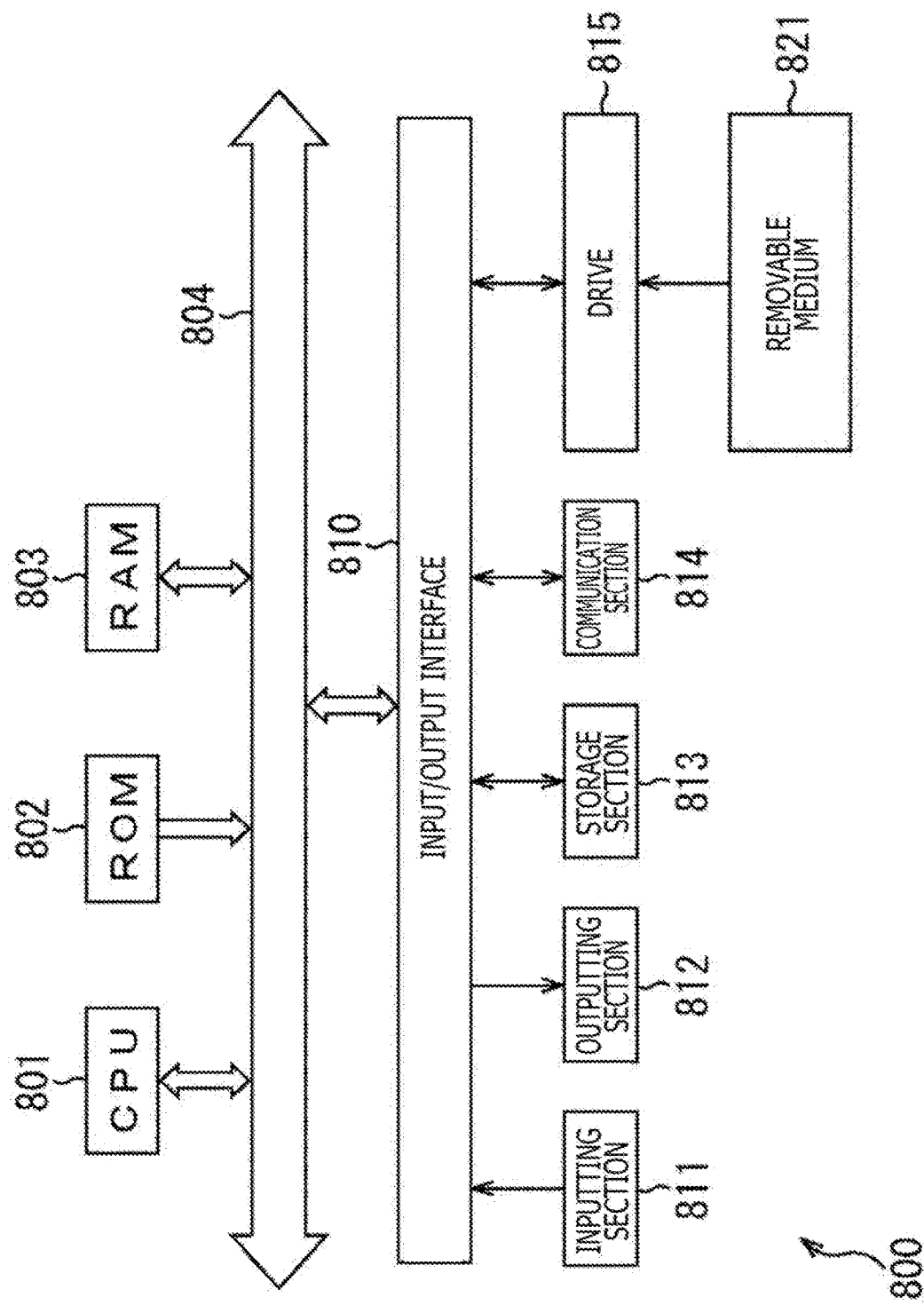
FIG. 70 is a block diagram depicting a principal configuration example of a computer.

FIG. 70 is a block diagram depicting an example of a configuration of hardware of a computer that executes the series of processes described above in accordance with a program.

In a computer 800 depicted in FIG. 70, a CPU (Central Processing Unit) 801, a ROM (Read Only Memory) 802 and a RAM (Random Access Memory) 803 are connected to each other by a bus 804.

To the bus 804, also an input/output interface 810 is connected. To the input/output interface 810, an inputting section 811, an outputting section 812, a storage section 813, a communication section 814 and a drive 815 are connected.

The inputting section 811 includes, for example, a keyboard, a mouse, a microphone, a touch panel, an input terminal and so forth. The outputting section 812 includes a display, a speaker, an output terminal and so forth. The storage section 813 includes, for example, a hard disk, a RAM disk, a nonvolatile memory and so forth. The communication section 814 includes, for example, a network interface. The drive 815 drives a removable medium 821 such as a magnetic disk, an optical disk, a magneto-optical disk, a semiconductor memory or the like.

In the computer configured in such a manner as described above, the CPU 801 loads a program stored, for example, in the storage section 813 into the RAM 803 through the input/output interface 810 and the bus 804 and executes the program to perform the series of processes described above. Into the RAM 803, also data and so forth necessary upon execution of various processes by the CPU 801 are suitably stored.

The program executed by the computer (CPU 801) can be recorded, for example, into the removable medium 821 as a package medium or the like and applied. In this case, the program can be installed into the storage section 813 through the input/output interface 810 by mounting the removable medium 821 on the drive 815.

Further, this program can be provided through a wired or wireless transmission medium such as a local area network, the Internet or a digital satellite broadcast. In this case, the program can be received by the communication section 814 and installed into the storage section 813.

Also it is possible to install this program in advance into the RPM 802 or the storage section 813.

<Application of Present Technology>

The image encoding apparatus 100 or the image decoding apparatus 200 according to any embodiment described hereinabove can be applied to various electronic apparatus such as transmitters or receivers, for example, for distribution by a satellite broadcast, a wired broadcast such as a cable TV or the Internet, distribution to a terminal by cellular communication and so forth, or recording apparatus that record an image on a medium such as an optical disk, a magnetic disk, a flash memory or the like, reproduction apparatus for reproducing an image from such storage media as described above and so forth.

<First Application Example: Television Receiver>

Figure 71:
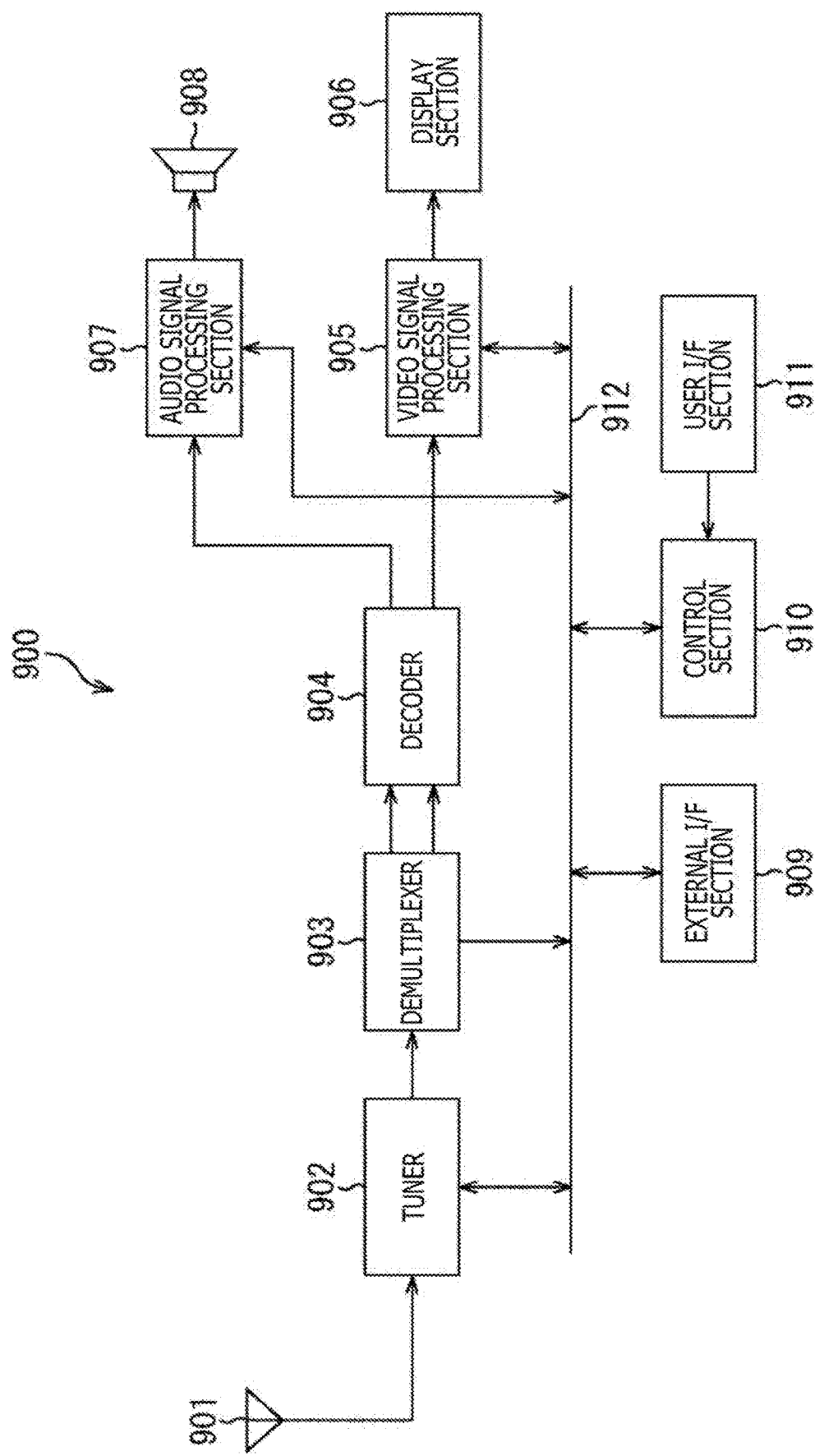
FIG. 71 is a block diagram depicting an example of a schematic configuration of a television apparatus.

FIG. 71 is a view depicting an example of a schematic configuration of a television apparatus to which any embodiment described hereinabove is applied. A television apparatus 900 includes an antenna 901, a tuner 902, a demultiplexer 903, a decoder 904, a video signal processing section 905, a display section 906, an audio signal processing section 907, a speaker 908, an external interface (I/F) section 909, a control section 910, a user interface (I/F) section 911 and a bus 912.

The tuner 902 extracts a signal of a desired channel from broadcasting signals received through the antenna 901 and demodulates the extracted signal. Then, the tuner 902 outputs an encoded bit stream obtained by the demodulation to the demultiplexer 903. In particular, the tuner 902 has a role as a transmission section in the television apparatus 900, which receives an encoded stream in which an image is encoded.

The demultiplexer 903 demultiplexer a video stream and an audio stream of a broadcasting program of a viewing target from an encoded bit stream and outputs the demultiplexed streams to the decoder 904. Further, the demultiplexer 903 extracts auxiliary data such as an EPG (Electronic Program Guide) or the like from the encoded bit, stream and supplies the extracted data to the control section 910. It is to be noted that the demultiplexer 903 may perform descramble in the case where the encoded bit stream is in a scrambled state.

The decoder 904 decodes the video stream and the audio stream inputted from the demultiplexer 903. Then, the decoder 904 outputs video data generated by the decoding process to the video signal processing section 905. Further, the decoder 904 outputs audio data generated by the decoding process to the audio signal processing section 907.

The video signal processing section 905 reproduces video data inputted from the decoder 904 and causes the display section 906 to display a video. Further, the video signal processing section 905 may cause the display section 906 to display an application screen image supplied through the n work. Further, the video signal processing section 905 may perform additional processes such as, for example, noise removal and so forth for video data in accordance with a setting. Furthermore, the video signal processing section 905 may generate an image of a GUI (Graphical User Interface) such as, for example, a menu, a button, a cursor or the like and cause the generated image to be superimposed on an output image.

The display section 906 is driven by a drive signal supplied from the video signal processing section 905 and displays a video or an image on a video face of a display device (for example, a liquid crystal display, a plasma display, an OELD) (Organic ElectroLumnescence Display) (organic EL display) or the like).

The audio signal processing section 907 performs a reproduction process such as D/A conversion, amplification and so forth for audio data inputted from the decoder 904 and causes sound to be outputted from the speaker 908. Further, the audio signal processing section 907 may perform additional processes such as noise removal or the like for the audio data.

The external interface section 909 is an interface for connecting the television apparatus 900 and an external apparatus or a network to each other. For example, a video stream or an audio stream received through the external interface section 909 may be decoded by the decoder 904. In particular, also the external interface section 909 has a role as a transmission section in the television apparatus 900, which receives an encoded stream in which images are encoded.

The control section 910 includes a processor such as a CPU, and a memory such as a RAM, a ROM and so forth. The memory stores a program to be executed by the CPU, program data, EPG data, data acquired through a network and so forth. The program stored in the memory is read into and executed by the CPU, for example, upon activation of the television apparatus 900. The CPU executes the program to control operation of the television apparatus 900 in response to an operation signal inputted, for example, from the user interface section 911.

The user interface section 911 is connected to the control section 910. The user interface section 911 includes a button and a switch for allowing, for example, a user to operate the television apparatus 900, a reception section for a remote controlling signal and so forth. The user interface section 911 detects an operation by the user through the components mentioned and generates an operation signal, and outputs the generated operation signal to the control section 910.

The bus 912 connects the tuner 902, demultiplexer 903, decoder 904, video signal processing section 905, audio signal processing section 907, external interface section 909 and control section 910 to each other.

In the television apparatus 900 configured in such a manner as described above, the decoder 904 may have a function of the image decoding apparatus 200 described hereinabove. In particular, the decoder 904 may decode encoded data by a method described hereinabove in connection with the foregoing embodiments. By such decoding, the television apparatus 900 can suppress degradation of the encoding efficiency of a received encoded bit stream.

Further, in the television apparatus 900 configured in such a manner as described above, the video signal processing section 905 may be configured, for example, so as to encode image data supplied from the decoder 904 and output the obtained encoded data to the outside of the television apparatus 900 through the external interface section 909. Further, the video signal processing section 905 may have the function of the image encoding apparatus 100 described hereinabove. In short, the video signal processing section 905 may encode image data supplied from the decoder 904 by the methods described hereinabove in connection with the embodiments. By such encoding, the television apparatus 900 can suppress degradation of the encoding efficiency of encoded data to be outputted.

<Second Application Example: Portable Telephone Set>

Figure 72:
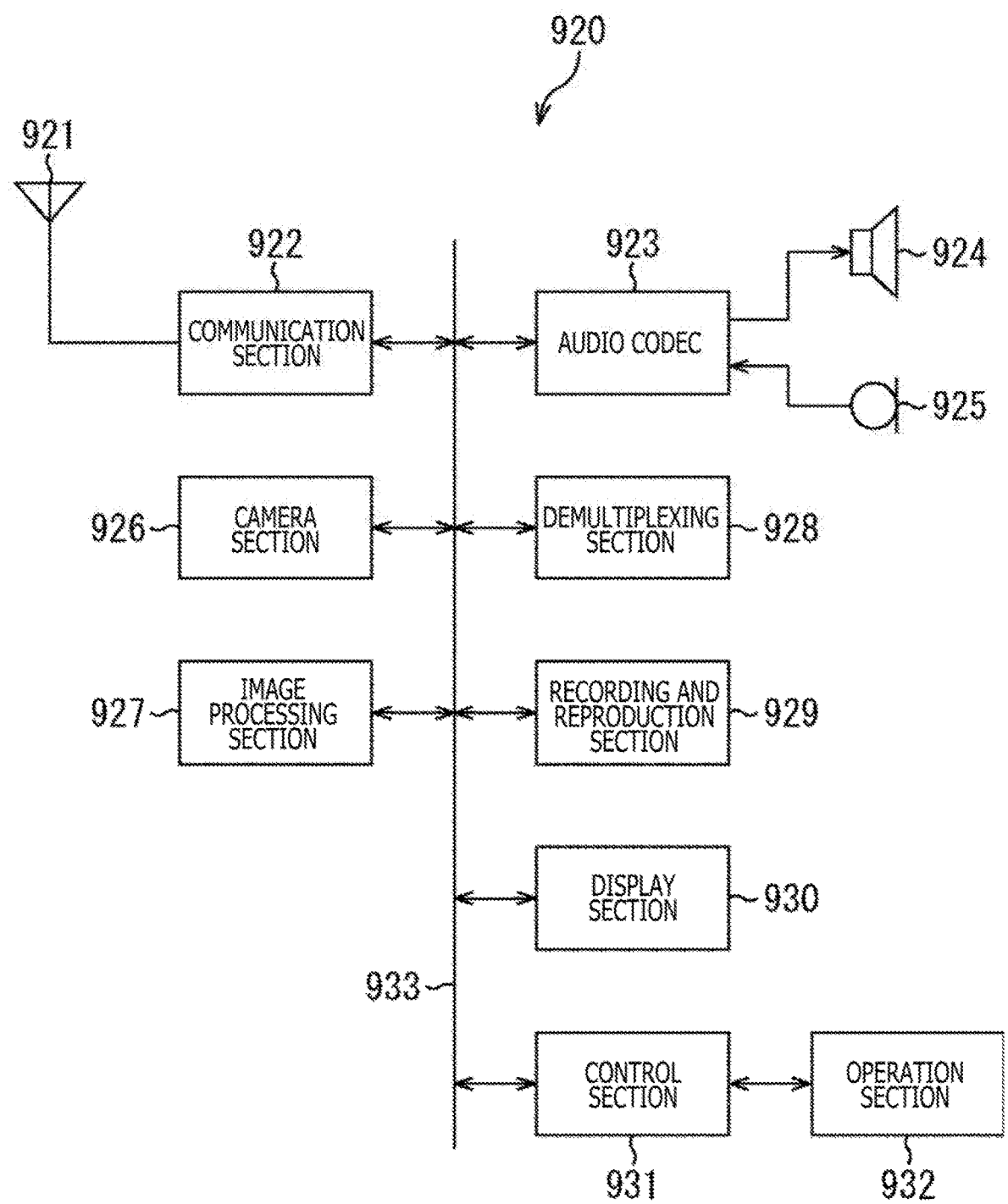
FIG. 72 is a block diagram depicting an example of a schematic configuration of a portable telephone set.

FIG. 72 is a view depicting an example of a schematic configuration of a portable telephone set to which the embodiments described hereinabove are applied. A portable telephone set 920 includes an antenna 921, a communication section 922, an audio codec 923, a speaker 924, a microphone 925, a camera section 926, an image processing section 927, a demultiplexing section 928, a recording and reproduction section 929, a display section 930, a control section 931, an operation section 932 and a bus 933.

The antenna 921 is connected to the communication section 922. The speaker 924 and the microphone 925 are connected to the audio codec 923. The operation section 932 is connected to the control section 931. The bus 933 connects the communication section 922, audio codec 923, camera section 926, image processing section 927, demultiplexing section 928, recording and reproduction section 929, display section 930 and control section 931 to each other.

The portable telephone set 920 performs such operations as transmission and reception of a voice signal, transmission and reception of an electronic mail or image data, pickup of an image, recording of data and so forth in various operation modes including a voice speech mode, a data communication mode, an image pickup mode and a videophone mode.

In the voice speech mode, an analog speech signal generated by the microphone 925 is supplied to the audio codec 923. The audio codec 923 converts the analog speech signal into speech data and A/D converts and compresses the speech data after the conversion. Then, the audio codec 923 outputs the speech data after the compression to the communication section 922. Then, the communication section 922 encodes and modulates the speech data to generate a transmission signal. Then, the communication section 922 transmits the generated transmission signal to a base station (not depicted) through the antenna 921. On the other hand, the communication section 922 amplifies and frequency converts a wireless signal received through the antenna 921 to acquire a reception signal. Then, the communication section 922 demodulates and decodes the reception signal to generate speech data and outputs the generated speech data to the audio codec 923. The audio codec 923 decompresses and D/A converts the speech data to generate an analog speech signal. Then, the audio codec 923 supplies the generated speech signal to the speaker 924 such that speech is outputted from the speaker 924.

On the other hand, in the data communication mode, for example, the control section 931 generates character data that configure an electronic mail in response to operations by the user through the operation section 932. Further, the control section 931 controls the display section 930 to display characters. Further, the control section 931 generates electronic mail data in response to a transmission instruction from the user through the operation section 932 and outputs the generated electronic mail data to the communication section 922. The communication section 922 encodes and modulates the generated electronic mail data to generate a transmission signal. Then, the communication section 922 transmits the generated transmission signal to the base station (not depicted) through the antenna 921. On the other hand, the communication section 922 amplifies and frequency converts a wireless signal received through the antenna 921 to acquire a reception signal. Then, the communication section 922 demodulates and decodes the reception signal to restore the electronic mail data and outputs the restored electronic mail data to the control section 931. The control section 931 controls the display section 930 to display the substance of the electronic mail and supplies the electronic mail data to the recording and reproduction section 929 such that the electronic data is written into its recording medium.

The recording and reproduction section 929 has an arbitrary storage medium that is readable and writable. For example, the storage medium may be a built-in type storage medium such as a RAM, a flash memory or the like or an externally mountable storage medium such as a hard disk, a magnetic disk, a magneto-optical disk, an optical disk, a USB (Universal Serial Bus) memory, a memory card or the like.

Further, in the image pickup mode, for example, the camera section 926 picks up an image of an image pickup object to generate image data and outputs the generated image data to the image processing section 927. The image processing section 927 encodes the image data inputted from the camera section 926 and supplies the encoded stream to the recording and reproduction section 929 so as to be written into the storage medium of the same.

Further, in the image display mode, the recording and reproduction section 929 reads out an encoded stream recorded on the storage medium and outputs the encoded stream to the image processing section 927. The image processing section 927 decodes the encoded stream inputted from the recording and reproduction section 929 and supplies the image data to the display section 930 such that the image is displayed.

Further, in the videophone mode, for example, the demultiplexing section 928 multiplexes a video stream encoded by the image processing section 927 and an audio stream inputted from the audio codec 923 and outputs the multiplexed stream to the communication section 922. The communication section 922 encodes and modulates the stream to generate a transmission signal. Then, the communication section 922 transmits the generated transmission signal to a base station (not depicted) through the antenna 921. On the other hand, the communication section 922 amplifies and frequency converts a wireless signal received through the antenna 921 to acquire a reception signal. The transmission signal and the reception signal can include an encoded bit stream. Then, the communication section 922 demodulates and decodes the reception signal to restore the stream and outputs the restored stream to the demultiplexing section 928. The demultiplexing section 928 demultiplexes the video stream and the audio stream from the inputted stream and outputs the video stream to the image processing section 927 while it outputs the audio stream to the audio codec 923. The image processing section 927 decodes the video stream to generate video data. The video data is supplied to the display section 930, by which a series of images are displayed. The audio codec 923 decompresses and D/A converts the audio stream to generate an analog audio signal.

Then, the audio codec 923 supplies the generated audio signal to the speaker 924 such that speech is outputted from the speaker 924.

In the portable telephone set 920 configured in this manner, for example, the image processing section 927 may have the function of the image encoding apparatus 100 described hereinabove. In short, the image processing section 927 may encode image data by the methods described in the foregoing description of the embodiments. By such encoding, the portable telephone set 920 can suppress degradation of the encoding efficiency of encoded data.

Further, in the portable telephone set 920 configured in this manner, for example the image processing section 927 may have the function of the image decoding apparatus 200 described hereinabove. In short, the image processing section 927 may decode encoded data by the methods described hereinabove in the foregoing description of the embodiments. By such decoding, the portable telephone set 920 can suppress degradation of the encoding efficiency of encoded data.

<Third Application Example: Recording and Reproduction Apparatus>

Figure 73:
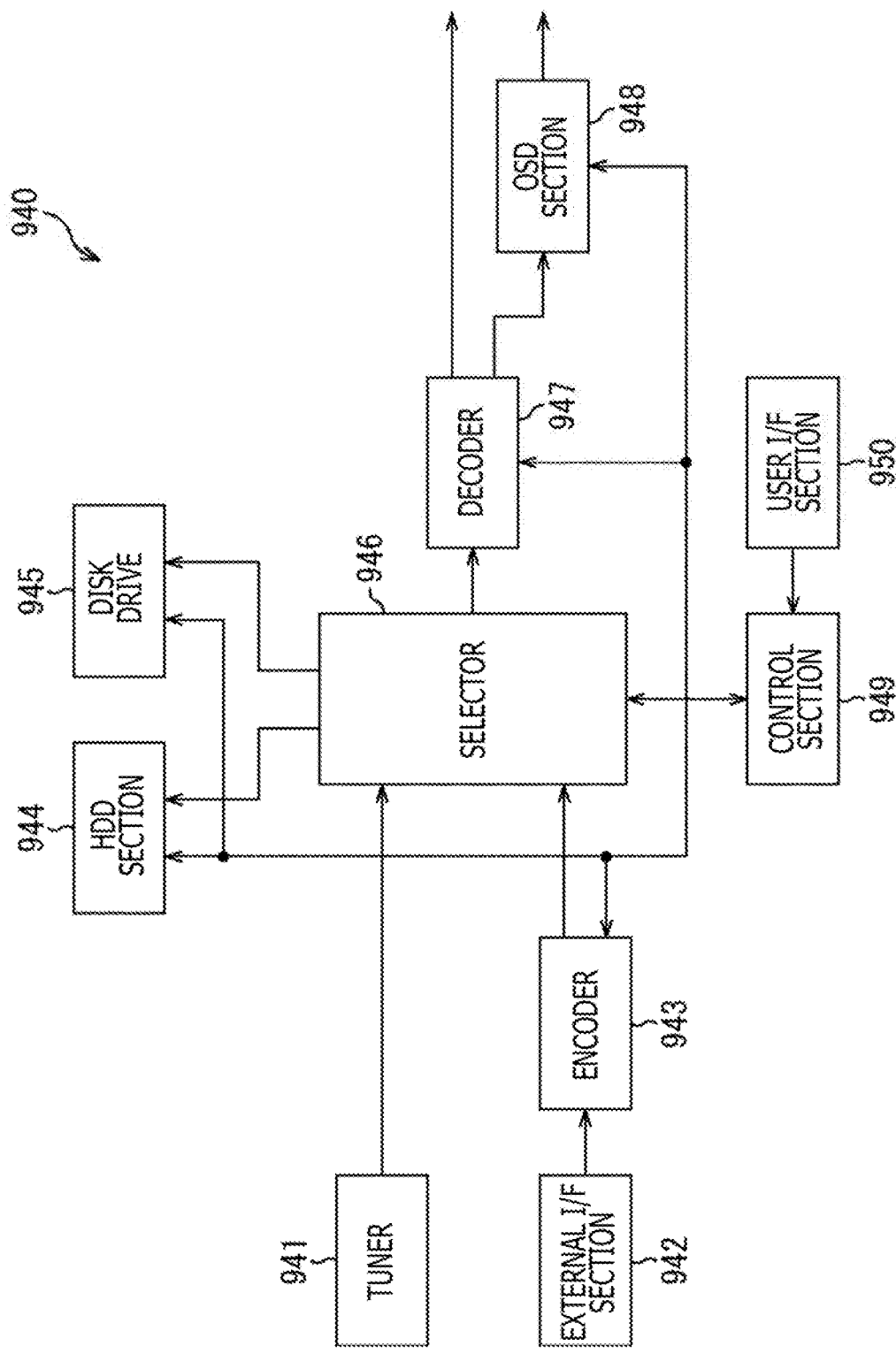
FIG. 73 is a block diagram depicting an example of a schematic configuration of a recording and reproduction apparatus.

FIG. 73 depicts an example of a schematic configuration of a recording and reproduction apparatus to which any embodiment described hereinabove is applied. A recording and reproduction apparatus 940 encodes, for example, audio data and video data of a received broadcasting program and records the encoded data on a recording medium. Further, the recording and reproduction apparatus 940 may encode, for example, audio data and video data acquired from a different apparatus and record the data on a recording medium. Further, the recording and reproduction apparatus 940 reproduces, for example, data recorded on the recording medium on a monitor and a speaker in response to an instruction of the user. At this time, the recording and reproduction apparatus 940 decodes audio data and video data.

The recording and reproduction apparatus 940 includes a tuner 941, an external interface (I/F) section 942, an encoder 943, an HDD (Hard Disk Drive) section 944, a disk drive 945, a selector 946, a decoder 947, an OSD (On-Screen Display) section 948, a control section 949 and a user interface (I/F) 950.

The tuner 941 extracts a signal of a desired channel from broadcasting signals received through an antenna (not depicted) and demodulates the extracted signal. Then, the tuner 941 outputs an encoded bit stream obtained by the demodulation to the selector 946. In other words, the tuner 941 has a role as the transmission section in the recording and reproduction apparatus 940.

The external interface section 942 is an interface for connecting the recording and reproduction apparatus 940 and an external apparatus or a network to each other. The external interface section 942 may be, for example, an IEEE (Institute of Electrical and Electronic Engineers) 1394 interface, a network interface, a USB interface, a flash memory interface or the like. For example, video data and audio data received through the external interface section 942 are inputted to the encoder 943. In other words, the external interface section 942 has a role as a transmission section in the recording and reproduction apparatus 940.

The encoder 943 encodes, in the case where video data and audio data inputted from the external interface section 942 are not in an encoded state, the video data and the audio data. Then, the encoder 943 outputs an encoded bit stream to the selector 946.

The HDD section 944 records an encoded bit stream, in which content data of videos, audios and so forth are compressed, various programs and other data on an internal hard disk. Further, the HDD section 944 reads out, upon reproduction of videos and audios, such data from the hard disk.

The disk drive 945 performs recording and reading out of data on and from a recording medium mounted thereon. The recording medium to be mounted on the disk drive 945 may be, for example, a DVD (Digital Versatile Disc) disk (DVD-Video, DVD-RAM (DVD+Random Access Memory), DVD-R (DVD+Recordable), DVD-RW (DVD+Rewritable), DVD+R (DVD+Recordable), DVD+RW (DVD+Rewriteable) and so forth) or a Blu-ray (registered trademark) disk or the like.

The selector 946 selects, upon recording of videos and audios, an encoded bit stream inputted from the tuner 941 or the encoder 943 and outputs the selected encoded bit stream to the HDD 944 or the disk drive 945. On the other hand, upon reproduction of videos and audios, the selector 946 outputs an encoded bit stream inputted from the HDD 944 or the disk drive 945 to the decoder 947.

The decoder 947 decodes an encoded bit stream to generate video data and audio data. Then, the decoder 947 outputs the generated video data to the OSD section 948. Further, the decoder 947 outputs the generated audio data to the external speaker.

The OSD section 948 reproduces the video data inputted from the decoder 947 and displays a video. Further, the OSD section 948 may superimpose an image of a GUI such as, for example, a menu, a button, a cursor or the like on the displayed video.

The control section 949 includes a processor such as a CPU or the like and a memory such as a RAM, a ROM and so forth. The memory stores a program to be executed by the CPU, program data and so forth. The program stored in the memory is read into and executed by the CPU, for example, upon activation of the recording and reproduction apparatus 940. By executing the program, the CPU controls operation of the recording and reproduction apparatus 940, for example, in response to an operation signal inputted from the user interface section 950.

The user interface section 950 is connected to the control section 949. The user interface section 950 includes, for example, a button and a switch for allowing a user to operate the recording and reproduction apparatus 940, a reception section for a remote controlling signal and so forth. The user interface section 950 detects an operation by the user through the components to generate an operation signal and outputs the generated operation signal to the control section 949.

In the recording and reproduction apparatus 940 configured in this manner, for example, the encoder 943 may have the functions of the image encoding apparatus 100 described above. In short, the encoder 943 may encode image data by the methods described in the foregoing description of the embodiments. By such encoding, the recording and reproduction apparatus 940 can suppress degradation of the encoding efficiency of encoded data.

Further, in the recording and reproduction apparatus 940 configured in this manner, for example, the decoder 947 may have the functions of the image decoding apparatus 200 described hereinabove. In short, the decoder 947 may decode encoded data by the methods described in the foregoing description of the embodiments. By such decoding, the recording and reproduction apparatus 940 can suppress degradation of the encoding efficiency of encoded data.

<Fourth Application Example: Image Pickup Apparatus>

Figure 74:
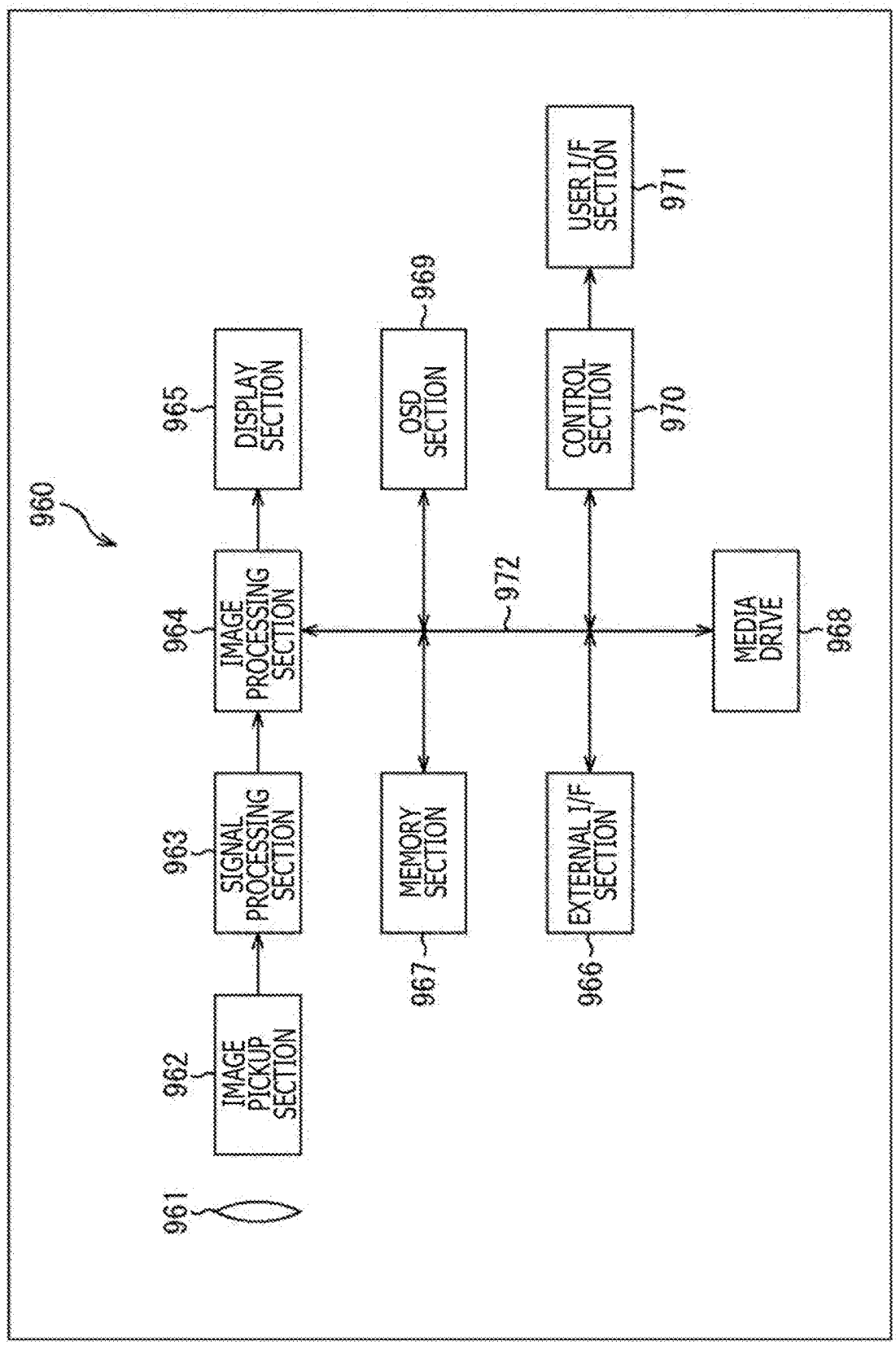
FIG. 74 is a block diagram depicting an example of a schematic configuration of an image pickup apparatus.

FIG. 74 depicts an example of a schematic configuration of an image pickup apparatus to which any embodiment described hereinabove is applied. An image pickup apparatus 960 picks up an image of an image pickup object to generate an image and encodes and records image data on a recording medium.

The image pickup apparatus 960 includes an optical block 961, an image pickup section 962, a signal processing section 963, an image processing section 964, a display section 965, an external interface (I/F) section 966, a memory section 967, a media drive 968, an OSD section 969, a control section 970, a user interface (I/F) section 971 and a bus 972.

The optical block 961 is connected to the image pickup section 962. The image pickup section 962 is connected to the signal processing section 963. The display section 965 is connected to the image processing section 964. The user interface section 971 is connected to the control section 970. The bus 972 connects the image processing section 964, external interface section 966, memory section 967, media drive 968, OSD section 969 and control section 970 to each other.

The optical block 961 includes a focus lens, a diaphragm mechanism and so forth. The optical block 961 forms an optical image of an image pickup object on an image pick plane of the image pickup section 962. The image pickup section 962 includes an image sensor such as a CCD (Charge Coupled Device) image sensor, a CMOS (Complementary Metal Oxide Semiconductor) image sensor or the like and converts an optical image formed on the image pickup plane into an image signal in the form of an electric signal by photoelectric conversion. Then, the image pickup section 962 outputs the image signal to the signal processing section 963.

The signal processing section 963 performs various camera signal processes such as knee correction, gamma correction, color correction and so forth for an image signal inputted from the image pickup section 962. The signal processing section 963 outputs the image data after the camera signal processes to the image processing section 964.

The image processing section 964 encodes the image data inputted from the signal processing section 963 to generate encoded data. Then, the image processing section 964 outputs the generated encoded data to the external interface section 966 or the media drive 968. Further, the image processing section 964 decodes encoded data inputted from the external interface section 966 or the media drive 968 to generate image data. Then, the image processing section 964 outputs the generated image data to the display section 965. Further, the image processing section 964 may output image data inputted from the signal processing section 963 to the display section 965 such that an image is displayed. Further, the image processing section 964 may superimpose display data acquired from the OSD section 969 on the image to be outputted to the display section 965.

The OSD section 969 generates an image of a GUI such as, for example, a menu, a button, a cursor or the like and outputs the generated image to the image processing section 964.

The external interface section 966 is configured, for example, as a USB input/output terminal. The external interface section 966 connects the image pickup apparatus 960 and a printer to each other, for example, upon printing of an image. Further, as occasion demands, a drive is connected to the external interface section 966. On the drive, a removable medium such as, for example, a magnetic disk, an optical disk or the like is mounted, and a program read out from the removable medium can be installed into the image pickup apparatus 960. Furthermore, the external interface section 966 may be configured as a network interface connected to a network such as a LAN, the internet or the like. In other words, the external interface section 966 has a role as a transmission section of the image pickup apparatus 960.

The recording medium to be mounted on the media drive 968 may be an arbitrary readable and writable removable medium such as, for example, a magnetic disk, a magneto-optical disk, an optical disk, a semiconductor memory or the like. Further, a recording medium may be mounted fixedly on the media drive 968 such that a non-portable storage section such as, for example, a built-in type hard disk drive or an SSD (Solid State Drive) is configured.

The control section 970 includes a processor such as a CPU or the like and a memory such as a RAM, a ROM or the like. The memory stores therein a program to be executed by the CPU, program data and so forth. The program stored in the memory is read into and executed by the CPU, for example, upon activation of the image pickup apparatus 960. By executing the program, the CPU controls operation of the image pickup apparatus 960, for example, in response to an operation signal inputted from the user interface section 971.

The user interface section 971 is connected to the control section 970. The user interface section 971 includes, for example, a button, a switch and so forth for allowing the user to operate the image pickup apparatus 960. The user interface section 971 detects an operation by the user through the components described to generate an operation signal and outputs the generated operation signal to the control section 970.

In the image pickup apparatus 960 configured in this manner, for example, the image processing section 964 may have the functions of the image encoding apparatus 100 described hereinabove. In short, the image processing section 964 may encode image data by any method described in the foregoing description of the embodiments. By such encoding, the image pickup apparatus 960 can suppress degradation of the encoding efficiency of encoded data.

Further, in the image pickup apparatus 960 configured in such a manner as described above, for example, the image processing section 964 may have the functions of the image decoding apparatus 200 described hereinabove. In short, the image processing section 964 may decode encoded data by any method described in the foregoing description of the embodiments. By such decoding, the image pickup apparatus 960 can suppress degradation of the encoding efficiency of encoded data.

<Fifth Application Example: Video Set>

Figure 75:
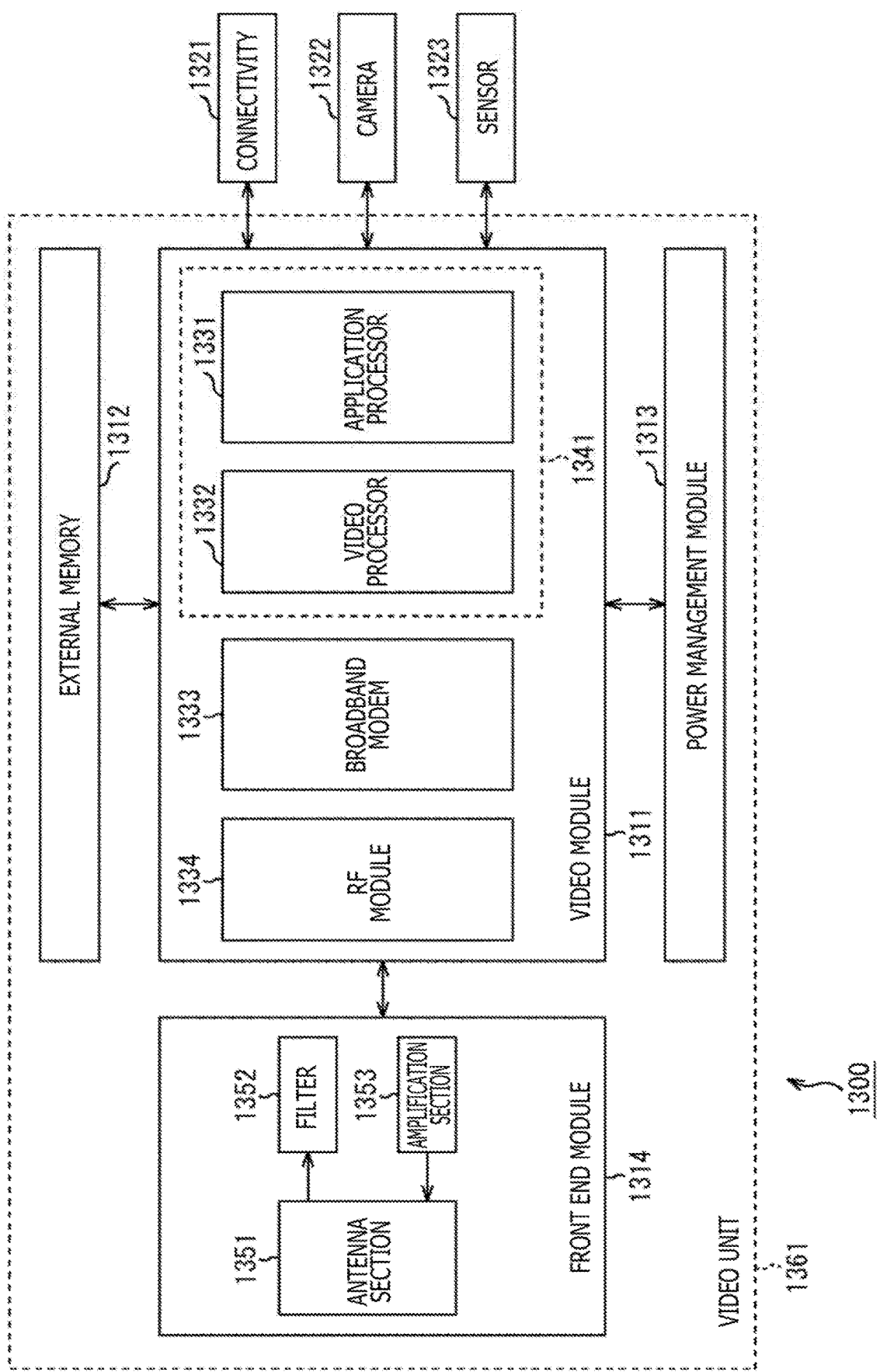
FIG. 75 is a block diagram depicting an example of a schematic configuration of a video set.

Further, the present technology can be carried out also as any constitution to be incorporated in an arbitrary apparatus or in an apparatus that configures a system, such as, for example, a processor as a system LSI (Large Scale integration) or the like, a module that uses a plurality of processors or the like, a unit that uses a plurality of modules or the like, a set in which some other function is added to a unit (namely, part of constitutions of an apparatus). FIG. 75 is a view depicting an example of a schematic configuration of a video set to which the present technology is applied.

In recent years, multifunctionalization of electronic apparatus has been and is proceeding, and in the case where, in development or manufacture, some configuration is carried out as sales, provision or the like, not only a case in which it is carried out as a constitution having one function, but also a case in which a plurality of constitutions having functions associated with each other are combined and carried out as one set having a plurality of functions are found increasingly.

A video set 1300 depicted in FIG. 75 has such a multifunctionalized configuration and is a combination, with a device having a function or functions relating to encoding and/or decoding of an image (one of or both encoding and decoding), a device having some other function relating to the function or functions.

As depicted in FIG. 75, the video set 1300 includes a module group including a video module 1311, an external memory 1312, a power management module 1313, a front end module 1314 and so forth, and a device having relating functions such as a connectivity 1321, a camera 1322, a sensor 1323 and so forth.

A module is a part in which several part functions related to each other are collected such that it has coherent functions. Although a particular physical configuration is arbitrary, for example, a module is conceivable in which electronic circuit elements having individual functions such as a plurality of processors, registers, capacitors and so forth and other devices and so forth are disposed on a wiring board or the like and integrated. Also it is conceivable to combine a module with another module, a process or the like to form a new module.

In the case of the example of FIG. 75, the video module 1311 is a combination of constitutions having functions relating to image processing and includes an application processor, a video processor, a broadband modem 1333 and an RF module 1334.

A processor includes constitutions, which have predetermined functions, integrated on a semiconductor chip by SoC (System On a Chip) and is called, for example, system LSI (Large Scale Integration) or the like. The constitutions having the predetermined functions may be logic circuits (hardware constitutions), may be a CPU, a ROM, a RAM and so forth and a program executed using them (software configuration) or may be a combination of both of them. For example, a processor may include a logic circuit and a CPU, a ROM, a RAM and so forth such that part of functions are implemented by the logic circuit (hardware constitution) and other functions are implemented by a program (software configuration) executed by the CPU.

The application processor 1331 of FIG. 75 is a processor that executes an application relating to image processing. The application executed by the application processor 1331 not only can execute, in order to implement predetermined functions, arithmetic operation processing but also can control constitutions inside and outside of the video module 1311 such as, for example, the video processor 1332 and so forth if necessary.

The video processor 1332 is a processor having a function relating to encoding and/or decoding of an image (one of or both encoding and decoding).

The broadband modem 1333 performs digital modulation or the like for data (digital signal) to be transmitted by wired or wireless (or both wired and wireless) broadband communication performed through a broadband line such as the Internet, a public telephone network or the like to convert the data into an analog signal or converts an analog signal received by such broadband communication to convert the analog signal into data (digital signal). The broadband modem 1333 processes arbitrary information such as, for example, image data to be processed by the video processor 1332, a stream encoded from image data, an application program, setting data or the like.

The RF module 1334 is a module that performs frequency conversion, modulation/demodulation, amplification, filtering and so forth for an RF (Radio Frequency) signal to be transmitted or received through an antenna. For example, the RF module 1334 performs frequency conversion and so forth for a baseband signal generated by the broadband modem 1333 to generate an RF signal. Further, for example, the RF module 1334 performs frequency conversion and so forth for an RF signal received through the front end module 1314 to generate a baseband signal.

It is to be noted that, as indicated by a broken line 1341 in FIG. 75, the application processor 1331 and the video processor 1332 may be integrated so as to be configured as a single processor.

The external memory 1312 is a module provided outside the video module 1311 and having a storage device utilized by the video module 1311. Although the storage device of the external memory 1312 may be implemented by any physical constitution, since generally it is frequently utilized for storage of a large amount of data such as image data of a unit of a frame, it is desirable to implement the storage device by a semiconductor memory that is comparatively less expensive and has a large capacity like a DRAM (Dynamic Random Access Memory).

The power management module 1313 manages and controls power supply to the video module 131 (constitutions in the video module 1311).

The front end module 1314 is a module that provides a front end function (circuit at a transmission/reception end of the antenna side) to the RF module 1334. As depicted in FIG. 75, the front end module 1314 includes, for example, an antenna section 1351, a filter 1352 and an amplification section 1353.

The antenna section 1351 includes an antenna for transmitting and receiving a wireless signal and peripheral constitutions. The antenna section 1351 transmits a signal supplied from the amplification section 1353 as a wireless signal and supplies a received wireless signal as an electric signal (RF signal) to the filter 1352. The filter 1352 performs filter processing and so forth for an RF signal received through the antenna section 1351 and supplies the RF signal after the processing to the RF module 1334. The amplification section 1353 amplifies the RF signal supplied from the RF module 1334 and supplies the amplified RF signal to the antenna section 1351.

The connectivity 1321 is a module having functions relating to connection to the outside. The physical configuration of the connectivity 1321 is arbitrary. For example, the connectivity 1321 includes constitutions having a communication function according to a standard other than a communication standard with which the broadband modem 1333 is compatible, external input and output terminals and so forth.

For example, the connectivity 1321 may include a module having a communication function that complies with a wireless communication standard such as Bluetooth (registered trademark), IEEE 802.11 (for example, Wi-Fi (Wireless Fidelity, registered trademark)), NFC (Near Field Communication), IrDA (InfraRed Data Association) or the like, an antenna for transmitting and receiving a signal that complies with the standard, and so forth. Further, for example, the connectivity 1321 may include a module having a communication function that complies with a wired communication standard such as USB (Universal Serial Bus), HDMI (registered trademark) (High-Definition Multimedia interface) or the like, a terminal that complies with the standard and so forth. Furthermore, for example, the connectivity 1321 may include other data (signal) transmission functions such as analog input and output terminals and so forth.

It is to be noted that the connectivity 1321 may include a device of a transmission destination of data (signal). For example, the connectivity 1321 may include a drive for performing reading out and writing of data from and into a recording medium such as a magnetic disk, an optical disk, a magneto-optical disk, a semiconductor memory or the like (including not only a drive for a removable medium but also a hard disk, an SSD (Solid State Drive), a NAS (Network Attached Storage) and so forth). Further, the connectivity 1321 may include an outputting device of an image or sound (a monitor, a speaker or the like).

The camera 1322 is a module having a function for picking up an image of an image pickup object to obtain image data of the image pickup object. Image data obtained by image pickup of the camera 1322 is, for example, supplied to and encoded by the video processor 1332.

The sensor 1323 is a module having an arbitrary sensor function such as, for example, a sound sensor, an ultrasonic sensor, an optical sensor, an illuminance sensor, an infrared sensor, an image sensor, a rotation sensor, an angle sensor, an angular velocity sensor, a speed sensor, an acceleration sensor, an inclination sensor, a magnetic identification sensor, a shock sensor, a temperature sensor and so forth. Data detected by the sensor 1323 is supplied, for example, to the application processor 1331 and is utilized by an application or the like.

The constitution described as a module in the foregoing description may be implemented as a processor, and conversely, the constitution described as a processor may be implemented as a module.

In the video set 1300 having such a configuration as described above, the present technology can be applied to the video processor 1332 as hereinafter described. Accordingly, the video set 1300 can be carried out as a set to which the present technology is applied.

<Example of Configuration of Video Processor>

Figure 76:
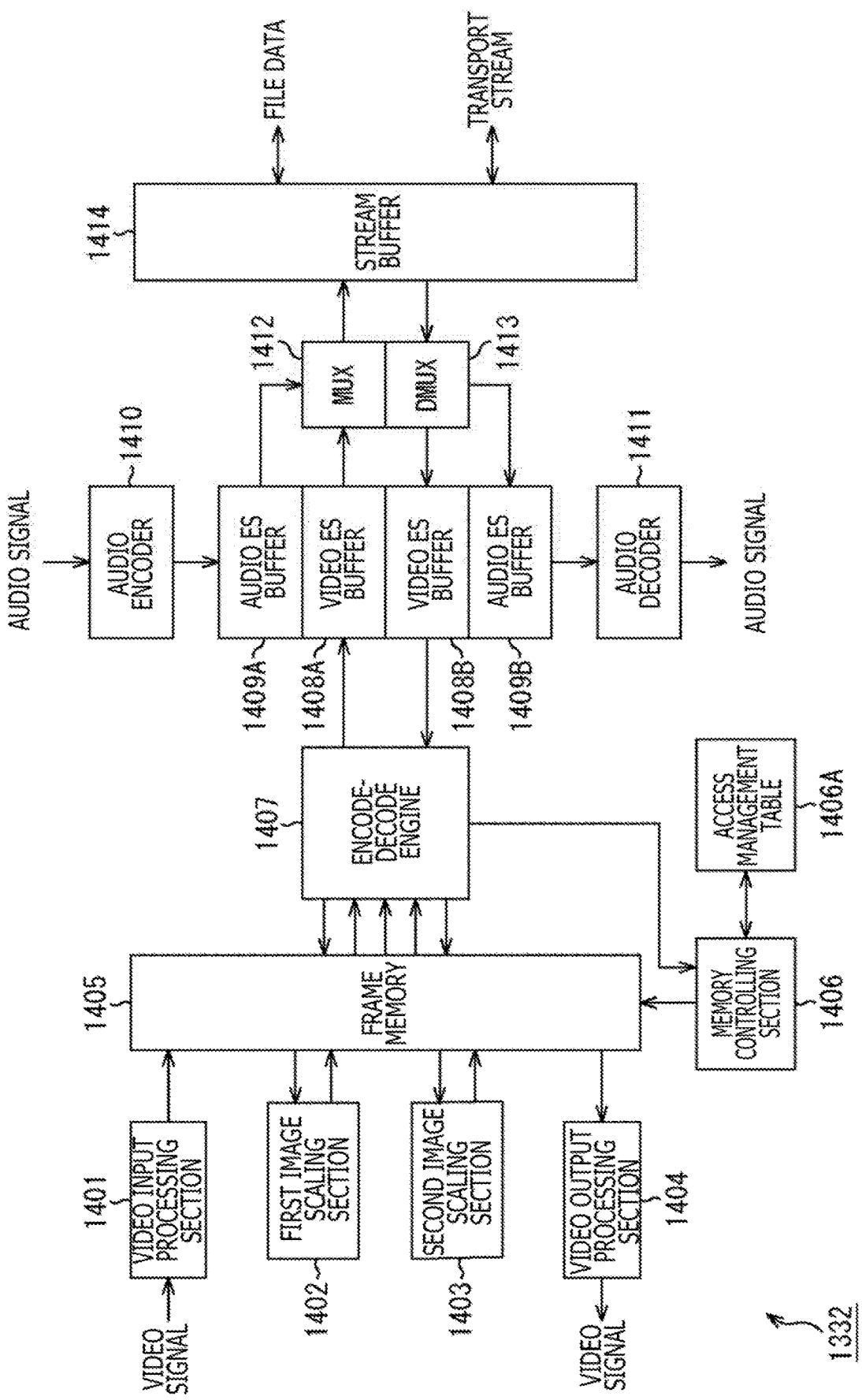
FIG. 76 is a block diagram depicting an example of a schematic configuration of a video processor.

FIG. 76 is a view depicting an example of a schematic configuration of the video processor 1332 (FIG. 75) to which the present technology is applied.

In the case of the example of FIG. 76, the video processor 1332 has a function for receiving an input of a video signal and an audio signal and encoding them by a predetermined method and a function for decoding encoded video data and audio data and reproducing and outputting a video signal and an audio signal.

As depicted in FIG. 76, the video processor 1332 includes a video input processing section 1401, a first image scaling section 1402, a second image scaling section 1403, a video output processing section 1404, a frame memory 1405 and a memory controlling section 1406. The video processor 1332 further includes an encode-decode engine 1407, video ES (Elementary Stream) buffers 1408A and 1408B and audio ES buffers 1409A and 1409B. Furthermore, the video processor 1332 includes an audio encoder 1410, an audio decoder 1411, a multiplexing section (MUX (Multiplexer)) 1412, a demultiplexing section (DMUX (Demultiplexer)) 1413 and a stream buffer 1414.

The video input processing section 1401 acquires a video signal inputted, for example, from the connectivity 1321 (FIG. 75) or the like and converts the video signal into digital image data. The first image scaling section 1402 performs format conversion, a scaling process of an image and so forth for image data. The second image scaling section 1403 performs a scaling process of an image in response to a format at an outputting designation through the video output processing section 1404 and performs format conversion, a scaling process of an image and so forth similar to those by the first image scaling section 1402 for image data. The video output processing section 1404 performs format conversion, conversion into an analog signal and so forth for image data and outputs the resulting analog signal as a reproduced video signal, for example, to the connectivity 1321 and so forth.

The frame memory 1405 is a memory for image data shared by the video input processing section 1401, first image scaling section 1402, second image scaling section 1403, video output processing section 1404 and encode-decode engine 1407. The frame memory 1405 is implemented as a semiconductor memory such as, for example, a DRAM or the like.

The memory controlling section 1406 receives a synchronizing signal from the encode-decode engine 1407 and controls writing and reading out access to the frame memory 1405 in accordance with an access schedule to the frame memory 1405 written in an access management table 1406A. The access management table 1406A is updated by the memory controlling section 1406 in response to a process executed by the encode-decode engine 1407, first image scaling section 1402, second image scaling section 1403 or the like.

The encode-decode engine 1407 performs an encoding process of image data and a decoding process of a video stream that is encoded data of image data. For example, the encode-decode engine 1407 encodes image data read out from the frame memory 1405 and successively writes the encoded image data as a video stream into the video ES buffer 1408A. Further, for example, the encode-decode engine 1407 successively reads out and decodes a video stream from the video ES buffer 1408B and successively writes the decoded video stream as image data into the frame memory 1405. The encode-decode engine 1407 uses the frame memory 1405 as a working area in such encoding and decoding. Further, the encode-decode engine 1407 outputs a synchronizing signal to the memory controlling section 1406 at a timing at which, for example, processing for each macro block is to be started.

The video ES buffer 1408A buffers a video stream generated by the encode-decode engine 1407 and supplies the buffered video stream to the multiplexing section (MUX) 1412. The video ES buffer 1408B buffers a video stream supplied from the demultiplexing section (DMUX) 1413 and supplies the buffered video stream to the encode-decode engine 1407.

The audio ES buffer 1409A buffers an audio stream generated by the audio encoder 1410 and supplies the buffered audio stream to the multiplexing section (MUX) 1412. The audio ES buffer 1409B buffers an audio stream supplied from the demultiplexing section (DMUX) 1413 and supplies the buffered audio stream to the audio decoder 1411.

The audio encoder 1410, for example, digitally converts an audio signal inputted from the connectivity 1321 or the like and encodes the digital audio signal by a predetermined method such as, for example, an MPEG audio method, an AC3 (Audio Code number 3) method or the like. The audio encoder 1410 successively writes an audio stream, which is encoded data of an audio signal, into the audio ES buffer 1409A. The audio decoder 1411 decodes an audio stream supplied from the audio ES buffer 1409B, performs, for example, conversion into an analog signal or the like, and supplies the resulting analog signal as a reproduced audio signal, for example, to the connectivity 1321 or the like.

The multiplexing section (MUX) 1412 multiplexes a video stream and an audio stream. The method of the multiplexing (namely, the format of a bit stream to be generated by the multiplexing) is arbitrary. Further, upon such multiplexing, also it is possible for the multiplexing section (MUX) 1412 to add predetermined header information and so forth to the bit stream. In other words, the multiplexing section (MUX) 1412 can convert the format of the stream by the multiplexing. For example, the multiplexing section (MUX) 1412 multiplexes a video stream and an audio stream to convert the streams into a transport stream that is a bit stream of a format for transfer. Further, for example, the multiplexing section (MUX) 1412 multiplexes a video stream and an audio stream to convert them into data of a file format for recording (file data).

The demultiplexing section (DMUX) 1413 demultiplexes a bit stream, in which a video stream and an audio stream are multiplexed, by a method corresponding to that of the multiplexing by the multiplexing section (MUX) 1412. In short, the demultiplexing section (DMUX) 1413 extracts a video stream and an audio stream from a bit stream read out from the stream buffer 1414 (separates a video stream and an audio stream from each other). In short, the demultiplexing section (DMUX) 1413 can convert the format of a stream by demultiplexing (reverse conversion to the conversion by the multiplexing section (MUX) 1412). For example, the demultiplexing section (DMUX) 1413 can convert a transport stream supplied, for example, from the connectivity 1321, broadband modem 1333 or the like into a video stream and an audio stream by acquiring the transport stream through the stream buffer 1414 and demultiplexing the transport stream. Further, for example, the demultiplexing section (DMUX) 1413 can convert file data read out from various recording media, for example, by the connectivity 1321 into a video stream and an audio stream by acquiring the file data through the stream buffer 1414 and demultiplexing the file data.

The stream buffer 1414 buffers a bit stream. For example, the stream buffer 1414 buffers a transport stream supplied from the multiplexing section (MUX) 1412 and supplies the buffered transport stream, for example, to the connectivity 1321, broadband modem 1333 and so forth at a predetermined timing or on the basis of request from the outside or the like.

Further, the stream buffer 1414 buffers file data supplied from the multiplexing section (MUX) 1412 and supplies the buffered file data, for example, to the connectivity 1321 and so forth at a predetermined timing or on the basis of a request from the outside or the like such that the file data is recorded on various recording media.

Furthermore, the stream buffet 1414 buffers a transport stream acquired, for example, through the connectivity 1321, broadband modem 1333 or the like and supplies the buffered transport stream to the demultiplexing section (DMUX) 1413 at a predetermined timing or on the basis of a request from the outside or the like.

Further, the stream buffer 1414 buffers file data read out from various recording media, for example, by the connectivity 1321 or the like and supplies the buffered file data to the demultiplexing section (DMUX) 1413 at a predetermined timing or on the basis of a request from the outside or the like.

Now, an example of operation of the video processor 1332 having such a configuration as described above is described. For example, a video signal inputted from the connectivity 1321 or the like to the video processor 1332 is converted into digital image data of a predetermined method such as a 4:2:2 Y/Cb/Cr method or the like by the video input processing section 1401 and is successively written into the frame memory 1405. The digital image data are read out into the first image scaling section 1402 or the second image scaling section 1403 and subjected to format conversion to that of a predetermined method such as the 4:2:0 Y/Cb/Cr method or the like and a scaling process, and then are written into the frame memory 1405 again. The image data is encoded by the encode-decode engine 1407 and written as a video stream into the video ES buffer 1408A.

Meanwhile, an audio signal inputted from the connectivity 1321 or the like to the video processor 1332 is encoded by the audio encoder 1410 and written as an audio stream into the audio ES buffer 1409A.

The video stream of the video ES buffer 1408A and the audio stream of the audio ES buffer 1409A are read out to and multiplexed by the multiplexing section (MUX) 1412 such that they are converted into a transport stream, file data or the like. The transport stream generated by the multiplexing section (MUX) 1412 is buffered by the stream buffer 1414 and then is outputted to an external network, for example, through the connectivity 1321, broadband modem 1333 or the like. Meanwhile, the file data generated by the multiplexing section (MUX 1412 is buffered by the stream buffer 1414 and then outputted, for example, to the connectivity 1321 or the like and then recorded into various recording media.

On the other hand, a transport stream inputted from an external network to the video processor 1332, for example, through the connectivity 1321, broadband modem 1333 and so forth is buffered by the stream buffer 1414 and then demultiplexed by the demultiplexing section (DMUX) 1413. Meanwhile, file data read out from various recording media, for example, by the connectivity 1321 or the like and inputted to the video processor 1332 is buffered by the stream buffer 1414 and then demultiplexed by the demultiplexing section (DMUX) 1413. In short, a transport stream or file data inputted to the video processor 1332 is demultiplexed into a video stream and an audio stream by the demultiplexing section (DMUX) 1413.

The audio stream is supplied through the audio ES buffer 1409B to and decoded by the audio decoder 1411 to reproduce an audio signal. Meanwhile, the video stream is successively read out, after written into the video ES buffer 1408B, and decoded by the encode-decode engine 1407 and written into the frame memory 1405. The decoded image data is subjected to a scaling process by the second image scaling section 1403 and is written into the frame memory 1405. Then, the decoded image data is read out into the video output processing section 1404 and format converted to a predetermined format such as the 4:2:2 Y/Cb/Cr format, whereafter it is converted into an analog signal and a video signal is reproduced and outputted.

In the case where the present technology is to be applied to the video processor 1332 configured in such a manner as described above, the present technology according to the respective embodiments described above may be applied to the encode-decode engine 1407. In particular, for example, the encode-decode engine 1407 may have the function of the image encoding apparatus 100 or the function of the image decoding apparatus 200 described above or both of them. This makes it possible to obtain advantageous effects similar to those of the respective embodiments described hereinabove with reference to FIGS. 1 to 69.

It is to be noted that, in the encode-decode engine 1407, the present technology (namely, the function of the image encoding apparatus 100 or the function of the image decoding apparatus 200 or both of them) may be implemented by hardware such as logic circuits or the like or may be implemented by software such as an incorporated program or the like or else may be implemented by both of them.

<Other Configuration Examples of Video Processor>

Figure 77:
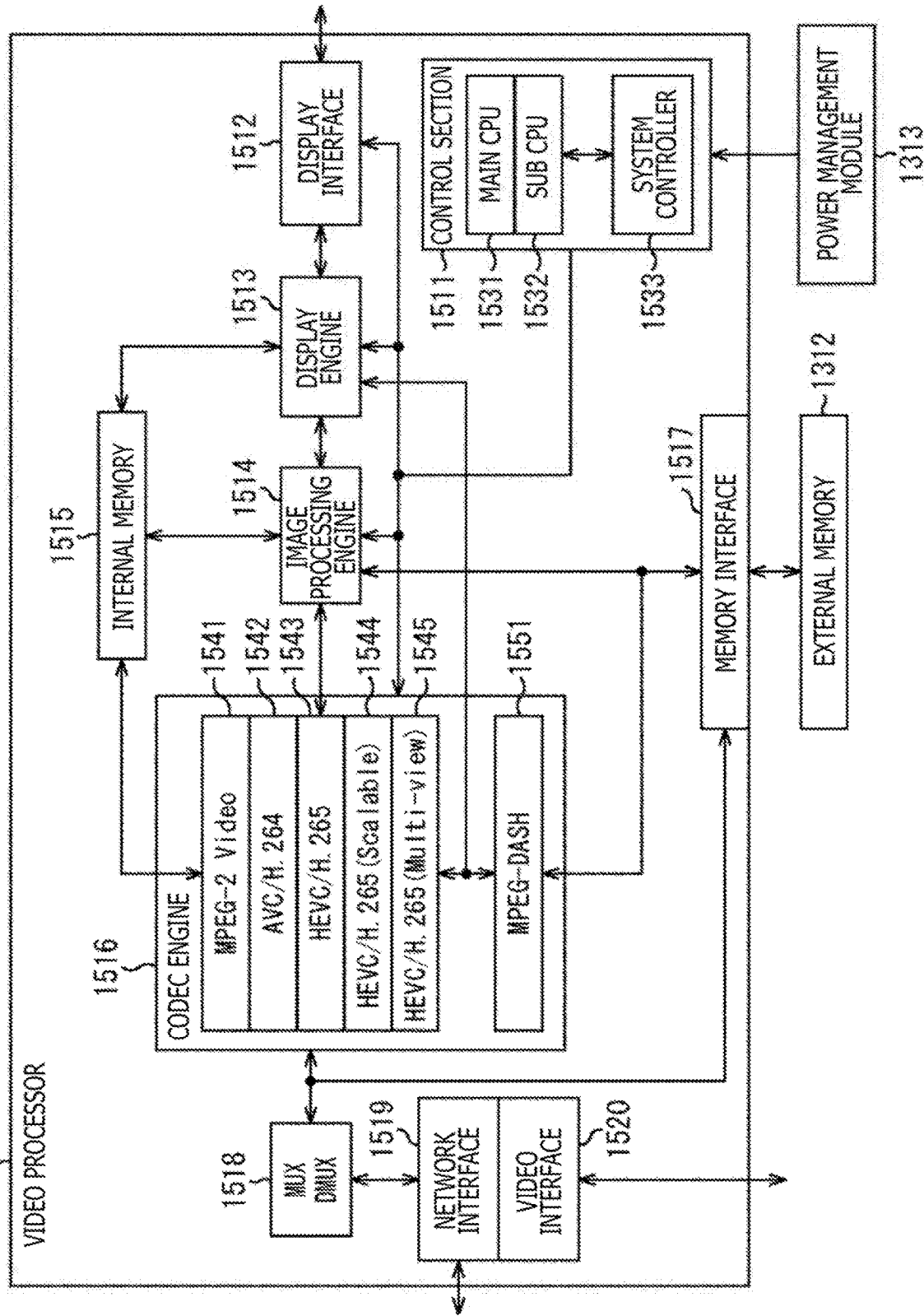
FIG. 77 is a block diagram depicting a different example of a schematic configuration of the video processor.

FIG. 77 is a view depicting a different example of a schematic configuration of the video processor 1332 to which the present technology is applied. In the case of the example of FIG. 77, the video processor 1332 has a function for encoding and decoding video data by a predetermined method.

More particularly, as depicted in FIG. 77, the video processor 1332 includes a control section 1511, a display interface 1512, a display engine 1513, an image processing engine 1514 and an internal memory 1515. The video processor 1332 further includes a codec engine 1516, a memory interface 1517, a multiplexing and demultiplexing section (MUX DMUX) 1518, a network interface 1519 and a video interface 1520.

The control section 1511 controls operation of the processing sections in the video processor 1332 such as the display interface 1512, display engine 1513, image processing engine 1514, codec engine 1516 and so forth.

As depicted in FIG. 77, the control section 1511 includes, for example, a main CPU 1531, a sub CPU 1532 and a system controller 1533. The main CPU 1531 executes a program and for forth for controlling operation of the processing sections in the video processor 1332. The main CPU 1531 generates a control signal in accordance with the program and so forth and supplies the control signal to the processing sections (namely, controls operation of the processing sections). The sub CPU 1532 plays an auxiliary role of the main CPU 1531. For example, the sub CPU 1532 executes a child process, a subroutine or the like of the program or the like executed by the main CPU 1531. The system controller 1533 controls operation of the main CPU 1531 and the sub CPU 1532 such as to designate programs to be executed by the main CPU 1531 and the sub CPU 1532 or the like.

The display interface 1512 outputs image data, for example, to the connectivity 1321 and so forth under the control of the control section 1511. For example, the display interface 1512 converts image data in the form of digital data into an analog signal and outputs the image data as a reproduced video signal, or the image data of digital data as they are, to a monitor apparatus or the like of the connectivity 1321.

The display engine 1513 performs various transform processes such as format conversion, size conversion, color region conversion and so forth for the image data under the control of the control section 1511 such that the image data satisfies hardware specifications of a monitor apparatus or the like on which an image of the image data is to be displayed.

The image processing engine 1514 carries out predetermined image processing such as, for example, a filtering process and so forth for picture quality improvement for the image data under the control of the control section 1511.

The internal memory 1515 is a memory provided in the inside of the video processor 1332 such that it is shared by the display engine 1513, image processing engine 1514 and codec engine 1516. The internal memory 1515 is used for transfer of data performed, for example, between the display engine 1513, image processing engine 1514 and codec engine 1516. For example, the internal memory 1515 stores data supplied from the display engine 1513, image processing engine 1514 or codec engine 1516 and supplies, as occasion demands (for example, in accordance with a request), the data to the display engine 1513, image processing engine 1514 or codec engine 1516. Although this internal memory 1515 may be implemented by any storage device, since generally it is frequently utilized for storage of a small amount of data such as image data in a unit of a block, parameters or the like, preferably it is implemented by a semiconductor memory that has a comparatively (for example, in comparison with the external memory 1312) small capacity but is high in response speed like, for example, an SRAM (Static Random Access Memory).

The codec engine 1516 performs processing relating to encoding or decoding of image data. The method for encoding and decoding with which the codec engine 1516 is compatible is arbitrary, and the number of such methods may be one or a plural number. For example, the codec engine 1516 may have codec functions of a plurality of encoding and decoding methods and perform encoding of image data or decoding of encoded data by a codec function selected from the codec functions.

In the example depicted in FIG. 77, the codec engine 1516 includes, as functional blocks for processing relating to the codec, for example, an MPEG-2 Video 1541, an AVC/H.264 1542, an HEVC/H.265 1543, an HEVC/H.265 (Scalable) 1544, an HEVC/H.265 (Multi-view) 1545 and an MPEG-DASH 1551.

The MPEG-2 Video 1541 is a functional block that encodes or decodes image data by the MPEG-2 method. The AVC/H.264 1542 is a functional block that encodes or decodes image data by the AVC method. The HEVC/H.265 1543 is a functional block that encodes or decodes image data by the HEVC method. The HEVC/H.265 (Scalable) 1544 is a functional block that scalably encodes or scalably decodes image data by the HEVC method. The HEVC/H.265 (Multi-view) 1545 is a functional block that multi-visually encodes or multi-visually decodes image data by the HEVC method.

The MPEG-DASH 1551 is a functional block for transmitting and receiving image data by the MPEG-DASH (MPEG-Dynamic Adaptive Streaming over HTTP) method. MPEG-DASH is a technology for performing streaming of a video using the HTTP (HyperText Transfer Protocol) and has one of characteristics in that appropriate encoded data is selected and transmitted in a unit of a segment from among a plurality of encoded data that are prepared in advance and are different from each other in resolution and so forth. The MPEG-DASH 1551 performs generation of a stream that complies with the standard, transmission control of the stream and so forth, and for encoding and decoding of image data, the MPEG-2 Video 1541 to HEVC/H.265 (Multi-view) 1545 described above are utilized.

The memory interface 1517 is an interface for the external memory 1312. Data supplied from the image processing engine 1514 or the codec engine 1516 is supplied to the external memory 1312 through the memory interface 1517. Meanwhile, data read out from the external memory 1312 is supplied to the video processor 1332 (image processing engine 1514 or codec engine 1516) through the memory interface 1517.

The multiplexing and demultiplexing section (MUX DMUX) 1518 performs multiplexing and demultiplexing of various data relating to an image such as a bit stream of encoded data, image data, a video signal and so forth. The method for the multiplexing and demultiplexing is arbitrary. For example, upon multiplexing, the multiplexing and demultiplexing section (MUX DMUX) 1518 not only can collect a plurality of data into one data but also can add predetermined header information and so forth to the data. Further, upon demultiplexing, the multiplexing and demultiplexing section (MUM DMUX) 1518 not only can divide one data into a plurality of data but also can add predetermined header information and so forth to the divisional data. In short, the multiplexing and demultiplexing section (MUX DMUX) 1518 can convert the data format by multiplexing and demultiplexing. For example, the multiplexing and demultiplexing section (MUX DMUX) 1518 can multiplex bit streams to convert them into a transport stream that is a bit stream of a format for transfer or data of a file format for recording (file data). Naturally, the multiplexing and demultiplexing section (MUX DMUX) 1518 can perform inverse conversion by demultiplexing.

The network interface 1519 is an interface, for example, for the broadband model 1333, connectivity 1321 and so forth. The video interface 1520 is an interface, for example, for the connectivity 1321, camera 1322 and so forth.

Now, an example of operation of such a video processor 1332 as described above is described. For example, if a transport stream is received from an external network through the connectivity 1321, broadband modem 1333 or the like, then the transport stream is supplied through the network interface 1519 to and demultiplexed by the multiplexing and demultiplexing section (MUX DMUX) 1518 and then is decoded by the codec engine 1516. Image data obtained by decoding of the codec engine 1516 is subjected, for example, to predetermined image processing by the image processing engine 1514 and further to predetermined conversion by the display engine 1513, and is supplied, for example, to the connectivity 1321 or the like through the display interface 1512 such that an image thereof is displayed on the monitor. Meanwhile, for example, image data obtained by decoding of the codec engine 1516 is re-encoded by the codec engine 1516 and multiplexed by the multiplexing and demultiplexing section (MUX DMUX) 1518 such that it converted into file data. The file data is, for example, outputted to the connectivity 1321 or the like through the video interface 1520 and is recorded on various recording media.

Furthermore, file data of encoded data, which are encoded image data, read out from a recording medium not depicted, for example, by the connectivity 1321 or the like are supplied through the video interface 1520 to and demultiplexed by the multiplexing and demultiplexing section (MUX DMUX) 1518, and thereafter, they are decoded by the codec engine 1516. Image data obtained by the decoding of the codec engine 1516 are subjected to predetermined image processing by the image processing engine 1514 and further to predetermined conversion by the display engine 1513, and thereafter, they are supplied through the display interface 1512, for example, to the connectivity 1321 or the like such that an image thereof is displayed on the monitor. Meanwhile, for example, image data obtained by decoding of the codec engine 1516 are re-encoded by the codec engine 1516 and multiplexed by the multiplexing and demultiplexing section (MUX DMUX) 1518 such that they are converted into a transport stream. The transport stream is supplied, for example, to the connectivity 1321, broadband modem 1333 and so forth through the network interface 1519 and transmitted to a different apparatus not depicted.

It is to be noted that transfer of image data or other data between the processing sections in the video processor 1332 is performed utilizing, for example, the internal memory 1515 or the external memory 1312. Further, the power management module 1313 controls power supply, for example, to the control section 1511.

In the case where the present technology is applied to the video processor 1332 configured in such a manner as described above, the present technology according to the respective embodiments described hereinabove may be applied to the codec engine 1516. In short, for example, the codec engine 1516 may have the function of the image encoding apparatus 100 or the function of the image decoding apparatus 200 described above or both of them. By this configuration, the video processor 1332 can achieve advantageous effects similar to those of the respective embodiments described hereinabove with reference to FIGS. 1 to 69.

It is to be noted that, in the codec engine 1516, the present technology (namely, the functions of the image encoding apparatus 100) may be implemented by hardware such as logic circuits and so forth, may be implemented by software such as an embedded program or the like or may be implemented by both of them.

While two examples of the configuration of the video processor 1332 are exemplified above, the configuration of the video processor 1332 is arbitrary and may be any other than the two examples described above. Further, although the video processor 1332 may be configured as a single semiconductor chip, it may otherwise be configured as a plurality of semiconductor chips. For example, the video processor 1332 may be, for example, a three-dimensional layered LSI in which a plurality of semiconductors are stacked. Further, the video processor 1332 may be implemented by a plurality of LSIs.

<Application Example to Apparatus>

The video set 1300 can be incorporated into various apparatus that process image data. For example, the video set 1300 can be incorporated into the television apparatus 900 (FIG. 71), portable telephone set 920 (FIG. 72), recording and reproduction apparatus 940 (FIG. 73), image pickup apparatus 960 (FIG. 74) and so forth. By incorporating the video set 1300 into an apparatus, the apparatus can achieve advantageous effects similar to those of the respective embodiments described hereinabove with reference to FIGS. 1 to 69.

It is to be noted that even part of the constitutions of the video set 1300 described above can be carried out as the configuration to which the present technology is applied if it includes the video processor 1332. For example, only the video processor 1332 can be carried out as a video processor to which the present technology is applied. Further, for example, the processor indicated by the broke line 1341, the video module 1311 or the like can be carried out as a processor, a module or the like to which the present technology is applied as described hereinabove. Furthermore, for example, the video module 1311, external memory 1312, power management module 1313 and front end module 1314 can be combined such that they are carried out as a video unit 1361 to which the present technology is applied. In the case of any configuration, advantageous effects similar to those of the embodiments described hereinabove with reference to FIGS. 1 to 69 can be achieved.

In short, any configuration can be incorporated into various apparatus that process image data similarly as in the case of the video set 1300 if the configuration includes the video processor 1332. For example, the video processor 1332, processor indicated by the broken line 1341, video module 1311 or video unit 1361 can be incorporated into the television apparatus 900 (FIG. 71), portable telephone set 920 (FIG. 72), recording and reproduction apparatus 940 (FIG. 73), image pickup apparatus 960 (FIG. 74) and so forth. Thus, by incorporating any of the configurations to which the present technology is applied into an apparatus, the apparatus can achieve advantageous effects similar to those of the respective embodiments described hereinabove with reference to FIGS. 1 to 69 similarly as in the case of the video set 1300.

<Sixth Application Example: Network System>

Further, the present technology can be applied also to a network system configured from a plurality of apparatus. FIG. 78 depicts an example of a schematic configuration of a n work system to which the present technology is applied.

A network system 1600 depicted in FIG. 78 is a system in which different apparatus transfer information relating to an image (moving image) through a network therebetween. A cloud service 1601 of the network system 1600 is a system that provides a service relating to an image (moving image) to terminals such as a computer 1611, an AV (Audio Visual) apparatus 1612, a portable information processing terminal 1613, an IoT (Internet of Things) device 1614 and so forth connected for communication to the cloud service 1601. For example, the cloud service 1601 provides a supplying service of a content of an image (moving image) like so-called video distribution (on-demand or live distribution) to a terminal. Further, for example, the cloud service 1601 provides a backup service for receiving a content of an image (moving image) from a terminal and storing the image. Further, for example, the cloud service 1601 provides a service for mediating transfer of a content of an image (moving image) between terminals.

The physical configuration of the cloud service 1601 is arbitrary. For example, the cloud service 1601 may have various servers such as a server that stores and manages moving images, a server that distributes a moving image to a terminal, a server that acquires a moving image from a terminal, a server that manages users (terminals) or accounting and so forth or an arbitrary network such as the Internet, a LAN or the like.

The computer 1611 is configured an information processing apparatus such as, for example, a personal computer, a server, a work station or the like. The AV apparatus 1612 includes an image processing apparatus such as, for example, a television receiver, a hard disk recorder, a game apparatus, a camera or the like. The portable information processing terminal 1613 includes a portable information processing apparatus such as, for example, a notebook type personal computer, a tablet terminal, a portable telephone set, a smartphone or the like. The IoT device 1614 includes an arbitrary object that performs processing relating to an image such as, for example, machinery, consumer electronics, furniture, other articles, an IC tag, a card type device and so forth. Those terminals have a communication function and can connect (establish a session) to the cloud service 1601 and perform transfer of information (namely, perform communication) to and from the cloud service 1601. Further, each terminal can communicate with any other terminal. Communication between terminals may be performed through the cloud service 1601 or may be performed without the intervention of the cloud service 1601.

The present technology may be applied to such a network system 1600 as described above such that, when data of an image (moving image) is transferred between terminals or between a terminal and the cloud service 1601, the image data may be encoded and decoded is such a manner as described hereinabove in connection with the embodiments. In short, each of the terminals (computer 1611 to IoT device 1614) and the cloud service 1601 may have functions of the image encoding apparatus 100 or the image decoding apparatus 200 described hereinabove. This makes it possible for the terminal of the cloud service 1601, which transfer image data, to suppress degradation of the encoding efficiency.

<Others>

It is to be noted that various kinds of information relating to encoded data (bit stream) may be multiplexed with and transmitted or recorded together with the encoded data or may be transmitted or recorded as separate data associated with the encoded data without being multiplexed with the encoded data here, the term "associate" signifies to make it possible, when one data is to be processed, to utilize (link), for example, different data. In other words, data that are associated with each other may be united into one data or may be made data separate from each other. For example, information associated with encoded data (image) may be transmitted on a transmission line different from that for the encoded data (image). Further, for example, information associated with encoded data (image) may be recorded on a recording medium different from that for the encoded data (image) (or into a recording area of a same recording medium). It is to be noted that this "association" may not be with the entire data but may be with part of the data. For example, an image and information corresponding to the image may be associated with each other in an arbitrary unit such as a plurality of frames, one frame, a portion in a frame or the like.

Further, as described hereinabove, in the present specification, such terms as to "synthesize," to "multiplex," to "add," to "integrate," to "include," to "store," to "place into," to "fit into," to "insert" and so forth signify to unite a plurality of things into one thing such as to unite, for example, encoded data and metadata into one data and signify one method of the "association" described above.

Further, the embodiment of the present technology is not limited to the embodiment described hereinabove but can be altered in various manners without departing from the subject matter of the present technology.

For example, in the present specification, the term system signifies a set of plural components (apparatus, modules (parts) and so forth) and does not matter whether or not all constitutions are placed in a same housing. Accordingly, both of a plurality of apparatus that are accommodated is separate housings and are connected to each other by a network and one apparatus in which a plurality of modules are accommodated in one housing are systems.

Further, for example, a constitution described as one apparatus (or one processing section) may be divided into and configured as a plurality of apparatus (or processing sections). Conversely, constitutions described as a plurality of apparatus (or processing sections) in the foregoing description may be collected such that they are configured as one apparatus (or processing section). Further, a constitution other than those may naturally be added to the configuration of each apparatus (or each processing section). Furthermore, if a constitution or operation as an entire system is substantially same, then part of constitutions of a certain apparatus (or a certain processing section) may be included in constitutions of a different apparatus (or a difference processing section).

Further, for example, the present technology can assume a configuration for cloud computing in which one function is shared and processed in cooperation by a plurality of apparatus through a network.

Further, for example, the program described hereinabove can be executed by an arbitrary apparatus. In this case, the apparatus may be configured such that it has necessary functions (functional blocks and so forth) and can acquire necessary information.

Further, for example, the steps described in connection with the flow charts described hereinabove can be executed by one apparatus and further can be shared and executed by a plurality of apparatus. Furthermore, in the case where a plurality of processes are included in one step, the plurality of processes included in the one step can be executed by one apparatus and also can be shared and executed by a plurality of apparatus.

It is to be noted that the program to be executed by the computer may be of the type by which the processes at steps by which the program is described are executed in a time series in the order as described in the present specification or of the type by which the processes are executed in parallel or executed individually at necessary timings such as when the process is called. Furthermore, the processes at the steps by which the program is executed may be executed in parallel to processes of a different program or may be executed in combination with processes of a different apparatus.

It is to be noted that the plurality of present technologies described in the present specification can individually be carried out solely and independently of each other unless inconsistency occurs. Naturally, also it is possible to carry out an arbitrary plurality of present technologies in combination. For example, also it is possible to carry out the present technology described in the description of any embodiment in combination with the present technology described in the description of a different embodiment. Also it is possible to carry out an arbitrary one of the present technologies described hereinabove in combination with a different technology that is not described hereinabove.

It is to be noted that also it is possible for the present technology to take the following configurations.

(1)

An image processing apparatus, including:

a control section configured to cause, where primary transform that is a transform process for a prediction residual that is a difference between an image and a prediction image of the image is to be skipped, also secondary transform, which is a transform process for a primary transform coefficient obtained by the primary transform of the prediction residual, to be skipped.

(2)

The image processing apparatus according to (1), in which the control section causes, where first information relating to skip of the primary transform indicates skip of the primary transform, the primary transform and the secondary transform to be skipped.

(3)

The image processing apparatus according to (1) or (2), in which the control section causes the primary transform to be executed where the first information indicates execution of the primary transform and causes the secondary transform to be skipped when second information relating to a substance of the secondary transform indicates skip of the secondary transform.

(4)

The image processing apparatus according to any one of (1) to (3), in which the primary transform is orthogonal transform.

(5)

The image processing apparatus according to any one of (1) to (4), in which the secondary transform is a transform process for transforming the primary transform coefficient into a one-dimensional vector;

performing matrix arithmetic operation for the one-dimensional vector;

performing scaling of the one-dimensional vector for which the matrix arithmetic operation is performed; and matrixing the scaled one-dimensional vector.

(6)

The image processing apparatus according to any one of (1) to (5), further including:

a primary transform section configured to perform the primary transform under the control of the control section; and a secondary transform section configured to perform the secondary transform under the control of the control section.

(7)

The image processing apparatus according to any one of (1) to (6), further including:

a quantization section configured to perform quantization for a secondary transform coefficient obtained by the secondary transform of the primary transform coefficient by the secondary transform section or the prediction residual; and an encoding section configured to encode a quantization transform coefficient level obtained by the quantization of the secondary transform coefficient or the prediction residual by the quantization section.

(8)

The image processing apparatus according to any one of (1) to (7), in which the control section causes, where first information relating to skip of the primary transform indicates skip of the primary transform, the primary transform and the secondary transform to be skipped;

the quantization section performs quantization for the prediction residual; and the encoding section encodes the quantization transform coefficient level and the first information to generate a bit stream that includes the encoded data of the quantization transform coefficient level and the encoded data of the first information.

(9)

The image processing apparatus according to any one of (1) to (8), further including:

a prediction section configured to generate the prediction image.

(10)

An image processing method, including:

causing, where primary transform that is a transform process for a prediction residual that is a difference between an image and a prediction image of the image is to be skipped, also secondary transform, which is a transform process for a primary transform coefficient obtained by the primary transform of the prediction residual, to be skipped.

(11)

An image processing apparatus, including:

a control section configured to cause, where inverse primary transform that is inverse transform to primary transform that is a transform process for a prediction residual that is a difference between an image and a prediction image of the image is to be skipped, also inverse secondary transform, which is inverse transform to secondary transform that is a transform process for a primary transform coefficient obtained by the primary transform of the prediction residual, to be skipped.

(12)

The image processing apparatus according to (11), in which the control section causes, where first information relating to skip of the inverse primary transform indicates skip of the inverse primary transform, the inverse primary transform and the inverse secondary transform to be skipped.

(13)

The image processing apparatus according to (11) or (12), in which the control section causes, where the first information indicates execution of the inverse primary transform and besides second information relating to a substance of the inverse secondary transform indicates skip of the secondary transform, the inverse secondary transform to be skipped and the inverse primary transform to be executed.

(14)

The image processing apparatus according to any one of (11) to (13), in which the inverse primary transform is inverse orthogonal transform.

(15)

The image processing apparatus according to any one of (11) to (14), in which the inverse secondary transform is a transform process for
transforming a secondary transform coefficient obtained by decoding and dequantization of encoded data into a one-dimensional vector;
performing matrix arithmetic operation for the one-dimensional vector;
performing scaling of the one-dimensional vector for which the matrix arithmetic operation is performed; and
matrixing the scaled one-dimensional vector.

(16)

The image processing apparatus according to any one of (11) to (15), further including:

an inverse primary transform section configured to perform the inverse primary transform under the control of the control section; and an inverse secondary transform section configured to perform the inverse secondary transform under the control of the control section.

(17)

The image processing apparatus according to any one of (11) to (16), further including:

a decoding section configured to decode encoded data and;

a dequantization section configured to dequantize a quantization transform coefficient level obtained by decoding of the encoded data by the decoding section, in which the inverse secondary transform section performs the inverse secondary transform for a secondary transform coefficient obtained by dequantization of the quantization transform coefficient level by the dequantization section, and the inverse primary transform section performs the inverse primary transform for the primary transform coefficient obtained by the inverse secondary transform of the secondary transform coefficient by the inverse secondary transform section.

(18)

The image processing apparatus according to any one of (11) to (17), in which the decoding section acquires encoded data of the quantization transform coefficient level and encoded data of first information relating to skip of the inverse primary transform from a bit stream and decodes the acquired data; and the control section causes, where the first information obtained by decoding by the decoding section indicates skip of the primary transform, the inverse primary transform and the inverse secondary transform to be skipped.

(19)

The image processing apparatus according to any one of (11) to (18), further including:

a prediction section configured to generate the prediction image.

(20)

An image processing method, including:

causing, where inverse primary transform that is inverse transform to primary transform that is a transform process for a prediction residual that is a difference between an image and a prediction image of the image is to be skipped, also inverse secondary transform, which is inverse transform to secondary transform that is a transform process for a primary transform coefficient obtained by the primary transform of the prediction residual, to be skipped.

(21)

An image processing apparatus, including:

an encoding section configured to skip, where secondary transform is to be performed for a primary transform coefficient obtained by primary transform of a prediction residual that is a difference between an image and a prediction image of the image, encoding of first information relating to skip of the primary transform.

(22)

The image processing apparatus according to (21), in which the encoding section skips the encoding of the first information where second information relating to a substance of the secondary transform indicates execution of the secondary transform.

(23)

The image processing apparatus according to (21) or (22), in which the encoding section encodes the first information where
third information relating to skip of the primary transform, the secondary transform and quantization of a secondary transform coefficient obtained by the secondary transform of the primary transform coefficient indicates execution of the primary transform, the secondary transform and the quantization;
the second information indicates skip of the secondary transform;
fourth information relating to permission of skip of the primary transform indicates permission of skip of the primary transform; and
a size of a transform block of a processing target is equal to or smaller than a maximum size with which skip of the primary transform is permitted.

(24)
The image processing apparatus according to any one of (21) to (23), in which
the primary transform is orthogonal transform.
(25)
The image processing apparatus according to any one of (21) to (24), in which
the secondary transform is a transform process for transforming the primary transform coefficient into a one-dimensional vector;
  performing matrix arithmetic operation for the one-dimensional vector;
  performing scaling of the one-dimensional vector for which the matrix arithmetic operation is performed; and
  matrixing the scaled one-dimensional vector.
(26)
The image processing apparatus according to any one of (21) to (25), further including:
  a primary transform section configured to perform the primary transform;
  a secondary transform section configured to perform the secondary transform; and
  a quantization section configured to perform quantization for a secondary transform coefficient obtained by the secondary transform of the primary transform coefficient by the secondary transform section or the prediction residual, in which
  the encoding section encodes a quantization transform coefficient level obtained by the quantization of the secondary transform coefficient or the prediction residual by the quantization section to generate a bit stream that includes the encoded data of the quantization transform coefficient level.
(27)
The image processing apparatus according to any one of (21) to (26), in which,
  where the encoding section performs encoding of the first information, the encoding section further encodes the first information and includes the generated encoded data of the first information into the bit stream.
(28)
The image processing apparatus according to any one of (21) to (27), in which
  the encoding section further encodes second information relating to the substance of the secondary transform and includes the generated encoded data of the second information into the bit stream.
(29)
The image processing apparatus according to any one of (21) to (28), further including:
  a prediction section configured to generate the prediction image.
(30)
An image processing method, including:
  skipping, where secondary transform is to be performed for a primary transform coefficient obtained by primary transform of a prediction residual that is a difference between an image and a prediction image of the image, encoding of first information relating to skip of the primary transform.
(31)
An image processing apparatus, including:
  a decoding section configured to skip, where inverse secondary transform that is inverse transform to secondary transform that is a transform process for a primary transform coefficient obtained by primary transform of a prediction residual that is a difference between an image and a prediction image of the image is to be performed, decoding of encoded data of first information relating to skip of inverse primary transform that is inverse transform to the primary transform.
(32)
The image processing apparatus according to (31), in which
  the decoding section skips decoding of encoded data of the first information where second information relating to a substance of the secondary transform indicates execution of the inverse secondary transform.
(33)
The image processing apparatus according to (31) or (32), in which
  the decoding section estimates, where decoding of encoded data of the first information is to be skipped, that the first information indicates execution of the inverse primary transform.
(34)
The image processing apparatus according to any one of (31) to (33), in which
  the decoding section decodes encoded data of the first information where
  third information relating to skip of the inverse primary transform, the inverse secondary transform and dequantization of a quantization transform coefficient level obtained by decoding of encoded data indicates execution of the inverse primary transform, the inverse secondary transform and the dequantization;
  the second information indicates skip of the inverse secondary transform;
  fourth information relating to permission of skip of the inverse primary transform indicates permission of skip of the inverse primary transform; and
  a size of a transform block of a processing target is equal to or smaller than a maximum size of the transform block with which skip of the inverse primary transform is permitted.
(35)
The image processing apparatus according to any one of (31) to (34), in which
  the decoding section is configured to further decode encoded data of a quantization transform coefficient level; and
  the image processing apparatus further includes a dequantization section configured to dequantize the quantization transform coefficient level obtained by decoding of the encoded data by the decoding section.
(36)
The image processing apparatus according to any one of (31) to (35), further including:
  an inverse secondary transform section configured to perform the inverse secondary transform; and
  an inverse primary transform section configured to perform the inverse primary transform.
(37)
The image processing apparatus according to any one of (31) to (36), in which
  the inverse primary transform is inverse orthogonal transform.
(38)
The image processing apparatus according to any one of (31) to (37), in which
  the inverse secondary transform is a transform process for transforming a secondary transform coefficient obtained by decoding and dequantization of encoded data into a one-dimensional vector;

performing matrix arithmetic operation for the one-dimensional vector;
performing scaling of the one-dimensional vector for which the matrix arithmetic operation is performed; and
matrixing the scaled one-dimensional vector.

(39)
The image processing apparatus according to any one of (31) to (38), further including:
a prediction section configured to generate the prediction image.

(40)
An image processing method, including:
skipping, where inverse secondary transform that is inverse transform to secondary transform that is a transform process for a primary transform coefficient obtained by primary transform of a prediction residual that is a difference between an image and a prediction image of the image is to be performed, decoding of encoded data of first information relating to skip of inverse primary transform that is inverse transform to the primary transform.

(41)
An image processing apparatus, including:
an encoding section configured to skip, where primary transform that is a transform process for a prediction residual that is a difference between an image and a prediction image of the image is to be skipped, encoding of first information relating to skip of secondary transform that is a transform process for a primary transform coefficient obtained by the primary transform of the prediction residual,

(42)
The image processing apparatus according to (41), in which
the encoding section skips encoding of the first information where second information relating to skip of the primary transform indicates skip of encoding of the primary transform.

(43)
The image processing apparatus according to (41) or (42), in which
the encoding section encodes the first information where
third information relating to permission of the secondary transform indicates permission of the secondary transform;
fourth information relating to skip of the primary transform, the secondary transform and quantization of a secondary transform coefficient obtained by the secondary transform of the primary transform coefficient indicates execution of the primary transform, the secondary transform and the quantization;
the second information indicates execution of the secondary transform; and
a total number of non-zero coefficients in a transform block of a processing target is equal to or greater than a given threshold value.

(44)
The image processing apparatus according to any one of (41) to (43), in which
the primary transform is orthogonal transform.

(45)
The image processing apparatus according to any one of (41) to (44), in which
the secondary transform is a transform process for transforming the primary transform coefficient into a one-dimensional vector;
performing matrix arithmetic operation for the one-dimensional vector;
performing scaling of the one-dimensional vector for which the matrix arithmetic operation is performed; and
matrizing the scaled one-dimensional vector.

(46)
The image processing apparatus according to any one of (41) to (45), further including:
a primary transform section configured to perform the primary transform;
a secondary transform section configured to perform the secondary transform; and
a quantization section configured to perform quantization for a secondary transform coefficient obtained by the secondary transform of the primary transform coefficient by the secondary transform section or the prediction residual, is which
the encoding section encodes a quantization transform coefficient level obtained by the quantization of the secondary transform coefficient or the prediction residual by the quantization section to generate a bit stream that includes the encoded data of the quantization transform coefficient level.

(47)
The image processing apparatus according to any one of (41) to (46), in which,
where the encoding section performs encoding of the first information, the encoding section further encodes the first information and includes the generated encoded data of the first information into the bit stream.

(48)
The image processing apparatus according to any one of (41) to (47), in which
the encoding section further encodes, where encoding of second information relating to skip of the primary transform, the second information and includes the generated encoded data of the second information into the bit stream.

(49)
The image processing apparatus according to any one of (41) to (48), further including:
a prediction section configured to generate the prediction image.

(50)
The image processing apparatus according to any one of (41) to (49), in which
the decoding section skips decoding of inverse primary transform skip information relating to skip of the inverse primary transform based on a size in a horizontal direction and a size is a vertical direction of a transform block of the inverse primary transform and the inverse secondary transform.

(51)
The image processing apparatus according to (50), in which
the decoding section skips decoding of the inverse primary transform skip information where a greater one of the sizes of the transform block in the horizontal direction and the vertical direction is greater than a given value.

(52)
The image processing apparatus according to (50), in which
the decoding section skips decoding of the inverse primary transform skip information where a sum or a product of the sizes of the transform block in the horizontal direction and the vertical direction is greater than a given value.

(53)
An image processing method, including:
skipping, where primary transform that is a transform process for a prediction residual that is a difference between an image and a prediction image of the image is to be skipped, encoding of first information relating to skip of secondary transform that is a transform process for a primary transform coefficient obtained by the primary transform of the prediction residual.

(54)

An image processing apparatus, including:

a decoding section configured to skip, where inverse primary transform that is inverse transform to primary transform that is a transform process for a prediction residual that is a difference between an image and a prediction image of the image is to be skipped, decoding of encoded data of first information relating to skip of inverse secondary transform that is inverse transform to secondary transform that is a transform process for a primary transform coefficient obtained by the primary transform of the prediction residual.

(55)

The image processing apparatus according to (54), in which the decoding section skips decoding of encoded data of the first information where second information relating to skip of the inverse primary transform indicates skip of the inverse primary transform.

(56)

The image processing apparatus according to (54) or (55), in which the decoding section estimates, where decoding of encoded data of the first information is to be skipped, that the first information indicates skip of the inverse secondary transform.

(57)

The image processing apparatus according to any one of (54) to (56), in which the decoding section decodes encoded data of the first information where third information relating to permission of the inverse secondary transform indicates permission of the inverse secondary transform;

fourth information relating to skip of the primary transform, the secondary transform and dequantization of a quantization transform coefficient level obtained by decoding of encoded data indicates execution of the primary transform, the secondary transform and the quantization;

the second information indicates execution of the primary transform; and a total number of non-zero coefficients in a transform block of a processing target is equal to or greater than a given threshold value.

(58)

The image processing apparatus according to any one of (54) to (57), in which the decoding section is configured to further decode encoded data of a quantization transform coefficient level; and the image processing apparatus further includes a dequantization section configured to dequantize the quantization transform coefficient level obtained by decoding of the encoded data by the decoding section.

(59)

The image processing apparatus according to any one of (54) to (58), further including:

an inverse secondary transform section configured to perform the inverse secondary transform; and an inverse primary transform section configured to perform the inverse primary transform.

(60)

The image processing apparatus according to any one of (54) to (59), in which the inverse primary transform is inverse orthogonal transform.

(61)

The image processing apparatus according to any one of (54) to (60), in which the inverse secondary transform is a transform process for
transforming a secondary transform coefficient obtained by decoding and dequantization of encoded data into a one-dimensional vector;
performing matrix arithmetic operation for the one-dimensional vector;
performing scaling of the one-dimensional vector for which the matrix arithmetic operation is performed; and
matrixing the scaled one-dimensional vector.

(62)

The image processing apparatus according to any one of (54) to (61), further including:

a prediction section configured to generate the prediction image.

(63)

The image processing apparatus according to any one of (54) to (62), in which the decoding section ships decoding of inverse primary transform skip information relating to skip of the inverse primary transform based on a size in a horizontal direction and a size in a vertical direction of a transform block of the inverse primary transform and the inverse secondary transform.

(64)

The image processing apparatus according to (63), in which the decoding section skips decoding of the inverse primary transform skip information where a greater one of the sizes of the transform block in the horizontal direction and the vertical direction is greater than a given value.

(65)

The image processing apparatus according to (63), in which the decoding section skips decoding of the inverse primary transform skip information where a sum or a product of the sizes of the transform block in the horizontal direction and the vertical direction is greater than a given value.

(66)

An image processing method, including:

skipping, where inverse primary transform that is inverse transform to primary transform that is a transform process for a prediction residual that is a difference between an image and a prediction image of the image is to be skipped, decoding of encoded data of first information relating to skip of inverse secondary transform that is inverse transform to secondary transform that is a transform process for a primary transform coefficient obtained by the primary transform of the prediction residual.

(67)

An image processing apparatus, including:

an encoding section configured to skip, where an average value, in units of sub blocks, of the number of non-zero coefficients included in a transform block of a processing targets is smaller than a threshold value, encoding of first information relating to skip of secondary transform that is a transform process for a primary transform coefficient obtained by primary transform of a prediction residual that is a difference between an image and a prediction image of the image.

(68)

The image processing apparatus according to (67), in which the encoding section determines a total number of the non-zero coefficients included in the transform block of the processing target and divides the total number by a sub block number of the transform block to determine the average value.

(69)

The image processing apparatus according to (67) or (68), in which the encoding section encodes the first information where
second information relating to permission of the secondary transform indicates permission of the secondary transform;
third information relating to skip of the primary transform, the secondary transform and quantization of a secondary transform coefficient obtained by the secondary transform of the primary transform coefficient indicates execution of the primary transform, the secondary transform and the quantization;
fourth information relating to skip of the primary transform indicates execution of the primary transform; and
the average value is equal to or greater than the threshold value.

(70)

The image processing apparatus according to any one of (67) to (69), in which the primary transform is orthogonal transform.

(71)

The image processing apparatus according to any one of (67) or (70), in which the secondary transform is a transform process for transforming the primary transform coefficient into a one-dimensional vector;
performing matrix arithmetic operation for the one-dimensional vector;
performing scaling of the one-dimensional vector for which the matrix arithmetic operation is performed; and
matrixing the scaled one-dimensional vector.

(72)

The image processing apparatus according to any one of (67) or (71), further including:

a primary transform section configured to perform the primary transform; and
a secondary transform section configured to perform the secondary transform.

(73)

The image processing apparatus according to any one of (67) to (72), further including:

a quantization section configured to perform quantization for a secondary transform coefficient obtained by the secondary transform of the primary transform coefficient by the secondary transform section or the prediction residual, in which the encoding section encodes a quantization transform coefficient level obtained by the quantization of the secondary transform coefficient or the prediction residual by the quantization section to generate a bit stream that includes the encoded data of the quantization transform coefficient level.

(74)

The image processing apparatus according to any one of (67) to (73), in which, where the encoding section performs encoding of the first information, the encoding section further encodes the first information and includes the generated encoded data of the first information into the bit stream.

(75)

The image processing apparatus according to any one of (67) to (74), further including:

a prediction section configured to generate the prediction image.

(76)

An image processing method, including:

skipping, where an average value, in units of sub blocks, of the number of non-zero coefficients included in a transform block of a processing targets is smaller than a threshold value, encoding of first information relating to skip of secondary transform that is a transform process for a primary transform coefficient obtained by primary transform of a prediction residual that is a difference between an image and a prediction image of the image.

(77)

An image processing apparatus, including:

a decoding section configured to skip, where as average value, in units of sub blocks, of the number of non-zero coefficients included in a transform block of a processing targets is smaller than a threshold value, decoding of encoded data of first information relating to skip of inverse secondary transform that is inverse transform to secondary transform that a transform process for a primary transform coefficient obtained by primary transform of a prediction residual that is a difference between as image and a prediction image of the image.

(78)

The image processing apparatus according to (77), in which the decoding section determines a total number of the non-zero coefficients included in the transform block of the processing target and divides the total number by a sub block number of the transform block to determine the average value.

(79)

The image processing apparatus according to (77) or (78), in which the decoding section estimates, where decoding of encoded data of the first information is to be skipped, that the first information indicates skip of the inverse secondary transform.

(80)

The image processing apparatus according to any one of (77) to (79), in which the decoding section decodes encoded data of the first information where
second information relating to permission of the secondary transform indicates permission of the secondary transform;
third information relating to skip of the primary transform, the secondary transform and quantization of a secondary transform coefficient obtained by the secondary transform of the primary transform coefficient indicates execution of the primary transform, the secondary transform and the quantization;
fourth information relating to skip of the primary transform indicates execution of the primary transform; and
the average value is equal to or greater than the given threshold value.

(81)

The image processing apparatus according to any one of (77) to (80), in which the decoding section is configured to further decode encoded data of a quantization transform coefficient level; and the image processing apparatus further includes a dequantization section configured to dequantize the quantization transform coefficient level obtained by decoding of the encoded data by the decoding section.

(82)

The image processing apparatus according to any one of (77) to (81), further including:

an inverse secondary transform section configured to perform the inverse secondary transform; and an inverse primary transform section configured to perform the inverse primary transform.

(83)

The image processing apparatus according to any one of (77) to (82), in which the inverse primary transform is inverse orthogonal transform.

(84)

The image processing apparatus according to any one of (77) to (83), in which the inverse secondary transform is a transform process for transforming a secondary transform coefficient obtained by decoding and dequantization of encoded data into a one-dimensional vector;

performing matrix arithmetic operation for the one-dimensional vector;

performing scaling of the one-dimensional vector for which the matrix arithmetic operation is performed; and matrixing the scaled one-dimensional vector.

(85)

The image processing apparatus according to any one of (77) to (84), further including:

a prediction section configured to generate the prediction image.

(86)

An image processing method, including:

skipping, where an average value, in units of sub blocks, of the number of non-zero coefficients included in a transform block of a processing targets is smaller than a threshold value, decoding of encoded data of first information relating to skip of inverse secondary transform that is inverse transform to secondary transform that a transform process for a primary transform coefficient obtained by primary transform of a prediction residual that is a difference between an image and a prediction image of the image.

(81)

An image processing apparatus, including:

an encoding section configured to skip, where primary transform that is a transform process for a prediction residual that is a difference between an image and a prediction image of the image, secondary transform that is a transform process for a primary transform coefficient obtained by the primary transform of the prediction residual and quantization for a secondary transform coefficient obtained by the secondary transform of the primary transform coefficient are to be skipped, encoding of first information indicative of a substance of the primary transform.

(88)

The image processing apparatus according to (87), in which the encoding section skips encoding of the first information where second information relating to skip of the primary transform, the secondary transform and the quantization indicates skip of the primary transform, the secondary transform and the quantization.

(89)

The image processing apparatus according to (87) or (88), in which the encoding section encodes the first information where third information relating to permission of the primary transform indicates permission of the primary transform;

the second information indicates execution of the primary transform, the secondary transform and the quantization;

fourth information relating to skip of the primary transform indicates execution of the primary transform; and a total number of non-zero coefficients in a transform block of a processing target is equal to or greater than a given threshold value.

(90)

The image processing apparatus according to any one of (87) to (89), in which the encoding section binarizes and encodes the first information using truncated unary binarization.

(91)

The image processing apparatus according to any one of (87) to (90), in which the encoding section sets a value of the first information to a value according a prediction mode of the image.

(92)

The image processing apparatus according to any one of (87) to (91), in which the encoding section changes, where prediction of the image is inter prediction, a value of the first information to a value obtained by subtracting the value of the first information from a maximum value of the first information.

(93)

The image processing apparatus according to any one of (87) to (92), in which the encoding section arithmetically encodes a bin at a top of the binarized first information in a regular mode in which a context is used and arithmetically encodes remaining bins in a bypass mode in which a context is not used.

(94)

The image processing apparatus according to any one of (87) to (93), in which the primary transform is orthogonal transform, and the secondary transform is a transform process for transforming the primary transform coefficient into a one-dimensional vector;

performing matrix arithmetic operation for the one-dimensional vector;

performing scaling of the one-dimensional vector for which the matrix arithmetic operation is performed; and matrixing the scaled one-dimensional vector.

(95)

The image processing apparatus according to any one of (87) to (94), further including:

a primary transform section configured to perform the primary transform;

a secondary transform section configured to perform the secondary transform; and a quantization section configured to perform quantization for the secondary transform coefficient or the prediction residual, in which the encoding section encodes a quantization transform coefficient level obtained by the quantization of the secondary transform coefficient or the prediction residual by the quantization section to generate a bit stream that includes the encoded data of the quantization transform coefficient level, and, where encoding of the first information is to be performed, the encoded data of the first information is further included into the bit stream.

(96)

An image processing method, including:

skipping, where primary transform that is a transform process for a prediction residual that is a difference between an image and a prediction image of the image, secondary transform that is a transform process for a primary transform coefficient obtained by the primary transform of the prediction residual and quantization for a secondary transform coefficient obtained by the secondary transform of the primary transform coefficient are to be skipped, encoding of first information indicative of a substance of the primary transform.

(97)

An image processing apparatus, including:

a decoding section configured to skip, where dequantization for a quantization transform coefficient level obtained by decoding encoded data, inverse secondary transform for transforming a secondary transform coefficient obtained by the dequantization of the quantization transform coefficient level into a primary transform coefficient and inverse primary transform for transforming the primary transform coefficient into a prediction residual that is a difference between an image and a prediction image of the image are to be skipped, decoding of encoded data of first information relating to a substance of the inverse primary transform.

(98)

The image processing apparatus according to (97), in which the decoding section skips decoding of encoded data of the first information where second information relating to skip of the dequantization, the inverse secondary transform and the inverse primary transform indicates skip of the dequantization, the inverse secondary transform and the inverse primary transform.

(99)

The image processing apparatus according to any one of (97) or (98), in which the decoding section estimates, where decoding of encoded data of the first information is to be skipped, that the first information indicates that gives orthogonal transform is to be used for inverse primary transform in a horizontal direction and inverse primary transform in a vertical direction.

(100)

The image processing apparatus according to any one of (97) to (99), in which the decoding section decodes encoded data of the first information where third information relating to permission of the inverse primary transform indicates permission of the inverse primary transform;

the second information indicates execution of the dequantization, the inverse secondary transform and the inverse primary transform;

fourth information relating to skip of the inverse primary transform indicates execution of the inverse primary transform; and a total number of non-zero coefficients in a transform block of a processing target is equal to or greater than a give threshold value.

(101)

The image processing apparatus according to any one of (97) to (100), in which the decoding section arithmetically decodes encoded data of the first information and converts a bin obtained by the arithmetic decoding into a multi-value using truncated unary binarization to obtain the first information.

(102)

The image processing apparatus according to any one of (97) to (101), in which the decoding section sets a value of the first information obtained by the decoding to a value according to a prediction mode of the image.

(103)

The image processing apparatus according to any one of (97) to (102), in which the decoding section changes, where prediction of the image is inter prediction, a value of the first information to a value obtained by subtracting a value of the first information from a maximum value of the first information.

(104)

The image processing apparatus according to any one of (97) to (103), in which the decoding section arithmetically decodes a bin at a top of encoded data of the first information in a regular mode in which a context is used and arithmetically decodes remaining bins in a bypass mode in which a context is not used.

(105)

The image processing apparatus according to any one of (97) to (104), in which the decoding section is configured to further decode encoded data of the quantization transform coefficient level; and the image processing apparatus further includes a dequantization section configured to dequantize the quantization transform coefficient level obtained by decoding of the encoded data by the decoding section, an inverse secondary transform section configured to perform the inverse secondary transform for the secondary transform coefficient obtained by the dequantization of the quantization transform coefficient level by the dequantization section, and an inverse primary transform section configured to perform the inverse primary transform for the primary transform coefficient obtained by the inverse secondary transform of the secondary transform coefficient by the inverse secondary transform section.

(106)

An image processing method, including:

skipping, where dequantization for a quantization transform coefficient level obtained by decoding encoded data, inverse secondary transform for transforming a secondary transform coefficient obtained by the dequantization of the quantization transform coefficient level into a primary transform coefficient and inverse primary transform for transforming the primary transform coefficient into a prediction residual that is a difference between an image and a prediction image of the image are to be skipped, decoding of encoded data of first information relating to a substance of the inverse primary transform.

(111)

An image processing apparatus, including:

an encoding section configured to encode information obtained from image data and skip, where a transform process and quantization for the image data are to be skipped, encoding of adaptive primary transform information indicative of whether or not adaptive primary transform is to be carried out.

(112)

The image processing apparatus according to (111), in which the encoding section skips, where the transform process and the quantization for a luminance component of the image data are to be skipped, encoding of the adaptive primary transform information for the luminance component of the image data.

(113)

The image processing apparatus according to (111), in which the encoding section sets, for each color component, whether or not the adaptive primary transform information is to be encoded.

(114)

The image processing apparatus according to any one of (111) to (113), in which the encoding section further skips, where the adaptive primary transform is to be carried out for the image data, encoding of transform skip information indicative of whether or not the transform process for the image data is to be skipped.

(115)

The image processing apparatus according to (114), in which the encoding section sets, for each color component, whether or not the transform skip information is to be encoded.

(116)

The image processing apparatus according to (114), in which the encoding section skips, where the adaptive primary transform for a luminance component of the image data is to be carried out, encoding of the transform skip information for the luminance component of the image data.

(117)

An image processing method, including:

encoding information obtained from image data and skipping, where a transform process and quantization for the image data are to be skipped, encoding of adaptive primary transform information indicative of whether or not adaptive primary transform is to be carried out.

(121)

An image processing apparatus, including:

a decoding section configured to decode encoded data encoded from information obtained from image data and skip, where an inverse transform process and dequantization for the data decoded from the encoded data is to be skipped, decoding of inverse adaptive primary transform information indicative of whether or not inverse adaptive primary transform is to be carried out.

(122)

The image processing apparatus according to (121), in which the decoding section skips, where the inverse transform process and the dequantization for data relating to a luminance component of the image data are to be skipped, decoding of the inverse adaptive primary transform information for data relating to the luminance component of the image data.

(123)

The image processing apparatus according to (121), in which the decoding section sets, for each color component, whether or not the inverse adaptive primary transform information is to be decoded.

(124)

The image processing apparatus according to any one of (121) to (123), in which the decoding section further skips, where the inverse adaptive primary transform is to be carried out for the data, decoding of inverse transform skip information indicative of whether or not the inverse transform process for the data is to be skipped.

(125)

The image processing apparatus according to (124), in which the decoding section sets, for each color component, whether or not the inverse transform skip information is to be decoded.

(126)

The image processing apparatus according to (124), in which the decoding section skips, where the inverse adaptive primary transform for data relating to a luminance component of the image data is to be carried out, decoding of the inverse transform skip information for data relating to the luminance component of the image data.

(127)

An image processing method, including:

decoding encoded data encoded from information obtained from image data and skipping, where an inverse transform process and dequantization for the data decoded from the encoded data is to be skipped, decoding of inverse adaptive primary transform information indicative of whether or not inverse adaptive primary transform is to be carried out.

(131)

An image processing apparatus, including:

an encoding section configured to encode information obtained from image data and skip, where a transform process and quantization for the image data are to be skipped, encoding of transform skip information indicative of whether or not the transform process for the image data is to be skipped.

(132)

The image processing apparatus according to (131), in which the encoding section sets, for each color component, whether or not the transform skip information is to be encoded.

(133)

The image processing apparatus according to (131) or (132), in which the encoding section further skips encoding of adaptive primary transform information indicative of whether or not adaptive primary transform is to be carried out.

(134)

The image processing apparatus according to (133), in which the encoding section skips encoding of the adaptive primary transform information for a luminance component of the image data.

(135)

The image processing apparatus according to (133), in which the encoding section sets, for each color component, whether or not the adaptive primary transform information is to be encoded.

(136)

An image processing method, including:

encoding information obtained from image data and skipping, where a transform process and quantization for the image data are to be skipped, encoding of transform skip information indicative of whether or not the transform process for the image data is to be skipped.

(141)

An image processing apparatus, including:

a decoding section configured to decode encoded data encoded from information obtained from image data and skip, where an inverse transform process and dequantization for data decoded from the encoded data are to be skipped, decoding of inverse transform skip information indicative of whether or not an inverse transform process for the data decoded from the encoded data is to be skipped.

(142)

The image processing apparatus according to (141), in which the decoding section sets, for each color component, whether or not the inverse transform skip information is to be decoded.

(143)

The image processing apparatus according to (141) or (142), in which the decoding section further skips decoding of inverse adaptive primary transform information indicative of whether or not inverse adaptive primary transform is to be carried out.

(144)

The image processing apparatus according to (143), in which the decoding section skips decoding of the inverse adaptive primary transform information for data relating to a luminance component of the image data.

(145)

The image processing apparatus according to (143), in which the decoding section sets, for each color component, whether or not the inverse adaptive primary transform information is to be decoded.

(146)

An image processing method, including:

decode encoding data encoded from information obtained from image data and skipping, where an inverse transform process and dequantization for data decoded from the encoded data are to be skipped, decoding of inverse transform skip information indicative of whether or not an inverse transform process for the data decoded from the encoded data is to be skipped.

REFERENCE SIGNS LIST

100 Image encoding apparatus, 101 Control section, 111 Arithmetic operation section, 112 Transform section, 113 Quantization section, 114 Encoding section, 115 Dequantization section, 116 Inverse transform section, 117 Arithmetic operation section, 118 Frame memory, 119 Prediction section, 131 Switch, 132 Primary transform section, 133 Secondary transform section, 141 Rasterize section, 142 Matrix arithmetic operation section, 143 Scaling section, 144 Matrixing section, 145 Secondary transform selection section, 200 Image decoding apparatus, 211 Decoding section, 212 Dequantization section, 213 inverse transform section, 214 Arithmetic operation section, 215 Frame memory, 216 Prediction section, 231 Switch, 232 Inverse secondary transform section, 233 inverse primary transform section, 241 Rasterize section, 242 Matrix arithmetic operation section, 243 Scaling section, 244 Matrixing section, 245 Inverse secondary transform selection section, 301 Secondary transform validity flag encoding section, 302 Secondary transform identifier encoding section, 303 Transform skip validity flag encoding section, 304 Maximum transform skip block size encoding section, 305 Transform quantization bypass flag encoding section, 306 Transform skip flag encoding section, 311 Secondary transform validity flag decoding section, 312 Secondary transform identifier decoding section, 313 Transform skip validity flag decoding section, 314 Maximum transform skip block size decoding section, 315 Transform quantization bypass flag decoding section, 316 Transform skip flag decoding section, 321 Secondary transform flag encoding section, 331 Secondary transform flag decoding section, 401 Primary transform validity flag encoding section, 402 Primary transform identifier encoding section, 411 Primary transform validity flag decoding section, 412 Primary transform identifier decoding section, 461 Transform skip flag decoding section

The invention claimed is:

1. An image processing apparatus, comprising:
an encoding section configured to skip, where secondary transform is to be performed for a primary transform coefficient obtained by primary transform of a prediction residual that is a difference between an image and a prediction image of the image, encoding of first information relating to skip of performing the primary transform on the prediction residual,
wherein the encoding section is implemented via at least one processor.

2. An image processing method, comprising:
skipping, where secondary transform is to be performed for a primary transform coefficient obtained by primary transform of a prediction residual that is a difference between an image and a prediction image of the image, encoding of first information relating to skip of performing the primary transform on the prediction residual.

3. An image processing apparatus, comprising:
a decoding section configured to skip, where inverse secondary transform that is inverse transform to secondary transform that is a transform process for a primary transform coefficient obtained by primary transform of a prediction residual that is a difference between an image and a prediction image of the image is to be performed, decoding of encoded data of first information relating to skip of performing inverse primary transform on the prediction residual that is inverse transform to the primary transform,
wherein the decoding section is implemented via at least one processor.

4. An image processing method, comprising:
skipping, where inverse secondary transform that is inverse transform to secondary transform that is a transform process for a primary transform coefficient obtained by primary transform of a prediction residual that is a difference between an image and a prediction image of the image is to be performed, decoding of encoded data of first information relating to skip of performing inverse primary transform on the prediction residual that is inverse transform to the primary transform.

5. An image processing apparatus, comprising:

an encoding section configured to skip, where primary transform that is a transform process for a prediction residual that is a difference between an image and a prediction image of the image is to be skipped, encoding of first information relating to skip of secondary transform that is a transform process for a primary transform coefficient obtained by the primary transform of the prediction residual, wherein the encoding section is implemented via at least one processor.

6. An image processing method, comprising:

skipping, where primary transform that is a transform process for a prediction residual that is a difference between an image and a prediction image of the image is to be skipped, encoding of first information relating to skip of secondary transform that is a transform process for a primary transform coefficient obtained by the primary transform of the prediction residual.

7. An image processing apparatus, comprising:

a decoding section configured to skip, where inverse primary transform that is inverse transform to primary transform that is a transform process for a prediction residual that is a difference between an image and a prediction image of the image is to be skipped, decoding of encoded data of first information relating to skip of inverse secondary transform that is inverse transform to secondary transform that is a transform process for a primary transform coefficient obtained by the primary transform of the prediction residual, wherein the decoding section is implemented via at least one processor.

8. The image processing apparatus according to claim 7, wherein the decoding section skips decoding of inverse primary transform skip information relating to skip of the inverse primary transform based on a size in a horizontal direction and a size in a vertical direction of a transform block of the inverse primary transform and the inverse secondary transform.

9. The image processing apparatus according to claim 8, wherein the decoding section skips decoding of the inverse primary transform skip information where a greater one of the sizes of the transform block in the horizontal direction and the vertical direction is greater than a given value.

10. The image processing apparatus according to claim 8, wherein the decoding section skips decoding of the inverse primary transform skip information where a sum or a product of the sizes of the transform block in the horizontal direction and the vertical direction is greater than a given value.

11. An image processing method, comprising:

skipping, where inverse primary transform that is inverse transform to primary transform that is a transform process for a prediction residual that is a difference between an image and a prediction image of the image is to be skipped, decoding of encoded data of first information relating to skip of inverse secondary transform that is inverse transform to secondary transform that is a transform process for a primary transform coefficient obtained by the primary transform of the prediction residual.

\* \* \* \* \*